US007389916B2

(12) United States Patent
Chirnomas

(10) Patent No.: US 7,389,916 B2
(45) Date of Patent: Jun. 24, 2008

(54) METHOD AND APPARATUS FOR CONTROLLING RENTED OR LEASED OR LOANED EQUIPMENT

(76) Inventor: Munroe Chirnomas, 47 Skyline Dr., Morris Township, NJ (US) 07960

( * ) Notice: Subject to any disclaimer, the term of this patent is extended or adjusted under 35 U.S.C. 154(b) by 0 days.

(21) Appl. No.: 11/076,732

(22) Filed: Mar. 10, 2005

(65) Prior Publication Data

US 2005/0156028 A1 Jul. 21, 2005

Related U.S. Application Data

(63) Continuation of application No. 10/766,178, filed on Jan. 27, 2004, now Pat. No. 6,917,853, which is a continuation of application No. 09/998,382, filed on Nov. 29, 2001, now abandoned, which is a continuation-in-part of application No. PCT/US01/16853, filed on May 23, 2001, which is a continuation-in-part of application No. PCT/US01/16893, filed on May 23, 2001, which is a continuation-in-part of application No. PCT/US01/16837, filed on May 23, 2001, which is a continuation-in-part of application No. PCT/US01/16847, filed on May 23, 2001, which is a continuation-in-part of application No. PCT/US01/16846, filed on May 23, 2001, which is a continuation-in-part of application No. PCT/US01/16894, filed on May 23, 2001.

(60) Provisional application No. 60/257,316, filed on Dec. 21, 2000, provisional application No. 60/206,363, filed on May 23, 2000.

(51) Int. Cl.
*G06F 7/08* (2006.01)

(52) U.S. Cl. ....................................... 235/381; 235/379

(58) Field of Classification Search ................ 235/379, 235/381; 705/59, 26
See application file for complete search history.

(56) References Cited

U.S. PATENT DOCUMENTS

2001/0039614 A1* 11/2001 Hellberg et al. ............ 713/156

FOREIGN PATENT DOCUMENTS

JP 2001312766 A * 2/2000

* cited by examiner

*Primary Examiner*—Karl D. Frech
(74) *Attorney, Agent, or Firm*—Lawrence C. Edelman

(57) ABSTRACT

A method and apparatus relating to the renting, leasing and/or loaning of electronic equipment operable and/or controllable by a computer, wherein one entity not in physical possession and/or control of the equipment desires control over another entity which has physical possession and/or control of the equipment. Such equipment may comprise a washing machine, medical, office or industrial equipment, a vending machine, etc. A central computer system includes software which enables management and execution of financial transactions between the entities, such as debiting or crediting of accounts held by these or other entities, or creating an invoice for one entity to present to another entity. Information used in making these financial transactions can be determined by analysis of information which may be communicated to the central computer system from at least one other source. Such source may include the control system of the controlled equipment, e.g., from a vending machine or the computer system of an interested entity.

41 Claims, 27 Drawing Sheets

METHOD AND APPARATUS FOR CONTROLLING RENTED OR LEASED OR LOANED EQUIPMENT

CROSS-REFERENCE TO RELATED APPLICATIONS

This application is a continuation of U.S. patent application Ser. No. 10/766,178, filed Jan. 27, 2004 now U.S. Pat. No. 6,917,853, entitled METHOD AND APPARATUS FOR CONTROLLING RENTED OR LEASED OR LOANED EQUIPMENT, which application claimed the priority of and was a continuation of U.S. patent application Ser. No. 09/998,382, filed Nov. 29, 2001 now abandoned, having the same title, which application claimed the priority of and was a continuation in part of: (i) PCT/US01/16853, filed May 23, 2001, entitled METHOD AND APPARATUS FOR INCLUDING ARTICLE IDENTIFICATION IN AN ARTICLE HANDLING DEVICE; (ii) PCT/US01/16893, filed May 23, 2001, entitled METHODS OF DOING THE BUSINESS OF MACHINE VENDING (which claims the benefit of U.S. Provisional Patent Application No. 60/257,316, filed Dec. 21, 2000, entitled METHOD AND APPARATUS FOR ARTICLE HANDLING, SUCH AS FOR A VENDING MACHINE); (iii) PCT/US01/16837, filed May 23, 2001, entitled METHOD AND APPARATUS FOR CONTROLLING A VENDING MACHINE; (iv) PCT/US01/16847, filed May 23, 2001, entitled METHOD AND APPARATUS FOR STORING ARTICLES FOR USE WITH AN ARTICLE HANDLING DEVICE; (v) PCT/US01/16846, filed May 23, 2001, entitled METHOD AND APPARATUS FOR HOSE STORAGE IN AN ARTICLE HANDLING DEVICE; (vi) PCT/US01/16894, filed May 23, 2001, entitled METHOD AND APPARATUS FOR POSITIONING AN ARTICLE HANDLING DEVICE, all of the above patent applications claim the benefit of U.S. Provisional Patent Application No. 60/206,363, filed May 23, 2000, entitled METHOD AND APPARATUS FOR ARTICLE HANDLING, SUCH AS FOR A VENDING MACHINE.

The prior application also claimed priority of and was a continuation in part of: (vii)International Publication No. WO 01/11578, filed Aug. 7, 2000, entitled VENDING MACHINE (which claims the benefit of U.S. Provisional Patent Application No. 60/147,832, filed Aug. 7, 1999, entitled VENDING MACHINE), and (viii) its corresponding U.S. application Ser. No. 09/633,477. (ix) U.S. Provisional Patent Application No. 60/257,316, filed Dec. 21, 2000 and entitled METHOD AND APPARATUS FOR ARTICLE HANDLING, SUCH AS FOR A VENDING MACHINE; and (x) U.S. Provisional Patent Application No. 60/261,964, filed Jan. 16, 2001 and entitled METHOD AND APPARATUS FOR ARTICLE HANDLING AND DISPENSING DEVICES; (xi) U.S. Provisional Patent Application No. 60/294,284, filed May 29, 2001, entitled METHOD AND APPARATUS FOR QUICK CHANGE DISPLAY GRAPHICS ON A MERCHANDISER; and (xii) U.S. Provisional Patent Application No. 60/296,675, filed Jun. 7, 2001, entitled METHOD AND APPARATUS FOR ARTICLE HANDLING, SUCH AS WITH A VENDING MACHINE.

The prior application also claimed priority of and was a continuation in part of: (xiii) U.S. Provisional Patent Application No. 60/332,518 filed Nov. 23, 2001 in the name of Munroe Chimomas and entitled MACHINE FOR VENDING ARTICLES AND METHODS ASSOCIATED THEREWITH, and of (xiv) U.S. Provisional Patent Application No. 09/991,767 filed Nov. 23, 2001 in the name of Munroe Chirnomas and entitled METHOD AND APPARATUS FOR VENDING GOODS. The entire disclosures of all of the above patent applications are incorporated herein by reference, at least for US purposes.

BACKGROUND OF THE INVENTION

The invention disclosed therein has applicability to the renting, leasing and/or loaning, etc. of electronic equipment, such as a washing machine, office equipment, industrial or medical equipment, vending or article dispensing equipment, and many other types of equipment operable and/or controllable by a computer, wherein the one entity wishes to have some control over another entity that has physical possession and/or control of the equipment.

The invention is especially useful for such equipment where one entity has an interest in controlling, in conjunction with at least one other interested entity, the usage of an equipment which is in the physical control and/or possession, custody etc. of a second entity.

Although detailed examples of the present invention will be described below in the environment of improvements in apparatus and methods involving the vending of goods from a vending apparatus, as noted above, and will be noted at places below, the invention is applicable more broadly to equipment control between various parties interested in the equipment.

Conventional vending machines are sized to fit into a space measuring about 4'×4'×6'. These vending machines typically include a storage area in which various goods are located and a dispensing means to move the goods from the storage area to an exit port. When a user of the vending machine (i.e., a purchaser of goods) wishes to purchase goods, he or she inserts money into the vending machine and is given an opportunity to select a particular item from the plurality of goods stored within the vending machine. Sometimes this selection process involves the user viewing the goods within the storage area of the vending machine by way of some transparent window or the like. Alternatively, some vending machines do not permit the user to view the goods stored within the machine, the selectable goods being understood by way of visible indicia on the exterior of the vending machine (e.g., branding indicia, advertising indicia, etc.) in association with selection indicia and/or means. In either case, the user usually enters his or her selection by way of a keypad, selection buttons, etc. In response to the user's selection, the dispensing means of the vending machine moves the selected goods from the storage area to the exit port of the vending machine such that the user may obtain the goods.

The above discussion relates to how a user obtains goods from a conventional vending machine. The purchase, installation, and maintenance of a conventional vending machine and the distribution of revenue from that vending machine will now be discussed. Using conventional techniques, an operator of a vending machine purchases the vending machine from a manufacturer of vending machines. The operator may obtain a loan from a third party (e.g., a bank) using the vending machine to collateralize the loan. In the alternative, the operator can lease the vending machine from a lessor of capital equipment for some agreed upon price schedule (usually involving payment on a monthly, quarterly, yearly, etc. basis).

Irrespective of how the vending machine is purchased or leased, the operator takes possession of the vending machine and installs the vending machine at a particular location, for example, within a business office, at a gas station, at an airport, at a tavern, etc. Placing the vending machine at the particular location may require that the operator enter into an agreement with the owner of the real property (or his or her representative) on which the vending machine is disposed. (Of course, when the operator owns the property on which the vending machine is located, no separate agreement need be obtained.) Typically, the agreement between the operator and the owner of the real property requires the operator to make periodic payments to the owner of the real property, for example, on a monthly, quarterly, yearly, etc. basis.

The operator is typically responsible for maintaining the vending machine after it is installed. This maintenance typically includes the purchasing of goods from a seller of goods, stocking the vending machine with the goods, and collecting revenue from the vending machine. The seller of goods is typically a goods manufacturer or distributor, for example, a food and/or beverage company, a candy company, and ice cream company, etc. The operator usually enters into an agreement with the seller of goods that dictates the quantity and price of the goods that the operator may purchase from the seller of goods. The agreement may also prescribe other factors, such as how the goods are displayed within the vending machine (e.g., when the vending machine includes a transparent window through which the purchaser may view the goods). It is noted that the operator may enter into agreements with a plurality of sellers of goods to obtain stock for a given vending machine such that different types and/or brands of goods may be stocked in a given vending machine.

As mentioned above, the operator typically collects revenue from the vending machine (i.e., the money deposited in the vending machine by purchasers of goods). This is usually done at the time that the vending machine is stocked with goods, such as on a daily, weekly, bi-weekly, monthly, etc. basis. The operator typically uses portions of the revenue to pay the manufacturer of vending machines, the lessor of capital equipment, the bank (e.g., for the purchase of the vending machine), the owner of the real property on which the vending machine is disposed (e.g., for rental of the real property), and/or the seller of goods (e.g., for purchasing previous or future goods to stock the vending machine).

While the conventional uses of vending machines and conventional business relationships among the entities involved directly or indirectly in the vending of goods from vending machines have been readily employed in the past, they are woefully inadequate in meeting future objectives for vending goods. For example, it would be desirable to permit an entity, other than the operator, to share in the risks and rewards (i.e., the losses and profits) of vending goods from a vending machine. Conventional vending machines and conventional business relationships, however, are ill equipped to achieve this result, primarily due to the inherent problems in verifying sales data and enforcing contractual obligations involving the vending of goods. Indeed, a seller of goods would not be motivated to enter into an agreement with an operator to share in the risks and rewards of vending its goods from a vending machine if it is difficult for the seller of goods to verify the sales data of the vending machine and/or enforce the obligations of any agreement governing such a relationship. Since the operator has virtually exclusive control over the vending machine, particularly in terms of stocking goods and collecting revenue, any share of the risks and rewards from vending goods are subject to the honesty and integrity of the operator. While it would be unfair to suggest that all operators are untrustworthy, it has been discovered that, as a practical matter, other entities have been unwilling to enter into agreements to share in the risks and rewards of goods vending with operators due to concerns of data verification and enforcement.

Efforts have been made in the vending art to make data concerning the sales of goods from a vending machine available to interested parties. The so-called Direct Data Exchange (DEX) format of vending data reporting purports to provide a means for obtaining sales information, such as type of goods, brand of goods, package type, weight, price, etc. Members of the National Automatic Merchandizing Association (NAMA) and others, however, understand that the DEX format has not been standardized and, therefore, is of marginal use as a tool in obtaining useful vending data from the field. Moreover, the accuracy of the DEX information is subject to the data collection and reporting processes of the operator. Indeed, an unscrupulous operator could easily tamper with, forge, or otherwise modify vending data obtained at a particular vending machine and arrange the data in the DEX format in an effort to legitimize the data to his or her advantage and, consequently, to the disadvantage of other parties that may be seeking to rely on the DEX data.

Accordingly, there is a need in the vending art for apparatus and methods that will facilitate agreements among entities with interests in vending goods, in addition to the operator, to share in the risks and rewards of vending. Indeed, distributing the risks associated with purchasing, installing, stocking, and selling goods through a vending machine among two or more entities will encourage people heretofore not willing to participate in the vending of goods and, therefore, expand the marketplace and ultimately provide better service to consumers.

SUMMARY OF THE INVENTION

The following invention is especially useful for equipment which is leased, rented, loaned, or licensed from one entity to another entity (such as a washing machine or an industrial or household appliance), or where one entity has an interest in controlling the usage of equipment which a second entity is in the physical control possession, custody etc. of the equipment with at least one other interested entity where the system includes:

i. a first computer having recorded information relating to the usage of a piece of equipment and, ii. the recorded information is communicated to at least one other computer system, iii. the at least one other computer system compares the information received to a database and determines whether the equipment is being used in a prescribed manner, iv. if the equipment is being used in a prescribed manner, then the one other computer can release a continuation code which can be communicated back to the first computer which can prevent the first computer from being disabled.

b. A piece of equipment controlled by an equipment computer control system linked to the equipment, and whereby the equipment computer control system is operable to disable the equipment upon the occurrence of a predetermined parameter being met.

c. Where the equipment computer control system can record data relating to at least one attribute (such as time, usage, unauthorized uses) or parameter in the equipment, and is able to release at least some of the data to another computer control system through some communication link.

d. Where the equipment computer control system can store a program memory which enables the equipment to perform a complete range of functions.

e. Where the computer control system can store in its memory prescribed parameters which determine specific restrictions or limitations which limit the equipment, from being able to perform a complete range of operation, to not being able to operate.

f. Where at least some of the data recorded by the equipment control system can be communicated from the equipment (using a data link, and preferably using an encryption technique to secure the data) to an external computer system.

g. Where the external computer system can receive the data from the equipment. If the data is encrypted, it can be decrypted and thereby authenticated as genuine and unadulterated data, and h. Where the external computer system is able to store information relating to the prescribed parameters which relate to its authorized usage.

i. The external computer system compares the usage and the specific ways in which the equipment was used to determine what, if any, action or decision should be taken 2) In addition to the above, the piece of machinery or equipment can also have security circuits throughout the system so that if the computer is altered or changed, the other components in the equipment would refuse to work, thus disabling operability of the equipment.

3) In some cases, the equipment has multiple capabilities, so that it can be used with more or less features or limitations, some or all of which can be disabled or modified based on information received, monitored or learned by the equipment control system.

4) As described above, where the amount of usage must first be reported back to the external computer before a continuation code can be released (such as with a leased car etc.)

5) This data can also be used to build a database to allow an equipment manufacturer or finance company understand how the equipment is being used This can be useful information when designing finance plans, marketing, advertising plans and equipment.

6) As described above, were the external computer system takes into consideration the information communicated from the equipment computer control and the information within the database relating to the creditworthiness of at least one entity.

7) Computer systems (first and external) and their control aspects and their link to other apparatus in the machine.

In accordance with further aspects of the present invention, the vending of goods from a vending apparatus is contemplated. It is understood that the term “vending apparatus” encompasses vending machines of conventional size and scale, such as snack food vending machines, beverage vending machines, ice cream vending machines, etc. The present invention, however, is not limited to this conventional scale of vending machines and, indeed, contemplates the vending of other types of goods using vending apparatus of various sizes and scales. For example, the vending apparatus may take on the size of a small, medium, or large room or building. A room-size vending apparatus may, for example, be located in an office and any type of goods may be stored and dispensed to employees or other people within the office. For example, office supplies (i.e., goods) may be stored within the vending apparatus and dispensed to people in the office with a need for office supplies. Alternatively, a building-size vending apparatus may be disposed at locations where convenience stores are typically found, for example, gas stations, rest stops, etc., such that goods that are typically found in convenience stores may be vended to purchasers. One skilled in the art will appreciate that variations in the sizes of, scales of, location of (e.g., above or below ground, etc.), and goods vended from apparatus in accordance with the invention are vast and should only be limited by the claims appended hereto.

It is noted that the sales of goods encompass the dispensing of goods that have been, or will be, paid for at some other time.

Numerous entities that may have an interest in the sales of goods from a vending apparatus in accordance with the invention will be referred to herein. These entities include, but are not limited to, machine manufacturers, operators, property holders (or owners), sellers of goods, lenders, lessors, data managers, and users.

By way of example, a machine manufacturer may be an entity that designs and/or manufactures a vending apparatus in accordance with one or more aspects of the present invention, or may be a representative, agent, or distributor for the machine manufacturer.

The operator may be an entity involved with at least one of, for example, the purchase, the rental, the installation, and/or the maintenance of a vending apparatus (e.g., loading of product into, the management of, the servicing of, etc., the vending apparatus) in accordance with one or more aspects of the present invention.

The property holder may be an owner, landlord, lessee, agent, or any other entity having an interest in the real property at which a vending apparatus is located.

The seller of goods may be a manufacturer, distributor, agent, broker, or other entity with an interest in the goods sold from the vending apparatus. It is noted that the seller of goods may often be a supplier of goods to the operator of the vending apparatus.

The lender may be a bank, a venture capitalist, a financing company, a leasing company, an investor, and/or any other entity that loans money to another entity to purchase, lease, or rent the vending apparatus.

The lessor may be a bank, a lessor of capital equipment, and/or any other entity with an ownership interest in the vending apparatus and that loans the vending apparatus to another entity.

The data manager may be any entity engaged in receiving or transmitting data concerning the sales of goods from one or more vending apparatus.

It is noted that the definitions provided above concerning the entities with an interest in the vending of goods from a vending apparatus are given by way of example and to assist in clarifying the aspects of the invention. As such, those skilled in the art will appreciate that the relationships among the entities discussed herein vis-a-vis one another and vis-a-vis the vending apparatus may include combinations of the aspects given above. For example, the machine manufacturer may be one or more of an operator, a property holder, a seller of goods, etc. The operator may be one of, but not limited to, an owner, a lessee, a renter, etc. of a vending apparatus. The seller of goods may also be one or more of an operator, a property holder, etc. One skilled in the art will appreciate that the variations are vast and any such variations may be contemplated without departing from the spirit and scope of the aspects of the invention.

In accordance with one or more aspects of the present invention, methods and/or apparatus are contemplated that utilize the disabling of, re-abling of, and/or prevention of disabling a vending apparatus.

In accordance with one or more further aspects of the present invention, methods and/or apparatus are contemplated for monitoring and/or releasing data concerning the sales of goods from a vending apparatus.

In accordance with one or more further aspects of the present invention, methods and/or apparatus are contemplated for receiving data concerning the sales of goods from a vending apparatus by a central computer.

In accordance with one or more further aspects of the present invention, methods and/or apparatus are contemplated for authenticating data by a vending apparatus, e.g., producing data concerning the sales of goods or any other data concerning a vending apparatus utilizing an encryption technology.

In accordance with one or more further aspects of the present invention, a vending apparatus includes: at least one storage area being operable to store goods for sale; at least one retrieving device operable to retrieve the goods from the storage area and to dispense the goods from the vending apparatus; and a processing unit operable to (i) permit the dispensing of goods from the vending apparatus for an interval, (ii) partially disable the vending apparatus from dispensing at least some of the goods at an end of the interval, and (iii) not at least partially disable the vending apparatus at the end of the interval if a continuation code is received by the vending apparatus before the end of the interval.

In accordance with one or more further aspects of the present invention, a method includes: permitting the dispensing of goods from a vending apparatus for an interval, the vending apparatus including at least one storage area being operable to store goods for sale and at least one retrieving device operable to retrieve the goods from the storage area and to dispense the goods from the vending apparatus; at least partially disabling the vending apparatus from dispensing at least some of the goods at an end of the interval; and not at least partially disabling the vending apparatus at the end of the interval if a continuation code is received by the vending apparatus before the end of the interval.

In accordance with one or more further aspects of the present invention, a method includes: entering into at least one contractual obligation with at least one entity concerning sales of goods from a vending apparatus; and agreeing with the at least one entity that (i) the vending apparatus may be enabled to dispense the goods for an interval, (ii) the vending apparatus is at least partially disabled from dispensing at least some of the goods at an end of the interval, and (iii) the vending apparatus is not at least partially disabled at the end of the interval if a continuation code is received by the vending apparatus before the end of the interval.

In accordance with one or more further aspects of the present invention, a vending apparatus includes: at least one storage area being operable to store goods for sale; at least one retrieving device operable to retrieve the goods from the storage area and to dispense the goods from the vending apparatus; and a processing unit operable to (i) permit the dispensing of goods from the vending apparatus, and (ii) at least partially disable the vending apparatus from dispensing at least some of the goods when an externally generated disable code is received by the vending apparatus.

In accordance with one or more further aspects of the present invention, a method includes: permitting the dispensing of the goods from a vending apparatus, the vending apparatus including at least one storage area being operable to store goods for sale and at least one retrieving device operable to retrieve the goods from the storage area and to dispense the goods from the vending apparatus; and at least partially disabling the vending apparatus from dispensing at least some of the goods when an externally generated disable code is received by the vending apparatus.

In accordance with one or more further aspects of the present invention, a method includes: entering into at least one contractual obligation with at least one entity concerning sales of goods from a vending apparatus; and agreeing with the at least one entity that (i) the vending apparatus may be enabled to dispense the goods, and (ii) the vending apparatus may be at least partially disabled from dispensing at least some of the goods when an externally generated disable code is received by the vending apparatus.

In accordance with one or more further aspects of the present invention, a vending apparatus includes: at least one storage area being operable to store goods for sale; at least one retrieving device operable to retrieve the goods from the storage area and to dispense the goods from the vending apparatus; and a processing unit operable to (i) permit the vending apparatus to dispense goods, (ii) at least partially disable the vending apparatus from dispensing at least some of the goods when a condition has occurred, and (iii) at least partially re-enabling the vending apparatus based on receiving a re-enable code.

In accordance with one or more further aspects of the present invention, a method includes: permitting a vending apparatus to dispense goods, the vending apparatus including at least one storage area being operable to store goods for sale and at least one retrieving device operable to retrieve the goods from the storage area and to dispense the goods from the vending apparatus; at least partially disabling the vending apparatus from dispensing at least some of the goods when a condition has occurred; and at least partially re-enabling the vending apparatus based on receiving a re-enable code.

In accordance with one or more further aspects of the present invention, a method includes: entering into at least one contractual obligation with at least one entity concerning sales of goods from a vending apparatus; and agreeing with the at least one entity that (i) the vending apparatus may be enabled to dispense the goods, (ii) the vending apparatus may be at least partially disabled from dispensing at least some of the goods when a condition has occurred, and (iii) the vending apparatus may be at least partially re-enabled by receiving a re-enable code after having been at least partially disabled.

In accordance with one or more further aspects of the present invention, a vending apparatus includes: at least one storage area being operable to store goods for sale; at least one retrieving device operable to retrieve the goods from the storage area and to dispense the goods from the vending apparatus; and a processing unit operable to (i) monitor a first selection of goods for purchase made by a user of the vending apparatus; (ii) determine whether the first selection is for at least some goods that are out of inventory within the vending apparatus; and (iii) monitor at least a second selection of goods for purchase made by the user in response to the first selection of goods being out of inventory.

In accordance with one or more further aspects of the present invention, a vending apparatus includes: at least one storage area being operable to store goods for sale; at least one retrieving device operable to retrieve the goods from the storage area and to dispense the goods from the vending apparatus; and a processing unit operable to (i) monitor data concerning sales of the goods from the vending apparatus; and (ii) release the data from the vending apparatus to at least one interested entity, wherein the data include at least one of (i) information concerning vending or attempts at vending unauthorized goods from the vending apparatus; (ii) information concerning the sales of goods from the vending apparatus obtained using a goods identification scanning device of the vending apparatus; and (iii) information concerning any limitations under which the vending apparatus vends the goods.

In accordance with one or more further aspects of the present invention, a method of monitoring data concerning sales of goods from a vending apparatus includes: monitoring a first selection of goods for purchase made by a user of the vending apparatus; using the vending apparatus to determine whether the first selection is for at least some goods that are out of.inventory within the vending apparatus; and using the vending apparatus to monitor at least a second selection of goods for purchase made by the user in response to the first selection of goods being out of inventory.

In accordance with one or more further aspects of the present invention, a method includes: using a vending apparatus to monitor data concerning sales of goods therefrom; and releasing the data from the vending apparatus to at least one interested entity, wherein the data include at least one of (i) information concerning vending or attempts at vending unauthorized goods from the vending apparatus; (ii) information concerning the sales of goods from the vending apparatus obtained using a goods identification scanning device of the vending apparatus; and (iii) information concerning any limitations under which the vending apparatus vends the goods.

In accordance with one or more further aspects of the present invention, a processing system includes: a data processor that is remote from at least one vending apparatus and operable to receive data from the vending apparatus concerning sales of goods from the vending apparatus; and a database operable to store at least some of the data, wherein the data include at least one of (i) information concerning vending or attempts at vending unauthorized goods from the vending apparatus; (ii) information concerning the sales of goods from the vending apparatus obtained using a goods identification scanning device of the vending apparatus; (iii) information concerning any limitations under which the vending apparatus vends the goods; and (iv) information concerning a user's second selection of goods from the vending apparatus in response to the user's first selection of goods being out of inventory in the vending apparatus.

In accordance with one or more further aspects of the present invention, a method includes: providing a central data processing system that is remote from at least one vending apparatus and operable to receive data from the vending apparatus concerning sales of goods from the vending apparatus; and receiving the data from the vending apparatus, wherein the data include at least one of (i) information concerning vending or attempts at vending unauthorized goods from the vending apparatus; (ii) information concerning the sales of goods from the vending apparatus obtained using a goods identification scanning device of the vending apparatus; (iii) information concerning any limitations under which the vending apparatus vends the goods; and (iv) information concerning a user's second selection of goods from the vending apparatus in response to the user's first selection of goods being out of inventory in the vending apparatus.

In accordance with one or more further aspects of the present invention, a vending apparatus includes: at least one storage area being operable to store goods for sale and at least one retrieving device operable to dispense the goods from the vending apparatus; and a processing unit operable to produce a code associated with at least some data obtained by the vending apparatus concerning sales of the goods therefrom, the code providing an indication as to whether the at least some data have been tampered with, at least one of the code and the at least some data concerning sales of goods from the vending apparatus being releasable from the vending apparatus to at least one interested entity such that a determination may be made as to whether the at least some data have been tampered with.

In accordance with one or more further aspects of the present invention, a method includes: using a vending apparatus to produce a code associated with at least some data obtained by the vending apparatus concerning sales of goods therefrom, the code providing an indication as to whether the at least some data have been tampered with; and releasing at least one of the code and the at least some data concerning sales of goods from the vending apparatus to at least one interested entity such that a determination may be made as to whether the at least some data have been tampered with.

Other aspects, features, and advantages of the present invention will be apparent to one skilled in the art from the description herein including the accompanying drawings.

Numerous scenarios are contemplated by the present invention which utilize the described invention and many permutations of the invention are possible.

BRIEF DESCRIPTION OF THE DRAWINGS

For the purposes of illustrating the invention, there are shown in the drawings, forms that are presently preferred, it being understood, however, that the invention is not limited to the precise arrangements and/or instrumentalities shown.

DETAILED DESCRIPTION

Figure 1:
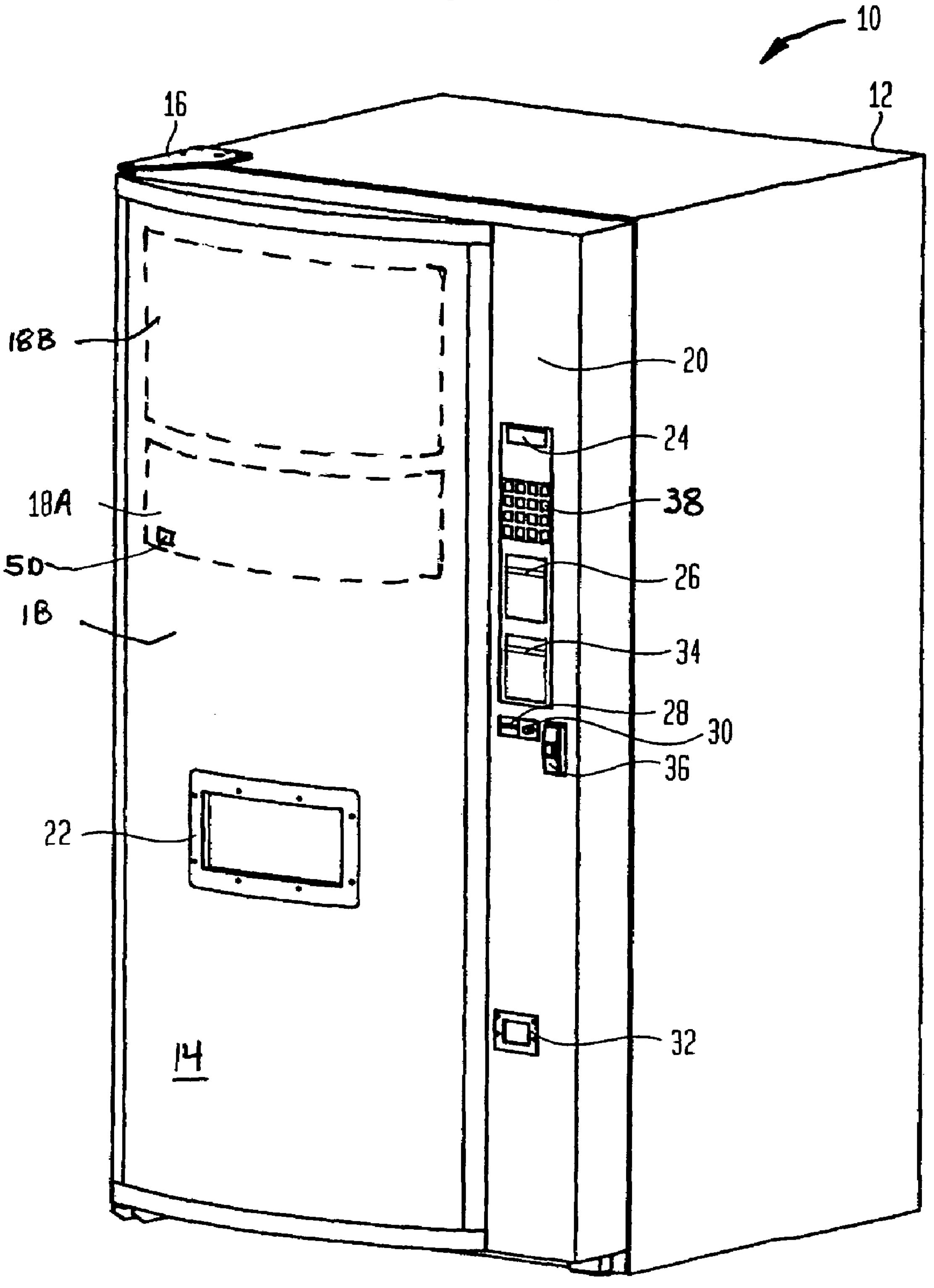
FIG. 1 is a perspective view of a vending apparatus suitable for use in accordance with one or more aspects of the present invention.

With reference to FIG. 1, a vending apparatus 10 is illustrated that is suitable for use in accordance with one or more aspects of the present invention, such as the vending of goods.

Figure 2:
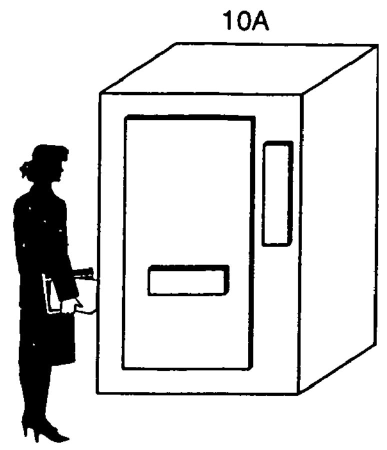
FIG. 2 is a perspective view of a vending apparatus suitable for use in accordance with one or more further aspects of the present invention.

For the purposes of illustration and simplicity, reference may be made herein to the vending apparatus 10 in a conventional vending machine environment, although it is intended that the vending apparatus 10 is suitable for more general article handling, retrieval and/or dispensing purposes, as well as point-of-sale (POS) dispensing. The vending apparatus 10, if embodied as a portable device, may be, for example, about the size of a traditional vending machine 10A (FIG. 2) or as large as a tractor-pulled trailer.

Alternatively, the vending apparatus 10, if embodied as a non-portable device, may be embodied as an automated dispensing room 10B (FIG. 3) or an area located in a permanent structure, such as in a building (aboveground or underground, and with or without interior walls or an enclosing cabinet). The vending apparatus may take on the size of a small, medium, or large room or building. Such a vending apparatus may be located in an office and any type of goods may be stored and dispensed to employees or other people within the office. For example, office supplies (i.e., goods) may be stored within the vending apparatus and dispensed to people in the office with a need for office supplies.

Alternatively, the vending apparatus may be disposed at locations where convenience stores are typically found, for example, gas stations, rest stops, etc., such that goods that are typically found in convenience stores may be vended to purchasers. One skilled in the art will appreciate that variations in the sizes of, scales of, location of (e.g., above or below ground, etc.), and goods vended from apparatus in accordance with the invention are infinite and should only be limited by the claims appended hereto.

It is intended that the term "goods" (or articles) includes any products, packaged goods, etc., such as food, beverages, snacks, trinkets, office supplies, groceries, consumer goods, etc.

Referring again to FIG. 1, the vending apparatus 10 includes a main cabinet 12 and a door 14 mounted on a hinge 16 for providing access to an interior portion. Servicing (e.g., stocking with goods, performing maintenance actions, collection of revenue, etc.) may be performed through the door 14. The door 14 is shown in a closed position, forming an enclosure with the main cabinet 12, within which various components of the vending apparatus 10 are disposed, as will be explained in more detail below.

A goods retrieval area 22 is formed in a panel 18 of the door 14 so that goods stored within the vending apparatus 10 can be dispensed to a user. The panel 18 preferably includes graphics (or other indicia), which indicates the various goods vendible by the vending apparatus 10, as well as the associated price and unique selection number. The graphics on panel 18 may be non-alterable (e.g., pre-printed), thereby fixing the type, brand, price, etc. of vendible goods. Alternatively, the graphics on panel 18 may be at least partially alterable, such that changes in the type, brand, price, etc. of the vendible goods may be reflected by the graphics. For example, the graphics on panel 18 may be divided into an alterable portion 18A and a non-alterable portion 18B (which may be a subportion or the remainder of the panel 18), where the alterable portion 18A may be changed. Details concerning how the alterable portion 18A may be changed is discussed below with reference to FIG. 4.

The ability to change the alterable portion 18A of the panel 18 (and, therefore, the indicia presented to the user) yields a ratio of areas of alterable graphics to non-alterable graphics on the panel 18. A corresponding ratio of vendible goods, (e.g., a ratio of one type of vendible goods to another type of vendible goods within the vending apparatus 10) is also contemplated. Indeed, it may be desirable to require that the ratio of sales, inventory, etc. of the goods represented by the indicia on the alterable portion 18A to the goods represented by the indicia on the non-alterable portion 18B corresponds to (e.g., either matches or is derived from) the ratio of areas of alterable graphics to non-alterable graphics. Further details concerning the use of alterable and non-alterable graphics portions may be found in International Publication No. WO 01/11578.

Various user interface elements are mounted on and/or accessed via a flat section 20 of the door 14. These elements preferably include at least one of an electronic customer display 24, a bill acceptor mechanism (and bill insertion slot) 26, a coin acceptor mechanism (and coin insertion slot) 28, a coin return actuator 30, a coin return well 32, a credit/debit card reader mechanism (and card insertion slot) 34, a door lock mechanism 36, and a keypad mechanism 38.

The customer display 24 may be a conventional fluorescent, LED, CRT, or touch screen display panel for displaying various items of information to the user of the vending apparatus 10, such as feedback to the user of the goods selection, the amount tendered, graphics (e.g., of product images) and/or whether the goods selected are sold out or are being vended.

The bill insertion slot accepts paper money into the bill acceptor mechanism 26 for purchasing articles or for making change. Preferably, the bill acceptor mechanism 26 is mounted inside the vending apparatus 10 so as to have the bill insertion slot portion extending through an aligned opening in flat section 20. The coin insertion slot accepts coins into the coin acceptor mechanism 28 for purchasing articles or for making change. Preferably, the coin acceptor mechanism 28 is also mounted inside the vending apparatus 10 so as to have the coin insertion slot portion extending through an aligned opening in the flat section 20.

The coin return actuator 30 preferably includes a conventional push-button mechanism for activating a coin return portion of the coin acceptor mechanism 28 which, upon actuation, returns coins inserted by the user to the coin return well 32. The coin return portion of the coin acceptor mechanism 28 also provides change to the coin return well 32 either in response to the purchasing of goods or for making change for paper money or higher denomination coins.

The credit/debit card slot is preferably operable to accept a credit/debit card into the card reader mechanism 34 (preferably of conventional design and construction) and to enable the user to pay for purchases via credit/debit procedures. Preferably, the credit/debit card reader mechanism 34 is also mounted inside machine 10 so as to have the credit/debit card slot portion extending through the aligned opening in the flat section 20. The vending apparatus 10 also preferably includes a communications unit (not shown), preferably of conventional design and construction, that is operable for use in authenticating such credit card purchases. As will be discussed hereinbelow, the communications unit preferably has other uses relating to machine control and data reporting.

The door lock mechanism 36 enables the door 14 to be secured so that it cannot be opened without an appropriate access device, such as a key.

The keypad mechanism 38 (preferably of conventional design and construction) is preferably operable to enable the user to select one or more desired goods from the vending apparatus 10. It is noted that the keypad mechanism 38 may be individual, and/or a matrix of, push buttons for each article selection (and an associated price display); and/or a user operated touch screen (that may include the integrated display 24).

Although the vending apparatus 10 as illustrated preferably includes all of the above described user interface elements, in a more minimal embodiment of the invention, most, if not all of these user interface elements may be omitted, and the vending apparatus 10 may be controlled from a remote location, with or without a local payment system. Additionally, the customer retrieval port may also be remote from the vending apparatus 10, and a goods conveyor system may be used to convey the articles to the remote customer retrieval port.

Figure 4:
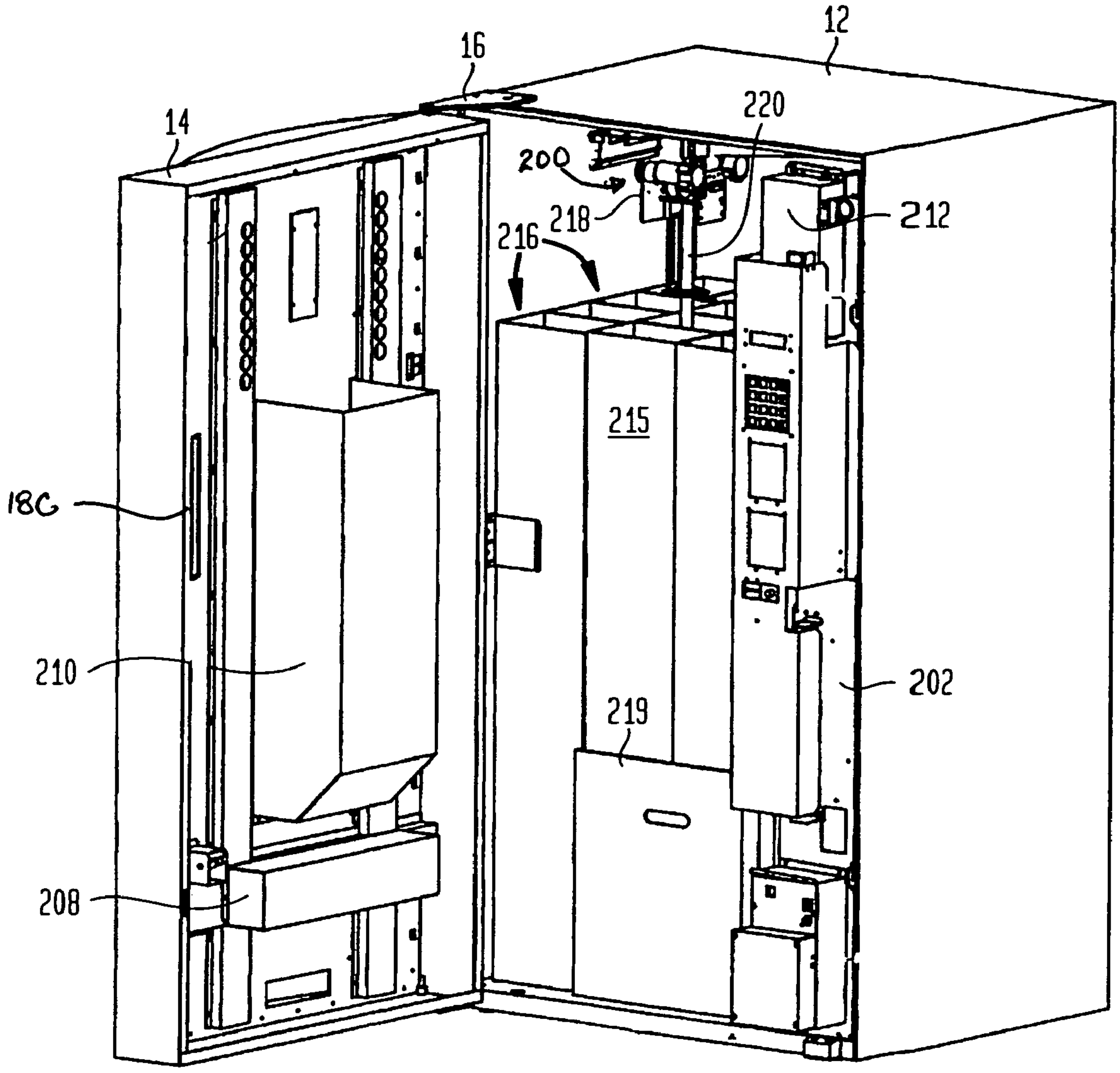
FIG. 4 is a perspective view of an interior of the vending apparatus of FIG. 1.

With reference to FIG. 4, a perspective view into the vending apparatus 10 of FIG. 1 is shown. In particular, the door 14 stands open to expose various electrical, mechanical, and electromechanical components of the vending apparatus 10. It is understood that FIG. 4 is somewhat simplified for the purposes of clarity and discussion.

The door 14 preferably includes a slot 18C that is operable to permit the insertion and extraction of the alterable portion 18A of the panel 18 (discussed hereinabove with respect to FIG. 1). As shown, the slot 18C is formed such that horizontal insertion and extraction is enabled, it being understood, however, that the slot 18C may be formed so as to permit differently sized and shaped alterable portions 18A and/or to permit vertical insertion and extraction, without departing from the spirit and scope of the invention. It is noted that the panel 18 (FIG. 1) preferably includes a substantially transparent window that assists in the enclosure of the alterable portion 18A while permitting a user to view the indicia on the alterable portion 18A through the transparent portion of the panel 18 (which aligns with portion 18A).

The vending apparatus 10 preferably includes a storage area 215, at least one electromechanical retrieving device 200, and a dispensing chute 210. The storage area 215 preferably includes a plurality of compartments 216 operable to store the various goods. Preferably, the compartments 216 are implemented using vertically aligned article storage bins as shown. (As will be discussed below, however, the compartments 216 may be horizontally aligned or in any other configuration without departing from the spirit and scope of the invention.) It is noted that the compartments 216 function to produce vertically aligned, horizontally aligned, and/or inclined stacks (e.g., columns and/or rows) of the goods and may employ any suitable mechanical means, such as open and/or closed sides, etc. for supporting the goods. Further details concerning some aspects of the compartments 216 may be found in PCT/US01/16847.

When one or more of the compartments 216 are used to retain goods that require refrigeration, they may be disposed in thermal communication with (e.g., contained within, disposed above, disposed below, etc.) a refrigeration unit (not shown). Further details concerning the use of a refrigeration unit in combination with the vending apparatus 10 may be found in U.S. Pat. No. 5,240,139, entitled PACKAGE VENDING MACHINE, the entire disclosure of which is incorporated herein by reference.

A container 219 is preferably operable to hold a plurality of the compartments 216 in an aligned manner, and thereby facilitate simultaneous handling (i.e., removal, installation and transportation) of the compartments 216 into, and out of, the storage area 215 for re-stocking the compartments 216 with new goods. Advantageously, the container 219 facilitates rapid and accurate positioning of the plurality of article storage bins in the storage area 215.

In the illustrated embodiment (using vertically aligned compartments 216), the retrieving device 200 is preferably disposed at an upper portion of the cabinet 12 and is preferably operable to retrieve goods from within compartments 216 of the storage area 215 and to dispose the goods in the dispensing chute 210. The electromechanical retrieving device 200 preferably includes a carriage 218 and an air hose 220. The carriage 218 is preferably operable to move in an X, Y plane such that the air hose 220 may be located over any of the compartments 216. For example, in response to a selection made by the user, the carriage 218 preferably moves to an X, Y location corresponding to a position centered over one of the compartments 216 holding the selected good.

Figure 5:
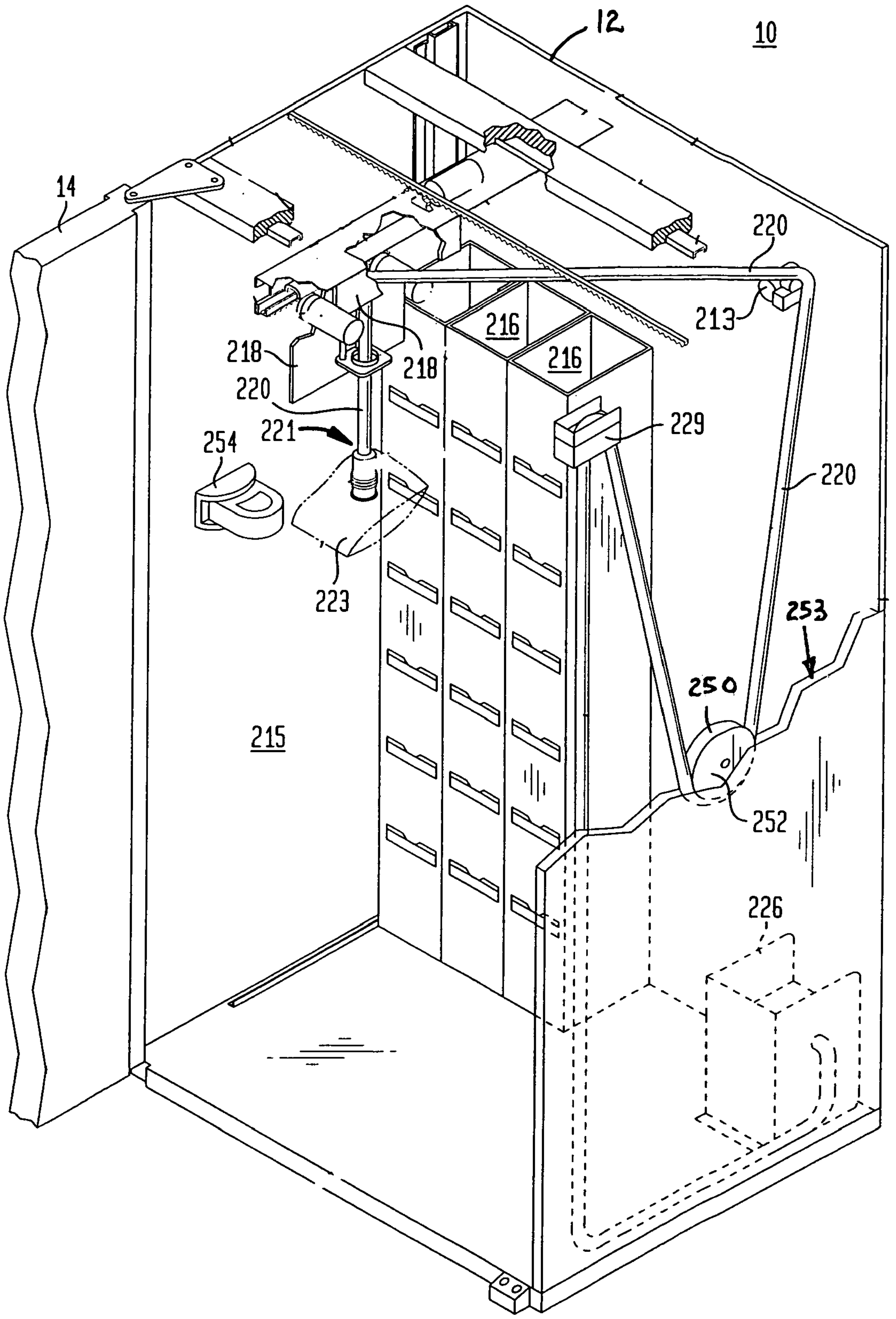
FIG. 5 is a cut-away perspective view of the vending apparatus of FIG. 1.

With reference to FIG. 5, the air hose 220 preferably includes an article contacting free end 221 and a distal end coupled to a vacuum unit 226. The vacuum unit 226 is preferably operable to impart suction at the free end 221 of the air hose 220. The free end 221 of the air hose 220 is preferably adapted to selectively engage with any of the goods stored in the storage area 215. For example, the free end 221 of the air hose 220 may contact a particular article 223 meeting the selection requirements of the user. In other words, the free end 221 of the air hose 220 is adapted to contact the article 223 contained within the compartment 216 over which the air hose 220 has been located in response to the user's selection. To this end, the free end 221 of the air hose 220 is preferably operable to also move in a Z-direction (vertically in the example shown in the drawings) by way of a Z-direction drive (such as pinch rollers that engage the air hose 220) in carriage 218. Rollers 213 and 252 maintain a storage loop 250 in the air hose 220 in a space 253 which is parallel to an inside vertical wall of cabinet 12, in order to satisfy the Z-direction movement of the free end 221.

Figure 3:
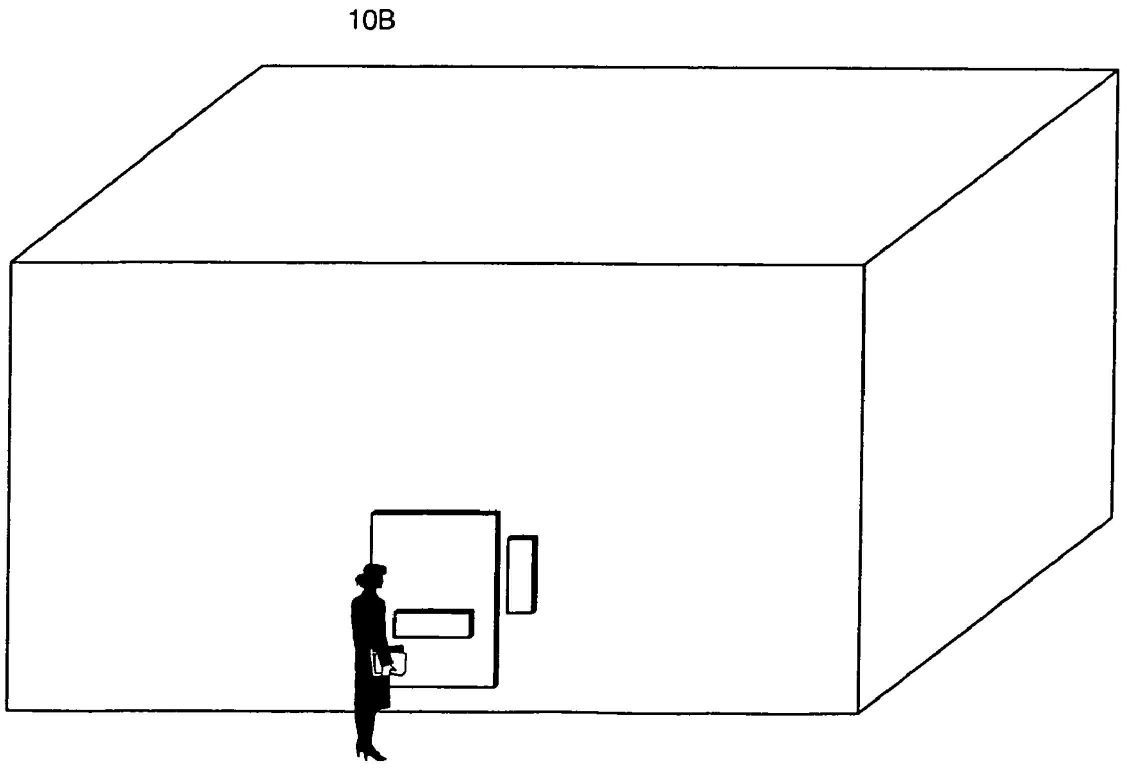
FIG. 3 is a perspective view of a vending apparatus in accordance with one or more still further aspects of the present invention.

In use, the free end 221 of the air hose 220 imparts suction on the article 223 being vended such that as the air hose 220 is retracted, the contacted article 223 is extracted from the compartment 216. The carriage 218 then moves to an X, Y position over the dispensing chute 210 and the suction is quickly stopped such that the article 223 is released from the free end 221 and falls through the dispensing chute 210 to the goods retrieval area 22 (FIG. 3). Further details regarding the electromechanical retrieving device 200 and alternative devices may be found in Patent Application No. PCT/US01/16853.

Although for the purposes of illustrating the invention, a preferred electromechanical retrieving device 200 has been described above, it is noted that any of the known (or hereinafter developed) electromechanical, magnetic or other means for retrieving articles in a vending machine may be employed without departing from the spirit and the scope of the invention as claimed herein. For example, in the event that horizontally aligned compartments are employed, an alternative retrieving device (e.g., using suction and/or a gripping mechanism) may be used to extract the goods from within or at a dispensing end thereof. Further, the use of a curvilinear plane for article transport may be utilized as is known in the videocassette vending art. Details concerning horizontally aligned compartments may be found, for example, in U.S. Pat. No. 6,230,930, issued May 15, 2001, entitled METHOD AND APPARATUS FOR VENDING PRODUCTIONS, the entire disclosure of which is hereby incorporated by reference.

In accordance with one or more further aspects of the present invention, the vending apparatus 10 preferably includes and article identification (ID) device 254 that is mounted within the cabinet 12. Any suitable design and implementation of the article ID device 254 may be employed without departing from the spirit and scope of the present invention. For example, the article ID device 254 may employ one or more of an optical technology, such as a bar code scanner(for reading a unique article ID, e.g., a UPC code, preprinted on the goods), an image recognition system, an analog and/or digital still camera, an analog and/or digital video camera. Alternatively, the article ID device 254 may employ electromagnetic technology, such as a radio frequency identification transponder (RFID) or a magnetic reader for article identification using electromagnetic tags included with the goods. The article ID device 254 is preferably mounted within the cabinet 12 at a substantially fixed location such that the goods stored in the storage area 215 may be scanned as they are moved from the compartments 216 to the dispensing chute 210 by the electromechanical retrieving device 200. Alternatively, the article ID scanning may take place before or after such goods dispensing movement. Further, the article ID device 254 may be mounted on the carriage 218 and/or on the free end 221 of the air hose 220. Preferably, only a single article ID device 254 is employed when the electromechanical retrieving device 200 discussed above is used to move the goods from the storage area 215 to the dispensing chute 210. Indeed, the electromechanical retrieving device 200 described hereinabove and shown in FIGS. 4 and 5 is preferably operable to move the article 223 past the article ID device 254 to obtain a scan of any of the goods stored in the storage area 215. Details concerning the types of information gleaned from such scanning and uses thereof will be discussed more fully hereinbelow.

Figure 6:
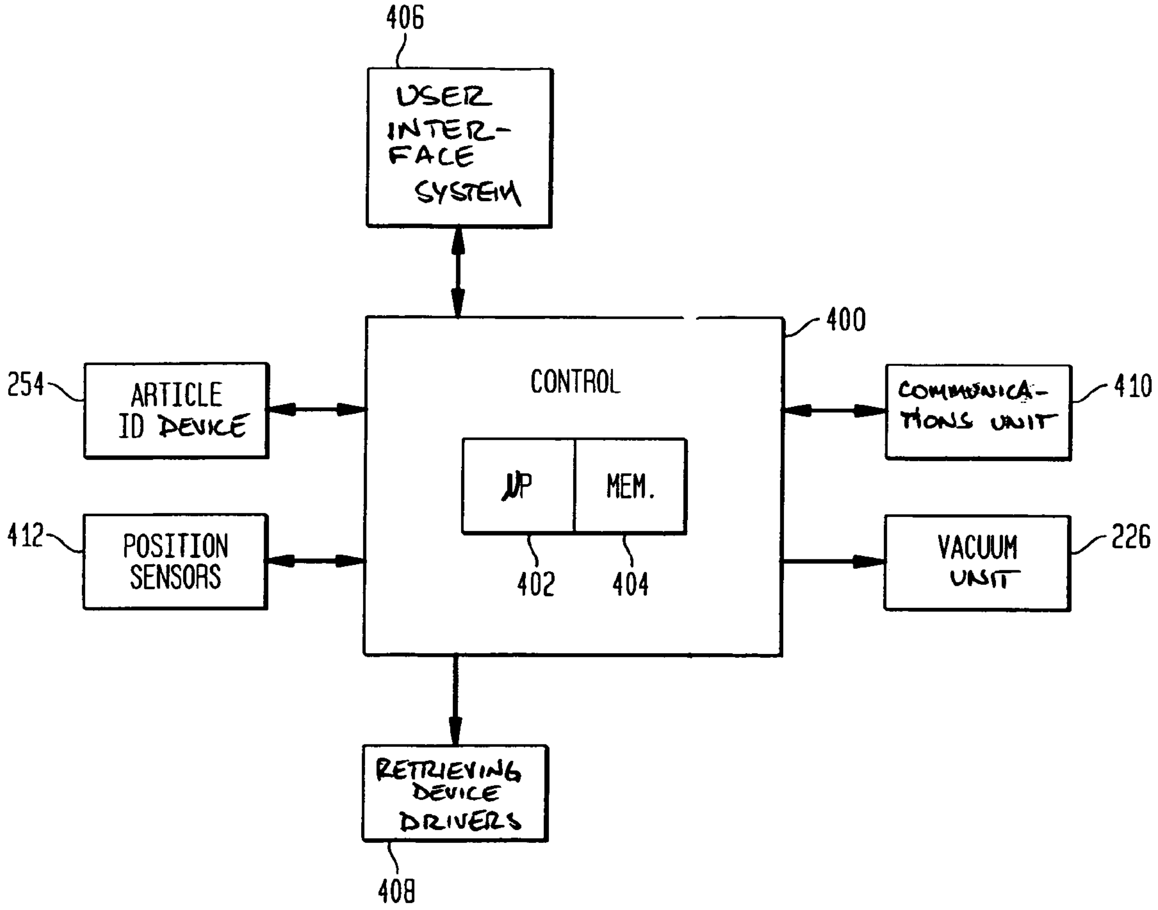
FIG. 6 is a high level functional and/or circuit block diagram of an electromechanical system suitable for use in any of the vending apparatus of FIGS. 1-5.

With reference to FIG. 6, a functional block diagram of certain aspects, circuits, and/or systems of the vending apparatus 10 is shown. In particular, a control system 400 including a microprocessor 402 and an associated memory 404, is preferably in electrical cooperation with peripheral circuits/systems, such as a user interface system 406, a retrieving device driver 408, a communications unit 410, the vacuum unit 226, the article ID device 254 (and/or system), and one or more position sensors 412. Although a digital microprocessor 402 is preferred, it is understood that the control system 400 may be implemented using analog techniques (including electromechanical techniques) as known in the art without departing from the spirit and scope of the invention.

The memory 404 preferably includes read only memory (ROM) and random access memory (RAM). The ROM is preferably used for storing one or more control programs (e.g., software) that provides instructions to the microprocessor 402. These instructions preferably cause the microprocessor 402 to produce control signaling to one or more of the user interface system 406, the retrieving device driver 408, the commmunications unit 410, the vacuum unit 226, the article ID device 254, and the one or more position sensors 412 (and/or any other electronic circuits useful in implementing the vending apparatus 10). In particular, the instructions are preferably operable to cause the combination of the microprocessor 402 and the peripheral circuits and/or systems to perform the actions and/or functions described herein and/or shown in the accompanying drawings, it being understood that the particular software code may be readily determined by one skilled in the art without departing from the spirit and scope of the invention.

The RAM of the memory 404 is preferably used for temporary storage of data monitored, calculated, and/or received by the vending apparatus 10 during operation. The data may include, for example, data obtained from the article ID device 254, data obtained from the user interface system 406, etc. Further details concerning the monitoring, storing, and/or processing of this and/or other data will be discussed later in this description.

The user interface system 406 preferably includes one or more of the display 24, the bill acceptor mechanism (and insertion slot) 26, the coin acceptor mechanism (and insertion slot) 28, the coin return actuator 30, the coin return well 32, the credit/debit card reader mechanism (and card insertion slot) 34, and the keypad mechanism 38.

By way of example, the control program providing instructions to the microprocessor 402 preferably coordinates the display of information to the user, the receipt of selections from the user, and the receipt of payment from (and dispensing of change to), the user, concerning the vending of goods from the vending apparatus 10. In particular, after appropriate remittance has been made and/or arranged for, the user's selection is preferably input through the keypad mechanism 38 to the microprocessor 402 and stored at least temporarily in RAM 404. The microprocessor 402 preferably produces one or more dispensing commands based on the user's selection, which are input into the retrieving device driver 408. The retrieving device drivers 408 are preferably operatively coupled to the electromechanical retrieving device 200 (FIG. 4) and cause it to move into the proper X, Y position relative to the compartment 216 in which the selected article 223 is stored. Preferably, one or more of the position sensors 412 are utilized to provide feedback to the microprocessor 402 and/or retrieving device drivers 408 as to whether the air hose 220 is in the proper X, Y position. The Z-direction drive pinch roller portion of the retrieving device drivers 408 is also preferably operable to cause the air hose 220 to move in the Z-direction (i.e., into one or more of the compartments 216 of the storage area 215).

Preferably, one or more of the position sensors 412 are operable to provide feedback to the microprocessor 402 and/or the retrieving device driver 408 as to whether the free end 221 of the air hose 220 has engaged the selected article 223. For example, the position sensors 412 may include an airflow sensor (e.g., in vacuum box 229, FIG. 5) operable to determine whether a flow of air through the air hose 220 has been substantially impeded (i.e., when the free end 221 of the air hose 220 comes into secure contact with the selected article 223). The airflow sensor may be implemented, for example, using a hinged flap within the vacuum box 229 that includes a magnet disposed on a free end portion thereof. When air is flowing through vacuum box 229, the hinged flap is oriented in a direction substantially parallel to the airflow direction and parallel with a longitudinal wall of vacuum box 229. A corresponding reed switch is disposed on the longitudinal wall of the vacuum box 229 such that it is adjacent to the magnet on the hinged flap when substantial air flow exits (i.e., when the free end 221 of the air hose 220 has not yet engaged the article 223, and the hinged flap is in a transverse orientation with respect to the air flow direction when an article 223 is engaged by the free end 221).

At an appropriate time (preferably prior to the free end 221 of the air hose 220 contacting the article 223), the microprocessor 402 preferably signals the vacuum unit 226 to activate such that suction is achieved at the free end 221 of the air hose 220. (It is noted that many variations in the time of the vacuum unit 226 activation may be employed, such as may be desirable when refrigeration is used to keep the goods cool and excessive evacuation of cool air by the air hose 220 is to be avoided.)

The control system 400, and the microprocessor 402 in particular, determined when an article 223 has been securely engaged by the free end 221, e.g., in response to the air flow sensor in vacuum box 229, and preferably commands the retrieving device drivers 408 to reverse the air hose 220 in the Z-direction such that the selected article 223 is removed from the compartment 216. The microprocessor 402 then preferably commands the retrieving device driver 408 to cause the carriage 218 to move into an X, Y position in alignment with the dispensing chute 210. Preferably, one or more of the position sensors 412 are operable to determine whether the air hose 220 (and selected article 223) are in alignment with the dispensing chute 210. For example, one or more reed switches may be mounted on a front wall of the cabinet 12 and one or more associated magnets may be mounted on the carriage 218, where magnetic communication between the one or more magnets and the reed switch provides a signal to the control system 400 that proper positioning of the carriage 218 relative to the dispensing chute 210 has been obtained.

It is most preferred that the microprocessor 402 commands the carriage 218 to move the article 223 substantially near the article ID device 254 (e.g., prior to aligning with the dispensing chute 210) such that data may be obtained concerning the article 223. (This will be discussed in further detail hereinbelow.)

The microprocessor 402 then preferably commands the vacuum unit 226 to be deactivated such that suction within the air hose 220 is substantially diminished and the selected article 223 is released from the free end 221 and drops through the dispensing chute 210 to the goods retrieval area 22. It is noted that in the event that the selected article 223 is fragile and should not be subject to sever impact forces, the microprocessor 402 may command the retrieving device driver 408 to drive the air hose 220 into the dispensing chute 210 such that the article 223 is delicately released at the goods retrieval area 22.

Although the vending apparatus 10 preferably includes all of the functional blocks illustrated in FIG. 6, it is understood that any one or more of the functional blocks may be employed (partitioned as shown or in any combination) without departing from the spirit and scope of the invention. For example, in a more fundamental configuration, the vending apparatus 10 may include the control system 400, the user interface system 406, and the retrieving device driver 408. Such a configuration may be employed using the particular retrieving device 200 discussed above (FIGS. 4 and 5), any of the known retrieving devices, or any retrieving devices hereafter developed as may be advantageous in a specific embodiment. Examples of known retrieving devices include article engaging spiral-activated devices, gravity assisted beverage dispensing devices (e.g., solenoid activated gates), electromechanical robotic gripping devices, alone or in combination with elevators and/or conveyors, etc.

Figure 7:
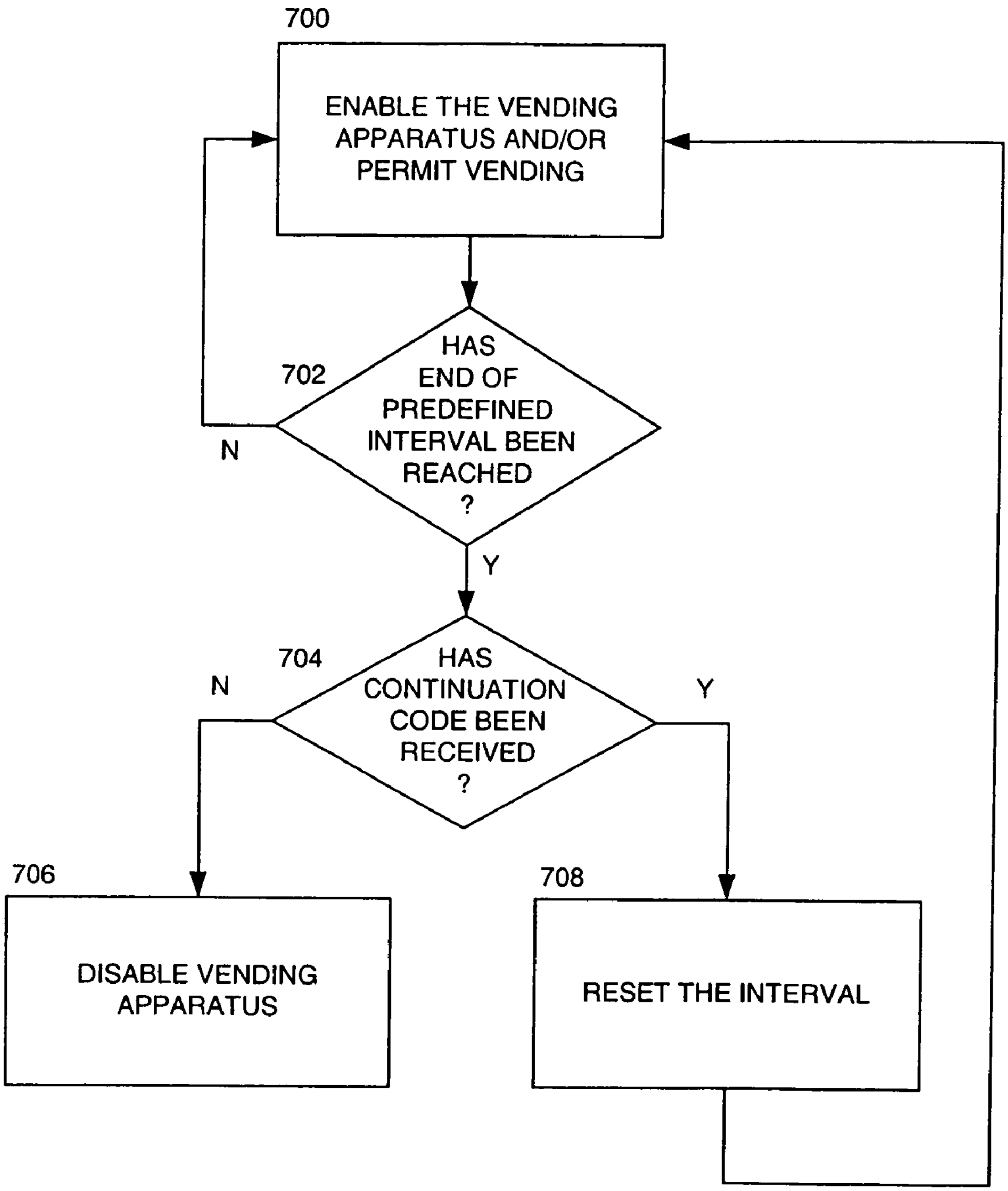
FIG. 7 is a flow diagram illustrating capabilities, actions, and/or functions of a vending apparatus in accordance with one or more aspects of the present invention.

It has been discovered in accordance with one or more aspects of the invention that benefits are obtained when the control system 400 (whether of a digital or analog configuration) is operable to enable and/or disable the dispensing of at least some of the goods stored in the vending apparatus 10. For example, FIG. 7 is a flow diagram illustrating a process that is preferably carried out using the control system 400, it being most preferred that the process is executed by way of a software program running on the microprocessor 402 platform (FIG. 6).

At action 700, the vending apparatus 10 is preferably operating in at least a partially enabled state, such that at least some of the goods stored within the vending apparatus 10 may be dispensed to a user. The vending apparatus 10 is preferably enabled for a predefined interval illustrated by a wait loop between actions 700 and 702. At an end of the predefined interval, an inquiry is preferably made as to whether a continuation code has been received by the vending apparatus 10 (action 704). If the result of the inquiry is negative, then the process preferably branches to action 706, where the vending apparatus 10 is preferably at least partially disabled (e.g., such that at least some of the goods stored within the vending apparatus 10 may not be dispensed therefrom). If, however, the result of the inquiry is affirmative, then the process flow preferably branches to action 708, where the interval is reset and the vending apparatus 10 is permitted to remain in the enabled state (e.g., such that at least some of the goods may be dispensed therefrom).

The continuation code is preferably an electronic code that is input to the vending apparatus 10 through at least one of (i) the keypad mechanism 38; (ii) a dedicated keypad (not shown e.g., a service keypad or any other keypad) that may be available, for example, only by opening the door 14 of the vending apparatus 10; (iii) a portable computing device (not shown) that is operable to connect to the communications unit 410, e.g., through a data port or the like; and (iv) a communications network to which the vending apparatus is connected, e.g., through the communications unit 410. When a communications network is employed to input the continuation code into the vending apparatus I0, the communications network may include, for example, at least one of a wire network, a telephone network, a radio frequency link, an infrared link, a local area network, a wide area network, the Internet, etc.

It is noted that the continuation code may be subject to cryptography, such that a decryption algorithm is employed within the vending apparatus 10 (e.g., in the control system 400) to decode the continuation code. This would provide a high level of confidence that only authentic continuation codes may be utilized to enable the vending apparatus 10. Any of the known cryptographic techniques may be employed, such as transposition, substitution, polyalphabetic substitution, conventional key encryption, public key encryption, cipher systems, code systems, etc., which may or may not use a serial number of the vending apparatus 10 as part of the technique (e.g., to make it unique to the vending apparatus 10).

The predefined interval (actions 700 and 702) preferably represents at least one of (i) one or more predefined periods of time; (ii) one or more predefined numbers of vends of goods from the vending apparatus 10; or (iii) one or more predefined quanta of sales by the vending apparatus 10. It is noted that this quanta may be one or more amounts of money, of time, of units of goods vended, etc. For example, when the predefined interval is a period of time, such as 30 days, the control system 400 preferably is operable to disable the vending apparatus 10 from dispensing at least some of the goods when an end of the interval (e.g., the $30^{th}$ day) is reached. It is understood, however, that if the continuation code is received by the vending apparatus 10 prior to an end of the 30th day, then the control system 400 preferably does not disable the vending apparatus 10 from dispensing at least some of the goods. Indeed, the interval is preferably reset, and the control system 400 preferably permits the vending apparatus 10 to dispense at least some of the goods for another interval.

When a predefined interval comprising a predefined number of vending cycles has occurred, the control system 400 may be programmed so as to at least partially disable the vending apparatus 10 from further dispensing at least some of the goods, such as when five hundred articles have been dispensed from the vending apparatus 10. Again, however, the control system 400 preferably permits the vending apparatus 10 to remain in an enabled state when the continuation code is received prior to the end of the interval (i.e., prior to the five-hundredth vending cycle). Those skilled in the art will appreciate that many modifications and variations in the predefined interval may be implemented without departing from the spirit and scope of the invention.

It is noted that the process control of the vending apparatus 10 may prescribe that the vending apparatus 10 be enabled for sequential intervals so long as respective continuation codes are received by the vending apparatus 10 (for each interval). Preferably, an algorithm is used during the generation of the continuation codes such that no two sequential continuation codes are identical. For example, a portion of previously transmitted data concerning the sales of goods from the vending apparatus 10 may be used to generate a subsequent continuation code such that it would be nearly impossible to predict a future continuation code. Advantageously, this would prevent an entity to the agreement (e.g., the operator) from determining the continuation code on his or her own and entering the same without authorization.

Advantageously, the control process illustrated in FIG. 7 is useful in encouraging one or more entities to enter into agreements with one another concerning sales of goods from the vending apparatus 10 (or a plurality of vending apparatus 10). For example, an operator of the vending apparatus 10 may enter into at least one contractual obligation with at least one other entity concerning sales of goods from the vending apparatus 10. The other entity may be for example, a lender who has loaned money to the operator to purchase the vending apparatus 10, a lessor who has rented the vending apparatus to the operator, and/or a holder of property who has rented space to the operator on which the vending apparatus 10 is located. Alternatively, the other entity may include one or more of a manufacturer of the vending apparatus 10, a seller of one or more goods that are to be vended from the vending apparatus 10, a distributor or agent of the seller of goods, etc.

Irrespective of the particular relationships of the entities involved, and in accordance with one or more aspects of the present invention, the entities preferably agree that (i) the vending apparatus 10 may be enabled to dispense goods for a predefined interval; (ii) the vending apparatus 10 is predisposed to be at least partially disabled from dispensing at least some of the goods at the end of the interval; and (iii) the vending apparatus 10 is not at least partially disabled at the end of the interval if a continuation code is received by the vending apparatus 10 before the end of the interval.

The above method defining an agreement between the entities (e.g., the operator and the seller of goods) concerning sales of goods from the vending apparatus 10 provides assurance to, for example, the seller of goods that the one or more contractual obligations of the operator are likely to be met. Indeed, when the seller of goods has at least some control over whether the continuation code is received by the vending apparatus 10 (and the operator does not have such control), then the operator will be motivated to fulfill his or her contractual obligations to the seller of goods. Advantageously, the vending apparatus 10 need not be actually disabled (and business disrupted) to ensure that the contractual obligations are met. Indeed, the receipt of the continuation code by the vending apparatus 10 provides an incentive to adhere to the terms of a contract while providing seamless (uninterrupted) operation and vending.

In accordance with one or more aspects of the invention, it is preferred that an agreement is reached between the entities that the continuation code is made available to the vending apparatus 10 after a determination is made that the at least one contractual obligation has been satisfied or waived. For example, the seller of goods may make a determination that the operator has fulfilled his or her contractual obligation to the seller of goods and, in response, make the continuation code available to the vending apparatus 10 such that the operator may continue to enjoy the financial benefits of operating the vending apparatus 10. On the other hand, the seller of goods may withhold the continuation code from the vending apparatus 10 if a determination is made that the operator has not met his or her contractual obligations to the seller of goods, thereby providing the seller of goods with leverage over the operator, e.g., by preventing the operator from enjoying the financial benefits of operating the vending apparatus 10. Further details concerning illustrative examples of what the contractual obligations may include and how they may be obtained will be discussed later in this description.

It is noted that the control process of the vending apparatus 10 may prescribe that the vending apparatus 10 may be automatically re-enabled after having been disabled for failure to receive a continuation code. For example, the specter of having the vending apparatus 10 disabled for a substantial period of time (e.g., seven days, one month, etc.) may be sufficient incentive to ensure the entities that the obligations concerning sales of goods from the vending apparatus 10 will be met. Thus, in one embodiment the vending apparatus 10 may be automatically re-enabled after the period of time has passed.

It is noted that the actions of determining whether the at least one contractual obligation is satisfied and/or making the continuation code available to the vending apparatus 10 may take on many forms (and be performed by various parties) without departing from the spirit and scope of the invention. Some general and specific examples of the communication that may take place between entities as related to these determinations will now be discussed with reference to FIGS. 8 and 9. By way of example, and with reference to FIG. 8, a first entity (e.g., the operator) 80 may have entered into one or more contractual obligations with a second entity (e.g., the seller of goods) 82, with the understanding that the seller of goods 82 would make the continuation code available to the vending apparatus 1 0 when it determines that the operator 80 has met the one or more obligations.

In accordance with one aspect of the present invention, the seller of goods 82 preferably receives prescribed data (concerning the sales of goods from the vending apparatus 10) in a form, and with substance, that is suitable to determine whether the operator 80 has met its obligations with the seller of goods 82. It is noted that the mechanisms and/or methods by which the prescribed data are received by, for example, the seller of goods will be discussed in detail later in this description. Such data may include, for example, whether unauthorized goods have been vended, a quantum of sales concerning one or more goods, etc. (Further details concerning illustrative examples of what the prescribed data may include and how it may be obtained will be described later in this description.) Assuming that the operator 80 has met its obligations to the seller of goods 82, the seller of goods 82 may generate the continuation code and release the continuation code directly to the vending apparatus 10, e.g., by way of the keypad mechanism 38, the dedicated keypad, the data port of the vending apparatus 10, a communications network, etc. Alternatively, the seller of goods 82 may release the continuation code to an entity responsible for inputting the continuation code into the vending apparatus 10, such as the operator 80.

Figure 9:
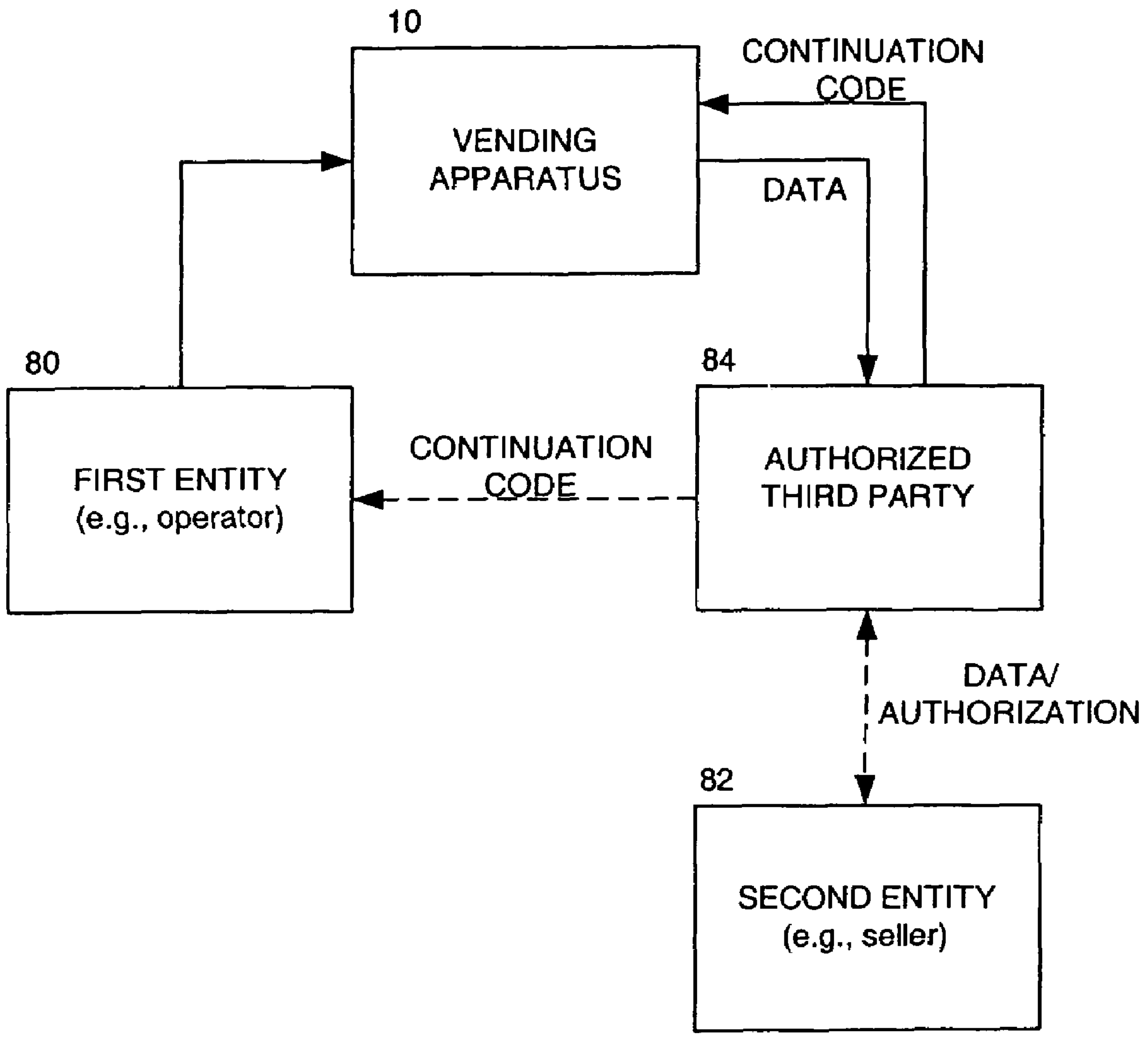
FIG. 9 is a high level block diagram illustrating alternative data and/or functional cooperation between a vending apparatus and one or more entities in accordance with one or more further aspects of the present invention.

With reference to FIG. 9, an alternative arrangement may be employed in accordance with another aspect of the present invention, where an authorized third party 84 may at least one of: (i) receive the prescribed data concerning the sales of goods from the vending apparatus 10, (ii) generate the continuation code, and (iii) release the continuation code to the vending apparatus 10, to an intermediate entity, and/or to an entity responsible for inputting the continuation code into the vending apparatus 10, such as the operator 80.

Preferably, the authorized third party 84 receives the prescribed data and makes the prescribed data available to the seller of goods 82 (either in its raw form and/or after processing) such that the seller of goods 82 may make a determination as to whether the one or more contractual obligations have been satisfied. If they have, the seller of goods 82 preferably authorizes the third party 84 to at least one of generate and release the continuation code, either directly to the vending apparatus 10 and/or to another entity, such as the operator 80 for input to the vending apparatus 10. It is noted that the seller of goods 82 may generate the authorization code itself or may authorize the third party 84 to generate the continuation code.

Alternatively, the entities 80, 82 may authorize the third party 84 to receive the prescribed data, determine whether the contractual obligations have been met, generate the continuation code, and make the same available to the vending apparatus 10 without any intervention by another entity, such as the seller of goods 82. Advantageously, in accordance with these aspects of the present invention, the burden of management on the part of the seller of goods 82 may be shifted to the third party 84 for the purposes of efficiency and/or convenience.

It is noted that further examples of the relationships and communications among entities with an interest in the sale of goods from the vending apparatus are presented later in this description with reference to FIGS. 22-31.

As discussed above, one of the many conditions upon which the continuation code may be made available to the vending apparatus 10 is whether one or more contractual obligations among entities have been satisfied. This determination may be based on an analysis of prescribed data concerning the sales of goods from the vending apparatus 10. Presented below are illustrative examples of contractual obligations and prescribed data contemplated by the invention, it being understood that these examples are not exhaustive and many variations, and/or modifications of the same are within the scope of the invention. In reviewing these examples, one skilled in the art will appreciate that in many situations the contractual obligations and the prescribed data are similar in character. For example, one contractual obligation may be to sell 20% of the total sales from the vending apparatus 10 of brand ABC corn chips within each month. The prescribed data upon which a determination is made as to whether this contractual obligation has been met may be (i) the quantum of brand ABC corn chips sold in each month; and (ii) the quantum of all other goods sold in each month.

Turning now to the illustrative examples, one skilled in the art will appreciate from the disclosure herein that the variations in the particular contractual obligations between the entities in accordance with the present invention are vast. By way of example, the contractual obligations may include at least one of:

(i) an obligation to vend only authorized goods;

(ii) an obligation to maintain inventory of one or more goods in the vending apparatus;

(iii) an obligation not to steal receipts (e.g., money) from the vending apparatus;

(iv) an obligation to provide a quantum of money to the at least one entity (e.g., a rent payment, a lease payment, a finance payment, etc.)

(v) an obligation to provide a quantum of money to the at least one entity based on the sales of goods from the vending apparatus;

(vi) an obligation to display goods in the vending apparatus in a prescribed way;

(vii) an obligation to store specific goods in specific storage compartments (which may include the orientation of the goods in the compartments);

(viii) an obligation to display advertising indicia on the vending apparatus in a prescribed way;

(ix) an obligation to maintain a prescribed ratio of a quantum of one or more goods to a quantum of storage space for goods in the vending apparatus;

(x) an obligation to maintain a prescribed number of goods selections in the vending apparatus;

(xi) an obligation to dispense prescribed quanta of one or more goods from the vending apparatus in a predefined period of time;

(xii) an obligation to receive a prescribed quantum of money at the vending apparatus in a predefined period of time;

(xiii) an obligation to sell a prescribed ratio of one or more of the goods to one or more others of the goods;

(xiv) an obligation to sell a prescribed ratio of one or more of the goods to one or more others of the goods in a predefined period of time;

(xv) an obligation to make prescribed data concerning the sales of goods from the vending apparatus available to the at least one entity;

(xvi) an obligation to maintain the vending apparatus in operation to a prescribed degree; and (xvii) an obligation not to tamper with the vending apparatus.

Those skilled in the art will appreciate from the disclosure herein that variations on the obligation to sell only authorized goods are vast. By way of example, the obligation to sell only authorized goods may include at least one of:

(i) the obligation to sell only goods of an authorized type;

(ii) the obligation to sell only goods of an authorized brand;

(iii) the obligation to sell only goods of an authorized size;

(iv) the obligation to sell only goods of an authorized weight;

(v) the obligation to sell only goods of an authorized expiration date;

(vi) the obligation to sell only goods of an authorized package type;

(vii) the obligation to sell only goods of an authorized period of manufacture; and (viii) the obligation to sell only goods of an authorized place of manufacture.

One skilled in the art will appreciate from the disclosure herein that determinations as to whether the one or more contractual obligations between entities have been met may be conducted in any number of ways and that the information used to make the determinations may be gathered in various ways. It is preferred that the determinations are made by analyzing the prescribed data concerning the sales of goods from the vending apparatus 10. Most preferably, the prescribed data (whether in final data form or in raw data form, from which the final data are computed or generated) are monitored, stored, and released by the vending apparatus 10. Further details concerning the mechanisms and/or methods by which the prescribed data are monitored, stored, and/or released are discussed later in this description with respect to FIG. 17.

Those skilled in the art will appreciate that the prescribed data concerning the sales of goods from the vending apparatus 10 may take on many forms without departing from the spirit and scope of the invention. For example, the prescribed data may include at least one of:

(i) a quantum of one or more types of goods sold during one or more predefined periods of time;

(ii) a quantum of one or more brands of goods sold during one or more predefined periods of time;

(iii) a ratio of one or more types of the goods sold to one or more other types of the goods sold in a predefined period of time;

(iv) a ratio of one or more brands of the goods sold to one or more other brands of the gods sold in a predefined period of time;

(v) respective dates of vends (and/or attempted vends) from the vending apparatus;

(vi) respective times of vends (and/or attempted vends) from the vending apparatus;

(vii) information concerning whether a particular good was out of inventory;

(viii) information concerning what a next choice of goods was made by a purchaser when a particular good was out of inventory;

(ix) information concerning whether the vending apparatus was operational;

(x) information concerning any limitations under which the vending apparatus vends the goods;

(xi) DEX data;

(xii) service and maintenance information (and/or date/time thereof);

(xiii) apparatus diagnostics information;

(xiv) payment information and/or errors;

(xv) types of payment used to obtain goods from the vending apparatus; and (xvi) any data that may be monitored, received, calculated, etc. by the control system 400 concerning the vending apparatus 10.

Those skilled in the art will appreciate that the information concerning any limitations under which the vending apparatus 10 vends the goods may take on many forms without departing from the spirit and scope of the invention. It is noted that these limitations relate to, for example, how goods are vended, how information concerning the vendible goods is presented to the user and/or to other entities, how much vending may take place before vending is at least temporarily disabled, etc. For example, the information concerning the limitations under which the vending apparatus vends the goods may include at least one of:

(i) whether (and/or what) the vending apparatus is required to vend concerning only authorized goods;

(ii) whether (and/or what) inventory of one or more goods must be maintained in the vending apparatus;

(iii) whether (and/or what) goods must be displayed in the vending apparatus in a prescribed way;

(iv) whether (and/or what) advertising indicia must be displayed on the vending apparatus in a prescribed way;

(v) whether a (and/or what) prescribed ratio of a quantum of one or more goods to a quantum of storage space for goods in the vending apparatus must be maintained;

(vi) whether a (and/or what) prescribed number of goods selections in the vending apparatus must be maintained;

(vii) whether only a (and/or what) prescribed maximum number of goods selections in the vending apparatus are permitted (even though the storage area would otherwise have sufficient space to store additional selections);

(viii) whether a (and/or what) prescribed number of goods must be dispensed from the vending apparatus in a predefined period of time;

(ix) whether a (and/or what) prescribed quantum of money must be received at the vending apparatus in a predefined period of time;

(x) whether a (and/or what) prescribed ratio of one or more of the goods to one or more others of the goods must be vended from the vending apparatus;

(xi) whether a (and/or what) prescribed ratio of one or more of the goods to one or more others of the goods must be vended from the vending apparatus in a predefined period of time;

(xii) whether (and/or what) the vending apparatus must be maintained in operation to a prescribed degree; and (xiii) whether (and/or what) and/or how the vending apparatus must not be tampered with.

One skilled in the art will appreciate that the obligation, the prescribed data concerning, and/or the limitation not to tamper with the vending apparatus 10 may include, for example, at least one of:

(i) not to tamper with the article ID device 254 (FIG. 5) of the vending apparatus 10;

(ii) not to tamper with the control system 400 and/or the peripheral systems/circuits (FIG. 6) of the vending apparatus 10;

(iii) not to relocate and/or move the vending apparatus 10;

(iv) not to alter at least a portion of the indicia on the exterior of the vending apparatus 10 (e.g., relating to the vendible goods therein); and (v) not to alter any mechanical, electrical, electromechanical devices (e.g., motors, wire harnesses, etc.) including any security circuits therefore.

Various examples of contractual obligations between the entities with an interest in the sale of goods from the vending apparatus 10 have been given above. Preferably, the vending apparatus 10 includes mechanisms and/or functional capabilities that aid in gathering data that may be used to determine whether one or more of the contractual obligations have been met. These mechanisms and/or functional capabilities may permit an external mechanism to make the determination; however, they preferably provide the vending apparatus 10 with the ability to make the determination internally. Details concerning the mechanisms and/or functional capabilities of the vending apparatus 10 as related to the determination of whether the contractual obligations have been met will now be provided. Irrespective of whether the determination is made internally or externally, the vending apparatus 10 is preferably operable to become at least partially disabled in response to the determination, e.g., via operation of the control system 400 or via an external mechanism, such as an external computer system.

Compliance with the contractual obligation to vend only authorized goods may be determined, for example, by manually inspecting the vending apparatus 10 to determine what goods are available therefrom, although it is preferred that the prescribed data provide the information necessary for making the determination. It is most preferred that the vending apparatus 10 is capable of monitoring one or more parameters concerning the sales of goods therefrom and collecting the prescribed data (whether in final form or in raw data form, from which the final data may be computed and/or generated).

To that end, the vending apparatus 10 is preferably operable to monitor whether goods of an authorized type, an authorized brand, an authorized size, an authorized weight, an authorized expiration data, an authorized package type, an authorized period of manufacture, an authorized place of manufacture, etc. are being vended therefrom.

By way of example, the article ID device 254 (FIG. 5) may be used in the determination of whether authorized goods are being sold from the vending apparatus 10. The article ID device 254 is preferably operable to obtain at least some of the above listed information by scanning the article 223 and providing data to the microprocessor 402 of the control system 400 (FIG. 6). For example, when the article ID device 254 includes a bar code scanner, the UPC code on the article 223 may be analyzed to determine the type, the brand, the size, the weight, the expiration data, the package type, the period of manufacture, the place of manufacture, etc. of the goods being vended. This data may be at least temporarily stored in the memory 404 of the control system 400.

In an alternative embodiment, the type, the brand, the size, the weight, etc. of the goods being vended may be gleaned from DEX data or other program data collected by the vending apparatus 10 using more conventional techniques.

One skilled in the art will appreciate that these raw data are suitable for use in determining whether unauthorized goods are being (or have been) vended from the vending apparatus 10. These raw data may be released (as prescribed data) from the vending apparatus 10, e.g., via the communications unit 410, for an externally conducted determination. Preferably, however, the vending apparatus 10 is operable to make the determination as to whether unauthorized goods are being (or have been) vended and, therefore, is operable to determine whether the contractual obligation relating thereto has been met. Thus, the prescribed data may include one or more of the final data as to whether unauthorized goods are being (or have been) vended and, further, whether the contractual obligation relating thereto has been met.

Compliance with the contractual obligation to maintain inventory of one or more goods in the vending apparatus 10 may be determined by, for example, manually inspecting the vending apparatus 10, although it is preferred that the prescribed data provide the information necessary for making the determination. To this end, the vending apparatus 10 is preferably operable to monitor one or more parameters concerning the inventory of one or more goods stored therein and collecting the prescribed data (whether in final form or in raw data form, from which the final data may be computed and/or generated). These parameters may include the number of goods maintained in the vending apparatus 10 of one or more of a particular type, brand, size, weight, expiration data, package type, period of manufacture, place of manufacture, etc.

The control system 400 in combination with the electromechanical retrieving device 200 may be capable of conducting an inventory action on the goods stored within the vending apparatus 10. In one embodiment, the electromechanical retrieving device 200 may be commanded by the control system 400 to remove goods to be inventoried from their positions within the storage area 215 (and to hold them temporarily in an alternative location within the storage area 215) while the control system 400 in combination with the article ID device 254 counts the quanta of goods of a particular type, brand, size, weight, expiration data, package type, period of manufacture, place of manufacture, etc.

Indeed, as discussed above, the article ID device 254 may be used to obtain at least some of the above listed information by scanning the article 223 and providing data to the microprocessor 402 of the control system 400. For example, when the article ID device 254 includes a bar code scanner, the UPC code on the article 223 may be analyzed to determine the type, the brand, the size, the weight, the expiration data, the package type, the period of manufacture, the place of manufacture, etc. of the goods being maintained in the vending apparatus 10. This data may be at least temporarily stored in the memory 404 of the control system 400.

In this way, raw data may be obtained to determine whether prescribed inventories are being maintained. These raw data may be released (as prescribed data) from the vending apparatus 10, e.g., via the communications unit 410, for an externally conducted determination. Preferably, however, the vending apparatus 10 is operable to make the determination as to whether prescribed inventories are being maintained and, therefore, is operable to determine whether the contractual obligation relating thereto has been met. For example, information concerning what the one or more prescribed inventories must be may be stored in the memory 404 of the control system 400. The microprocessor 402 of the control system 400 is preferable operable to compare the one or more prescribed inventories with the raw data relating to the actual inventories being maintained in the vending apparatus 10. The result of the comparison yields the final data, e.g., the determination as to whether the one or more prescribed inventories are being maintained. Further, the result may yield other final data, such as whether the contractual obligation relating to whether the one or more prescribed inventories are being maintained has been met.

The discussion immediately above has substantial applicability to determining whether the obligation to maintain a prescribed ratio of space occupied by one or more goods stored in the vending apparatus 10 to the storage space available within the vending apparatus 10. Indeed, the space available within the vending apparatus (e.g., the size of the storage area 215) is available to the microprocessor 402, for example, by way of the memory 404, then the data obtained via the inventory operation conducted by the control system 400, the article ID device 254, and the electromechanical retrieving device 200 may be: (i) released by the vending apparatus (e.g., via communications unit 410) for and external determination; (ii) used to internally compute (e.g., via the microprocessor 402) the actual ratio of space occupied by one or more goods stored in the vending apparatus 10 to the storage space available; (iii) used to determine whether the prescribed ratio is being maintained within the vending apparatus; and/or (iv) whether the contractual obligation relating to the prescribed ratio has been met.

Compliance with the contractual obligation not to steal money from (and/or to report all the money collected from) the vending apparatus 10 may be determined by, for example, confronting an offending entity (e.g., the operator) or catching that entity in the act of stealing (or failing to report), although it is preferred that the prescribed data provide the information necessary for making the determination. To that end, the vending apparatus 10 is preferably operable to monitor raw data from which a determination may be made as to whether money is being (or has been) stolen from the vending apparatus 10. The raw data may include, for example, the quanta of goods being sold from the vending apparatus 10, the quanta of money being taken in by the vending apparatus 10, and the date and/or time of vends.

In one illustrative embodiment, the vending apparatus 10 may be operable to collect DEX data using known techniques, which DEX data includes the raw data.

These raw data may be released (as prescribed data) from the vending apparatus 10, e.g., via the communications unit 410, for an externally conducted determination. Preferably, however, the vending apparatus 10 is operable to make the determination as to whether money is being (or has been stolen) therefrom and, further, the determination as to whether the contractual obligation relating thereto has been met.

Among the ways in which a determination as to whether stealing has occurred includes comparing the quanta of money purportedly taken in by the vending apparatus 10 (as reported by and/or provided by the operator) with the actual quanta of money taken in by the vending apparatus 10 monitored by the vending apparatus. Alternatively, the quanta of goods sold as monitored by the vending apparatus 10 may be compared against the money received and monitored by the vending apparatus 10 and/or reported by the operator to an interested entity. In either case, the control system 400, and the microprocessor 402 in particular, may preferably be used to conduct the comparison.

Compliance with the obligation to display goods in the vending apparatus 10 in a prescribed way may be determined by, for example, physically inspecting the vending apparatus 10, although it is preferred that the prescribed data provide the information necessary for making the determination. To that end, the vending apparatus 10 is preferably operable to monitor raw data from which a determination may be made as to whether one or more of the goods are displayed within the vending apparatus 10 in a prescribed way. For example, in a vending apparatus 10 in which a user may view the goods through a window, an entity (e.g., the operator) may be obligated to store one or more of the goods within the storage area 215 of the vending apparatus 10 in a prescribed way. This will typically be an issue when the vending apparatus 10 is of the horizontally aligned container 216 type (discussed hereinabove with respect to FIGS. 4, 5, etc.).

Preferably, the control system 400 is capable of at least obtaining raw data concerning whether the goods are displayed in the prescribed way by obtaining the spatial coordinates within the storage area 215 at which particular goods are stored. These spatial coordinates may be stored in, for example, the memory 404 and, in use, the control system 400 may utilize these spatial coordinates in commanding the electromechanical retrieving device 200 to those coordinates when dispensing goods from the vending apparatus 10. Alternatively, when the vending apparatus 10 is of the spiral dispensing variety, the control system 400 may readily provide an indication of which spirals are activated to dispense goods from the vending apparatus 10. It is also noted that if the vending apparatus 10 collects DEX data using any of the known techniques, such data may provide an indication of where the goods are displayed within the vending apparatus 10 (e.g., spiral locations corresponding to pre-programmed user selections, such as A1, A2, A3, A4, B1, B2, B3, B4, etc.).

One skilled in the art will appreciate that these raw data are suitable for use in determining whether the goods are displayed in the prescribed way within the vending apparatus 10. These raw data may be released (as prescribed data) from the vending apparatus 10, e.g., via the communications unit 410, for an externally conducted determination. Preferably, however, the vending apparatus 10 is operable to make the determination as to whether the goods are displayed in the prescribed way and, therefore, is operable to determine whether the contractual obligation relating thereto has been met.

For example, information concerning the prescribed way in which goods are to be displayed within the vending apparatus 10 may be stored in the memory 404 of the control system 400. The microprocessor 402 of the control system 400 is preferably operable to compare the prescribed way in which goods are to be displayed with the raw data relating to the actual way in which goods are (or have been) displayed within the vending apparatus 10. The result of the comparison yields the final data, e.g., the determination as to whether the goods are displayed in the prescribed way. Further, the result may yield other final data, such as whether the contractual obligation relating to whether the goods are displayed in the prescribed way has been met.

Compliance with the obligation to display advertising indicia (or other desirable graphics) on the vending apparatus 10 in a prescribed way may be determined by, for example, physically inspecting the vending apparatus 10, although it is preferred that the prescribed data provide the information necessary for making the determination. To that end, the vending apparatus 10 is preferably operable to monitor raw data from which a determination may be made as to whether indicia are displayed in an authorized way at the vending apparatus 10.

By way of example, the vending apparatus 10 is preferably operable to monitor whether a specific display panel 18 and/or the alterable portion 18A thereof (discussed hereinabove with respect to FIGS. 1 and 4) is in a prescribed configuration (e.g., contains prescribed advertising indicia and that the indicia are displayed properly). In a preferred embodiment, the alterable portion 18A and the panel 18 each include at least one of an electronic, an electromechanical, and/or a mechanical means useful for sensing whether an authorized panel 18 or alterable portion 18A is being used. Preferably, the panel 18 and/or the alterable portion 18A include an electronic security circuit 50 that is operatively coupled to, or in operative communication with, a receiving circuit such that unauthorized removable of the alterable portion 18A may be sensed by the receiving circuit. For example, the electronic security circuit 50 may produce a unique code that when received indicates an authorized configuration of the panel 18 and/or the alterable portion 18A. Any of the known electronic security circuits may be utilized to implement the electronic security circuit 50, such as a MicroChip encryption security chip. Alternatively, the circuit 50 may be a radio frequency identification (RFID) tag (with corresponding reader) as may be obtained, for example, from Motorola of San Jose, Calif. As is known in the art, the electronic security circuit 50 preferably communicates with the receiving circuit (or circuits) by way of hard wire, wireless communication, etc. and preferably utilizes encryption. Further details concerning suitable implementation hardware for the electronic security circuits 50 may be found at www.aimglobal.org, a website of the global trade organization, AIM. This website provides many details concerning article identification and data collection (AIDC).

The receiving circuit may be another electronic security circuit 50 (located on another system/circuit of the vending apparatus 10 as will be discussed later in this description), a dedicated circuit (not shown), the control system 400, etc. Preferably, the control system 400 is or includes the receiving circuit and, via the microprocessor 402, determines whether the electronic security circuit 50 of the panel 18 and/or the alterable portion 18A is present and, if so, emits a code.

One skilled in the art will appreciate that the raw data (e.g., the emitted and received code or the lack thereof) are suitable for use in determining whether the indicia are displayed in an authorized way at the vending apparatus 10. These raw data may be released (as prescribed data) from the vending apparatus 10, e.g., via the communications unit 410, for an externally conducted determination. Preferably, however, the vending apparatus 10 is operable to make the determination as to whether the indicia are displayed in an authorized way and, therefore, is operable to determine whether the contractual obligation relating thereto has been met.

For example, information concerning the prescribed way in which the indicia are to be displayed at the vending apparatus 10 may be stored in the memory 404 of the control system 400. The microprocessor 402 of the control system 400 is preferable operable to compare the prescribed way in which indicia are to be displayed with the raw data relating to the actual way in which the indicia are (or have been) displayed at the vending apparatus 10. The result of the comparison yields the final data, e.g., the determination as to whether the indicia are displayed in the prescribed way. Further, the result may yield other final data, such as whether the contractual obligation relating to whether the indicia are displayed in the prescribed way has been met.

Compliance with the obligation to maintain a prescribed number of goods selections in the vending apparatus 10 may be determined by, for example, physically inspecting the vending apparatus 10, although it is preferred that the prescribed data provide the information necessary for making the determination. To that end, the vending apparatus 10 is preferably operable to monitor raw data from which a determination may be made as to whether the prescribed number of goods selections are (or have been) available in the vending apparatus 10.

In one embodiment, the vending apparatus 10 may be operable to collect DEX data utilizing known techniques, which data may include an indication of the total number of goods selections available from the vending apparatus 10. For example, the DEX data may indicate that there are twenty-five goods selections available (e.g., by way of the goods selection numbers labeled A1-A9, B1-B9, and C1-C7).

In an alternative embodiment, the vending apparatus 10 is operable to obtain raw data concerning the actual number of goods selections that are available therefrom, for example, utilizing the control system 400 and the microprocessor 402 in particular. Indeed, the memory 404 of the control system 400 preferably includes the actual number of goods selections that are available in the vending apparatus 10 by way of the number of X, Y positions programmed into the vending apparatus 10 during setup so as to correspond with the positions of the vendible goods as arranged within the storage area 215 (discussed in detail hereinabove with respect to FIGS. 4-6).

One skilled in the art will appreciate that the raw data (e.g., actual number of goods selections that are available in the vending apparatus 10) are suitable for use in determining whether the prescribed number of goods selections are (or have been) available in the vending apparatus 10. These raw data may be released (as prescribed data) from the vending apparatus 10, e.g., via the communications unit 410, for an externally conducted determination. Preferably, however, the vending apparatus 10 is operable to make the determination as to whether the prescribed number of goods selections are (or have been) available in the vending apparatus 10 and, therefore, is operable to determine whether the contractual obligation relating thereto has been met.

By way of example, the memory 404 of the control system 400 may contain information concerning the prescribed number of goods selections that should be available in the vending apparatus 10. By comparing the prescribed number of goods selections with the raw data, e.g., the actual number of goods selections available from the vending apparatus 10, the control system 400 preferably produces prescribed data indicating whether the prescribed number of goods selections has been maintained (and, further, whether the contractual obligation related thereto has been met).

Compliance with the contractual obligation to sell and/or dispense a prescribed quanta of one or more goods from the vending apparatus 10 in a predefined period of time may be determined by, for example, a physical inspection of the vending apparatus 10, querying the operator for the information necessary to make the determination, etc. It is preferred the prescribed data provide the information necessary for making the determination. To that end, the vending apparatus 10 is preferably operable to monitor raw data from which the determination may be made as to whether the prescribed quanta of one or more goods has been sold and/or dispensed from the vending apparatus 10 in the predefined period of time.

For example, the control system 400 of the vending apparatus 10 is preferably operable to monitor the quantum of one or more groups of goods sold (and/or dispensed) during one or more predefined periods of time. (It is noted that the one or more groups of goods may, for example, be goods of a particular type, a particular brand, a particular size, a particular weight, a particular expiration date, a particular package type, a particular period of manufacture, a particular place of manufacture, etc.)

In one embodiment, the information concerning the quantum of goods sold may be obtained by way of the combined functions of the control unit 400 and the article ID device 254. Indeed, as each article 223 is sold (and/or dispensed) from the vending apparatus 10, the article ID device 254 preferably scans the article 223 and provides information obtained during the scan to the control system 400. The microprocessor 402 of the control system 400 preferably processes this information and stores at least a total of the goods sold and/or dispensed of a particular group. Preferably, the control system 400, and the microprocessor 402 in particular, are operable to monitor the time and date of sale of goods.

One skilled in the art will appreciate that the raw data (e.g., one or more totals of goods of respective groups sold and/or dispensed, and the time and/or date of sale of goods) are suitable for use in determining whether the prescribed quanta of one or more goods has been sold and/or dispensed from the vending apparatus 10 in the predefined period of time. These raw data may be released (as prescribed data) from the vending apparatus 10, e.g., via the communications unit 410, for an externally conducted determination. Preferably, however, the vending apparatus 10 is operable to make the determination as to whether the prescribed quanta of one or more goods has been sold and/or dispensed from the vending apparatus 10 in the predefined period of time and, therefore, is operable to determine whether the contractual obligation relating thereto has been met.

By way of example, the memory 404 of the control system 400 may contain information concerning the prescribed quanta of one or more goods that should be sold and/or dispensed from the vending apparatus 10 in the predefined period of time. By comparing the prescribed quanta of goods sold and/or dispensed with the raw data, e.g., the actual number of goods that were sold and/or dispensed from the vending apparatus 10 in the predefined period of time, the control system 400 preferably produces prescribed data indicating whether the prescribed quanta of one or more goods were sold and/or dispensed from the vending apparatus 10 (and, further, whether the contractual obligation related thereto has been met).

Compliance with the contractual obligation to sell a prescribed ratio of one or more of the goods to one or more others of the goods may be determined in any number of ways, although it is preferred that the prescribed data provide the information necessary for making the determination. To that end, the vending apparatus 10 is preferably operable to monitor raw data from which a determination may be made as to whether the prescribed ratio of the one or more of the goods to the one or more others of the goods has been sold from the vending apparatus 10.

By way of example, the prescribed ratio of goods may be a ratio of types of goods (e.g., a ratio of the number of corn chips sold to the number of potato chips sold), a ratio of brands of goods (e.g., a ratio of the number of brand ABC goods to the number of brand XYZ goods sold), a ratio of sizes of goods (e.g., a ratio of the number of size X goods to size Y goods sold), a ratio of weights of goods, a ratio of expiration dates of goods, a ratio of package types of goods, etc.

In one embodiment, the article ID device 254 preferably provides information to the control system 400 concerning at least one of the type, brand, size, weight, expiration data, package type, period of manufacture, place of manufacture, etc. of each article 223 sold and/or dispensed from the vending apparatus 10. Preferably, the control system 400 at least temporarily stores this information in the memory 404. Further, the control system 400 preferably at least temporarily stores the times and/or dates on which the goods are sold and/or dispensed from the vending apparatus 10.

One skilled in the art will appreciate that this raw data may be utilized to determine whether the prescribed ratio of one or more of the goods to one or more others of the goods have been sold from the vending apparatus 10. Although the vending apparatus 10 may release this raw data (e.g., via the communications unit 410) for an external determination, it is preferred that the control system 400, and the microprocessor 402 in particular, is operable to compute the one or more ratios. For example, if the obligation in question is to sell a prescribed ratio of brand ABC goods to brand XYZ goods within a predefined period of time (or on an ongoing basis), the microprocessor 402 preferably divides the number (and/or sales) of ABC brand goods by the number (and/or sales) of XYZ brand goods within the predefined period of time (or on an ongoing basis).

The memory 404 of the control system 400 preferably contains information concerning the prescribed ratio of one or more of the goods to one or more others of the goods that should be sold from the vending apparatus 10 (e.g., in the predefined period of time). By comparing the prescribed ratio with the raw data, e.g., the actual ratio, the control system 400 preferably produces prescribed data indicating whether the prescribed ratio of one or more of the goods to one or more others of the goods was sold from the vending apparatus 10 (and, further, whether the contractual obligation related thereto has been met).

Compliance with the contractual obligation to receive a prescribed quantum of money at the vending apparatus 10 in a predefined period of time may be determined in any number of ways including a physical inspection of the vending apparatus 10, although it is preferred that the prescribed data provide the information necessary for making the determination. To that end, the vending apparatus 10 is preferably operable to monitor raw data from which a determination may be made as to whether the prescribed quantum of money was received at the vending apparatus 10 in a predefined period of time.

By way of example, the control system 400 is preferably operable to monitor the quanta of money received at the vending apparatus 10 by way of information provided from the user interface system 406 (FIG. 6). Indeed, each time money is received by the vending apparatus 10 (e.g., by way of the bill acceptor mechanism 26, the coin acceptor mechanism 28, the credit/debit card reader mechanism 34, etc.), the control system 400, and the microprocessor 402 in particular, preferably at least temporarily stores information indicative of the money received. As discussed above, the control system 400 may also be operable to collect and at least temporarily store the respective dates and/or times on which goods are sold from the vending apparatus 10.

One skilled in the art will appreciate that this raw data is suitable for use determining whether the prescribed quanta of money was received at the vending apparatus 10 in the predefined period of time. This raw data may be released by the vending apparatus 10 (e.g., via the communications unit 410) for an external determination. It is preferred, however, that the control system 400, and the microprocessor 402 in particular, is operable to make the determination as to whether the prescribed quanta of money was received at the vending apparatus 10 in the predefined period of time. For example, the microprocessor 402 preferably aggregates the amounts of money received over a particular time period (i.e., the predefined period of time) using the dates and/or times that goods were vended from the vending apparatus 10.

The memory 404 of the control system 400 preferably contains information concerning the prescribed quanta of money that that should be received by the vending apparatus 10 (e.g., in the predefined period of time). By comparing the prescribed quanta of money received with the raw data, e.g., the actual quanta of money received, the control system 400 preferably produces prescribed data indicating whether the prescribed quanta of money was received by the vending apparatus 10 (and, further, whether the contractual obligation related thereto has been met).

Compliance with the contractual obligation to maintain the vending apparatus 10 in operation (e.g., to a prescribed degree) may be determined in any number of ways, including physical inspection of the vending apparatus 10, although it is preferred that the prescribed data provide the information necessary for making the determination. In one embodiment, the control system 400 is preferably operable to monitor raw data from which a determination may be made as to whether the vending apparatus 10 is operational to a prescribed degree, e.g., whether the vending apparatus 10 is (or has been) capable of vending goods and/or to what degree the vending apparatus 10 is (or has been) capable of vending goods.

For example, the vending apparatus 10 may be partially incapable of vending goods because it may only be capable of vending certain types, brands, weights, sizes, etc. of goods. On the other hand, the vending apparatus 10 may be entirely incapable of vending goods for various periods of time, e.g., due to power outages, mechanical failures, etc. The control system 400, and the microprocessor 402 in particular, is preferably operable to monitor such operational conditions of the vending apparatus 10 and to at least temporarily store such information in the memory 404. The raw data may be released from the vending apparatus 10 (e.g., via the communications unit 410) for external processing to determine whether the obligation to maintain the vending apparatus 10 in operation to a prescribed degree may be made.

Preferably, however, the control system 400 is capable of determining whether the vending apparatus 10 has been maintained in operation to the prescribed degree and, further, determining whether the obligation related thereto has been met. For example, the microprocessor 402 of the control system 400 is preferably operable to compare the prescribed degree to which the vending apparatus 10 should be maintained operational (which may be stored in the memory 404) to the actual degree to which the vending apparatus 10 has been operational. The actual degree to which the vending apparatus 10 has been operational may be determined by monitoring data from one or more of the peripheral systems/circuits discussed above with respect to FIG. 6. For example, the microprocessor 402 may monitor: (i) whether power has been lost and for what periods of time; (ii) whether certain groups of goods have been vendible from the vending apparatus 10 (e.g., using the article ID device 254); etc.

Compliance with the contractual obligation not to tamper with the vending apparatus 10 may be determined in any number of ways, although it is preferred that the prescribed data provide the information necessary for making the determination. To that end, the vending apparatus 10 is preferably operable to monitor raw data from which a determination may be made as to whether the vending apparatus 10 has been tampered with. Tampering with the vending apparatus may include, for example: (i) movement of the vending apparatus 10 to an unauthorized location; (ii) removal and/or altering of the control system 400 and/or the peripheral circuits/systems (FIG. 6); and (iii) removal and/or unauthorized altering of graphics (e.g., advertising indicia) concerning the goods stored within the vending apparatus 10, such as the panel 18 and/or the alterable portion 18A thereof (FIG. 1) described hereinabove.

In one embodiment, the vending apparatus 10 preferably includes motion sensors (e.g., a subset of the position sensors 412, FIG. 6), to sense whether the vending apparatus 10 is being moved in an unauthorized manner. The motion sensors preferably provide raw data to the control system 400 and the microprocessor 402 in particular, that indicates whether the vending apparatus 10 is being rotated, tilted and/or otherwise moved. This raw data may be released as prescribed data from the vending apparatus 10 (e.g., via the communications unit 410) for external an external determination as to whether the vending apparatus 10 has been tampered with in an unauthorized manner. Preferably, however, the vending apparatus 10 is capable of processing the raw data (e.g., utilizing the microprocessor 402 of the control system 400) to determine whether the vending apparatus 10 has been moved in an unauthorized manner. Any of the known algorithms for processing motion sensor information may be utilized for this purpose. Thus, the vending apparatus 10 may produce prescribed data including the determination as to whether the obligation not to tamper with the vending apparatus 10 has been met.

In a further embodiment, the vending apparatus 10 preferably includes an electronic means for sensing whether unauthorized removal and/or altering of the control system 400 and/or the peripheral circuits/systems (FIG. 6) has occurred. To that end, the control system 400 and/or the peripheral systems/circuits preferably include an electronic security circuit 50 (best seen in FIG. 13) that is operatively coupled to, or in operative communication with, a receiving circuit such that unauthorized removal and/or alteration of the control system 400 and/or the peripheral systems/circuits may be sensed by the receiving circuit. The electronic security circuit 50 be implemented using substantially the same technology discussed hereinabove with respect to sensing unauthorized removal and/or alteration of panel 18.

One skilled in the art will appreciate that the raw data (e.g., the emitted and received code or lack thereof) from the electronic security circuit 50 and/or the receiving circuit (or circuits) are suitable for use in determining whether the control system 400 and/or the peripheral systems/circuits have been removed and/or altered in an unauthorized manner. These raw data may be released (as prescribed data) from the vending apparatus 10, e.g., via the communications unit 410, for an externally conducted determination. Preferably, however, the vending apparatus 10 is operable to make the determination as to whether the control system 400 and/or the peripheral systems/circuits have been removed and/or altered in an unauthorized manner and, therefore, is operable to determine whether the contractual obligation relating thereto has been met.

For example, information concerning the authorized configuration of the control system 400 and/or peripheral systems/circuits may be stored in the memory 404 of the control system 400. The microprocessor 402 of the control system 400 is preferably operable to compare the stored information with the raw data relating to the actual condition of the control system 400 and/or peripheral systems/circuits. The result of the comparison yields the final data, e.g., the determination as to whether an unauthorized removal and/or alteration has taken place. Further, the result may yield other final data, such as whether the contractual obligation relating to whether the control system 400 and/or peripheral systems/circuits have been removed and/or altered in an unauthorized way.

In keeping with the example above (where the operator enters into a contract with the seller of goods) one of the contractual obligations may be an obligation on the part of the operator to vend only goods authorized by the seller of goods. For example, the seller of goods may be in the business of manufacturing and/or distributing corn chips and may be interested in maintaining or expanding its market share. Thus, the seller of goods may contract with an operator of one or more vending apparatus 10 whereby the operator agrees to vend the seller's corn chips in exchange for, for example, a desirable price at which the operator may purchase the corn chips from the seller. In the past, the seller of goods would have relatively little leverage in insuring that the operator met its contractual obligation to vend only the corn chips of the seller. In accordance with the invention, however, the seller of goods has the option of withholding the continuation code from the vending apparatus 10 if the seller of goods learns that the operator is not living up to the agreement. Advantageously, this will motivate the operator to adhere to the contractual obligations with the seller of goods. Moreover, the above described apparatus and method will encourage entities to engage in such agreements, thereby expanding the markets for the sales of goods from vending apparatus, increasing the sales of vending apparatus, and improving the vending experience to users.

Additional advantages are obtained using the vending apparatus 10 and/or method described herein. For example, the operator may enter into an agreement with another entity to permit that entity to share in the risks and/or rewards of vending goods from the vending apparatus 10. This may result in a number of contractual obligations between the parties including, for example, an obligation not to steal receipts, and an obligation to provide a quantum of money to the other entity based on the sales of goods from the vending apparatus 10. When such an agreement is made between, for example, the operator and an investor who lends money to the operator to purchase, rent, or lease the vending apparatus 10, a so-called pay-as-you-vend arrangement may be obtained. In other words, the operator may pay the investor for the vending apparatus 10 at least partially in accordance with the sales of goods from the vending apparatus, subject to the usage fluctuations that will inevitably occur. This shifts some of the risks and rewards resulting from the sales of goods from the vending apparatus 10 among the operator and the investor. Advantageously, the vending apparatus 10 in this example becomes a variable cost asset as opposed to a fixed cost asset of traditional vending machines. Heretofore, the operator typically was the only party that obtained profits and/or losses due to market fluctuations. Indeed, other entities, such as the investor, heretofore expected a particular sum of money from the operator on a schedule, irrespective of the usage fluctuations in the sales of goods. It is noted that it is preferred that the investor is in control of making the continuation codes available to the vending apparatus 10, thereby having leverage to motivate the operator to meet his obligations.

By way of further example, the operator may enter into a contract with the seller of goods (and/or the distributor or agent thereof) where at least one contractual obligation between the parties includes, for example, an obligation to vend only authorized goods (such as selling only goods of an authorized type, brand, size, and/or weight). Assuming that limiting the operator in this way would benefit the seller of goods (e.g., in terms of market share, profit/loss, etc.), the seller of goods may provide the manufacturer of the vending apparatus 10 with a quantum of money (e.g., a rebate) for manufacturing the vending apparatus 10 in a way that facilitates such limitations under which the vending of goods may be performed. In other words, the seller of goods will wish to motivate the manufacturer of the vending apparatus 10 to design and manufacture the vending apparatus 10 such that it will only vend authorized goods as specified by the seller of goods. Furthermore, the operator may be motivated to purchase the vending apparatus 10 (even though it is subject to being disabled if a continuation code is not received at appropriate times) because he or she may be provided with an incentive to do so, for example, by way of the manufacturer selling the vending apparatus 10 to the operator at a discounted price, such as a discount based on the rebate it received from the seller of goods.

Figure 10:
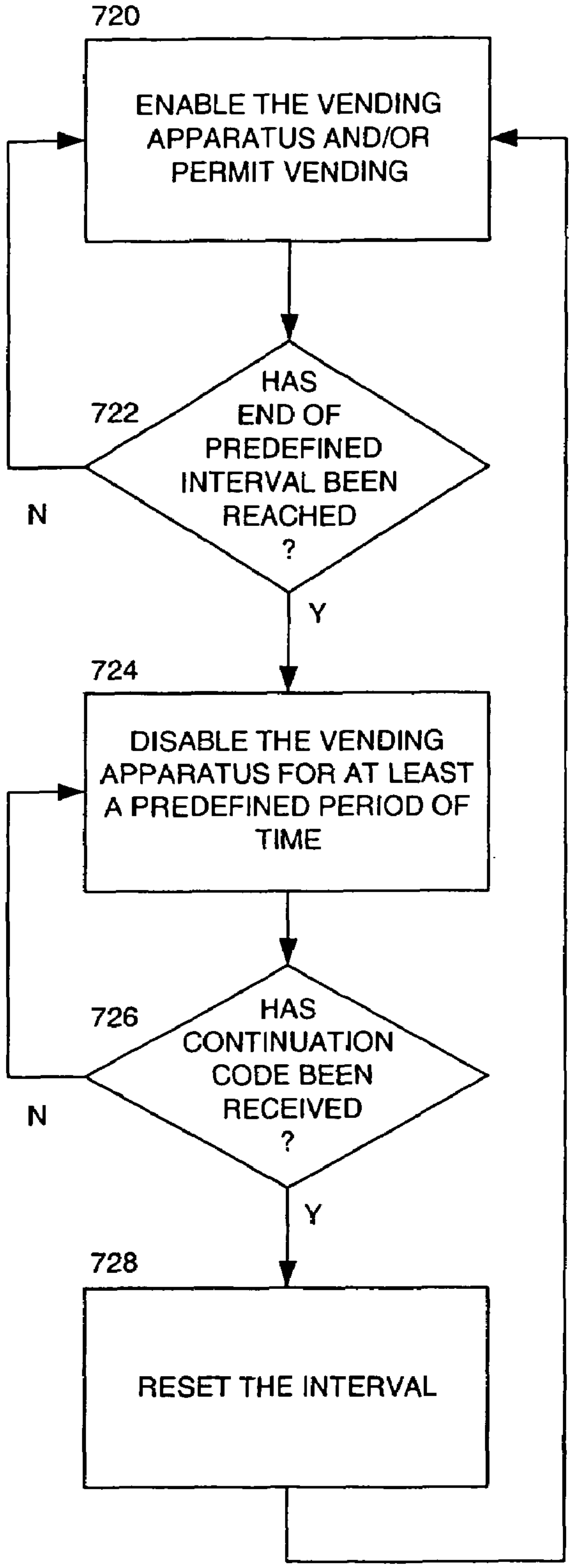
FIGS. 10-12 are flow diagrams illustrating capabilities, actions, and/or functions of various vending apparatus and/or methods in accordance with one or more further aspects of the present invention.

Reference is now made to FIG. 10, which is a flow diagram illustrating an alternative process to that of FIG. 7 and which may be carried out using the control system 400. Again, it is preferred that the process is executed by way of a software program running on the microprocessor 402 platform (FIG. 6). At action 720, the vending apparatus 10 is preferably operating in at least a partially enabled state, such that at least some of the goods stored within the vending apparatus 10 may be dispensed to a user. The vending apparatus 10 is then preferably enabled for a predefined interval, illustrated by a loop between actions 722 and 720. At an end of the predefined interval, the process flow preferably branches to action 724 where the vending apparatus 10 is preferably at least partially disabled (e.g., such that at least some of the goods stored within the vending apparatus 10 may not be dispensed therefrom). This disablement of the vending apparatus 10 preferably lasts for a predefined period of time (e.g., one hour). Before or after the predefined period of time has elapsed, an inquiry is preferably made as to whether a continuation code has been received by the vending apparatus 10 (action 726). If the result of the inquiry is negative, then the process preferably flows back to action 724, where the vending apparatus 10 remains disabled. If, however, the result of the inquiry is affirmative, then the process flow preferably branches to action 728, substantially immediately, or after the predefined period of time has elapsed. At action 728, the interval is preferably reset and the vending apparatus 10 is permitted to enter an enabled state (e.g., such that at least some of the goods may be dispensed therefrom).

Although the process flow illustrated in FIG. 10 differs from the process flow of FIG. 7 (e.g., because in the former the vending apparatus 10 is disabled for at least some period of time), one skilled in the art will appreciate that the discussion hereinabove of FIG. 7 regarding the details of the predefined interval, the continuation code, the flow of information between various entities (FIGS. 8 and 9), etc. applies equally to the process flow of FIG. 10. For example, the control process illustrated in FIG. 10, just as was the case with FIG. 7, is useful in encouraging one or more entities to enter into agreements with one another concerning sales of goods from the vending apparatus 10 (or a plurality of vending apparatus 10). Irrespective of the particular relationship of the entities involved, and in accordance with one or more further aspects of the present invention, the entities preferably agree that (i) the vending apparatus 10 may be enabled to dispense goods for a predefined interval; (ii) the vending apparatus 10 is at least partially disabled from dispensing at least some of the goods at the end of the interval; (iii) the vending apparatus 10 remains at least partially disabled for a predefined period of time after the end of the interval irrespective of whether a continuation code was received before the end of the interval; and (iv) the vending apparatus 10 is at least partially re-enabled if the continuation code is received by the vending apparatus 10 before or after the end of the interval. The above method defining an agreement between the entities (e.g., the operator and the seller of goods) concerning sales of goods from the vending apparatus 10 provides assurance to, for example, the seller of goods that the one or more contractual obligations of the operator are likely to be met.

Figure 11:
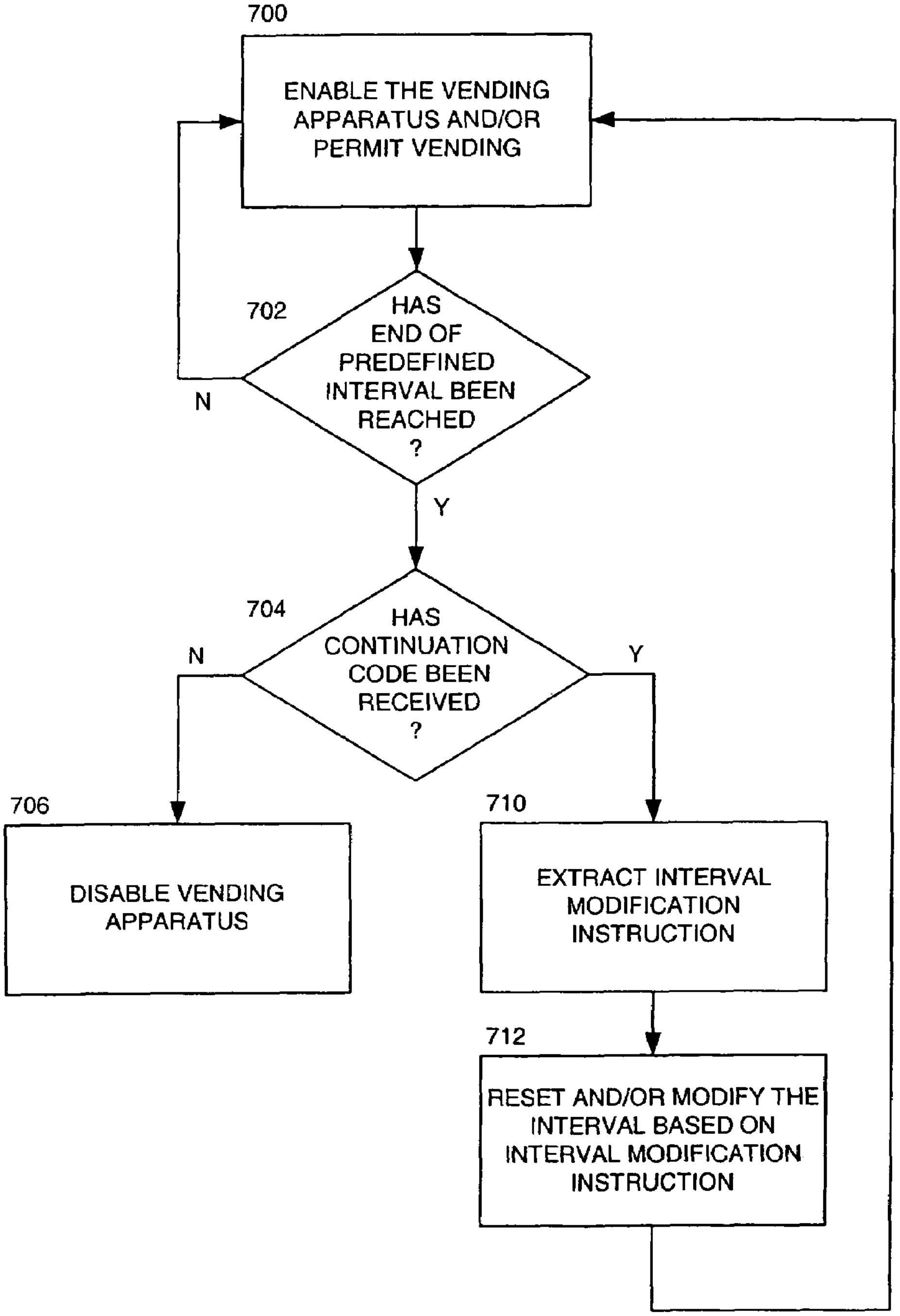

Reference is now made to FIG. 11, which is a flow diagram illustrating an alternative process in accordance with one or more aspects of the invention that is preferably carried out using the control system 400. Again, it is most preferred that the process is executed by way of a software program running on the microprocessor 402 platform (FIG. 6). The process flow through actions 700, 702, 704, and 706 is substantially similar to the process flow discussed hereinabove with respect to FIG. 7 and, therefore, the details relating to this portion of the process flow of FIG. 11 will not be repeated.

Referring to action 704, if the result of the inquiry (i.e., as to whether the continuation code has been received by the vending apparatus 10) is in the affirmative, then the process flow preferably branches to action 710. At action 710, an interval modification instruction is extracted from the continuation code, it being understood that the interval modification instruction had been inserted into, and/or augmented with, the continuation code prior to being received by the vending apparatus 10. It is noted that the interval modification instruction may be sent to the vending apparatus 10 separate from the continuation code (or any other code, such as a disable code or a re-enable code, which are presented later in this description). At action 712, the interval is at least one of reset and modified in response to the vending apparatus 10 receiving the continuation code and, more particularly, in response to the vending apparatus 10 receiving the interval modification instruction. For example, the interval may be increased, decreased or unchanged in response to the interval modification instruction. Advantageously, this permits additional flexibility in structuring and/or restructuring the agreement between the entities concerning the sales of goods from the vending apparatus 10.

It is noted that although the process flow concerning the modification of the interval (e.g., actions 710 and 712) of FIG. 11 have been discussed in terms of modifying the process flow of FIG. 7, one skilled in the art will appreciate that the process flow of FIG. 10 may be readily modified in light of the disclosure herein to permit the modification of the interval. For example, process actions substantially similar to those of actions 710 and 712 may be inserted into the process flow of FIG. 10 by substituting them for action 728.

Figure 12:
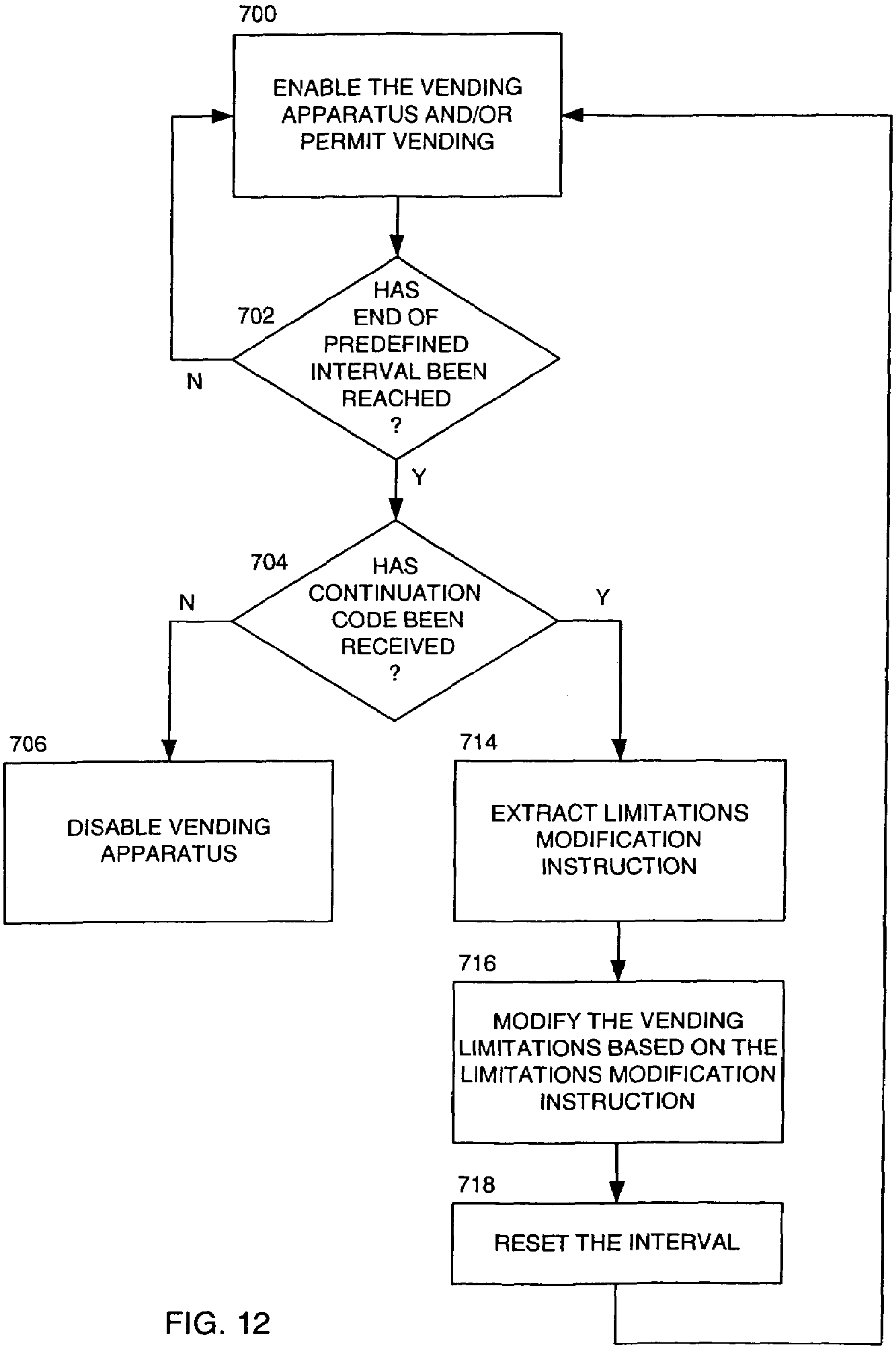

Reference is now made to FIG. 12, which is a flow diagram illustrating an alternative process in accordance with one or more aspects of the invention that is preferably carried out using the control system 400. Again, it is preferred that the process is executed by way of a software program running on the microprocessor 402 platform (FIG. 6). Actions 700, 702, 704, and 706 are substantially similar to those of FIG. 7 and, therefore, the details of these actions will not be repeated here.

Referring to action 704, if the result of the inquiry (i.e., as to whether the continuation code has been received by the vending apparatus 10) is in the affirmative, then the process flow preferably branches to action 714. At action 714, a limitations modification instruction is preferably extracted from the continuation code. It is understood that the limitations modification instruction had been inserted into, and/or augmented with, the continuation code prior to the continuation code having been received by the vending apparatus 10. Thus, the limitations modification instruction may be entirely separate from the continuation code (or any other code, such as a disable code or re-enable code, which are presented later in this description). At action 716, the limitations as to how the goods are vended from the vending apparatus 10 are modified based on the limitations modification instruction obtained from the continuation code. Among the examples of the particular limitations that may be modified, and that were discussed in detail hereinabove, is the limitation to vend only authorized goods.

By way of example, the limitations modification instruction may dictate that one or more of the limitations under which the vending apparatus 10 was vending goods is eliminated. For example, an operator may have an agreement with a lender (e.g., a bank) that the operator will pay the bank a certain percentage of the sales from the vending apparatus 10, with the limitation that a prescribed quantum of money must be received by the vending apparatus 10 in a predefined period of time (e.g., to ensure that the bank gets minimum payments). When the operator has paid the bank in full, however, the operator may wish to operate the vending apparatus 10 without limitation. In this case, the bank may cause the limitations modification instruction to provide that this limitation be lifted.

At action 718, the interval is preferably reset and the process flow preferably feeds back to action 700, where the vending apparatus 10 is permitted to enter (and/or remain in) the enabled state (e.g., such that at least some of the goods may be dispensed therefrom).

Although the process concerning the modification of vending limitations based on the limitations modification instruction of the continuation code has been discussed in terms of the basic process flow of FIG. 7, those skilled in the art will appreciate that the process flow of FIG. 10 may be modified to include this capability by, for example, inserting action 714 and 716 in between actions 726 and 728 of FIG. 10. Advantageously, the ability to modify the vending limitations via the limitations modification instruction provides additional degrees of freedom for the entities to negotiate and/or renegotiate the terms under which the goods may be dispensed from the vending apparatus 10.

The concept of at least partially disabling the vending apparatus 10 from dispensing at least some of the goods stored therein has been discussed above (e.g., regarding FIGS. 7-12) and will be further considered herein below. It is noted that those skilled in the art will appreciate from the disclosure herein that the particular mechanism and/or process for disabling the vending apparatus 10 may vary. A determination as to whether the vending apparatus 10 should be disabled may be made externally (e.g., via an external computer system) or internally (e.g., via the control system 400) and a corresponding external and/or internal disable signal generated to cause the vending apparatus 10 to become at least partially disabled. For example, the control system 400 (FIG. 6) may prevent the electromechanical retrieving device 200 (FIG. 5) from moving to the X, Y position of one or more of the containers 216. Alternatively, the control system 400 may prevent the air hose 220 from moving into contact with the article 223 and/or may prevent vacuum action when the X, Y positions of the carriage 218 corresponds to a container 216 that contains goods that are "disabled" from being vended. Another alternative way to disable the dispensing of goods may include requiring that the retrieving device 200 return the article 223 to the storage area 215 instead of placing it in the dispensing chute 210. A further alternative may be to disable the dispensing chute 210, the bill acceptor mechanism 26, the coin acceptor mechanism 28, the card acceptor mechanism 34, etc. Still further, one or more motors and/or electromechanical devices may be disabled.

In one embodiment, a condition that triggers the desirability to at least partially disable the vending apparatus 10 may occur and the timing of actually disabling the vending apparatus 10 may occur anytime afterwards (e.g., after a current vend is completed as opposed to prohibiting the current vend to complete). The condition may be the detection by the article ID device 254 that an unauthorized good has been detected and the at least partial disablement may be prohibiting further vending from the corresponding compartment 216.

It is noted that an unscrupulous party may be motivated to attempt to alter the nature of the vending apparatus 10 such that it will not at least partially disable in accordance with the invention as described in the embodiments herein. For example, if the function of partly or fully disabling the vending apparatus 10 is carried out by way of a software program running on the microprocessor 402 platform of the control system 400 (FIG. 6) as discussed above, then an unscrupulous party may seek to remove the control system 400 from the vending apparatus 10 and replace it with a substitute control system that does not disable the vending apparatus 10.

Figure 13:
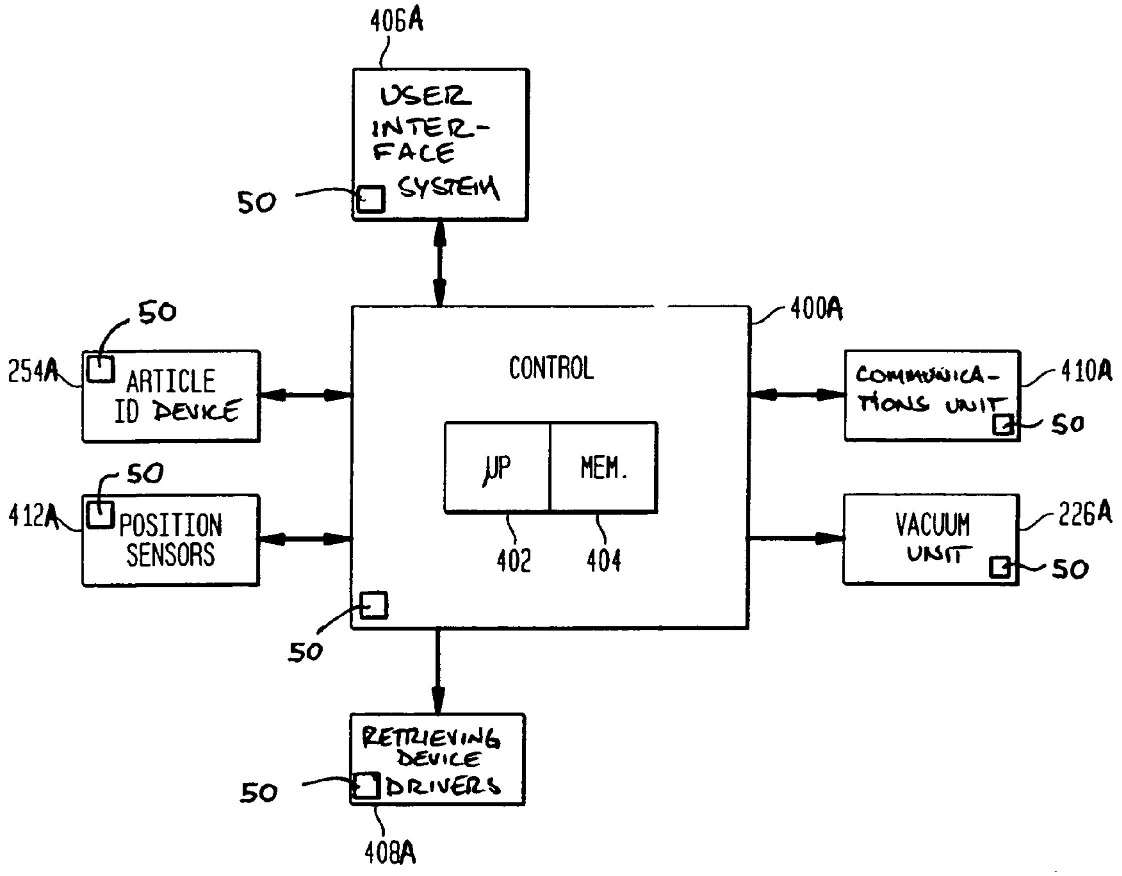
FIG. 13 is a high level functional and/or circuit block diagram of an alternative electromechanical system suitable for use in any of the vending apparatus of FIGS. 1-5.

In order to thwart the unauthorized modification of the vending apparatus 10, the vending apparatus 10 preferably includes at least one of an electronic, an electromechanical, and/or a mechanical means for sensing whether an unauthorized modification of the vending apparatus 10 has occurred and, if so, at least partially disabling the vending apparatus 10 from dispensing goods. With reference to FIG. 13, one or more of the control system 400A and/or the peripheral systems/circuits preferably include an electronic security circuit 50 that is operatively coupled to, or in operative communication with, a receiving circuit such that unauthorized removal of the system/circuit having the electronic security circuit 50 may be sensed by the receiving circuit. The electronic security circuit 50 maybe implemented using substantially the same technology presented hereinabove with respect to sensing unauthorized removal and/or modification of the panel 18, the control system 400, the peripheral systems/circuits (FIG. 6), etc. The electronic security circuits 50 preferably communicate with other portions of and/or one integrated into the vending apparatus 10 (i.e., receiving circuits), such as power supplies, motors, wire harnesses, switches, encoders, the customer display 24, the bill acceptor mechanism 26, the coin acceptor mechanism 28, the coin return actuator 30, the credit/debit card reader mechanism 34, the keypad mechanism 38, the article ID device 254, one or more of the position sensors 412, the communications unit 410, the vacuum unit 226, the retrieving device drivers 408, and/or any other electronic and/or electromechanical device of the vending apparatus 10. For example, if a given component with an electronic security circuit 50 is altered and/or removed, then any one or more of the components with a receiving circuit (which may be another electronic security circuit 50) may cease to operate. Thus, for example, a motor may refuse to operate in response to a control system 400 that does not include an expected electronic security circuit 50.

Advantageously, when a vending apparatus 10 employs one or more of the electronic security circuits 50, an unscrupulous person seeking to alter the vending apparatus 10 would need to replace every component of the vending apparatus 10 that includes an electronic security circuit 50 and/or any receiving circuit with which they communicate. This would make it highly impractical for the party to alter the vending apparatus 10 in an unauthorized way.

Figure 14:
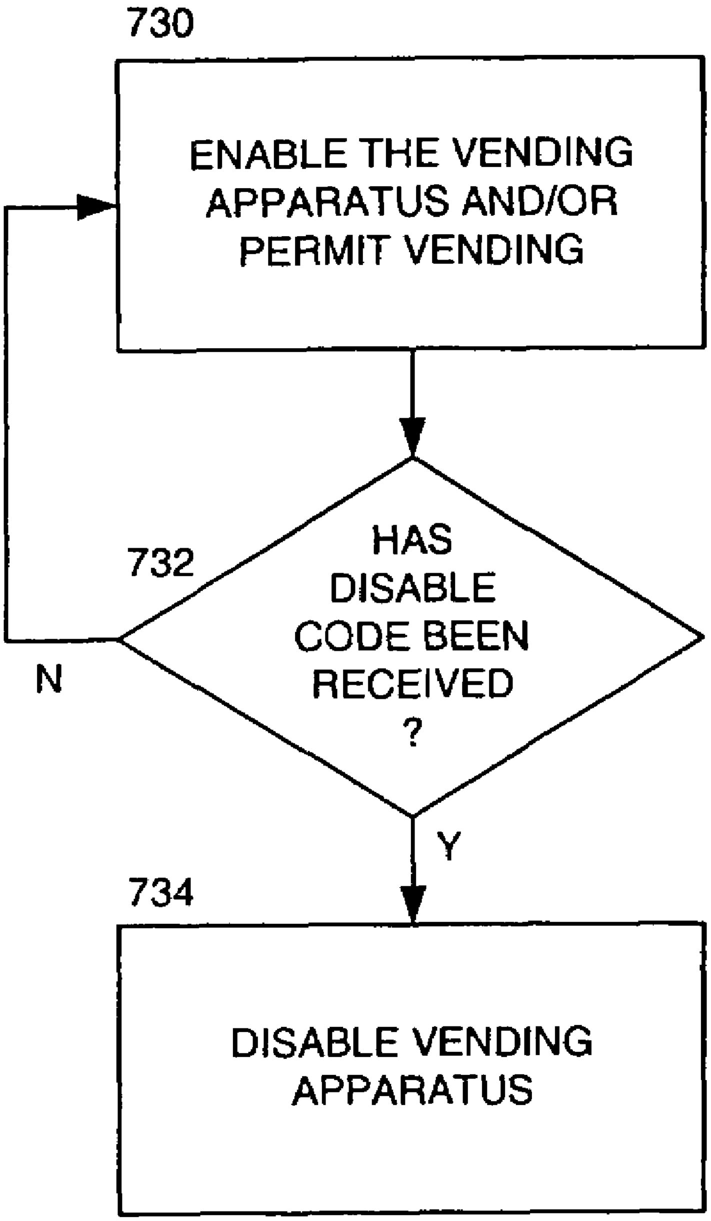
FIGS. 14-15 are flow diagrams illustrating capabilities, actions, and/or functions of various vending apparatus and/or methods in accordance with one or more further aspects of the present invention.

Reference is now made to FIG. 14, which illustrates a process flow for the vending apparatus 10 in accordance with one or more further aspects of the present invention. Preferably, the process is carried out using the control system 400 (FIG. 6), it being most preferred that the process is executed by way of a software program running on the microprocessor 402 platform. At action 730, the vending apparatus 10 is preferably operating in at least a partially enabled state, such that at least some of the goods stored within the vending apparatus 10 may be dispensed to a user. At action 732, an inquiry is preferably made as to whether a disable code has been received by the vending apparatus 10. If the result of the inquiry is negative, then the process preferably flows back to action 730, where the vending apparatus 10 is permitted to remain in the enabled state. If, however, the result of the inquiry is positive, then the process flow preferably advances to action 734, where the vending apparatus 10 is preferably at least partially disabled (e.g., such that at least some of the goods stored within the vending apparatus 10 may not be dispensed therefrom). The specific mechanisms that are preferably used to disable the vending apparatus 10 have been discussed above and will not be repeated here.

The disable code is preferably an electronic code that is input into the vending apparatus 10 through at least one of (i) the keypad mechanism 38; (ii) a dedicated keypad (not shown) that may be available, for example, only by opening the door 14 of the vending apparatus 10; (iii) a portable computing device (not shown) that is operable to connect to the communications unit 410, e.g., through a data port or the like; and (iv) a communications network to which the vending apparatus 10 is connected (e.g., through the communications unit 410). Whenr a communications network is employed to input the disable code into the vending apparatus 10, the communications network may include, for example, at least one of a wire network, a telephone network, a radio frequency link, an infrared link, a local area network, a wide area network, the Internet, etc.

It is noted that the disable code may be subject to cryptography, such that a decryption algorithm is employed within the vending apparatus 10 (e.g., in the control system 400) to decode the disable code. This would provide a high level of confidence that only authentic disable codes may be utilized to disable the vending apparatus 10.

Advantageously, the control process illustrated in FIG. 14 is useful in encouraging one or more entities to enter into agreements with one another concerning sales of goods from the vending apparatus 10 (or a plurality of vending apparatus 10). These agreements may be substantially similar to those discussed hereinabove with respect to FIGS. 7-12. In general, however, in accordance with one or more aspects of the present invention, the entities preferably agree that (i) the vending apparatus 10 may be enabled to dispense the goods, and (ii) the vending apparatus 10 may be at least partially disabled from dispensing at least some of the goods when an externally generated disable code is received by the vending apparatus 10. More particularly, the entities may agree that the disable code may be made available to the vending apparatus 10 after a determination is made that at least one contractual obligation between the entities has not been at least one of satisfied and waived.

It is noted that the discussion hereinabove with respect to the details concerning the various contractual obligations, the prescribed data concerning sales of goods by the vending apparatus 10, the limitations under which the vending apparatus 10 may vend goods, the mechanisms and/or processes used to disable the vending apparatus 10, the flow of information between various entities, apply equally here. Indeed, these details apply to the control process illustrated in FIG., 14, the capabilities of the vending apparatus 10, the methods carried out by the vending apparatus 10, and/or the relationships between the entities having an interest in the sale of goods from the vending apparatus 10. Accordingly, these details will not be repeated here. For example, the general and specific examples of the relationships and communication between entities with an interest in the sale of goods from the vending apparatus 10 presented above with respect to FIGS. 8 and 9 apply here, although it is understood that the disable code is communicated instead of, or in addition to, the continuation code, etc. It is noted that further examples of the relationships and communications among entities with an interest in the sale of goods from the vending apparatus are presented later in this description with reference to FIGS. 22-31.

Figure 15:
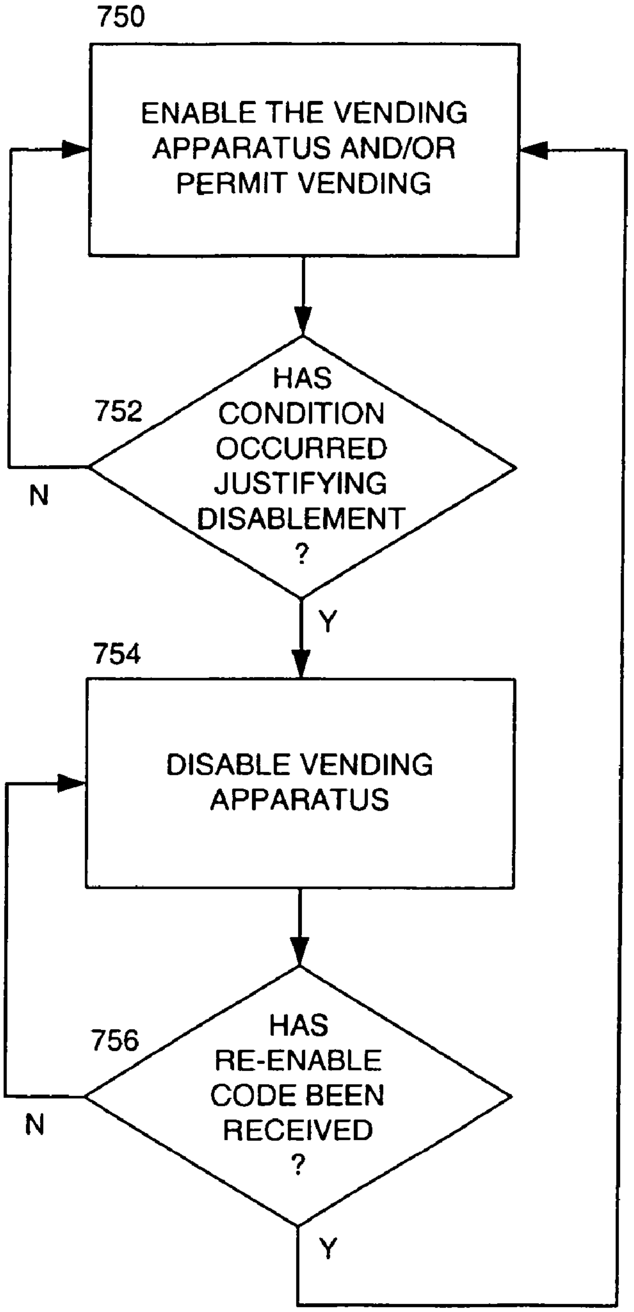

Reference is now made to FIG. 15, which illustrates a process flow for the vending apparatus 10 in accordance with one or more further aspects of the present invention. Preferably the process is carried out using the control system 400 (FIG. 6), it being most preferred that the process is executed by way of a software program running on the microprocessor 402 platform. At action 750, the vending apparatus 10 is preferably operating in at least a partially enabled state, such that at least some of the goods stored within the vending apparatus 10 may be dispensed to a user. At action 752, an inquiry is preferably made as to whether a predefined condition has occurred that justifies at least partially disabling the vending apparatus 10 (e.g., such that at least some of the goods stored within the vending apparatus 10 may not be dispensed therefrom). If the result of the inquiry is negative, then the process preferably flows back to action 750, where the vending apparatus 10 is permitted to remain in the enabled state. If, however, the result of the inquiry is positive, then the process flow preferably advances to action 754, where the vending apparatus 10 is preferably at least partially disabled.

It is noted that action 754 may be carried out by generating an internal disable signal (or code) within the vending apparatus 10. Details concerning examples of the mechanisms and/or processes to disable the vending apparatus 10 (e.g., using an internal disable signal) have been presented above in this description. By way of example, the control system 400 may be operable to determine whether the predefined condition exists and cause the disabling of the vending apparatus 10 as discussed hereinabove. It is further noted that the invention contemplates a process flow that includes actions 750, 752, and 754 and that does not require (but that may include) any further actions.

The predefined condition at action 752 preferably includes at least one of (i) that one or more limitations under which the vending apparatus 10 vends the goods are violated; (ii) that one or more of contractual obligations into which entities have entered have not been satisfied or waived; (iii) that the vending apparatus receives an externally generated disable code; and (iv) that the vending apparatus reaches an end of a predefined interval without having received a continuation code. The preferred mechanisms and/or processes that are employed by the vending apparatus 10 (and any external systems or entities) to determine whether one or more limitations and/or contractual obligations have been violated have been discussed in detail hereinabove and apply equally here. The vending apparatus 10 preferably is operable to at least partially disable (action 754) if these determinations are affirmative, if the externally generated disable code is received, and/or if a continuation code is not received in a timely manner. The preferred mechanisms and/or processes by which the vending apparatus 10 disables have been discussed in detail above and apply equally here.

At action 756, an inquiry is preferably made as to whether a re-enable code has been received by the vending apparatus 10. If the result of the inquiry is negative, then the process preferably flows back to action 754, where the vending apparatus 10 remains in the at least partially disabled state. If, however, the result of the inquiry is positive, then the process flow preferably flows back to action 750, where the vending apparatus 10 is permitted to enter the enabled state (e.g., such that at least some of the goods stored within the vending apparatus 10 may be dispensed therefrom).

The re-enable code is preferably an electronic code that is input into the vending apparatus 10 via at least one of (i) the keypad mechanism 38; (ii) a dedicated keypad (not shown) that may be available, for example, only by opening the door 14 of the vending apparatus 10; (iii) a portable computing device (not shown) that is operable to connect to the communications unit 410, e.g., through a data port or the like; and (iv) a communications network to which the vending apparatus 10 is connected (e.g., through the communications unit 410).

The microprocessor 402 of the control system 400 is preferably operable to receive the re-enable code, to determine its authenticity, and to cause the reverse of the disable condition of the vending apparatus 10. It is noted that the re-enable code may be subject to cryptography, such that a decryption algorithm is employed within the vending apparatus 10 (e.g., in the control system 400) to decode the re-enable code. This would provide a high level of confidence that only authentic re-enable codes may be utilized to re-enable the vending apparatus 10.

Advantageously, the control process illustrated in FIG. 15 is useful in encouraging one or more entities to enter into agreements with one another concerning sales of goods from the vending apparatus 10 (or a plurality of vending apparatus 10). These agreements may be substantially similar to those discussed hereinabove with respect to FIGS. 7-12. In general, however, in accordance with one or more aspects of the present invention, the entities preferably agree that (i) the vending apparatus 10 may be enabled to dispense the goods, (ii) the vending apparatus 10 may be at least partially disabled from dispensing at least some of the goods when the predefined condition has occurred; and (iii) the vending apparatus 10 may be at least partially re-enabled by receiving a re-enable code after having been at least partially disabled.

It is noted that the discussion hereinabove with respect to the details concerning the various contractual obligations, the prescribed data concerning sales of goods by the vending apparatus 10, the limitations under which the vending apparatus 10 may vend goods, the mechanisms and/or processes used to disable the vending apparatus 10, the flow of information between various entities apply equally here. Indeed, these details apply to the control process illustrated in FIG. 15, the capabilities of the vending apparatus 10, the methods carried out by the vending apparatus 10, and/or the relationships between the entities having an interest in the sale of goods from the vending apparatus 10. For example, the general and specific examples of the relationships and communication between entities with an interest in the sale of goods from the vending apparatus 10 presented above with respect to FIGS. 8 and 9 apply here, although it is understood that the re-enable code is communicated instead of, or in addition to, the continuation and/or disable codes, etc. It is noted that further examples of the relationships and communications among entities with an interest in the sale of goods from the vending apparatus are presented later in this description with reference to FIGS. 22-31.

Figure 16:
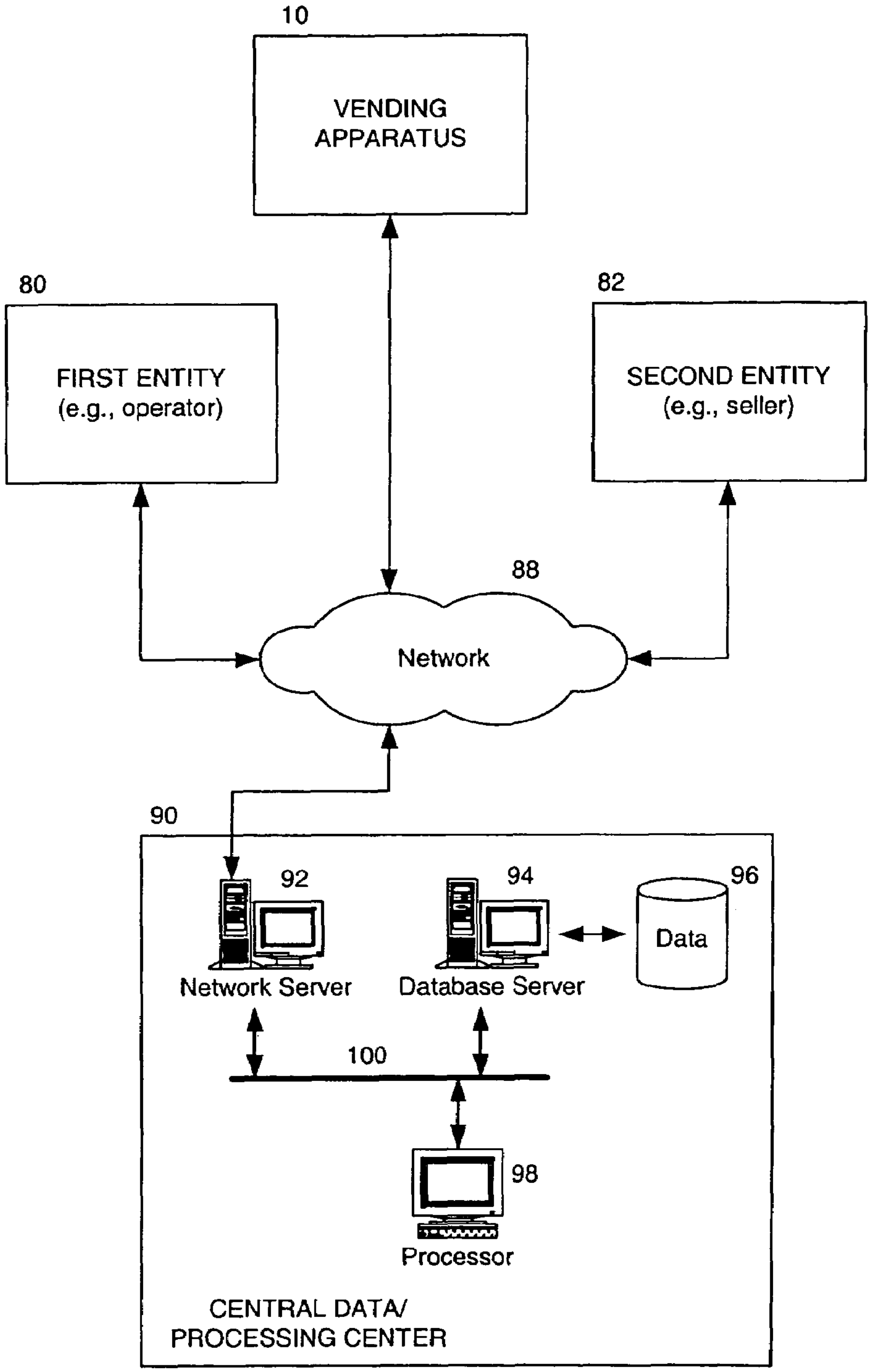
FIG. 16 is a high level block diagram illustrating data, control, and/or functional communication between one or more vending apparatus, one or more entities with an interest in the vending apparatus and a central data/processing center in accordance with one or more further aspects of the present invention.

Reference is now made to FIG. 16, which is a high level block diagram illustrating data, functional, co-operational, etc. communication among the vending apparatus 10, one or more entities 80, 82, and one or more central data centers 90 over a network 88. Any of the known techniques may be employed to facilitate communication over the network 88, where the network may be any one or more of a wire network, a telephone network, a radio frequency link, an infrared link, a local area network, a wide area network, the Internet, etc.

It is noted that the central data center 90 may be under the custody and/or control of any one or more authorized ones of the entities with an interest in the sales of goods as discussed above. It is contemplated, however, that not all entities have authority to alter any control program under which the control data center 90 operates.

The central data center 90 preferably includes a network server 92, a data base server 94, a database 96, a processor 98, and a bus 100 providing cooperative communication therebetween (and/or the functional equivalents thereof). It is noted that the central data center 90 may be implemented utilizing any computer system, such as a hand held computer (or computers), a lap-top computer (or computers), distributed computers, desktop computers, etc. The network server 92 may employ any of the known technology for facilitating communication over the network 88. (It is understood that the vending apparatus 10, or other entities 80, 82 may employ a network server similar to the network server 92 to facilitate communication over the network 88.) The database server 94 preferably is operable to facilitate, manage, and maintain any data stored within and/or retrieved from the database 96. Any of the known database server technologies may be employed to implement the database server 94. The processor 98 is preferably operable to facilitate overall control, manipulation, reception, transmission, etc. of the data to and from the central data center 90.

Preferably, the central data center 90 receives data concerning the sales of goods and/or any data released from the vending apparatus 10 where the data is monitored, stored, and released by the vending apparatus 10.

Figure 17:
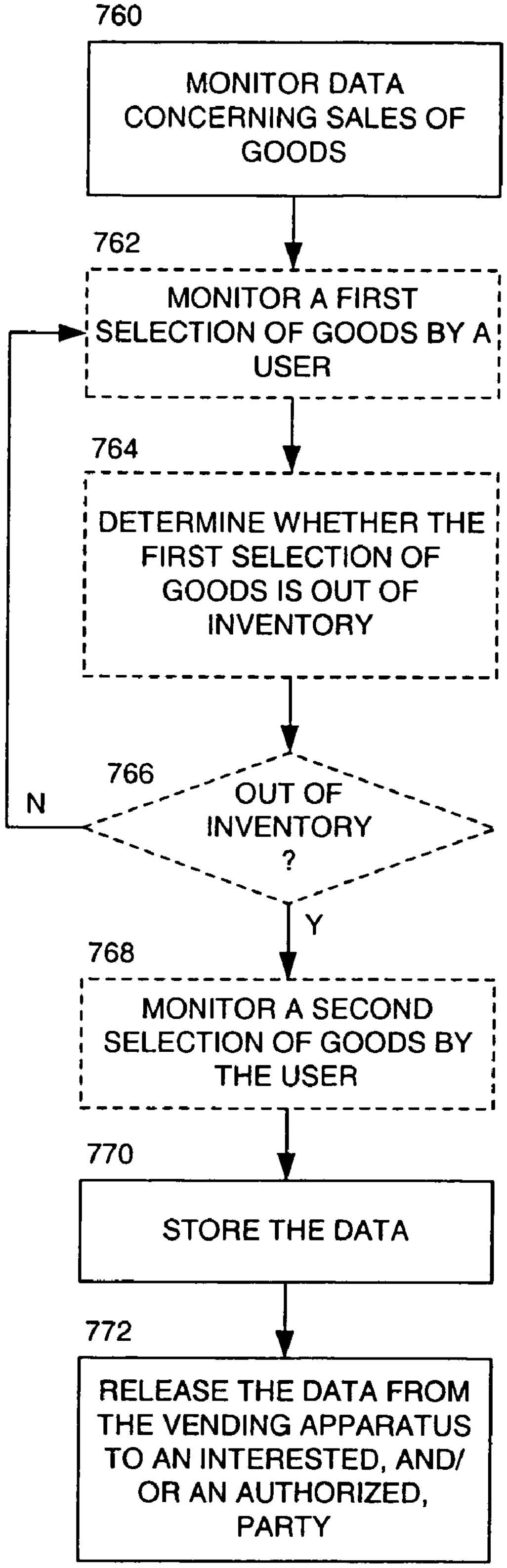
FIGS. 17-18 are flow diagrams illustrating capabilities, actions, and/or functions of various vending apparatus and/or methods in accordance with one or more further aspects of the present invention.

With reference to FIG. 17, and in accordance with one or more further aspects of the present invention, the vending apparatus 10 preferably includes various capabilities, actions, and/or functions associated with one or more of monitoring the data concerning sales of goods, storing the data, and releasing the data to interested parties, such as the central data center 90 (FIG. 16). To this end, the vending apparatus 10 is preferably operable to carry out the process flow illustrated in FIG. 17, for example, utilizing the control system 400 and one or more of the peripheral circuits and/or systems discussed hereinabove and shown in FIG. 6.

At action 760, the vending apparatus 10 preferably monitors data concerning the sales of goods therefrom. For example, the microprocessor 402 of the control system 400 preferably communicates with one or more of the user interface system 406 (e.g., the bill acceptor mechanism 26, the coin acceptor mechanism 28, the coin return actuator 30, the coin return well 32, the credit/debit card reader mechanism 34, and/or the keypad mechanism 38), the a communications unit 410, the article ID device 254, and/or the one or more position sensors 412 to collect data therefrom. The data may include, for example, (i) information concerning vending or attempts at vending unauthorized goods; (ii) information concerning the sales of goods from the vending apparatus 10 obtained, for example, using the article ID device 254 (FIG. 5); and (iii) information concerning any limitations under which the vending apparatus 10 vends the goods. The preferred mechanisms and/or processes utilized by the vending apparatus 10 to monitor this and other data have been discussed hereinabove and apply equally here.

In accordance with one or more further aspects of the present invention, at action 762, the vending apparatus 10 preferably monitors a first selection of goods made by a user of the vending apparatus 10. At action 764, the vending apparatus 10 preferably determines whether the first selection of goods is out of inventory. If the result of the determination is negative (action 766), then the process preferably flows back to action 762, where the vending apparatus 10 again monitors a first selection of goods, for example, by the same user or a subsequent user. If, however, the result of the determination is affirmative (action 766) the process flow preferably advances to action 768 where the vending apparatus 10 monitors a second selection of goods made by the user, e.g., where the second selection of goods was made by the user because the first selection of goods was out of inventory. It is noted that this information may be of particular interest to one or more entities interested in knowing marketing information concerning the sales of goods from the vending apparatus 10. For example, a seller of goods may be particularly interested in knowing what subsequent choices users would make if a particular article was not available from the vending apparatus 10.

It is noted that although actions 762 through 768 illustrate a preferred process flow, they need not be implemented and indeed, the process flow may advance from action 760 to 770 without passing through actions 762-768.

At action 770, the data monitored by the vending apparatus 10 are at least temporarily stored, e.g., within the memory 404 (FIG. 6). At action 772, the vending apparatus 10 preferably releases the data to an interested, and/or authorized party, such as the central data center 90 (FIG. 16). Alternatively, the vending apparatus 10 may release the data to, for example, a portable computing device connected to the communications unit 410 of the vending apparatus 10. It is noted that the flow of data among the vending apparatus 10 and one or more interested parties may be consistent with the data flows of the embodiments discussed hereinabove that reference FIGS. 8 and 9. Preferably, the data that are released from the vending apparatus 10 are encrypted as will be presented in detail later in this description.

The preferred data that the vending apparatus 10 is capable of monitoring has been discussed in detail above. These data include the prescribed data concerning the sales of goods from the vending apparatus 10, the limitations under which the vending apparatus 10 vends the goods, the contractual obligations, etc. For example, the vending apparatus 10 is preferably operable to monitor information concerning vending or attempts at vending unauthorized goods. This information (whether in final data form or in raw data form) preferably includes, for example, data concerning whether at least one of: (i) only goods of an authorized type are vended; (ii) only goods of an authorized brand are vended; (iii) only goods of an authorized size are vended; (iv) only goods of an authorized weight are vended; (v) only goods of an authorized expiration date are vended; (vi) only goods of an authorized package type are vended; (vii) only good of an authorized period of manufacture are vended; and (viii) only goods of an authorized place of manufacture are vended. The information may also concern a number of times that unauthorized goods were vended or that attempts were made at vending unauthorized goods. Any other data may also be collected.

By way of further example, when the vending apparatus 10 is operable to monitor information concerning the sales of goods from the vending apparatus obtained using the article ID device 254, the information preferably includes at least one of a type of goods, a brand of goods, a size of goods, a weight of goods, an expiration date of goods, a package type of goods, a period of manufacture of goods, and a place of manufacture of goods.

As discussed above, the data monitored by the vending apparatus 10 may include raw data, e.g., a price of a vended article, a date of sale of the article, a time of sale of the article, etc. Preferably, the vending apparatus 10 is operable to compute additional (or final) data concerning the sales of goods based on the raw data. Many examples of such calculations have been discussed hereinabove and apply equally here. For example, the vending apparatus 10 is preferably operable to calculate a quantum of one or more types of goods sold during one or more prescribed periods of time. To this end, one skilled in the art will appreciate from the disclosure herein that, for example, the control system 400, and the microprocessor 402 in particular, may be operable to monitor the quanta of a particular type of goods sold and monitor an interval of time (e.g., the prescribed period of time) of interest such that the number of articles of the particular type sold during the prescribed period of time may be calculated. It will be appreciated that the particular data monitored and/or calculated by the vending apparatus 10 are vast and that any particular variation is contemplated by, and is within the scope of, the invention.

With reference to FIG. 16, the data that the central data center 90 receives over the network 88 concerning the sales of goods from the vending apparatus 10 preferably includes at least some of the data monitored by the vending apparatus 10 as discussed above. For example, these data preferably include at least one of: (i) information concerning vending or attempts at vending unauthorized goods from the vending apparatus 10; (ii) information concerning the sales of goods from the vending apparatus 10 obtained using a goods identification scanning device (e.g., the article ID device 254) of the vending apparatus 10; (iii) information concerning any limitations under which the vending apparatus 10 vends the goods; and (iv) information concerning a user's second selection of goods from the vending apparatus 10 in response to the user's first selection of goods being out of inventory in the vending apparatus 10.

It is noted that details concerning this data (and/or other data) concerning the sales of goods from the vending apparatus 10 were discussed hereinabove with respect to FIG. 17 and apply equally here concerning the data that the central data center 90 receives over the network 88. This includes that the central data center 90 may receive raw data concerning sales of goods and/or any other data from the vending apparatus 10 as discussed above. Preferably, the central data center 90 is operable to compute additional (or final) data concerning the sales of goods from the vending apparatus 10 based on the raw data. Such processing is preferably carried out by the processor 98 of the central data center 90. Thus, for example, if the vending apparatus 10 does not compute the final data, and releases raw data to the central computer 90, the processor 98 preferably computes the final data. Various illustrative examples of such computations have been discussed above and apply equally here.

Preferably, the database 96 has information concerning at least one of the contractual obligations, the limitations on how goods are vended, etc. such that the central data center 90 may receive prescribed data (concerning the sales of goods from the vending apparatus 10) and the processor 98 may determine whether one or more obligations among entities with an interest in the sale of goods from the vending apparatus 10 have been met based on the prescribed data. Various illustrative examples of the mechanisms and/or processes for making such determinations have been discussed above with respect to the vending apparatus 10, which apply equally here.

Further, the central data center 90 is preferably operable to generate and/or make the continuation code, the disable code, and/or the re-enable code available to the vending apparatus 10. The preferred mechanisms and/or processes for generating or making these codes available to the vending apparatus have been described in detail above and apply equally here.

Preferably, the central data center 90 is further operable to facilitate the computation and/or distribution of revenue from the vending apparatus 10 and/or other entities among the interested entities in accordance with agreed to processes and protocols.

Preferably, the data received by, and/or released from, the central data center 90 has been encrypted such that advantageous authentication of the data may be performed. Further details concerning the encryption, decryption, and authentication of data (by the vending apparatus 10 and/or the central computer 90) are presented later in this description.

Figure 8:
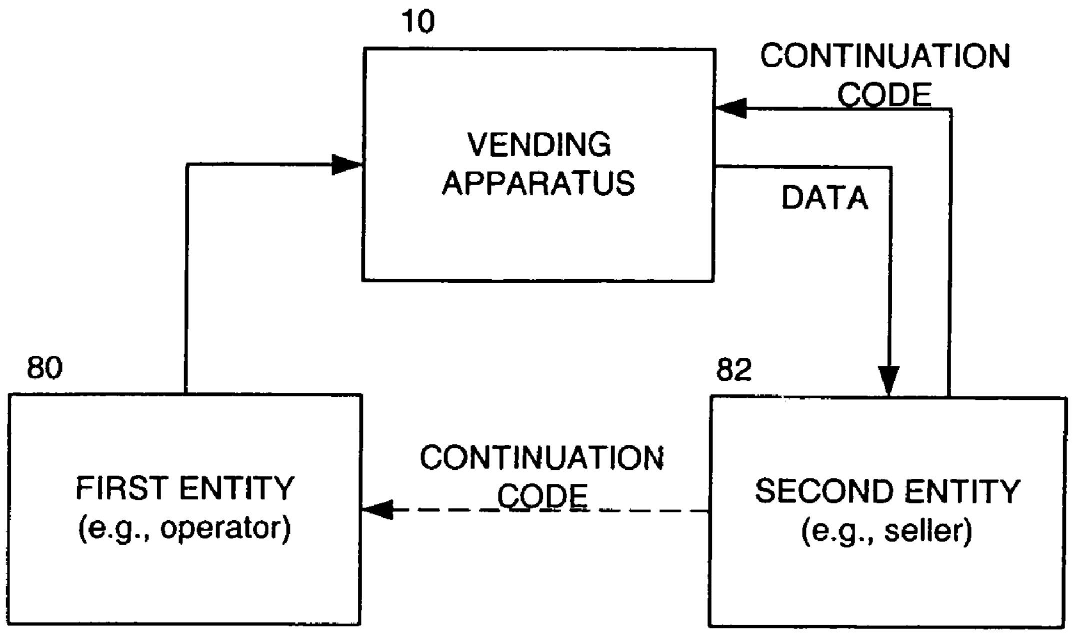
FIG. 8 is a high level block diagram illustrating data and/or functional cooperation between a vending apparatus and one or more entities with an interest in the vending apparatus in accordance with one or more aspects of the present invention.

The central data center 90 preferably releases at least some of the data that it receives over the network 88 and/or calculates (e.g., using the processor 98) to at least one interested party, such as one or more of the entities 80, 82 (FIGS. 8 and 9). Preferably, the central data center 90 requires that the interested party provide an authorization code prior to releasing the data. It is noted that the interested party may include one or more of the manufacturer of the vending apparatus 10, the operator, the seller of goods, the lender, the lessor, the owner of property, etc.

Thus, an interested entity may obtain valuable information from the central data center concerning the sale of goods from the vending apparatus 10. For example, if the central data center 90 is operable to perform one or more of the actions discussed above with respect to FIG. 17, an interested party (e.g., the seller of goods) may be able to obtain information concerning what subsequent choices users would make if a particular article was not available from the vending apparatus 10. Alternatively, an interested entity may obtain information concerning any limitations under which the vending apparatus 10 vends the goods (e.g., to verify that they are authorized). Advantageously, this permits entities to obtain information concerning the sales of goods from the vending apparatus 10 without the need to physically inspect the vending apparatus 10 (either directly or through a representative).

As discussed hereinabove, at least some of the apparatus and methods of the invention rely on data obtained at the vending apparatus 10 and provided to an interested entity. Some entities may not be comfortable with entering into certain relationships with other entities concerning the sales of goods from the vending apparatus 10 without assurances that the data concerning the sales of goods from the vending apparatus 10 may be relied upon. For example, if an operator and a seller have entered into an agreement in which the operator is obliged to sell a prescribed quantity of the seller's goods through the vending apparatus 10, then the seller of goods would be interested in authenticating the data concerning the sales of goods from the vending apparatus 10. Indeed, the seller of goods may be concerned that the operator may attempt to alter the data concerning the sales of goods from the vending apparatus 10 to benefit himself (and to the detriment of the seller of goods). Advantageously, the vending apparatus 10 in accordance with one or more aspects of the present invention is operable to produce ciphertext from the data concerning the sale of goods therefrom, such that, e.g., the seller of goods may be confident that the data received are accurate.

Figure 18:
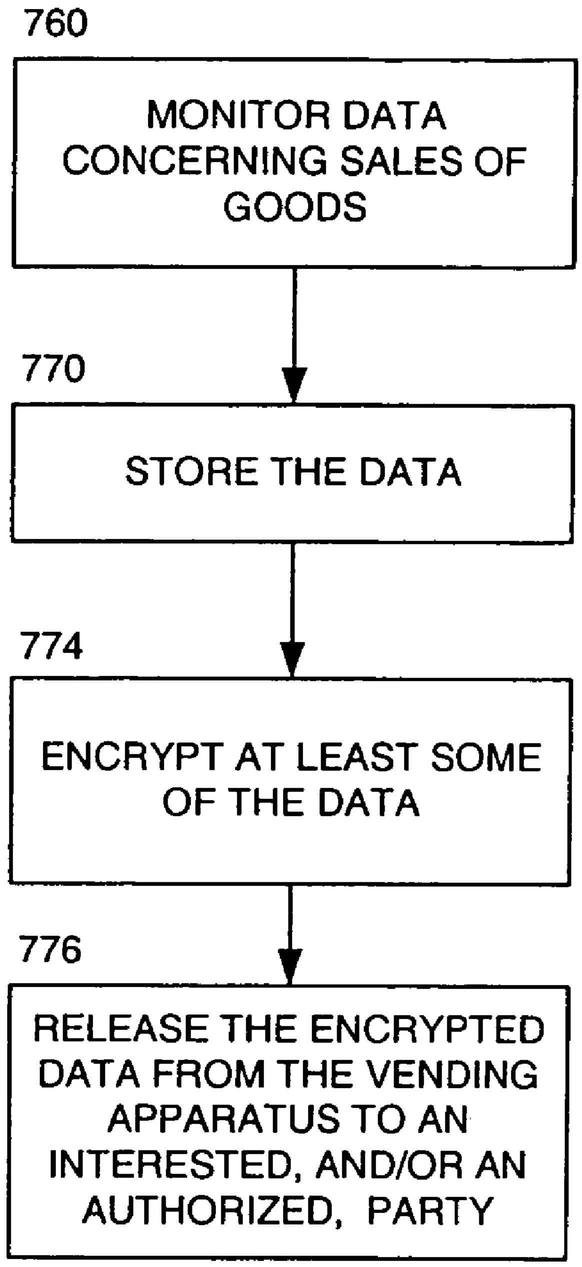

Reference is now made to FIG. 18, which is a flow diagram illustrating a process that is preferably carried out by the vending apparatus 10 in accordance with one or more further aspects of the present invention. It is preferred that the process is implemented utilizing the control system 400, where a software program provides instructions to the microprocessor 402 (FIG. 6). Preferably action 760 is substantially similar to action 760 of FIG. 17 and the discussion hereinabove with respect thereto applies equally here. Accordingly, the details of the preferred mechanisms and/or processes for the monitoring of data by the vending apparatus 10 concerning sales of goods will not be repeated. At action 770, the data monitored by the vending apparatus 10 are preferably at least temporarily stored, e.g., within the memory 404 (FIG. 6).

At action 774, the vending apparatus 10 preferably encrypts at least some of the data concerning the sales of goods and, at action 776, the encrypted data is preferably released from the vending apparatus 10 to an interested and/or authorized party. The vending apparatus 10 may release the data directly to the interested party, to one or more intermediate parties, and/or to an intermediate device, such as a portable computing device connected to the communications unit 410 of the vending apparatus 10. It is noted that the flow of data among the vending apparatus 10 and the one or more interested parties may be consistent with the data flows of the embodiments discussed hereinabove that reference FIGS. 8, 9, and 16. Accordingly, a detailed discussion of the flow of such data will not be repeated here.

The encryption algorithm employed at action 774 may be any of the known cryptographic algorithms, such as those involving transposition, substitution, polyalphabetic substitution, conventional key encryption, public key encryption, cipher systems, code systems, etc. For example, with reference to FIG. 19, the data concerning the sales of goods from the vending apparatus 10 may be subject to an encryption algorithm 300 in which a secret key is utilized to encrypt the data and produce so-called ciphertext (e.g., text in which the data can not be discerned without a decryption key). Advantageously, the one or more interested parties may receive the ciphertext and utilize the same to authenticate the data contained therein. For example, the one or more interested parties may be privy to the decryption key which, when input into a substantially similar encryption algorithm 300 (along with the ciphertext) yields the original data concerning the sales of goods from the vending apparatus 10. This provides the interested party with a high degree of confidence that the data are authentic and worthy of reliance.

Figure 19:
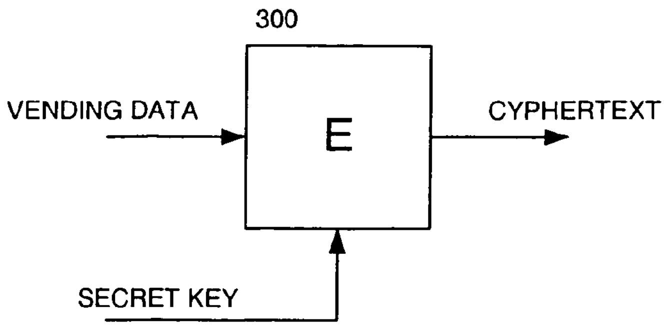
FIGS. 19-21 are functional block diagrams illustrating encryption techniques suitable for use with various vending apparatus and/or methods in accordance with one or more aspects of the invention.

In some circumstances, it is preferred that the vending apparatus 10 is operable to produce the ciphertext in a way that cannot be decrypted without a non-public (e.g., secret) decryption key (e.g., FIG. 19). In this way, an entity that is not privy to the non-public decryption key cannot decrypt the ciphertext and gain access to the data concerning the sales of goods from the vending apparatus 10.

Figure 20:
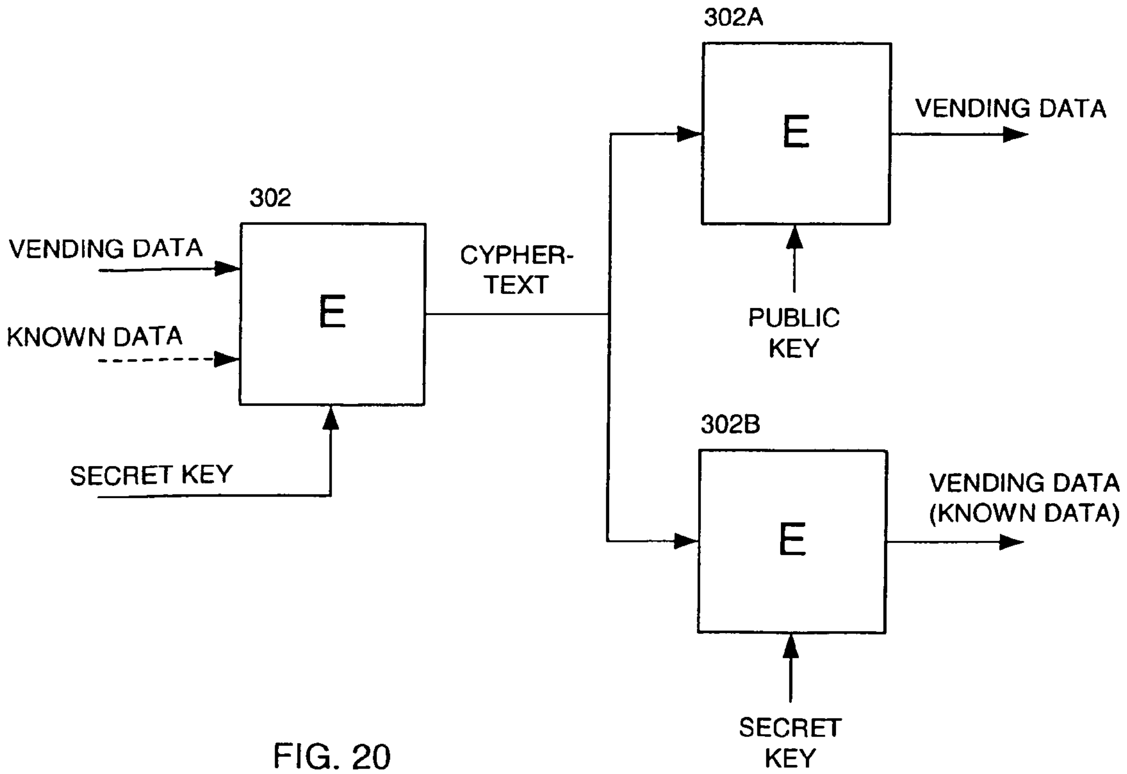

With reference to FIG. 20, other circumstances may dictate that an entity that is not privy to the non-public decryption key may nevertheless have a need to gain access to the data concerning the sales of goods from the vending apparatus 10. For example, this entity may need the data to meet its obligations to one or more other entities. These other entities may be privy to the non-public decryption key. By way of example, an operator may be obligated to provide a share of the total sales from the vending apparatus 10 to a seller of goods. Thus, the operator would need access to the total sales data to compute the share. Such total sales data, however, may be encrypted into ciphertext such that the seller of goods can authenticate the total sales data. Thus, the vending apparatus 10 may be operable to produce the ciphertext in a way that may be decrypted utilizing both a public decryption key and a non-public decryption key.

To that end, and with reference to FIG. 20, the encryption algorithm 302 produces ciphertext in accordance with a non-public (e.g., secret) encryption key that may be decrypted utilizing algorithm 302A and a public key. Thus, for example, the operator may monitor the data concerning the sales of goods from the vending apparatus 10 and take appropriate actions to ensure that he meets his obligations to the seller of goods. Furthermore, another entity that is privy to the non-public (e.g., secret) decryption key (e.g., the seller of goods) may authenticate the data concerning the sales of goods from the vending apparatus 10 utilizing algorithm 302B and the secret decryption key.

In order to assist in authenticating the data contained in the ciphertext, the ciphertext preferably includes some known data (e.g., an identification number, a vending apparatus identification number, a date, a time, a sequence number, a vending apparatus location number, etc.). The entity that is privy to the secret decryption key may search the decrypted ciphertext to determine whether the known data is included. If it is, then that entity may have a high degree of confidence that the data concerning the sales of goods from the vending apparatus 10 are authentic and have not been tampered with.

Figure 21:
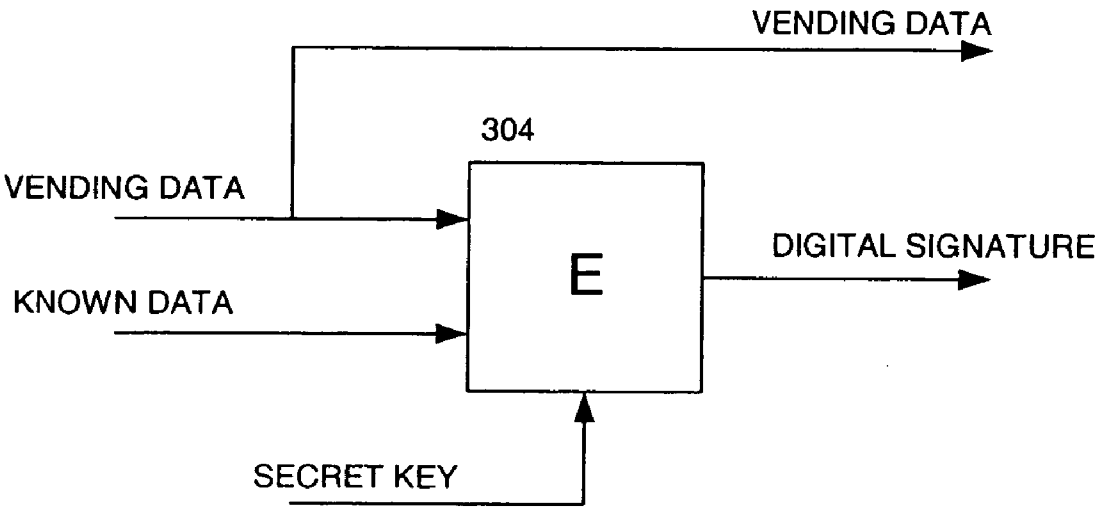

In accordance with alternative aspects of the present invention, and with reference to FIG. 21, the vending apparatus 10 may be operable to encrypt the data concerning the sales of goods from the vending apparatus 10 in such a way that the vending data are substantially unaltered by an encryption algorithm 304. The vending apparatus 10 may produce a digital signature by encrypting the vending data and other known data using algorithm 304 and a secret encryption key. The digital signature may only be decrypted utilizing a non-public decryption key. Thus, one or more entities (e.g., the operator) may utilize the vending data to carry out various actions, including meeting his or her obligations, while one or more other entities (e.g., the seller of goods) may decrypt the digital signature to authenticate the vending data.

In accordance with one or more further alternative aspects of the apparatus and methods of the present invention, the vending apparatus 10 may be operable to produce a code associated with at least some of the data concerning sales of goods. The code need not be produced using encryption, but preferably provides an indication as to whether the data have been tampered with. For example, the vending apparatus 10 may insert the vending data into an electronic file and the code may indicate a number of times that the electronic file has been opened. If the code indicates that the electronic file has never been opened, then an entity receiving the electronic file (and the code) may reasonably assume that the data have not been tampered with. Preferably, when the data are stored at least temporarily within the vending apparatus (action 770, FIG. 18), the storage is preferably carried out in a secure manner so that the data may not be tampered with prior to being inserted into the electronic file and/or prior to being released from the vending apparatus 10.

It will be appreciated from the discussion thus far that many relationships may be established among the entities with an interest in the sale of goods from the vending apparatus 10 (or a plurality of such vending apparatus) and that many forms and paths for communicating various data among the entities may be employed in accordance with the invention. Some general and specific examples of these relationships, communication paths, and data exchanges have been presented above (e.g., with reference to FIGS. 8 and 9). Some further illustrative examples of these relationships, communication paths, and data exchanges will now be presented. Any or all of the entities in the descriptions below may each use one or more computer systems to enable communication among them to carry out the communication of data as described herein.

Figure 22:
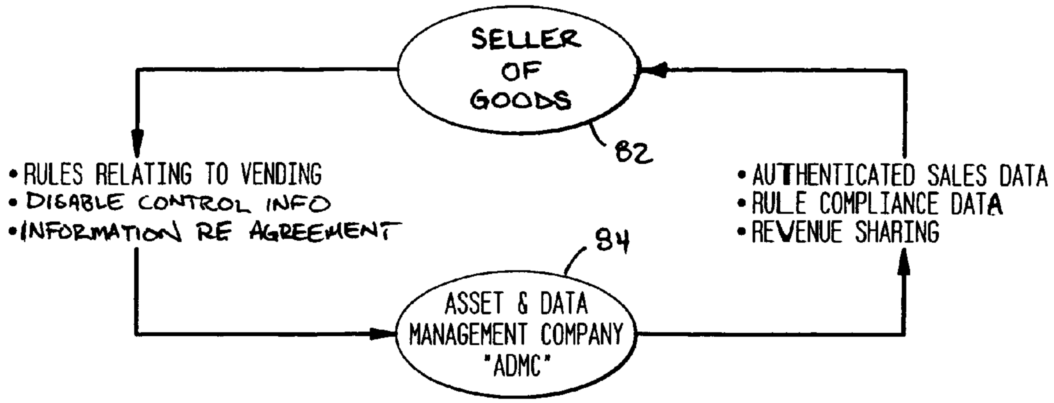
FIGS. 22-31 are combination flow diagrams and block diagrams illustrating examples of relationships, communications, and data exchanges among entities in accordance with one or more aspects of the present invention.

With reference to FIG. 22, an example is illustrated of one or more relationships and communications between the seller of goods 82 and the authorized third party 84 (e.g., an asset and data management company (ADMC)). In this example, the ADMC 84 performs functions and actions that assist the seller of goods 82 in enjoying the financial benefits of the sales of goods from the vending apparatus 10. For example, the seller of goods 82 may have an agreement (e.g., via contract) with the operator (not shown) such that mutual financial benefits may be enjoyed by both parties. As was discussed in detail hereinabove, rules relating to vending (e.g., specific rules guiding the limitations under which the vending apparatus 10 vends the goods) are preferably established by way of the contractual agreement between the seller of goods 82 and the operator.

The ADMC 84 is preferably privy to prescribed data concerning the sales of goods from the vending apparatus 10 (e.g., as discussed above with respect to FIG. 9). The ADMC 84 preferably provides at least some of the prescribed data to the seller of goods 82 such that the seller of goods 82 may determine for itself whether the agreed to rules concerning limitations on vending are being followed and, therefore, whether the contractual obligations between the seller of goods 82 and, for example, the operator are being met. Preferably, the prescribed data are authenticated by the ADMC 84 using, for example, the encryption mechanisms and/or processes discussed hereinabove with respect to FIGS. 18-21. Alternatively, the ADMC 84 may itself determine whether compliance with the rules concerning limitations on vending exists and supply rule compliance data to the seller of goods 82. Advantageously, this alleviates the burden on the seller of goods 82 from making such determinations and permits it to focus on other matters.

The seller of goods 82 may provide the ADMC 84 with agreement control information, such as the conditions under which a continuation code, a disable code, a limitation modification code, and/or a re-enable code should be made available to the vending apparatus 10. This agreement control information may also include the authorization to generate and/or make the codes available to the vending apparatus 10, thereby providing the seller of goods 82 with leverage to ensure that the operator complies with the limiting rules regarding vending and, further, complies with its contractual obligations. (It is noted that these conditions concerning disabling the vending apparatus 10 are preferably established during the process of negotiating the agreement between the seller of goods 82 and the operator.)

The seller of goods 82 also preferably provides the ADMC 84 with information concerning the contractual obligations that should be followed concerning the sales of goods from the vending apparatus 10. These contractual obligations are preferably defined by the agreement between the seller of goods 82 and the operator and may include, for example, information concerning any revenue sharing between the operator and the seller of goods 82. Since the ADMC 84 is privy to the prescribed data concerning, for example, sales of goods from the vending apparatus 10, it may compute revenue shares and facilitate the distribution of such shares (e.g., payments) to the seller of goods 82 and/or any other entities.

Figure 23:
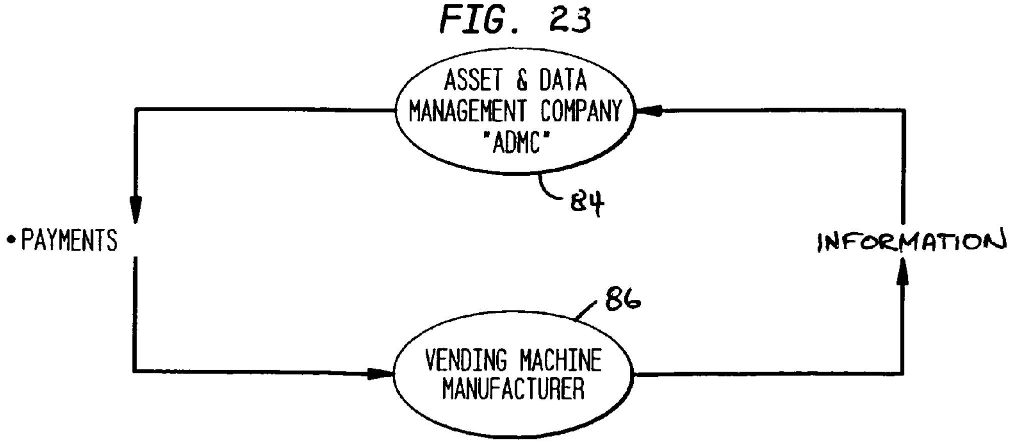

With reference to FIG. 23, the information concerning the contractual obligations provided to the ADMC 84 (FIG. 22) may include information relating to providing payments to the vending machine manufacturer 86. These contractual obligations may be defined by, for example, a separate agreement between the seller of goods 82 and the vending machine manufacturer 86 and/or an agreement between the operator and the vending machine manufacturer 86. In order to provide the vending machine manufacturer 86 with at least some leverage to obtain such payments, the ADMC 84 may need to receive data from the vending machine manufacturer 86 to generate and/or cause the generation of the disable control information (e.g., the continuation codes, the disable codes, the re-enable codes, etc.) for the vending apparatus 10. Such data may include the serial number of the vending apparatus 10 or any other such machine specific information. Advantageously, if the vending machine manufacturer 86 does not receive its payments, it may withhold the data and prevent, for example, continuation codes from being made available to the vending apparatus 10.

Figure 24:
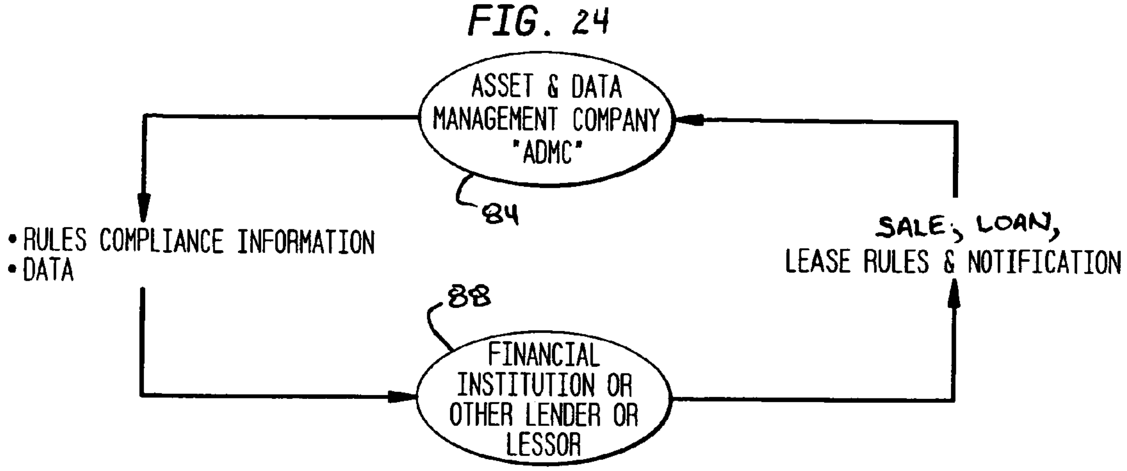

With reference to FIG. 24, the ADMC 84 may also communicate with yet another entity 88, such as a financial institution, a lender, a lessor, etc. (hereinafter "financial institution 88"). More specifically, the ADMC 84 may communicate rule compliance information and/or other data to the financial institution 88 relating to whether another of the entities, e.g., the operator, is in compliance with the terms of an agreement. As discussed above, the financial institution 88 may have an agreement with, for example, the operator concerning a sale, lease, loan, etc. of the vending apparatus 10 to the operator. Thus, the financial institution 88 may expect to receive payments from the operator (e.g., fixed payments and/or payments dependent on sales of goods from the vending apparatus 10). The financial institution 88 may provide the terms of the sale, loan, lease, etc. to the ADMC 84 such that the ADMC may determine compliance by the operator. Therefore, in this example the ADMC is acting as an agent for the financial institution 88 by releasing codes (e.g., continuation codes, etc.) to the operator as per the agreement between the operator and the financial institution 88. Advantageously, the ADMC 84 may simply provide an indication to the financial institution 88 as to whether compliance with the sale, loan, lease, etc. has been met.

Figure 25:
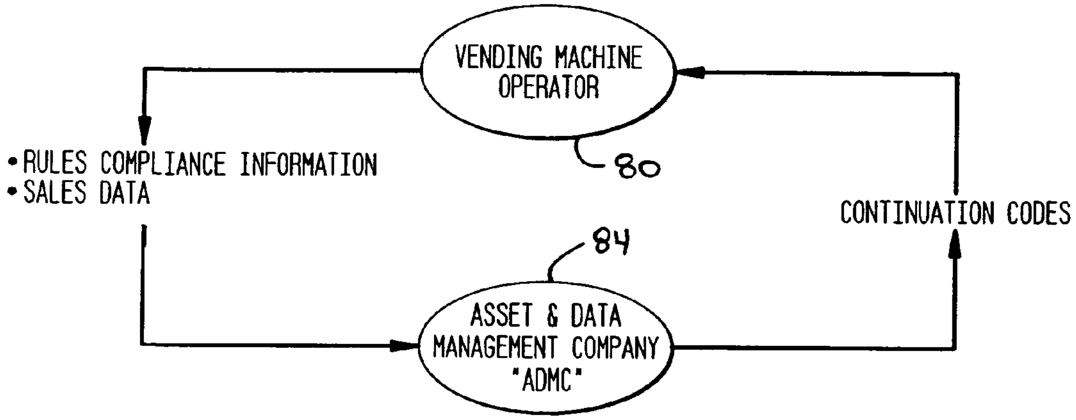

With reference to FIG. 25, the above discussion concerning the relationships among the seller of goods 82, the ADMC 84, the vending apparatus manufacturer 86, and the financial institution 88 hinges, at least to some extent, on whether the vending machine operator 80 provides or causes prescribed data (e.g., concerning the sales of goods from the vending apparatus 10) to be provided to the ADMC 84. The prescribed data may include, for example, rule compliance information, sales data, etc. The vending machine operator 80 may be motivated to provide this data to the ADMC 84 when he or she must rely on whether the vending apparatus 10 receives disable control information, such as continuation codes, disable codes, re-enable codes, etc., in order to obtain financial benefits from the vending apparatus 10.

Figure 26:
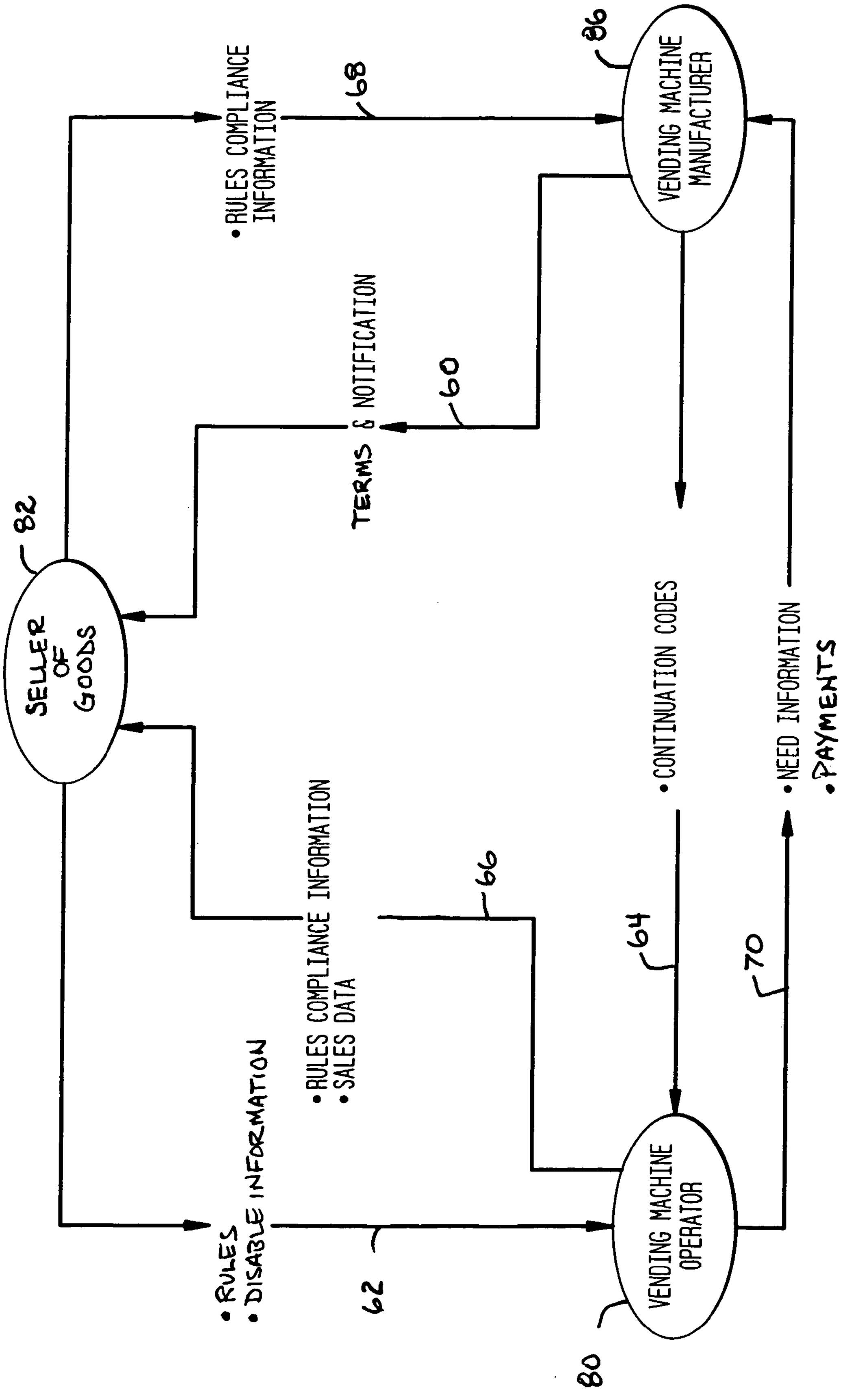

With reference to FIG. 26, an alternative example is illustrated of relationships, communications, and data exchanges between various entities concerning the sales of goods from the vending apparatus 10. In this example, the seller of goods 82 and the vending machine operator 80 have entered into an agreement concerning the sales of goods from the vending apparatus 10. In addition, the vending machine operator 80 and the vending machine manufacturer 86 have entered into an agreement concerning, for example, the sale (or lease) of the vending apparatus 10 to the vending machine operator 80. While the seller of goods 82 may be privy to the limiting rules under which the vending apparatus 10 vends goods by way of the negotiations with the vending machine operator 80, the seller of goods 82 preferably receives the terms of the agreement between the vending machine manufacturer 86 and the vending machine operator 80 as illustrated by line 60.

The seller of goods 82 utilizes the terms of its agreement with the vending machine operator 80 and the terms of the agreement between the vending machine manufacturer 86 and the vending machine operator 80 to formulate a set of limiting rules under which the vending apparatus 10 must vend the goods (including any disable conditions). These rules are communicated to the vending machine operator 80 (and/or directly to the vending machine apparatus 10) as illustrated by line 62.

The vending machine operator 80 (or vending apparatus 10) needs information (and/or must avoid receiving certain information) from the vending machine manufacturer 86 in order to ensure that the vending apparatus 10 is capable of vending the goods, such as, continuation codes, disable codes, re-enable codes, etc., as illustrated by line 64. To receive (and/or avoid) this information, however, the vending machine operator 80 must provide prescribed data concerning the sale of goods from the vending apparatus 10, which may include rule compliance information, sales data, etc. to the seller of goods 82. Further, the operator 80 may be required to provide other information and/or payments to the vending machine manufacturer 86 as prescribed by the agreement therebetween.

In turn, the seller of goods 82 may provide compliance information (e.g., concerning the terms of the agreement between the manufacturer 86 and the operator 80 and/or the terms of the agreement between the operator 80 and the seller of goods 82) to the vending machine manufacturer 86 as illustrated by line 68. The vending machine manufacturer 86 may ensure that it receives such compliance information by, for example, releasing disable control information (e.g., the continuation codes, disable codes, re-enable codes, etc.) to the vending machine operator 80 (and/or to the vending apparatus 10 directly) only when it receives the compliance information and/or only when compliance exists. It is noted that compliance may involve fulfillment of both agreements (i.e., between the seller of goods 82 and the operator 80, and between the vending machine manufacturer 86 and the operator 80).

Figure 27:
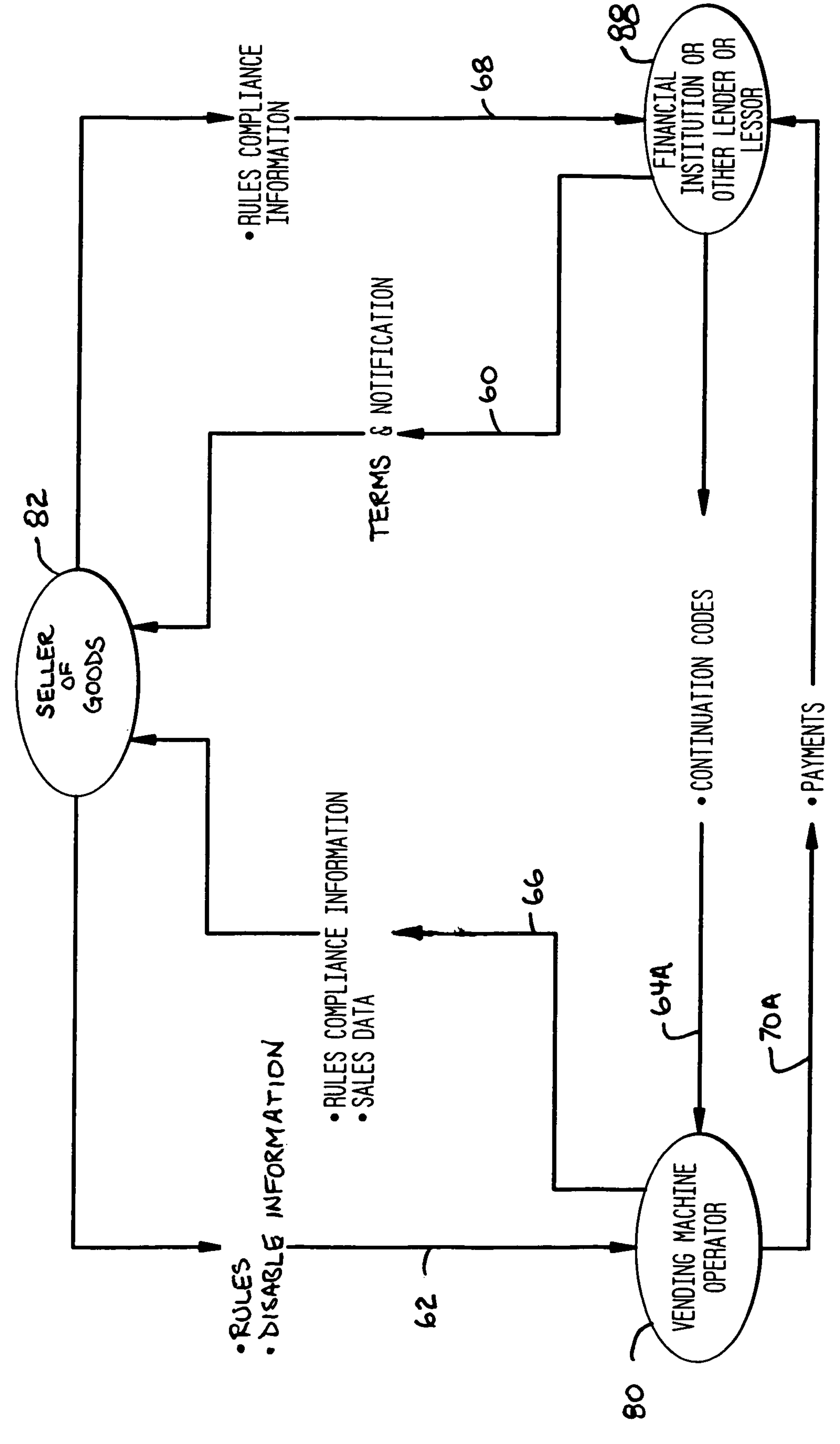

With reference to FIG. 27, a further example is illustrated of relationships, communications, and data exchanges among the vending machine operator 80, the seller of goods 82, and the financial institution 88. The relationship, communication, and data exchange between the vending machine operator 80 and the seller of goods 82 may be, for example, substantially similar to those described above with respect to FIG. 26. In the example illustrated in FIG. 27, the vending machine operator 80 also enters into an agreement with the financial institution 88 dictating the sale, loan, or lease of the vending apparatus 10. The terms of this agreement are communicated to the seller of goods 82 as illustrated by line 60. The terms of this agreement may dictate that the vending machine operator 80 provide payments to the financial institution 88 (which may be fixed and/or dependent on the sale of goods from the vending apparatus 10) as illustrated by line 70A.

In order to ensure that the financial institution 88 receives its payments and the seller of goods 82 receives any financial benefits defined by its agreement with the vending machine operator 80, the financial institution 88 may release, for example, continuation codes, re-enable codes, disable codes, etc. to the vending machine operator 80 (and/or the vending apparatus 10 directly) as illustrated by line 64A. Thus, the financial institution 88 may withhold the continuation codes if, for example, it does not receive payments from the vending machine operator 80 and/or if the compliance information (line 68) provided by the seller of goods 82 indicates that the seller of goods 82 is not receiving its financial benefits from the vending machine operator 80.

Figure 28:
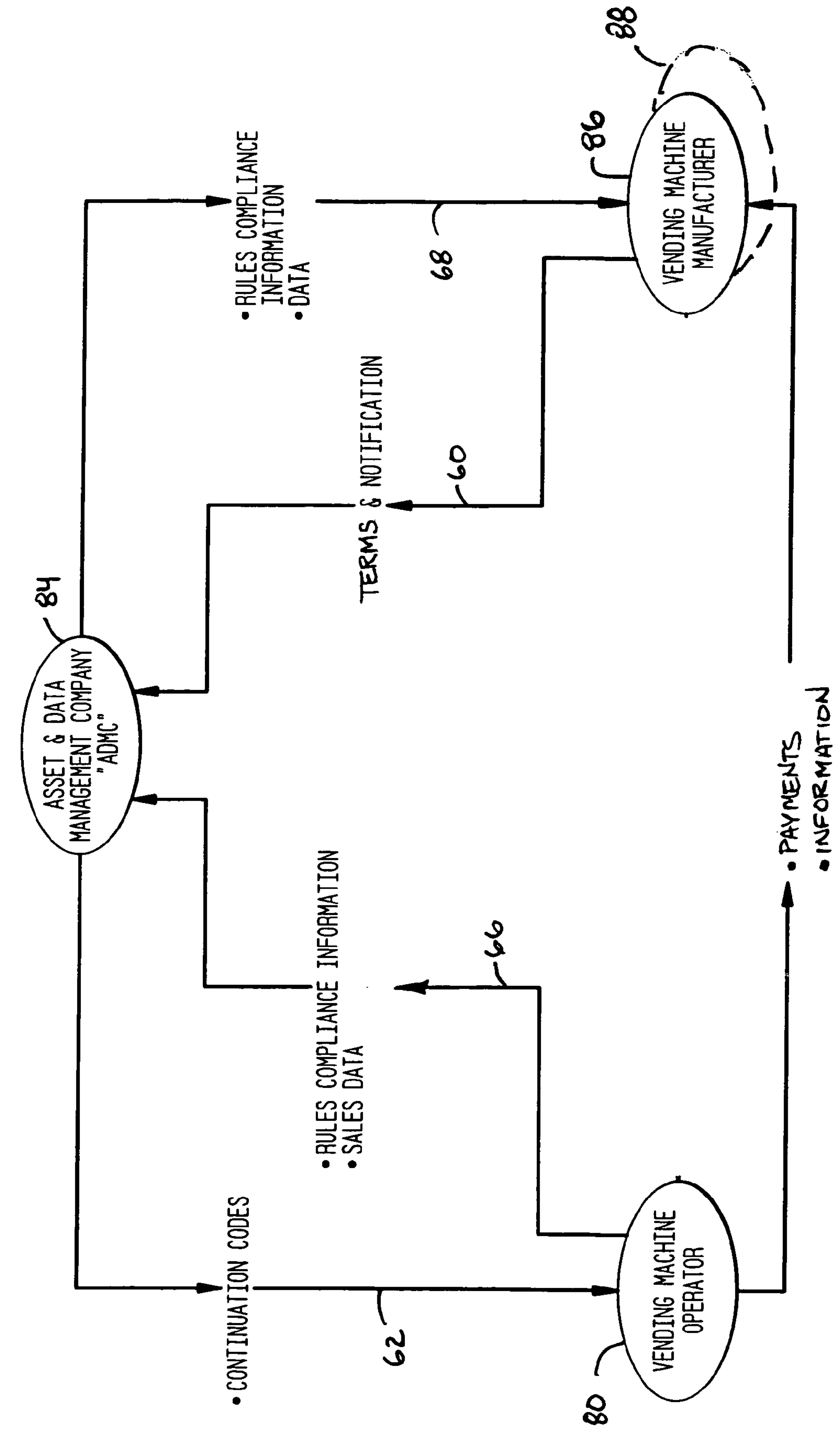

With reference to FIG. 28, a further example is illustrated of relationships, communications, and data exchanges among the vending machine operator 80, the ADMC 84, and one or more of the vending machine manufacturer 86 and the financial institution 88. In this example, certain responsibilities and burdens are shifted from the seller of goods 82 and/or the vending machine manufacturer 86 (and/or the financial institution 88) as compared with the previous examples discussed hereinabove. For example, the ADMC 84 receives prescribed data concerning the sale of goods from the vending apparatus 10 (line 66) and preferably makes a determination of the propriety of releasing disable control information, for example, continuation codes to the vending machine operator 80 (and/or directly to the vending apparatus 10) as illustrated by line 62.

By way of example, the vending machine operator 80 may have entered into an agreement with the vending machine manufacturer 86 (or financial institution 88) concerning the sale and/or lease of the vending apparatus 10, which agreement may prescribe that the vending machine operator 80 provide payments to the vending machine manufacturer 86 (or financial institution 88). (It is noted that these payments may be fixed or subject to the sales of goods from the vending apparatus 10). Information concerning the terms of this agreement may be communicated to the ADMC 84 as illustrated by line 60. The vending manufacturer 86 (or financial institution 88) may provide information to the ADMC 84 as to compliance by the vending machine operator 80 in making the prescribed payments as illustrated by line 68. Advantageously, the vending machine manufacturer 86 may ensure that it receives such prescribed payments from the vending machine operator 80 because the ADMC 84 may, for example, withhold the continuation codes from the vending machine operator 80 if such payments are not made.

Figure 29:
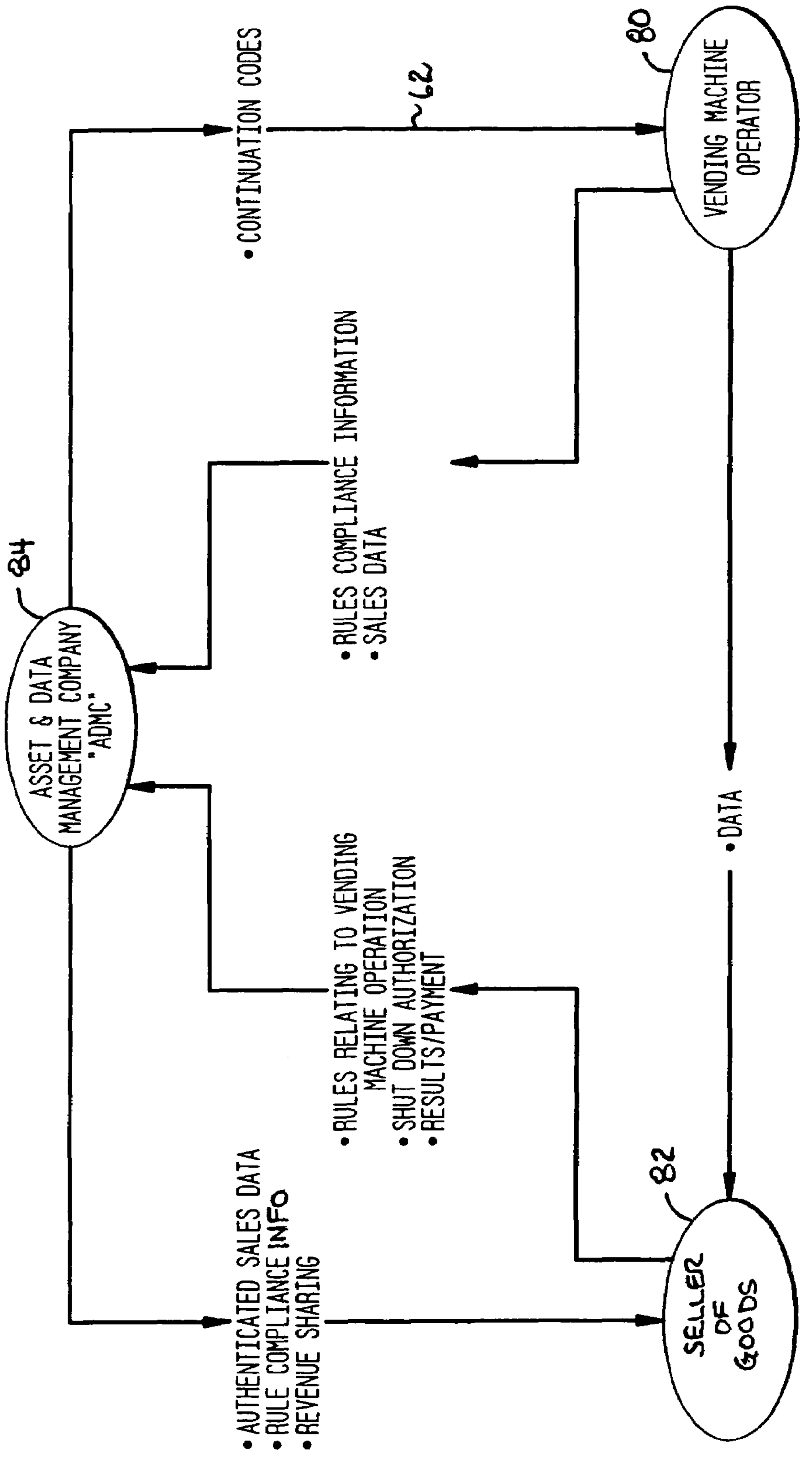

With reference to FIG. 29, a further example is illustrated of one or more relationships, communications, and data exchanges among the vending machine operator 80, the seller of goods 82, and the ADMC 84. One skilled in the art will appreciate that many of the details concerning the relationships, communications, and data exchanges may be readily determined in light of the previous examples presented hereinabove with respect to FIGS. 22-28 and will not be repeated here. It is noted, however, that the example shown in FIG. 29 contemplates an agreement between the seller of goods 82 and the vending machine operator 80 that dictates that the vending machine operator 80 provide certain prescribed data to the seller of goods 82 in order to partially or fully comply with the terms of the agreement. Such data may include, for example, information concerning the habits and/or preferences of users of the vending apparatus 10, for example, what a user's next choice is likely to be when the user's first choice of goods is not in inventory in the vending apparatus 10. Advantageously, the mechanisms and/or processes contemplated by the example of FIG. 29 ensure that the seller of goods 82 receives such prescribed data from the vending machine operator 80. Indeed, if the vending machine operator 80 fails to provide such prescribed data in accordance with its obligations, the seller of goods 82 may authorize the ADMC 84 to, for example, withhold the continuation codes (line 62) from the vending machine operator 80, thereby preventing him from enjoying the financial benefits of the vending apparatus 10.

Figure 30:
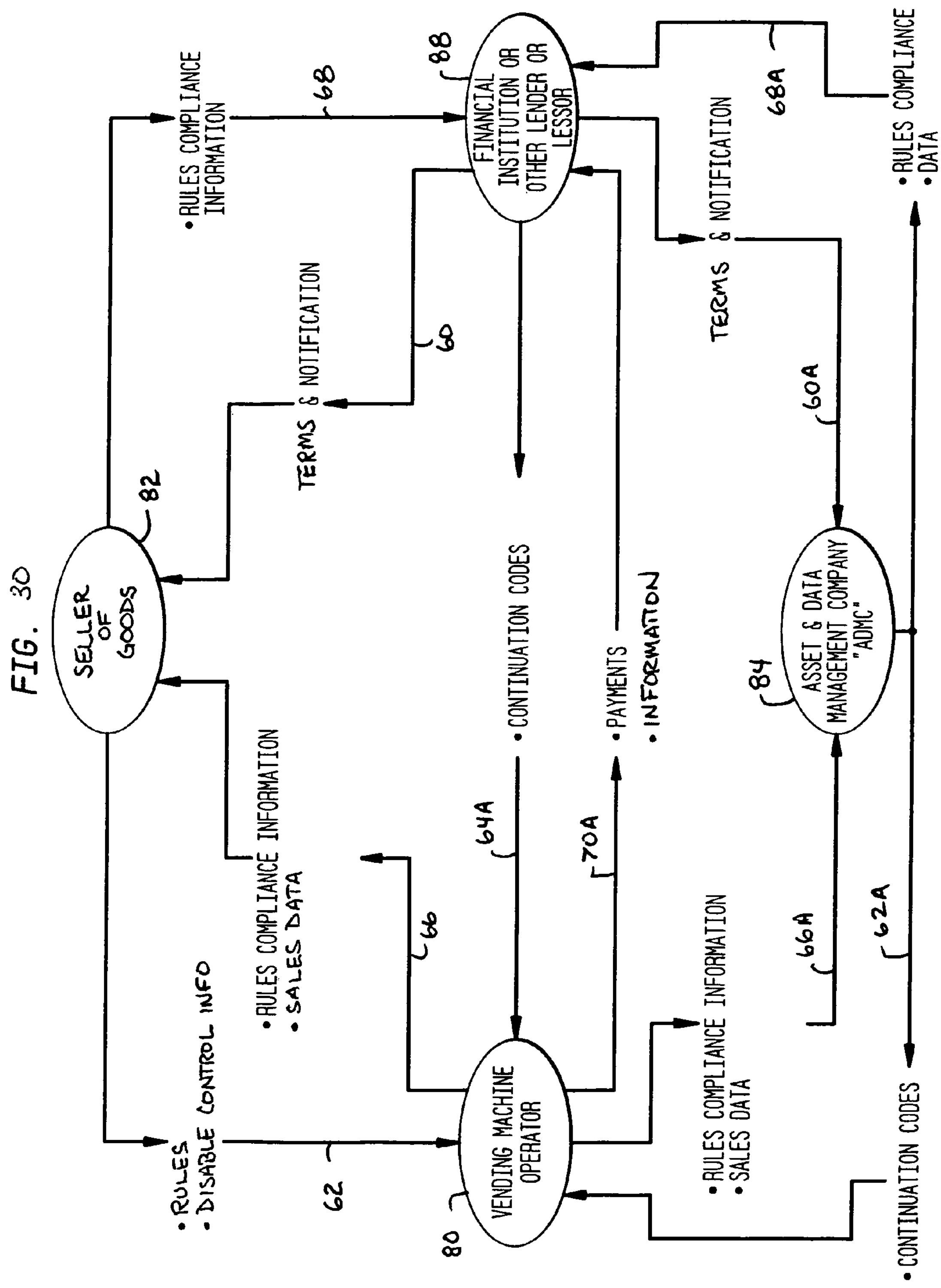

With reference to FIG. 30, one skilled in the art will appreciate from the disclosure herein that many variations and modifications on the relationships, communication paths, data exchanges, etc. illustrated hereinabove with respect to FIGS. 22-29 (and the other figures and discussions in this description) may be made without departing from the spirit and scope of the invention. In the example illustrated in FIG. 30, the relationships, communications, data exchanges, etc. discussed hereinabove with respect to FIGS. 27 and 28 have been combined. It is noted that in this example, the vending machine operator 80 must rely on receiving information (or avoiding receiving information), such as continuation codes, re-enable codes, disable codes, etc., from two entities, namely, the financial institution 88 and the ADMC 84 in order to enjoy the financial benefits of the vending apparatus 10. The agreements among these entities may be set up such that at least one or both of the sources of disable code information must be received (e.g., when the information includes continuation codes) or avoided (e.g., when the information includes disable codes) in order to ensure that the vending apparatus 10 is capable of vending goods. In this way, multiple entities may be ensured that the vending machine operator 80 complies with its contractual obligation with them.

Figure 31:
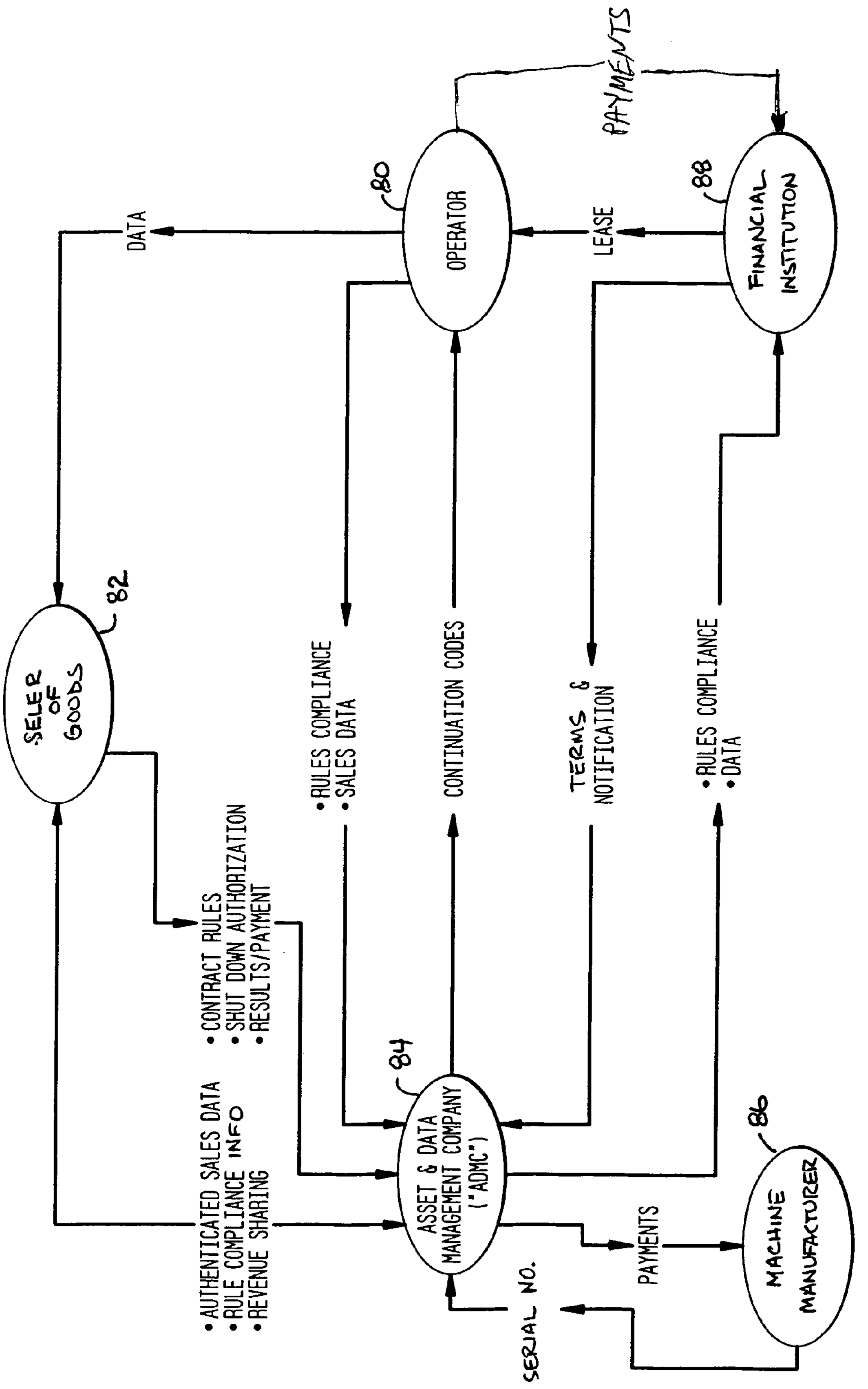

With reference to FIG. 31, a further example is illustrated of relationships, communications, data exchanges, etc., among the operator 80, seller of goods 82, ADMC 84, the vending machine manufacturer 86, and the financial institution 88. One skilled in the art will appreciate that this example is comprised of a combination of the examples illustrated in FIGS. 23, 28 and 29 and, therefore, a repeat of details already discussed hereinabove with respect to those figures will not be made here. It is noted, however, that the entities may ensure that compliance with the one or more agreements may be ensured by way of, for example, one source of disable control information (line 62) that may include continuation codes, re-enable codes, disable codes, etc. Indeed, the advantages of employing the ADMC 84 as a central hub for information and control is apparent in that compliance of many contractual obligations among the entities may be ensured by way of a single source (e.g., the ADMC 84) of the disable control information.

Further embodiments and aspects of the invention are described next, and are applicable to supplement those embodiments of the invention described in the above text and Figures. Accordingly, the below text is intended to be read in conjunction with the Figures used to illustrate the foregoing methods and apparatus.

In accordance with one aspect, the present invention relates to methods of doing business, and more particularly relates to methods of doing the business of machine vending. In its most immediate sense, this aspect of the invention relates to methods of doing machine vending using a computerized vending machine, or CVM, such as is disclosed in the above-referenced patent applications.

Existing methods of doing business using vending machines, and indeed existing contractual relationships that relate to such machines, are based upon a conventional vending machines of the self-standing type.

In such methods and relationships, an "operator" of the machine (this may be an owner or lessee of the machine) sites the machine at a particular location controlled by a person having an interest in the real property at that location (the "landlord"). (For the purposes of this invention, the landlord may own the property, may be a lessee, or a real estate agent. And, the landlord need not be different from the "operator".) The operator contracts with a seller of goods (e.g. the "manufacturer" of snack foods, which usually is but need not necessarily be different from the operator or the landlord) that are loaded into the machine. When a purchaser purchases goods from the machine, he or she makes a payment to the machine and gets the goods in return. The operator periodically collects the money and pays the landlord and the manufacturer. If the owner is a lessee or has purchased the machine with financing provided by a lender, then the owner will also pay the lender (e.g. a bank) from the money collected from the machine.

Heretofore, the contractual relationships between these parties have been independent of the actual operations carried out by the machine. For example, the landlord will charge the operator rent based e.g. upon the location and size of the place where the machine is located and the cost of providing electricity to operate the machine. So, too, the lender will charge the operator a sum that is related to the amount loaned to the operator and to whatever interest rate currently applies. Likewise, the manufacturer will charge the operator a price related to the quantity and nature of the goods the operator elects to purchase.

Such relatively simple contracts are different from those used in analogous retail situations. For example, a store in a shopping center will conventionally pay the landlord a negotiated percentage of its sales. Such a pay-as-you-go arrangement can be highly beneficial for both parties, since they can share the risks and rewards of the business and can adjust the share to correspond to e.g. the financial status of the tenant.

Such arrangements have not been practical for vending machines. This is because such machines must be physically visited by persons who e.g. remove cash from them, and such persons cannot easily be supervised by third parties such as banks or landlords. Furthermore, operators can and do change the product offerings of the machines to better match the wants of the persons who purchase items from them, and it would be very difficult for e.g. a bank or a landlord to know exactly what goods were loaded into a particular machine at any particular time.

Operators, landlords, manufacturers, and lenders would all benefit from contractual relationships wherein payments related to vending machines would depend upon actual operations carried out by the machine, i.e. would depend upon e.g. the number, types, and prices of items sold from the machine, the time of day that the machine was most often used, sales data collected by the machine, etc.

Accordingly, an object of the invention is to provide a method of doing business wherein persons could receive payments based on actual operations carried out a vending machine.

Another object of the invention is to provide a method of doing business wherein a person who is in physical possession of such a machine may be deprived of some or all of the economic benefits of the machine without the need to physically take the machine away from the person in possession of it.

The invention proceeds from the realization that a CVM can be provided with computer intelligence sufficient to wholly or partly reversibly disable operation of the CVM, or to re-enable operation of the CVM again, by timely inputting an authorization code or a deauthorization code, and that the use of such a code will engender confidence in a third party that he or she will be properly paid. For example, let it be assumed that a bank finances the operator's purchase of a CVM and the operator pays the bank every 30 days. The CVM will be programmed to automatically shut down at 30 day intervals. If the operator actually pays the bank, then the bank will provide the operator with an authorization code that the operator can input to the CVM to keep the machine operating after the 30 days has passed. If the operator does not pay the bank, then the CVM will automatically become disabled, and the operator will derive no economic benefit from it. The lack of such economic benefit will then serve as an incentive for the operator to pay the bank. And, the bank need not take physical possession of the CVM to achieve this result. The bank can wait until it is convenient to take physical possession.

Alternatively, a lessor may lease the operator a CVM in accordance with a contract under which the operator pays the lessor 10% of the sales volume from the CVM every 30 days. The CVM can then be programmed to register the sales volume over each 30 day period and then to shut down automatically unless the operator inputs an authorization code provided by the lessor.

In yet another alternative, let it be assumed that a landlord provides a large space for a bank of CVMs, purchases or leases the CVMs and sites them there, and engages an operator to run the CVMs in accordance with a contract under which the operator must pay the landlord 40% of the sales of the CVMs. After some time, the landlord checks the sales of the CVMs and finds that the operator has been underpaying. The landlord can then input a deauthorization code to the CVMs to shut them down until the operator has settled its accounts with the landlord.

In still another alternative, let it be assumed that a landlord provides a large space filled with CVMs, hires staff to service the machines, and sets different manufacturers in competition with each other to have their goods sold from the CVMs. (In this example, the landlord is also the owner. As stated above, the landlord and owner, just like the owner and manufacturer, the manufacturer and landlord, etc., can be the same or different.) Each manufacturer contracts with the landlord to pay the landlord a rebate based on sales of the manufacturer's goods. If the manufacturer is late in paying the rebate, the landlord can input a deauthorization code to prevent that manufacturer's goods from being sold until the manufacturer has settled accounts with the landlord.

One particularly advantageous embodiment of the invention is specifically adapted for use in a very common relationship between a manufacturer and an operator. In this common relationship, the manufacturer provides a custom-decorated vending machine to the operator. The vending machine is decorated with e.g. the manufacturer's logo and/or housemark, indicating that COCA-COLA® or PEPSI® etc. can be purchased from the vending machine. Naturally, when such a relationship exists, the manufacturer and operator enter into contract wherein the operator is obliged to refrain from stocking the vending machine with goods made by a competing manufacturer.

In the CVM disclosed in at least one of the above-referenced patent applications, the CVM can be loaded with different types of goods and the front of the CVM has first and second regions. The manufacturer can supply the CVM with the manufacturer's logo, housemark etc. in the first region, and the operator can provide artwork for other goods in the second region.

With such an arrangement, the operator and manufacturer can contract to provide e.g. that at least 80% (measured by units, sales in dollars, or by whatever criterion the parties negotiate and verified by e.g. a barcode scanner in the CVM) of the goods sold from the CVM will be manufactured by the manufacturer, while allowing the operator the freedom to select the other 20% (for which the operator can put corresponding artwork in the second region). If in actual operation of the CVM the negotiated percentage is not achieved, then the CVM can be programmed to indicate that selected goods are unavailable, preventing them from being sold and thereby increasing the percentage to the negotiated percentage.

In the CVM disclosed in at least one of the above-referenced patent applications, the CVM has a communications port permitting the CVM to be accessed by e.g. the Internet. In an especially advantageous embodiment of the invention, an exclusive contract is established with a data management company that communicates with the CVM through the port and serves as a gateway for other firms that require such communication. The data management company can convey information about e.g. products purchased and dates and times of purchases to firms that can use such information and can also serve as a trusted intermediary so that the CVM is not subjected to conflicting authorization and deauthorization codes from different parties.

In accordance with yet another advantageous aspect of the invention, the third party is paid at least partially by receipt of data. For example, a food manufacturer may produce a new food/snack item and may lack information about consumer acceptance of the item and the times and circumstances under which consumers are likely to purchase it. In such circumstances, the manufacturer may provide the item to the operator at no charge, but rather in accordance with a contract under which the operator must supply information regarding sales of the item at various prices and at various times of day and days of the week. Such information can aid the manufacturer to test-market the new item and to determine consumer acceptance of the item at various price points. If the manufacturer does not receive the information, the manufacturer can either withhold an authorization code or generate a deauthorization code and thereby prevent the operator from deriving a financial benefit by selling the item.

Alternatively, the third party may be paid at least partially by receipt of contract rights. For example, a manufacturer may produce a new food/snack item and may purchase from the operator the right to have the item distributed from all the operator's CVMs, but at various price points so as to conduct a controlled market test.

These different forms of payments need not be mutually exclusive; a third party may for example receive a combination of currency and data.

DETAILED DESCRIPTION OF PREFERRED EMBODIMENTS OF THESE FURTHER AXPECTS OF THE INVENTION

CVMs suitable for the herein-disclosed inventions are the CMV's described herein.

A proper understanding of this invention requires a reconsideration of business arrangements that are traditionally made with respect to vending from machines. In one traditional arrangement, an operator buys or leases a machine, installs it at a landlord's premises, and pays the landlord rent (which may be a commission percentage). In such an arrangement, the landlord must trust the honesty of the operator. While it is possible for the landlord to audit the operator's financial records, the vending business is presently a cash-based business and no party to a vending contract can be sure that all machine receipts are in fact recorded on the operator's books.

In another traditional arrangement, a food or beverage manufacturer engages a vending machine manufacturer to make machines having product-specific graphics (so that a consumer can know e.g. that the machine dispenses PEPSI® or FRITOS®). This custom-labeled machine is then sold or leased to an operator. In such an arrangement, the food or beverage manufacturer seeks to prevent the operator from selling products other than those for which the custom-labeled machine was originally intended, and most of the time the food manufacturer must simply trust to the honesty of the operator. In some exceptional instances, such machines can read the barcode information on the goods loaded into them, and self-destruct if the goods are not those the machine has been programmed to expect, but this is an extreme and wasteful measure.

These traditional arrangements are necessarily simple and unsophisticated because inter alia it is not feasible for anyone other than the operator to interact with the vending machine.

However, a CVM of the types mentioned above has sufficient intelligence to "know" e.g. the items stored in it, the dates, times, and prices of sales, the dates and times it is serviced and the identity of the person(s) servicing it, etc. (For example, a CVM can use a laser scanner to read the barcode on an item stored in it and this information can be matched with information stored in the CVM.) And, information regarding the contents of the machine and the particulars of sales from the machine can be easily stored in the machine and outputted to a computer (e.g. a laptop or a handheld in the hands of a service person) or sent to a remote computer via a communications port (that connects e.g. to the Internet). This makes it practical for persons other than the operator to have accurate information about the actual operations carried out by the CVM. This in turn makes it practical for parties to make contracts that would have been imprudent using older vending machine technology.

For example, most landlords would have been unwilling to purchase banks of vending machines for use in e.g. company cafeterias. This is because the landlord would likely have to contract with an operator company to stock and service the machines and it would be very difficult for the landlord to be confident that the operator was not skimming cash that properly belonged to the landlord. However, it would be feasible for a landlord to purchase or lease a bank of CVMs and to contract with a third party operator to stock and service them, because the landlord would have recourse to the actual operations carried out by the CVM as a check on the honesty of the operator. In other words, CVMs can practically be owned or leased by persons other than operators, and CVMs make it practical to unbundle functions that formerly would have been carried out by operators alone. Hence, it would be practical (although not necessarily profitable) for an operator to contract with a third party to stock and service CVMs that are remote from the operator's main geographical area.

Hence, the availability of highly sophisticated CVMs makes it possible for parties to consider many different types of contracts that would have been considered imprudent using older vending machines. (As used herein, "contract" is used in its most general sense. The contract need not be written out.) In general, each party to such a contracts will likely fall into one or more of the following categories:

a manufacturer of items dispensed from the CVM;

a person having an ownership interest (e.g. title, lease, security interest, right to operate) in the CVM;

a person having an interest (e.g. title, lease, possessory interest) in real property where the CVM is located;

a person having a legal right to remove money from the CVM;

a person having a legal right to load goods into the CVM; and a person having a legal right to communicate with the CVM via its communications port.

Although CVMs make it practical for parties to enter into different type of vending contracts, they still require the ability to enforce self-help measures if their contract partner does not adhere to the provisions of the contract. Usually but by no means always, the self-help measure is the entire or partial shutdown of the CVM. In many instances, the CVM will shut down, totally or partially, by the automatic generation of a shut-down signal. For example, the CVM might shut down automatically upon:

a) passage of a predetermined period of time (e.g. a month);

b) movement of the CVM, or excessively frequent movement of the CVM;

c) passage of a predetermined period of time between servicings (to e.g. prevent stale goods in the CVM from being dispensed);

d) excessive sales of a non-branded item in a CVM primarily intended for sales of branded items; or e) sale of a predetermined sales volume of goods, or of a predetermined sales volume within a predetermined period of time.

To prevent such a shutdown, or to reverse such a shutdown if one has already occurred, an authorization code is input to the CVM. Hence, in accordance with an exemplary preferred embodiment of the invention, a bank may contract with an operator to finance the operator's purchase or lease of a CVM. The CVM is programmed to shut down at noon on the last day of each month unless an authorization code is previously input to the CVM. If the bank receives payment, it generates an authorization code that may be input to the CVM and that will prevent the next scheduled shutdown from taking place. The authorization code may be manually input to the CVM by the operator, or electronically input to the CVM (as via the Internet) if the CVM has a communications port that permits this.

The shutdown of the CVM need not necessarily prevent all operation of the CVM. For example, the CVM disclosed in at least one of the above-referenced patent applications can distinguish between different goods loaded into it. It is possible, for example, to disable the CVM from dispensing only one or two items that have been loaded into it, and to continue to dispense all the others until dispensing of the disabled goods is re-permitted by input of an authorization code.

In accordance with another aspect of the invention, the CVM does not automatically shut down in the absence of a timely input authorization code. Rather, the CVM continues to operate until it is wholly or partially disabled upon receipt of a de-authorization code. This would be preferred when, for example, each party recognizes that the other is a financially responsible entity that can ordinarily be depended upon to meet its financial obligations. In such a context, shutdown should properly be an extraordinary remedy.

Accordingly, in accordance with this aspect of the invention, the third party issues the de-authorization code (or causes it to be issued) and causes it to be input to the CVM, which in turn causes the CVM to at least partially shut down.

In yet another preferred embodiment of the invention, a data management company is engaged to serve as an electronic gateway having the exclusive right to communicate with the CVM through the communications port. This embodiment may be particularly advantageous when an operator enters into a contracts under which a plurality of manufacturers supply items for a single machine. For example, if a CVM is capable of vending 40 items, the data management company may (acting as agent for the operator) contract with five different manufacturers, each supplying 8 items to be sold from the CVM. The data management company would e.g. administer the collection and input of the necessary authorization and deauthorization codes, would prevent the CVM from receiving contradictory codes, and would package and distribute data from the CVM for the benefit of the operator.

Although at least one preferred embodiment of these aspects of the invention have been described above, this description is not limiting and is only exemplary.

Accordingly, even further embodiments and aspects of the invention are described next, which further embodiments are applicable to supplement those embodiments of the invention described above, where such descriptions are not in conflict. Accordingly, the below text is also intended to be read in conjunction with the foregoing text and Figures.

For example, further aspects of the invention include a method of operation of apparatus for dispensing articles, including some or all of the following:

An article ID device which can identify articles being dispensed from the machine (can include a camera, or a bar code scanner, and can apply to other types of dispensing machines such as spiral machines, food machines, beverage machines)

Ability to disable dispensing of at least some of the articles stored therein, in a predetermined fashion, without the need for any communication or any disable code being input from any source external to the machine or its control system (The control system is able to shut the machine down even if the whereabouts of the machine are unknown to an interested party)

Ability to re-enable dispensing of articles when an authorization code is received and input into the machine.(can be input by devices such as a keypad, a modem, a portable computer, a wireless device, a modem, a memory storage device, a telephone, an intemet connection etc.)

These aspect of present invention is also directed to a dispensing machine with:

a. A control system which includes:

A program memory for storing information relating to a limited number of article selections (for example No more than 20 selections)

A program memory which contains defined information detailing the identity of products which are authorized to be dispensed.(can also include ability to store the identity of products which are not authorized to be dispensed from the machine)

In one aspect of the invention, any or all of the relevant parameters in the control system can be adjusted, changed or eliminated by an authorized party. Many of these parameters are restrictions that can be used by one or more interested parties to enforce agreements and rules that the equipment will be governed by. These restrictions and changes thereto could include, for example:

determining the types of articles which are authorized to be dispensed or sold through the equipment adjusting the parameters which determine when or how the equipment is partially or fully disabled.

Adjusting the programming in the control system to allow a machine to disable in six month intervals up from one month intervals.

Changing the control system to disable the machine based on the amount of product sold instead of based on the amount of time elapsed.

Eliminating any or all of the restrictions on the machine whatsoever

Changing the price that products could be sold for

Giving the ability to allow some or all articles to be dispensed for a reduced rate or for no charge Changing the parts of the machine which will be disabled (eg. The coin mechanism, the dispensing apparatus, the bill acceptor etc.)

Changing the specific data that someone can gain access to.

DETAILED DESCRIPTION OF THESE PREFERRED EMBODIMENTS

The following description, consisting of Parts II & III, are to be read in conjunction with FIGS. 14 though 27, which illustrate various methods of operation for a vending machine and associated apparatus, such machine being described in Part I, as well as business relationships which can benefit from and utilize a vending machine and associated apparatus having the features of the present invention.

POTENTIAL PARTIES, THIRD PARTIES OR INTERESTED PARTIES

End Consumer

Location Landlord

Equipment Operator

Money Lender

Product Producer

Data Management Entity

Asset management entity

Equipment Producer

Interested parties are generally entities which have a vested interest in the equipment. They can include but are not limited to;

Companies that own the equipment

Banks, money lenders, leasing companies, product manufacturers which may own part or all of a machine, or be giving subsides to the operator of the machine.

vending machine manufacturers which may have a financial interest in the machine.

Data management companies which expect to receive sales and other data from the machine. These entities may be independent and buy the data from the vending machine operator or other party that owns the data, or they may manage the data from the machines on for the benefit of another interested party, such as a consumer products company.

Asset management companies which manage assets for the owners. For example, a food company may pay a management company to manage and protect the food company's machines.

Rule Enforcement

Disables part or all of the system capabilities if:

Machine attempts to dispense unauthorized articles

The machine does not receive an authorization code prior to a specific time

The machine does not receive an authorization code prior to dispensing a specific amount of articles The machine does not receive an authorization code prior to receiving a specific total amount of aggregate payments from end users Revenue Sharing The revenue sharing aspect of the invention relates to an interested party's desire to gain some benefit from the ongoing sales revenue generated out of a vending machine. In this aspect of the invention, there are many structures which can be beneficial to all parties involved. This method can involve as few as two parties but can also involve many more parties.

For example, a company that wishes to finance vending machines for a vending machine operating entity (the "operator" who makes money actually operating the equipment) can make the machine available to the operator in return for an agreed upon payment structure. This payment structure may or may not include a predetermined fee for the use of the machine. The payment structure can at least partially be based on the amount of revenue or related monies which are sold or dispensed from the machine. So in one case, the operator might pay the finance company a monthly fee for the machine as well as be responsible for paying a fee which is calculated as being a percentage of the sales or profits generated from the machine as agreed upon in advance.

In another aspect, the operator of the machine may have agreements with several parties relating to the same machine. For example, a machine operator may have five product manufacturing companies (companies A,B,C,D and E) one leasing company and one data and asset management company involved with the same machine.

All five of the product companies have an interest in their product being sold out of the machine. In this example, two of the product companies, companies A & B are giving free product to the vending machine operator in exchange for sales, location and demographic data on their products being sold by the operator, as well as an agreement from the operator to stock and sell at least 4 of any type of products, which are produced by companies A & B, in the machine. One of the product companies, company C, pays an up front contribution towards the cost of the machine in return for an agreement by the operator to always sell and stock at least 6 articles manufactured by the producer. Company C agrees to let the operator choose, at the operator's own discretion, any 2 of the articles produced by company C to put in the machine, however they both agree in advance that the remaining 4 product selections will be specific ones. Company D agrees to pay part of the monthly lease payment for the machine in exchange for the operator agreeing to stock and sell 10 specific article selection types at all times (produced by company D) and also in exchange for the operator agreeing to share a defined percentage (for example 3%) of his revenues with company D, to be paid by the operator on a monthly basis. Company E agrees to give the operator a one time payment and further agrees not to charge the operator for company E's products sold in the machine until one month after they are sold out of the machine (offering the product to the operator on "consignment") in exchange for the operator agreeing to sell 8 specific types of company E's products out of the machine at all times and also pay 2% of revenue, from company E's retail sales through the machine, to company E.

There is also a leasing company which has leased the machine to the operator. Since the operator has a limited credit history, the leasing company agrees to lease the machine to the operator under the condition that the machine will be programmed by a third party (which can be the machine manufacturer or another authorized party) to disable itself in the event that an authorization code is not received and input into the machine on a monthly basis. This authorization code will be made available to the operator and the machine every month, on the condition that the operator maintains his financial obligations to the leasing company.

The product producers can each have similar agreements with the operator which would require them to authorize the release of authorization codes which need to be input into the machine in order to avoid the disabling a part or all of the machine. Separate authorization codes from the separate product companies (or from their agents) can be withheld in order to force a disabling of the product selections that relate to their individual agreements with the operator.

Since this can be a cumbersome situation for the product companies and even the leasing company to manage, they can authorize agents or utilize one agent to manage their interests in the machine. Such a data and asset management company can monitor the machine and require the sales and other data be reported to them from the machine operator (or the machine directly, if it so enabled) in order to confirm that the operator is following the agreed upon various contracts with the various interested parties which the management company is accountable to.

In this example, the Leasing company and the five product producers decide to utilize the services of the same asset and data management company. The management company also requires that a nominal fee (for example, 0.25%) of the sales from the machine must be paid to the management company for their services by the operator. The management company now is legally bound and entrusted to manage the machine for the parties involved based on agreements (typically in writing). One other function that the management company can perform is to verify to the parties that there are no conflicts between the terms of any of the agreements involved, preferably this is done before any new contract is signed.

One function that the management company performs is getting any and all agreed upon data from the operator and or the machine so that proper decisions of authorization code releases can be made. This requires the machine to have the ability to compile the relevant data in a format that is transferable and meaningful to the third party (in this case the third party is the management company). In addition, it is important that the data which is retrieved from the machine is accurate and true and not tampered with. Advantageously, the machine should be equipped with the ability to encrypt or encode the data coming out of the machine so that an operator can not try to corrupt or adulterate it. Therefore, even though accessing the data and communication from the machine may depend on the operator's cooperation, the operator has no ability to change the authentic data from the machine. The external computer used to read the data and authenticate the operations of the machine will first be able to verify that the data has not been adulterated, since the encryption technique will verify, for example that the code sent has come from a specific machine at a specific time and in an authentic manner etc.

The above scenario puts the power in the hands of the product companies and banks. There is also the example where the operator "rents out" space in the machine in exchange for some of the machine's revenue, as described more fully hereinafter.

One, several or all of the interested parties could utilize a common agent, such as a management company, to protect their interests and to enforce their agreements, which agreement may be independent or combined, with the operator.

Agreements can have a term and the parties can agree what will happen to the restrictions on the machine or the machine itself at the end of a term.

A machine can be set up to facilitate both revenue sharing and rule enforcement. For example, where the asset and data management company acts enables the product producers in the example above, to collect their payments and apply them toward the leasing company until any excess is reached which is then forwarded to the operator.

Rules:

A vending apparatus which is controlled by control system, whereby upon the occurrence of a specific disabling event, said control system can cause the disablement of at least part of the functionality or capability of at least part of the vending apparatus, or to cause the disablement of an apparatus which operates in conjunction with said vending apparatus, unless an authorization code is received by the control system.

where the disabling is caused by a control system, which is linked to the machine, and which automatically occurs at a predetermined time or time interval.

where the disabling event, as described above, is the passage of a specific amount of time (including a specific random amount of time.)

where the disabling is caused by an electronic communication which is communicated to a control system, which is linked to the machine, which disabling communication can occur as determined by a third party or entity, other than the entity which has physical possession of the apparatus.

where the disabling is caused by a control system linked to the machine when the machine has performed a specific amount of operating cycles.

Where the disabling is caused by a control system linked to the machine when the machine has dispensed a specific amount of articles.

Where the disabling is caused by a control system linked to the machine when the machine has accepted a specific amount of payments.

where the disabling is caused by a control system linked to the machine when the machine has performed a specific amount of operating cycles within a specific amount of time.

where the disabling is caused by a control system linked to the machine when the machine has accepted a specific amount of payments within a specific amount of time.

where the disabling is caused by a control system linked to the machine when the machine has sold a specific amount of articles within a specific amount of time.

where the disabling is caused by a control system linked to the machine when the machine has dispensed a specific amount of articles within a specific amount of time.

where the control system contains at least one secure micro-chip, which has the ability to produce or store a code which can be utilized to verify the authenticity of a potential authorization code, which said potential authorization code has been communicated to the control board from a source remote to the vending apparatus.

where the at least part of the vending apparatus as described above can include an apparatus or electronic device which is connected physically, electronically or communicatively with any part of the vending apparatus.

where the control system which controls the apparatus can be comprised of one or any of a combination and quantity of electronic controllers, computers or electronic devices.

A controlling third party (for example bank, product producer, data management company, leasing or finance company) controls the ability to release an authorization code to enable the partial or full functionality and capability of a specific machine.

In the event that the entity operating the machine is in violation of any rule as agreed upon by a controlling third party.

Where the rules may include requiring the machine operating entity to;

Communicate specified data to a third party.

Make a payment to a third party

Operate the equipment under specified guidelines

Sell only articles or products which are authorized by a third party

Maintain the equipment in an agreed upon fashion.

Operate the equipment in a location which is specified.

Maintain the product being sold in a fashion and with standards which are acceptable to a third party.

Display graphics or pictures which are acceptable to a third party

Sell product at a price point acceptable to a third party

Not tamper or dismantle or disable any specific part of the equipment

Not disable or tamper with a product ID device such as a bar code scanner

Not move the machine from a given location

Where the equipment has a multiple capabilities or functionalities, at least some of which, can be at least partially disabled in a manner as described above, by any one of a multiple, third controlling parties.

Where the equipment has a multiple capabilities or functionalities, at least some of which, can be at least partially disabled in a manner as described above, by all of a multiple of third controlling parties.

Article Producer Methods

Product/article producer has an interest in at least one article dispensing machine, and wishes to have ability to control aspects of the dispensing capability of the machine, further where the control(s) involves a set of rules that must be adhered to by the machine, further where the rules include at least one control parameter which determines the specific type of articles which can be dispensed, furthermore where the control system uses a ID device to determine whether a particular article is authorized to be dispensed, furthermore where the article dispenser is being operated by a party other than the article producer and where the article producer is gaining the benefits of controlling its interests in the article dispenser by enabling the control system to follow a set of rules which are acceptable to and or determined (directly or indirectly) by the article producer.

Where the machine is set to partially or full disable some or all of the machine's functions in the event that the rules set in the control system (directly or indirectly by the article producer) are violated.

Where the dispensing machine can be reset by use of an authorization/enable code being received by the control system of the machine.

like (a) above where the article producer is able achieve at least some control over the machine (as stated above) by utilizing at least one other party (other than the product producer and or the vending operator/such as an agent, a broker, a data management company, a computer reporting company)

as above Where the authorization codes are able to be generated/stored in a data computer Where the data computer is able to store data relevant to the rules and the history of rule adherence/violation by the operator of the machine.

Where the computer can do an automatic comparison between the rules and the historical adherence/violation data received from the computer associated with the dispensing machine (or portion/bin of the machine).

Where the data management computer can determine whether or not the continuation/authorization-enabling code should be made available to the control system associated with the dispensing machine.

Where the enabling code(s) are made available to the dispensing machine.

Where the enabling codes are not made available to the dispensing machine.

Where the data management computer system (network/computer/lan/wan etc.) is able to generate reporting information regarding the rule history of at least one of a given dispensing machine, which can be useful to the article producer.

Where reports generated can be utilized by article producer to determine whether to modify the rules for at least one machine operator.

Where data management computer can also have multiple article producers' separate rules being applied to at least one machine.

Where machine is set up to have a fixed number of total selections available as pre-set/controlled by a computer system (internal or remote).

Where the set number of selections is determined/limited by the control system and governed by the article producer +/or their agents rules.

Where the limitation of the number of selections can be modified only with the permission of at lest one the parties who set the rules.

Where the changes to the number of selections allowed is accomplished by an authorization code sent to a control system which controls the machine.

(need all of these claims also in combination with graphics and or tamper and or fixed graphics sheets etc.and or graphics with embedded security chips or RF tags (said rf tags/printing can be embedded in various non-detectable locations so that the machine will not function without communication to the graphics sheet.

Where continuation/enable codes for at least one of a given machine can be given to allow some of the articles in a machine to continue to be sold as normal and unrestricted, while yet other articles are not authorized to be sold.

Where codes can be sent to the machine in order to allow continuation of vending from at least one of a specific storage area of the entire storage area in the dispensing machine. (this is critical to allow MARS® to shut down bins from a violation on x number of bins, while still allowing HERSHEY ®0 to operate bins which have not had a violation related to them (or even need to have claims which allow bins to be shut down without a specific violation of a rule, but for example, just because the contract is invalid or expired or under negotiation or non-existent)

Where the machine control system (need to define machine control system) will shut at least part of the machine's functionality down unless the machine control system has received authorization initiated from an external source (lan, wan, Web, phone, wireless, handheld, micro device,) on a periodic basis.

Where there is a protocol between the machine control and the external control, whereby the machine control must first send data to the external control which data relates to the functions and certain specified (claim examples as dependents) sales related data, and or article dispensing data, (can include BCR data, machine usage data, uptime data, out of order data).

Where the outside control then does analyses of the incoming data received from the machine control system and makes determinations regarding what if any authorization codes should be released to the machine controller.

Where the authorization information/codes (and or disabling codes . . . in the case of a partial approval . . . where some bins may continue but others may not) are made available to the machine control system to enable the aspects of the machine which are authorized, to be enabled.

Where the data sent back to the machine control include changes of rules for the machine which reflect changes to the contracts or rules agreed to by the involved parties (HERSHEY®—releases 2 bins for general all purpose use, MARS® "contracts" to get access to one of the ex-HERSHEY® bins, and the operator—in this case—use the other released bin to vend as he sees fit.)

Business Method Scenarios

1. Whereby a Vending machine producer wishes to offer a machine to a potential customer on a trial basis for a limited time or for a limited amount of trial usage, and therefore sets the control system to have the ability to disable part or all of the vending machine and it's functions. This disabling can be determined and set to occur, for example, after a specific amount of time has lapsed, or after a number of articles have been dispensed, or after a specific amount of payments have been made to the machine.

2. Whereby a Bank, money lender, leasing company, financial institution, or investor or similar interested party has a concern regarding the fact that the equipment can be easily moved from one location to another. In order to improve their confidence that they can have some control over a portable asset such as a vending machine. The machine can be set to automatically disable unless an authorized code has been input into the control system. If the interested party such as a money lender has a concern about the whereabouts of the machine or the payments are overdue on a given machine, the money lender can decide not to release an authorization code for one or more machines. Since this would render the machines inoperable to the one in physical possession of the machine, the lender can be very confident that he will be able to either retrieve the payments due to him, or at the least the money lender, in this example, should be able to repossess the machine since it has little value to anyone in the disabled state.

3. Furthermore, the machine can have the ability to disable itself or be disabled in the event that the machine has been moved. This can be accomplished, for example, by putting sensors on the machine in order to detect the types of motion which would occur if the machine were to be moved. In the event, for example, that a machine has been lost or stolen and or sold to a third party in an illegal fashion and without the permission of the lender, the new person taking possession of the machine would naturally call the manufacturer of the machine, or their agent or distributor, in order to re-enable the machine. At that point, the inquiry could be used to alert the lender as to the whereabouts of the machine. In addition, the interested party can set the machine to display the phone number and other contact information or other messages on the graphic or digital display of the machine so that a person in possession of a stolen, lost or seized machine can know whom to contact. This message and the disabling feature itself also acts as an barrier to someone trying to sell a disable machine. Other interested parties, such as product and food producers, may also want to be able to control the movement of machines they have an interest in, and therefore they can also benefit from forcing the machine to be disabled in the event it is moved. Manufacturers who expect their products to be being dispensed at a specific location will want to know if a specific machine was removed from the location.

4. Any interested party may also have a desire to have access to certain information which can be communicated to them from the machine. Such information could include Control Board And Chip Security The data that the control system uses, in order to determine whether or not a given article is authorized to be dispensed, is able to be updated and uploaded from an electronic data input device such as a computer, a portable computer, a memory storage device or other similar input device. In addition, a keypad attached to the machine can also be used as the data input device. Can also be communicated by phone lines or a through a wireless transmission. The information and data being communicated to the controls system can be encrypted or secured using a known secure communications link.

In addition, high security computer chips which have specific security features can be operable in the control system in order to facilitate a secure transmission of data to and from the machine control system. These secure communications to and from the control system can safeguard against any unauthorized party from attempting to learn how to cheat the authorization code system. In this way, the control system cannot be studied by an unauthorized party attempting to ascertain what the next possible authorization code or code sequence is going to be.

In the event that someone were to try and replace the main control board with a "fake" board or a "cheater" control board, the machine can have one or multiple security devices or computer chips mounted in various components, apparatus and accessories throughout the equipment and machine. These security devices can communicate with each other so as to be designed to disable specific components or apparatus within the machine, in the event that any tampering of the control system has been detected by any one of the security devices in the machine. So, for example, if someone were to try and replace the main micro-controller board of the machine with an unauthorized controller board, security devices and features in components such as the motors, digital displays, touch screens, wire harnesses, keypads, encoders, switches, control boards, motor controllers, or any other electronic device, could be designed to disable one or several capabilities or functions of at least one aspect of an apparatus or part of the machine, thereby rendering the apparatus partially or fully disabled and inoperable. A security scheme such as described above can have many variations and embodiments, however the key idea of this aspect of the invention is to cause it to be highly impractical for someone to benefit financially by trying to cheat the system.

Additional, security measures can be taken in order to protect the electronics and control system of the machine from being cheated, such as embedding part or all of the control system in a potting compound or an epoxy thereby making it inaccessible. In addition, one could secure the control system by using more conventional methods such as welding or locking key parts of the control system in an enclosure. Such an enclosure could be removable for servicing, whereby the entire enclosure can be replaced by another authorized unit while preventing all the while any unauthorized person from gaining access to the key component. Additionally, certain operational code for the machine can be kept in high security chips so that it becomes more expensive for a person to try and reverse engineer the control system, forcing them to engineer a totally new control system.

Security measures such as those described above can give confidence to an interested party, such as a bank, a product manufacturer or a vending machine manufacturer, that they will be able to maintain some control over their investment and control over the machine. In the event that parts from a stolen machine are installed in another machine, they can be designed to not work without an authorization code.

While the preferred embodiment of the rule enforcement and disabling techniques described herein is described as utilizing a robotic vending machine, other machine designs can greatly benefit from the same business methods and the same disabling techniques and concepts. For example, some of these techniques can be modified to function successfully in spiral snack machines as well as beverage machines.

A machine programmed to disable itself after a certain predetermined amount of vending has occurred within a predefined amount of time, so that if the operator wishes to continue to use the machine for additional usage within that define time range they will have to pay for additional usage in order to re-enable the machine and continue to operate. If the operator negotiates this in advance he can avoid the shut down of the machine.

Where the disabling of the machine can include the disabling of any key apparatus or accessory associated with the machine, such as the bill validator, the coin mech etc.

Disabling Apparatus

For the optical article identification (ID) system:

A bar code or other image/vision recognition system for verifying stored article and/or proper operation and dispensing of article.

Use of a robotic mechanism for bringing stored articles to the article ID system. the robot can pass the article in proximity to the ID device or scanner and move the product in a pattern to enable a code search process to help locate the code on the article.

Additionally, the controls system can use the information learned from a prior package code search to improve the efficiency of subsequent searches and search patterns of articles from the same bin, or presumed to be of the same type as one already scanned. For example, once the code of a certain article type has been found to be scanned with the robot a certain distance away from the scanner, then the next time a similar article is being scanned, the robot can begin it's search with the robot in the same relative position relative to the scanner as the point of success of the prior scan.

Even furthermore, the robotic mechanism can be selectively controlled so as to improve the reliability of article identification, i.e., movement of article past the ID system can be slowed, and for flexible bag articles, the article may be "jiggled" so as to change the flex of the bag and thereby improve scanning of a bar-code or better optical recognition of an image Scanning for article ID can be at any time for verification and operation purposes, i.e., not just during or as part of a vend cycle, but also between cycles.

Proper operation and dispensing of article may include adherence to predetermined rules, and interaction with the control system for reporting and enforcement purposes, as well as further control of the vending machine for furthering the enforcement purposes. Articles identified as unauthorized can be put back in bin, or dispensed and then further article dispensing from that storage area can be disabled (unauthorized articles can also be automatically placed by robot in a special holding area for later inspection)

Article ID apparatus can also be manually used by the machine operator for inventory management.

Use of an optical ID system for spiral/Gravity feed machines to identify article package type, etc. prior to being dispensed, e.g., while article is falling (or rolling, in the case of beverage container etc.) or already landed at the customer retrieval area.

Determination of article ID is made during a dispensing operation, after dispense is initiated and the cycle is irreversible.

Article ID for inventory management, Pay As You Vend (PAYV) equipment financing, or for calculating incentives based on proper operation and/or adherence to rules Addition of circuitry enabling remote connectivity of the vending machine for inventory management, as well as for operational control.

New business methods relating to the above-noted enforcement possibilities. That is:

Once there is article IID (such as a bar code scanner,—and/or a camera) along with other data available about the dispensing operation of the machine, it is possible to set up rules for the "Authorized" operation of the machine, and if those rules are not followed, part or all of the vending machine can be shut-down.

The enforcement possibility facilitates among other things "Pay As You Vend" (PAYV) business methods, where the purchase price (or a lease or bonus payment) of a vending machine, or for that matter any other type of article handling/dispensing apparatus, can be set up so that, as an example, periodic payments are made based on the quantity or value of the articles handled during a given time period. If the data needed to calculate the payments due by the party leasing the equipment, or the payments themselves, are not provided, the machine may be pre-programmed to automatically default to a shut-down mode at some point in time. If the payments and/or data are provided, authorization codes are given to the operator (preferably before the equipment has been shut down) which prevent the default shut-down. An authorization code can also be given to re-activate a machine that has been fully or partially disabled in a vending machine environment. This can be implemented by a machine manufacturer (or a distributor [or a], finance company, or a product manufacturer), providing a vending machine to an operator, and require that the operator make periodic financing payments based on the quantity or value of the articles vended during a given time period prior to the payment date.

Furthermore, the machine can be pre-programmed to shut-down if an authorization code is not entered at periodic intervals. The authorization code could be given to the operator, or communicated to the machine if the proper payment, and sales data are made. This results in a win-win situation for both parties, since the more successful the operation of the machine, the more money is available for the operator to make larger payments, and the more money the manufacturer or lessor is able to make in a given time period.

New business methods relating to advantages provided to the machine operator by the above described novel apparatus. For example:

Once a reliable and verifiable database of sales data is available, it can be used to obtain volume discounts, both for the operator (from the article manufacturers), and for loyal customers (from grateful operators or as a promotion, etc from an article manufacturer).

Once a reliable and verifiable database of sales data is available, it can be used as a feedback tool to the machine operator, where adherence to predetermined rules may result in the operator getting an incentive or bonus.

Once a reliable and verifiable database of sales data is available, it can be used as a basis for a lease payment for the space where the machine is positioned, such as at a shopping mall.

The database can be made accessible to interested parties via the Internet or other remote accessing technique, which will further facilitate this business method.

Use of article/article handling/dispensing of the type noted above, in alternative environments:

Gas stations islands, where products are delivered to the customers using, e.g., a pneumatic tube, from a remote storage area using an article/article handling/dispensing apparatus for dispensing the products prior to being placed into the tube Automated convenience stores Automated supermarkets, etc.

Automated storerooms/stockrooms in an office building, etc.

The apparatus and a business method as described herein, wherein the article identification is used by the user interface and control apparatus for making all or part of the apparatus inoperable.

A business method as described herein wherein inoperability of the apparatus is used as an enforcement mechanism to stimulate adherence by an operator or owner of the apparatus to predetermined rules.

A business method as described wherein inoperability of the apparatus is used as an enforcement mechanism to stimulate reporting of sales and inventory data to a central authority.

A business method as described herein, wherein inoperability of the apparatus is used as an enforcement mechanism to stimulate adherence to plan-o-grams (proper article layout by person stocking the apparatus with article, i.e., the route driver).

A business method as described herein, wherein an incentive or bonus is provided to the route driver for adherence to the plan-o-grams.

Relating To Article ID System For Spirals

An article dispensing apparatus, comprising:

a storage volume for storing articles along a plurality of longitudinal axes;

a plurality of article transporting mechanisms, each including an elongated spiral-shaped article transporting device for selectively transporting an article along one of the plurality of longitudinal axes and out of the storage volume;

a drive mechanism coupled to each article transporting device for rotating a selected one thereof for causing transportation of an article out of the storage volume; and user interface and control apparatus for allowing a user of the dispensing apparatus to initiate an article dispensing operation, and to cause controlled rotation of the article transporting device so that a selected article is extracted from the article storage area and moved along a path to a dispensing area of the dispensing apparatus, and an article identification device, mounted within the dispensing apparatus, and operated so as to provide identification of an article before, during or after it moves to the dispensing area The apparatus described, wherein the article identification device uses imaging optics to provide article identification.

The apparatus described wherein the article identification device comprises a bar code scanner.

An Apparatus wherein the article identification provided by the article identification device is used by the user interface and control apparatus for:

a) shutting down or disabling further dispensing of articles in alignment with one or more of the longitudinal axes.

An Apparatus, wherein disabling of said dispensing is overcome, or re-enabled, in response to input to the control portion of the user interface and control apparatus of an encoded authorizing signal.

An Apparatus wherein disabling of said dispensing is overcome, or re-enabled, in response to the passage of time.

As Directed To Restriction Capabilities

An article storage and retrieval and/or dispensing system/apparatus which includes a the following:

At least one article retrieval mechanism;

At least one article identification system including at least one article identification device and/or input device (such as a bar code scanner or camera and vision or optical identification system);

A plurality of article storage areas wherein articles authorized to be retrieved and/or dispensed are stored; and At least one control system for controlling said article retrieval mechanism, said control system being preprogrammed to disable the ability of articles to be retrieved and/or dispensed based on a given operational parameter reaching a threshold value;

further including, means for providing an externally input authorization signal for overcoming said preprogrammed disabling, and/or means coupled with the article ID system for detecting attempted retrieval and/or dispensing of unauthorized articles, and deactivating ability to retrieve articles from at least one of said storage areas, and/or communication means for providing communication between said control system and a remote site, wherein if said communication means is disabled or tampered with, ability to retrieve articles from at least one of said storage areas is deactivated, where communication means can be a digital display, a portable computer, a memory storage device, a phone line, wireless, internet etc.

whereby said article ID system performs self-checks, and if evidence of tampering with proper operation of the ID system is detected, the ability to retrieve articles from at least one of said storage areas is deactivated, and/or wherein once ability to retrieve articles from at least one of said storage areas is deactivated, a new authorization code is required to reactivate the apparatus.

Specific Storage Area/Article Restrictions

Article retrieval system (which may or may not include a specific single customer interface, as in the case of an automated store) which contains a memory capable of storing information such as the information relating to the articles which may be stored in the article storage area(s).

1) whereby the control system is capable of determining whether or not an article which is identified by the ID system is an article which is authorized to be stored/retrieved/dispensed in/by the apparatus;

whereby (in one example) there are less ID systems/input devices (Scanners) than there are storage compartments or spirals etc., and/or whereby there is only one ID input device, and/or whereby the article is moved from initial storage area (to a central scanning area) in order to scan article, and/or whereby a memory/database of articles (data stored in controller memory or external computer memory) is provided, including the list of articles which are authorized to be dispensed from said dispensing device 2) Whereby the control system is able to deny/deactivate the access of future retrieval attempts by the apparatus of any specific articles/storage area(s), in the event that the article ID system or the control system has determined, that a specific article which was previously retrieved from that same area was not an "authorized article". This is based on a comparison between the article ID information gathered by the ID system on a given article and a list of authorized articles which is stored in the memory accessible to the control system (e.g., from a web-site, off location/external database, an internal memory, etc.).

Whereby the determination of the authorization of a specific article is made after the article is removed from the storage area, and/or Whereby, after the control system has detected an unauthorized article, the control system prevents any further retrieval of articles from that specific area, and/or This restriction can not be cleared by the operator unless physically present at the machine, and/or Whereby the first detected unauthorized article from any specific storage area is dispensed into the retrieval area, and/or Whereby the first detected unauthorized article from any specific storage area is placed back in the original storage area/container, prior to deactivating further access to that same storage area/container in the future, or Whereby the first detected unauthorized article from any specific storage area is placed into a separate article rejection storage area/container, prior to deactivating further access to that same storage area/container in the future, or Whereby the control and or article ID system above has anti-tamper features including mechanical, electronic, software, electronic hardware systems which disable use of the control system and thereby disable the use of the whole retrieval/dispensing apparatus in a temporary or permanent fashion in the event that tampering of the system has occured whereby the above tamper resistance mechanisms include the requirement of access to an encrypted code, which must be input into the control system (via numerous possible methods, wireless, manual keypad, modem, handheld computer, etc. ) in order to re-activate the apparatus after a tamper related deactivation of the apparatus has occurred.

whereby the control system has at least one tamper evidencing system which enables an authorized person to detect the unauthorized tampering with the control/ID system.

Revenue Sharing Concepts; Pay-As-You-Vend (PAYV)

An apparatus for providing a product[1] to a user of the apparatus, comprising:

- a first validating device (i.e., the selection buttons and the payment mechanism), responsive to operation[2] by the user, for internally generating a first validating signal representative of a user desired product from the apparatus;
- a second validating device, responsive to an input to said apparatus from a remote site in response at least in part to payments, of an encoded signal, for developing a second validating signal; and
- a controller, requiring prior receipt of both of said fist and second validated signals, before allowing said apparatus to provide the selected product to the user.

[1] defined in the text as goods, service or information

[2] e.g., selection and payment

The apparatus wherein said controller includes an accumulation device for developing a disable signal which prevents said controller from providing the selected product to the user, based on an accumulated value of at least one operation parameter[3] of the device reaching a predetermined value.

[3] such as one or more of "time, cycles, $ sales"

The apparatus wherein the operation parameter comprises one of:

time, $ sales volume # of sales transactions.

A method of operating an apparatus for providing a product to a user of the apparatus upon product selection and payment by the user, comprising the following steps:

- providing an apparatus where a non-user operator of the apparatus must make payments to a third party, based on an accumulated value of an operational parameter of the apparatus.

A device for providing a product[1] to a user of the device, comprising:

a selection mechanism, responsive to operation by the user, for generating a user selection signal representative of the user selecting a desired product from the device;

a processor, responsive to accumulation of at least one operational parameter of said device, for generating reporting data representative of accumulated user operation of the device;

(optional) an output, responsive to said processor, for providing said reporting data externally to said device according to a predetermined schedule;

an input, for receiving an encoded authorizing signal which is generated at least in part in response to the providing of said reporting data to said output;

(or—an input, for sequentially receiving encoded authorizing signals, each encoded signal being generated at least in part in response to a scheduled providing of said reporting data to said output)

a decoder, for decoding the encoded authorizing signals so as to develop a decoded authorizing signal;

a disabler, responsive to at least one operational parameter of said device, for developing a disabling signal after said operational parameter reaches a predetermined accumulated value; and)

a controller, which once disabled by application of said disable signal, is enabled by application of said enabling signal thereto, and can then respond to one or more of said user selection signals and provide product to the user.

A device for providing a product[1] to a first-type of user of the device, comprising:

a selection and payment mechanism, responsive to operation and payment by the first-type of user, for generating a user selection signal representative of the first-type of user selecting and making an appropriate payment for a desired product from the device;

an accounting means for keeping track of an accumulated value of at least one operation parameter[3] of the device;

a memory having stored therein a predetermined accumulated value for the at least one operation parameter of the device, said accumulated value based on a payment by a second-type of user of the device to a third party; and a comparator, coupled to said accounting means and said memory, for comparing the accumulated value of the operation parameter to the stored value, and applying a disabling signal so that said selection and payment mechanism becomes inoperable if said accumulated value is greater than said stored value.

The device described above further including a controller, for controlling the operation of the device, the controller having a first input responsive to said disabling signal for preventing said device from providing a selected product to said user even if the user has made an appropriate selection and payment, and the controller having a second input responsive to an authorizing signal for preventing said disabling signal from being at least partially effective.

The device wherein the authorizing signal is automatically generated internal to said device based on the passage of time.

The device further including a resetting mechanism, responsive to an internally or externally input authorizing signal for resetting the accumulated value of the operation parameter in the accounting means to a starting (i.e., minimum) value.

The device (define the difference between the first and second-types of users, i.e., first-type is actual purchaser of product from device, and second-type is one who operates the device as a business for selling to purchasers).

The device wherein said controller creates notification/communication to the second-types of users (owner/operator ) of the status of the comparator.

The device wherein said controller is coupled to a communication path (intemet, wired or wireless modem), to send communication to a remote site for accounting and generation of the authorizing signal.

The device wherein the authorizing signal may only authorize a partial operation of the device.

A method for providing a product[1] to a user of the device, comprising the steps of:

controlling operation of the device so as to selectively provide said product to a user;

preprogramming the device to automatically shut down (i.e., prevent selectively providing of said product to the user) based on accumulation to a predetermined value of a give operation parameter of the device, or accumulating at least the one operation parameter[3] of the device during operation of the device.

The bar code reader mounted to an interior wall of cabinet and positioned so that the article moves over the scanned surface thereof during the dispensing operation. In this manner, control system can maintain accurate information relating to the articles dispensed by the vending machine, thereby enabling new methods for operating a vending machine, a business for operating a vending machine, as well as a business for financing or leasing a vending machine, as described in other parts of this application. Since article ID is accomplished during dispensing, while the machine is not normally attended by the owner/operator, as compared to during loading, more reliable operational information is developed by the sales management information system. Although a bar code scanner is illustrated, alternative imaging systems could be used. For example, a digital still camera, an analog or digital video camera (or similar imaging device), or a radio-frequency (RF) ID device, may be used for obtaining article ID information.

PAYV

The above described apparatus can facilitate new business methods relating to article or article identification during or as part of a dispensing apparatus.

Traditionally, feedback of article ID is important as an analysis tool for the equipment owner (or operator or food manufacturer) for inventory and/or plan-o-gram information (product positioning or lay-out in the apparatus).

I. Equipment Control System

A. Feedback Tools Using a Microprocessor 1) barcode or radio-frequency (RF) scanning for article identification 2) optical (imaging) article identification system, for example, a digital still camera, or an analog or digital video camera or similar imaging device for obtaining article ID information.

3) Meter: for monitoring time, as well as total or incremental sales volume or receipts over time, and using the monitored information to control continued operation of the machine.

4) Meter: for per bin monitoring and control as noted in 3) above.

5) power outage/tamper sensors/machine transport sensors 6) maintenance (trouble) sensors B. Feedback Communication Link For Transmitting Encrypted Code 1) wireless: cell, beeper, infrared, radio frequency (RF)

2) verbal/telephone 3) modem 4) hand-held device

III. Control Data Processing Center

A. Managed By Or For The Owner/operator 1) in order to give feedback for machine sales, SKU's, time, volume, employee performance, etc.

B. Managed By or for Financial Backers (Interested Parties)

1. for purpose to determine sales, total or incremental 2. to authorize continued use of machine using authorization (enforcement) codes a) flat rate installment financing b) PAYV (Pay As You Vend) where the financial party gives authorization codes for continued operation of the machine based on successful periodic payments for incremental use of the machine above a minimum use agreed upon in the financing arrangement c) monitor cash receipts to determine machine thefts or illegal sales as a result of using an unauthorized control system which bypasses regular monitoring and reporting.

C. Managed By or for The Article Manufacturer (Such as M&Ms, Pepsi, or a Management Agent for an Article Manufacturer)

1. for purposes of monitoring and controlling compliance by the equipment operator to predetermined and agreed upon rules, and when meeting the rules giving authorization codes to the equipment operator (for continued operation of equipment.)

a) such as x percent of article bins for vending the article of a particular manufacturer b) x percent for no bins of a competitor's article c) maintaining payments for article being timely made and current including rental lease payments, etc.

d) any other agreed upon terms (i.e., reporting in a timely manner)

e) meeting terms gives access to the proper encrypted data f) allowing food company access to machine location and sales data IV. Possible On-Board Machine Enforcement Features A. Machine Defaults to Shut-down When:

1. predetermined time intervals, e.g., every three months 2. based on tampering of the machine via physical movement, or removal of computer board for control system, or removal of article ID or tampering with article ID system 3. full or partial shut-down of machine based on non-inherence to authorized article sales 4. based on a given dollar amount of sales within a given time interval 5. to reconcile the account once per year based upon time, for example, x sales, like a debit card with no time limit or 6. x sales per unit time (e.g., $2000/3 mos.)

a) the above two billing schemes require periodic payments, monthly or yearly, and if not paid by a certain time or if paid late, the machine is preprogrammed to shut down, or it can be manually shut-down using wireless control, etc.

B. Machine Requires Authorization Code From a Governing Body (e.g., The Central Data Processing Center)

1. prior to restarting.the machine after a shut-down 2. prior to shutting down, based on an agreed upon time interval shut-down 3. obtain authorization codes from a governing body in order to allow machine to continue its operation a) prior to a total dollar sale amount meter running low, or b) prior to a timed shut-down, or c) restarting after a prior shut-down C. Controlled Partial Shut-Down Of The Storage Area 1. in response to detection of unauthorized article in system V. Alternatives To Consider A. Default Is To Shut Down Machine 1. machine internally senses improper sales, or adherence to rules and shuts itself down Restricted Vending Machine 1. Revenue sharing: where payments by the operator or renter/lessee to the owner/lessor of the equipment are based on usage of the machine or, usage can be based on operation cycles, an accounting of time that the operator has had use of the equipment, the amount of money that the apparatus has generated, etc.

Typically, revenue sharing between an owner and an operator of the apparatus is based on DATA descriptive of the usage/operation of the machine. Prior art attempts at revenue sharing have been less than satisfactory because usage data can be falsely reported, or not reported at all. Furthermore most revenue sharing arrangements between an owner and an operator require the operator to make payments to the owner, which payments can be difficult to collect, especially since the owner may not even know exactly where the equipment is located.

For these and other reasons, the present invention provides an equipment (such as a vending machine) which has a built in enforcement system. This enforcement system partially or fully disables the apparatus in the event that the machine is not operated in accordance with preset rules which the operator and the owner of the machine agreed upon in advance. Revenue sharing arrangements can include linking the operator's cost of using an apparatus to the revenue which the apparatus will generate. Therefore it is possible to make equipment available to an operator in a way that reduces the operator's risk. This risk to the operator is reduced since the typically fixed costs associated with renting or buying the equipment are now variable. This enables the operator to have much more flexibility and encourages business expansion into business opportunities that would have previously been riskier or not viable at all. This has benefits for both the equipment operator (e.g. reduced risk and greater financial flexibility) and the equipment owner (e.g. increased sales of equipment, and can offer same equipment at variable costs to customers based on usage without jeopardizing the high profits which are generated by conventional sales on equipment which may have no restrictions).

Obviously, the revenue sharing business method can include sharing revenues or revenue based payments with parties other than the operator and/ or the owner, such as payments to a product producer who is subsidizing the equipment or a real estate owner who provides space for the equipment (e.g. such as at a shopping mall or a factory).

2. Adherence to rules agreed upon by an equipment operator and owner (or other party with a vested interest) of the machine. In the case that, as an example, a product producer who may sell the products or services to be vended from the apparatus (or another interested party) wishes to subsidize (partially or fully) the cost of a piece of equipment, there are often rules that the parties agree to in advance. These rules may typically require the operator to sell only certain types or kinds of merchandise through the equipment. Various arrangements are generally known where usage of a part or all of a piece of equipment will be restricted to a certain type of product or a specific brand. However, again these relationships have been based on trust and whatever reporting methods can be employed. In some cases, electronic reporting from the equipment directly or indirectly through a communication device can be used to inform the necessary parties as to the true nature of the usage of the machine. Several problems still exist however.

One problem is that the owner has little or no direct way of enforcing his agreement with the operator. Currently, the Owner or interested party (perhaps in this case, a product producer) may have a difficult time verifying the reports from the equipment operator. Furthermore, the operator may not always be willing to be cooperative with the owner or other party and may not give them access to the necessary data from the apparatus. Even still further, even if an operator is willing to share data with another party, the operator may also find it hard to authenticate the specific products vended from an apparatus. For example, in a traditional spiral type vending machine, the selection D2 may be thought of as storing one specific type or brand of product, when in reality the spiral instead is storing and dispensing a totally different brand or type of product. Regardless of whether the equipment is intentionally or unintentionally loaded incorrectly, the route person in the field might be the only one who realizes the discrepancy (if anyone realizes it at all). Therefore it is desirable to have the ability to Verify the identity of the actual product being stored in the apparatus.

Other attempts have been made to utilize bar code scanners in vending machines in order to try and detect unauthorized product in the machine. The Sanyo patent JP 4123194 and the Murphy Patent U.S. Pat. No. 5,390,711 both show some ways of trying to achieve this. The Sanyo patent shows bar code scanners at the loading point of a conventional beverage machine, whereby any unauthorized product would be detected at the time the product is loaded. This design may show some benefit in the case of the machine operator or route service loading person who simply tries to mistakenly put the wrong product in the machine. However, this design does little to actually prevent an intentional attempt by an operator or other person trying to put unauthorized product into the machine. This is due to the fact that if the detection of unauthorized products is occurring when the machine is being loaded, then that person could easily defeat the scanner in several ways. For one, the route person could cover up the bar code scanner with paper or another object while loading the machine. In another case, someone could simply have a piece of paper with an authorized bar code printed on it and by waving that over the bar code scanner, the machine will be tricked into vending unauthorized product. Referring to the patent by Murphy, the same problem is dealt with in a somewhat similar manner. By placing a bar code scanner at each spiral (product storage area) and with a relatively complex scanning mechanism, Murphy attempts to disable the machine from dispensing unauthorized product. Both Sanyo and Murphy require one Scanner or product identification system for each storage area (spiral or column of cans). This makes the practical usefulness of the designs very limited, since scanners are relatively expensive, delicate, and require accurate proximity to the code to be scanned in order to be effective. Murphy is an improvement over Sanyo, in one sense, in that it minimizes the chance of cheating by a route person since the verification of each code occurs before dispensing not at the time of loading. Murphy further shows that cheating attempts by covering over the scanner will shut down the operation of the machine.

A further disadvantage of both Sanyo and Murphy is the fact that bar code scanners and other ID devices are very sensitive to reading the code within a highly defined proximity. The prior art described, shows the scanners in a fixed position with the products to be scanned also in a highly defined position. This is also very impractical if the machine is going to be able to store and vend objects and articles of various sizes and shapes. Spiral machines are designed to hold various types of articles and packages in one spiral at the same time. Therefore, in order for a design such as Murphy's to work effectively, it would require a reliable identification of product every time.

Thus, some of the benefits of the present invention are as follows:

In the present invention there is described a multi-axis dispensing and product positioning mechanism. As product is removed from the storage areas the product or articles can be brought within proximity to (over ) the Product ID (scanner). This design is far more efficient and an improvement over the prior art in several ways. For example, in the present invention there is only the need for as few as one product ID devices, since the dispensing mechanism carries the product to the ID device. Due to the cost and delicate nature of installing these types of devices in a machine of this cost, a dramatic cost savings and increased reliability are now achieved with the present invention.

Additionally, the product positioning system can manipulate the product to be scanned or identified until the control system gives back a signal confirming that a code has been read or permission to vend the product without a successful product ID.

The preferred embodiment of the present invention is described with a storage system of containers which hold product which is of uniform type. Additionally, in the preferred embodiment the product is merchandised using graphics on the outside of the machine in such a way that the end customer is usually not able to see the actual package or article to be dispensed. This type of merchandising also forces the operator to keep only one article type in any given bin and preprogrammed to at least one specific selection key. If the entire, or a large portion of the front of the machine comprises a single graphic, it further enhances this "enforcement" aspect of the invention.

While the present invention has a more reliable code reading method, the dedicated nature of the product storage bins (due to the graphics blocking a view of the products by the user) allows for a system which doesn't need to read 100% of the packages from any given container in order to determine that authorized product is generally being stored there. This enables the control system of the present embodiment to analyze the statistical data of the codes read or not read from a given container. With this analysis, the control system can determine whether it can allow a certain amount of acceptable error in the loading or the mis-loading of the product in the machine.

Using an algorithm, the control system can also detect whether product is perhaps being loaded into the machine in a position which makes the code unreadable. Regardless of the determination of the control system based on the desired strictness of the algorithm, the control system can then communicate the problem to an external computer, the digital display on the machine or simply to maintain the information in memory for use at a later time.

The scanner can also be used for traditional uses like inventory control and accountability, as well as time stamping for preventing sale of food product which is stale. In the present invention, if the control system determines that the article is not authorized, the control system can disable access to that product storage bins/area or disable the entire machine.

One problem facing vending machine operators is the control of the product selections placed in machines by their route personnel. Managers of vending companies often want machines merchandised in a specific way with a specific product selection plan (i.e., according to a plan-o-gram). They find it difficult to enforce a discipline in their route personnel who actually load the machines. The person actually loading or restocking the machine often tends to have his own preferences regarding the selections of products to be stocked in the machine.

Accordingly:

These preferred embodiments solve this problem by guaranteeing that the verified product specific sales data is captured and can be analyzed by the appropriate person.

Furthermore, the control system in the preferred embodiment has the ability to monitor and measure the effectiveness, accuracy, and discipline of a given route person in adhering to the prescribed merchandising plan. For example, the controls system can monitor 1) the time it takes between the service door opening and closing again, to indicate the total loading time that a driver spent at a machine, 2) the number of unauthorized products (if any) that the driver (route person) may have put in the machine, or 3) if the route person is filling all selections in the machine up to a sufficient capacity (this is achieved by measuring the known number of vends which occurred on a given product between the last fill servicing and the point at which a given selection is sold out and comparing that number to the known capacity that a given selection is capable of storing in a specific container).

There are several purposes that this employee performance data can be used for. For example, the performance data can be analyzed by software residing on the machine control system or at an external site, and this analysis can be used to calculate at least one performance measurement which can then be displayed or communicated to the route person at the machine or to a reporting system which can give a more detailed analysis. The analysis can, for example include showing the affect that the performance has had on revenue at a particular machine and can also show the employee the positive or negative impact that his performance at a given machine (or a conglomerated group of machines) has had on his/her potential commission or bonus incentives. In this way, monitoring machine performance, especially as it relates to the service record of a given employee, creates a powerful tool which can be used in order to educate, discipline and motivate the employee in an automated fashion. Every time that a service person stops at a machine to service it, he will automatically be seeing his performance rating on that machine (or a group of machines) based on an analysis of the machine's problem and fill levels since the last time that the route person was at that machine. In doing the analysis in this way, it gives feedback to the employee in a manner which links his incentives on a given machine to that machine. It is well known that incentives or punishment are most effective when they are linked to a specific action or inaction and that the measurement of the performance be given as soon as possible after the occurrence of the event that is being assessed.

Product Identification

Description:

The apparatus will have product identification (product ID device) means which could include but is not limited to at least one of a bar code scanner, a magnetic reading device, an optical image recognition device, a radio frequency ID device, a video camera, a digital camera. The product ID device (or multiple devices) is used in conjunction with the dispensing and storage apparatus and is capable of identifying the products which are being dispensed from the apparatus. Checking the product ID after it has been removed from the storage area or at least just before the product moves from it's storage area is preferable to checking the product during loading or at other times. This is true especially when the ID device is being utilized as described here, for the If anyone tampers with a communication device such as a wireless device connected to the machine, the machine can be programmed to disable itself, and re-enable only with a proper authorization code.

As described at the beginning of this application, the inventive techniques described herein can also be utilized for other applications such as leased business equipment and other types of equipment and machinery.

Additionally:

Gravity feed dispensing system where article "falls" past a centrally located article identification system a. to enable:

shut-down, full or partial for counting data and inventory control plan-o-gram enforceability for proper article layout by route driver as an incentive bonus with interior display and monitor of bonus program provided to route driver Business Method for Manufacture of Vending Machines manufacturer desires to sell equipment at discount price, where price is tied to the end use of the equipment without leaving any money on the table, the equipment users can use the equipment, i.e., a Pay As You Vend (PAYV) system.

Further Embodiments

Further embodiments and aspects of the invention are described next and the below text is intended to be read in conjunction with the foregoing text and Figures.

Thus, in one embodiment, a multiple robot configuration for example, may be contained within a warehousing structure. The system can utilize a common computer system to control all processes including conveyance, dispensing and monitoring whereby at least one conveyor system for moving a containment structure, such as a bag, basket, box or other type of container from one location to another, the system further having at least two robots are positioned so as to be operative to remove articles from storage bins (e.g. Typically articles of different types with different storage requirements) within the reach of the respective robots. The conveyor system which may be of many varied methods generally known can convey the container in order to allow the robots to place articles within their reach into the common bag or box prior to dispensing or conveying the container or box to a customer retrieval location. This customer retrieval location or locations can be remote to the housing structure that contains the article storage facilities and or the article conveyor systems.

Additionally the other described aspects of the invention, such as article ID systems, control techniques and mechanical apparatus described herein may be applied to this embodiment. Other aspects that can be utilized advantageously here may be connection to a computer network such as the internet, LAN, WAN, Wireless etc. wherein a customer or user may monitor or order from the system. In one scenario, the user can order articles to be dispensed over the computer network and have them ready and waiting in a customer holding area so that the customer can retrieve the container or articles at a later time. A user can also use a touch screen in proximity to the automated dispensing system or retrieval area and or the remote computer system or network to check the inventory or availability of a specific item or items.

In a further embodiment, this system can also be utilized as a mini warehouse system. In this scenario, the storage areas may contain articles or packages which are placed there specifically for access and retrieval by a certain person or entity. Using a passcode or access card or similar device or using a payment method, the user can retrieve packages such as parcels, letters, or other shipped goods from the storage area. This provides for a very convenient system since traditional deliveries to a person or entities home or place of business often requiring a physical signature and for a both parties to be present to receive and have the article delivered. Instead, the delivering party and the receiving party can use the article storage and dispensing apparatus as an exchange device allowing for the two parties to carry out the transfer of goods without having the requirement of being at the same place at the same time. Additionally, the use of a pass code or a swipe card, which may be connected to a gasoline pump, or any one of a multitude of devices, including biometric devices such as facial or fingerprint recognition, could be used as a verifiable electronic signature to ensure accountability. The elements described herein can be used in various other useful combinations which are considered part of the invention.

This dispensing apparatus can be used in locations such as Gas Station islands, parking lots or convenience stores etc. whereby products are delivered to customers from the dispensing apparatus, for example, using a pneumatic tube, or a conveyor system bringing articles from a remote storage area of the vending apparatus to a location on the perimeter of the apparatus housing, or to location external and or remote to the housing of the apparatus whereby the customer interface, such as a touch screen device and remote retrieval area can be accessed by the customer for remote delivery of articles conveyed and dispensed from the vending apparatus. The described invention can be used in an automated supermarket and such things as automated storerooms or stockrooms in office buildings and commercial locations.

Furthermore, where the central computer system has software code that enables it to manage, determine, and execute the financial matters between the entities. Such matters may include debiting or crediting accounts of various of the involved entities or creating a bill or invoice for one entity to present to another entity. This financial information is determined from analysis of the information which may be communicated to the central computer system from at least one other source. Other sources may include, the control system of the vending apparatus or, for example, the computer network or system of an involved or interested entity.

In one scenario, an operator desires a vending apparatus so he can place it at a specific location. In some instances, an operator doesn't know how much activity the machine will get and he therefore may have to decide whether he can justify placing the machine at the location. One of the significant factors needed to make the decision for whether or not to place the vending machine in a location (or for that matter, whether or not to buy or lease or rent the machine at all) is obviously the cost of the machine. While various traditional financing methods may be useful to stretch out the cost of the machine over time, none of the prior art financing methods are designed to determine the payment or payments to be paid for the machine, by the operator or other interested entity, based on the performance parameters of the machine in a specific circumstance. For example, a parameter may be the amount of money inserted into the machine over a specific time period. Alternatively (or additionally) another parameter may be how many units were sold over a specific time or further without any measured relationship to a time element.

So, for example, the seller or owner of the machine may wish to lease or rent or sell the equipment to an operator or user and is willing to have the cost of the equipment to the operator or user be determined at least partially (or fully, if agreed) based on a parameter related to the machine, such as the amount of sales generated from the machine. Following this scenario, a machine manufacturer or a leasing company may be willing to lease or rent the equipment to the operator (operator could be a buyer in this case or a renter etc.) for a payment or price that is less than the traditional market price equivalent. The monthly payment may, for example, have a very nominal (or none at all) profit margin for the machine manufacturer or leasing company to benefit from initially. The regular payment (if there is agreed to be one at all) is fixed in this example and the user or operator must pay additional payments which are determined based on his usage of the equipment. Furthermore, the equipment may have a minimal or limited ability to operate, either in terms of features which are limited or in terms of usage which may be limited or restricted. So, for example, a given piece of equipment may be pre-programmed to disable if more than $3,000 of vending or revenue has occurred within a time frame of one year. The control system may be further programmed to reset a specific counter, which counts the money received by the machine, whenever the time interval of one year has passed. Therefore, if the operator finds himself having vended $2,954 dollars within a twelve month interval, he doesn't have to worry about the machine disabling, since on the first day of the new cycle the meter will turn back to $0 dollars vended and will again allow another $3,000 to be vended over the subsequent twelve months. However, if the operator has vended $3,000 worth of goods and there are still, for example, 3 months left in the year the machine will be disabled. In order to avoid the disabling of the machine, the operator would, for example, contact the management entity who controls the enabling codes for the machine and the operator would pay (or agree to be billed for) an increased ability to utilize the equipment. The operator may choose to pay for the ability to vend, for example, $1,500 of additional goods during the remaining 3 months of the year. Of course the system can be set to allow any remaining additionally ability to use purchased usage credits, to continue into the following time interval or period of the following year so in this way, an operator doesn't need to be accurate in predicting his additional usage requirements on a given machine.

The managing entity, typically a manager which represents the owner or leasing company or manufacturer, will determine (possibly automatically through use of the central computer system) whether or not to release an authorization code such as a continuation code (or an enable, re-enable etc. code as the case may be, a re-enable code is needed after the equipment has already been shut down) to the operator or entity requesting the code. Once the code is received and accepted by the computer control system of the vending apparatus, the vending machine will continue on as per the specific instructions of the latest received authorization code. The authorization code might, for example, also change the ongoing limitations of the machine if so determined. For example, if the operator and owner of the machine have agreed to increase the annual limit of the machine, from $3,000 per year to $4,500 per year, then a code can be released to the operator for communication to the machine (or transmitted to the machine directly if the connection is available) which causes the computer control system of the apparatus to modify the restriction of disabling accordingly.

Additionally, an operator could agree with a managing entity to have the ability to apply usage credits to a group of separate equipment. So in this way, the operator can apply credits to any one of several pieces of his equipment.

If an additional entity has contracted with the operator to sell a specific type of product or brand of goods, the machine and ID system can communicate to the central computer system in order to monitor compliance to the parameter. If the periodic continuation code is not input to the machine, the machine may be pre-programmed to disable part or all of the apparatus or to modify or limit in some way the features or capabilities of the machine. The authorization code required may be released by an authorized entity when the entity is satisfied that the agreement between the parties is being met.

In some cases, the contracts between numerous entities may be controlled together or separately relating to the same piece of equipment. So, for example, if the owner of a vending machine is the operator of the machine he may be interested in renting out space in the machine, much like a mall owner might rent out space in a building. Numerous entities may have an interest in the same piece of equipment. The financial investor or leasing company might simply wish to know that the machine is creating a threshold of revenue. Various sellers of goods or suppliers of products may wish to guarantee the space for storing and selling their products out of the machine. Using a central computer, which may be operated by a separate management entity, the owner/operator of the machine may have contracts with the various interested parties whereby the management entity collects, verifies, authenticates and redistributes the data relating to the vending machine. Furthermore, the management company may be authorized to debit, credit or bill various parties automatically as the data from the machine is received and analyzed. A given agreement can even design so that, depending on the performance of the sales of a given product, the operator or the supplier of goods could be required to pay the other a payment. If the product sells well, for example, the operator may be entitled to a bonus payment or rebate payment from the goods producer. However, if the sales of the goods are poor, the operator may be require to refund a portion or all of the rental payment which the goods producer paid for renting the machine space. This information and transaction of funds can all be processed by one or more central computer systems which are communicating directly or indirectly with all of the relevant entities. In another agreement relating to the same machine, the operator may be required to make payments to buy the machine from the machine producer. The machine producer may contract with the operator, and the management company for receiving at least part of the payment or compensation for the machine as coming from the payments being made by yet another entity such as the goods producer. So, for example, if the goods producer is debited for a rebate owed to the operator, the operator could assign part or all of the payment to be transferred directly or indirectly to the account of another entity, such as the machine manufacturer. In this way, accounts can be settled or bartered or exchanged between multiple parties without necessarily having the monies transfer to initial recipient. The central computer then acts as an exchange system which can facilitate numerous business dealings, both monetary as well as non-monetary exchanges, communications and services.

As described above, numerous scenarios are contemplated by the present invention which utilize the described invention and many permutations of the invention are possible.

The following numbered paragraphs provide further details concerning the elements, actions, and/or steps that are contemplated as falling within the scope of the methods and/or apparatus of the present invention:

1. A vending apparatus, comprising:

at least one storage area being operable to store goods for sale;

at least one retrieving device operable to retrieve the goods from the storage area and to dispense the goods from the vending apparatus; and a processing unit operable to (i) permit the dispensing of goods from the vending apparatus for an interval, (ii) partially disable the vending apparatus from dispensing at least some of the goods at an end of the interval, and (iii) not at least partially disable the vending apparatus at the end of the interval if a continuation code is received by the vending apparatus before the end of the interval.

2. The vending apparatus of paragraph 1, wherein the processing unit is further operable to (iii) continue the partial disablement of the vending apparatus for a predefined period of time after the end of the interval irrespective of whether the continuation code was received before the end of the interval, and (iv) at least partially re-enable the vending apparatus if the continuation code is received by the vending apparatus before or after the end of the interval.

3. The vending apparatus of paragraph 1, wherein the goods are packaged goods.

4. The vending apparatus of paragraph 1, wherein the interval represents at least one of (i) one or more predefined periods of time; (ii) one or more predefined numbers of vends of goods from the vending apparatus; (iii) one or more predefined quanta of sales by the vending apparatus.

5. The vending apparatus of paragraph 4, wherein the processing unit is further operable to at least one of reset and modify the interval in response to the vending apparatus receiving the continuation code.

6. The vending apparatus of paragraph 5, wherein the continuation code includes an interval modification instruction and the processing unit is further operable to at least one of reset and modify the interval in response thereto.

7. The vending apparatus of paragraph 6, wherein the processing unit is further operable to at least one of increase and decrease the interval in response to the interval modification instruction.

8. The vending apparatus of paragraph 1, wherein the processing unit is further operable to decode the continuation code, the continuation code having been encrypted prior to making it available to the vending apparatus.

9. The vending apparatus of paragraph 1, further comprising at least one of:

a goods selection keypad into which the continuation code may be entered into the vending apparatus;

a dedicated keypad into which the continuation code may be entered into the vending apparatus;

a data port through which the continuation code may be entered into the processing unit of the vending apparatus; and a communications unit operable to connect the vending apparatus to a communications network such that the continuation code may be input into the vending apparatus over the communications network.

10. The vending apparatus of paragraph 9, wherein the communications network includes at least one of a wire network, a telephone network, a radio frequency link, an infrared link, a local area network, a wide area network, and the Internet.

11. The vending apparatus of paragraph 1, wherein the processing unit is further operable to subject the sales of goods from the vending apparatus to at least one limitation.

12. The vending apparatus of paragraph 11, wherein processing unit is further operable to modify the at least one limitation in response to at least one limitation modification instruction contained in the continuation code.

13. The vending apparatus of paragraph 11, wherein the at least one limitation includes at least one of: (i) that the vending apparatus is required to vend only authorized goods; (ii) that inventory of one or more goods must be maintained in the vending apparatus; (iii) that goods must be displayed in the vending apparatus in a prescribed way; (iv) that advertising indicia must be displayed on the vending apparatus in a prescribed way; (v) that a prescribed ratio of a quantum of one or more goods to a quantum of storage space for goods in the vending apparatus must be maintained; (vi) that a prescribed number of goods selections in the vending apparatus must be maintained; (vii) that prescribed quanta of one or more goods must be dispensed from the vending apparatus in a predefined period of time; (viii) that a prescribed quantum of money must be received at the vending apparatus in a predefined period of time; (ix) that a prescribed ratio of one or more of the goods to one or more others of the goods must be vended from the vending apparatus; (x) that a prescribed ratio of one or more of the goods to one or more others of the goods must be vended from the vending apparatus in a predefined period of time; and (xi) that the vending apparatus must be maintained in operation to a prescribed degree.

14. The vending apparatus of paragraph 13, wherein the limitation that the vending apparatus is required to vend only authorized goods includes at least one of: (i) selling only goods of an authorized type; (ii) selling only goods of an authorized brand; (iii) selling only goods of an authorized size; (iv) selling only goods of an authorized weight; (v) selling only goods of an authorized expiration date; (vi) selling only goods of an authorized package type; (vii) selling only goods of an authorized period of manufacture; and (viii) selling only goods of an authorized place of manufacture.

15. The vending apparatus of paragraph 13, further comprising an article ID device operable to scan each article of goods that is dispensed from the vending apparatus and to provide information to the processing unit as to whether the limitation that the vending apparatus is required to vend only authorized goods is either met or violated.

16. The vending apparatus of paragraph 15, wherein the article ID device includes at least one of a bar code scanner (reader), an optical reader, an image recognition system, an analog and/or digital still camera, an analog and/or digital video camera, a radio frequency identification device, and a magnetic reader.

17. The vending apparatus of paragraph 1, wherein the processing unit is further operable to enable the vending apparatus for sequential intervals so long as respective continuation codes are received by the vending apparatus for each interval, and no two sequential continuation codes are identical.

18. The vending apparatus of paragraph 1, wherein the processing unit is further operable to automatically enable the vending apparatus after a predefined period of time has elapsed after the vending apparatus has been disabled.

19. The vending apparatus of paragraph 1, wherein the processing unit is further operable to disable the vending apparatus from dispensing only a subset of the goods when the continuation code is not received before or after the end of the interval.

20. A method, comprising:

permitting the dispensing of goods from a vending apparatus for an interval, the vending apparatus including at least one storage area being operable to store goods for sale and at least one retrieving device operable to retrieve the goods from the storage area and to dispense the goods from the vending apparatus;

at least partially disabling the vending apparatus from dispensing at least some of the goods at an end of the interval; and not at least partially disabling the vending apparatus at the end of the interval if a continuation code is received by the vending apparatus before the end of the interval.

21. The method of paragraph 20, further comprising:

continuing the partial disablement of the vending apparatus for a predefined period of time after the end of the interval irrespective of whether the continuation code was received before the end of the interval; and at least partially re-enabling the vending apparatus if the continuation code is received by the vending apparatus before or after the end of the interval.

22. The method of paragraph 20, wherein the goods are packaged goods.

23. The method of paragraph 20, wherein the interval represents at least one of (i) one or more predefined periods of time; (ii) one or more predefined numbers of vends of goods from the vending apparatus; (iii) one or more predefined quanta of sales by the vending apparatus.

24. The method of paragraph 23, further comprising at least one of resetting and modifying the interval in response to the vending apparatus receiving the continuation code.

25. The method of paragraph 24, wherein the continuation code includes an interval modification instruction and the method further comprises at least one of resetting and modifying the interval in response thereto.

26. The method of paragraph 25, further comprising at least one of increasing and decreasing the interval in response to the interval modification instruction.

27. The method of paragraph 20, further comprising decoding the continuation code, the continuation code having been encrypted prior to making it available to the vending apparatus.

28. The method of paragraph 20, further comprising subjecting the sales of goods from the vending apparatus to at least one limitation.

29. The method of paragraph 28, further comprising modifying the at least one limitation in response to at least one limitation modification instruction contained in the continuation code.

30. The method of paragraph 28, wherein the at least one limitation includes at least one of: (i) that the vending apparatus is required to vend only authorized goods; (ii) that inventory of one or more goods must be maintained in the vending apparatus; (iii) that goods must be displayed in the vending apparatus in a prescribed way; (iv) that advertising indicia must be displayed on the vending apparatus in a prescribed way; (v) that a prescribed ratio of a quantum of one or more goods to a quantum of storage space for goods in the vending apparatus must be maintained; (vi) that a prescribed number of goods selections in the vending apparatus must be maintained; (vii) that prescribed quanta of one or more goods must be dispensed from the vending apparatus in a predefined period of time; (viii) that a prescribed quantum of money must be received at the vending apparatus in a predefined period of time; (ix) that a prescribed ratio of one or more of the goods to one or more others of the goods must be vended from the vending apparatus; (x) that a prescribed ratio of one or more of the goods to one or more others of the goods must be vended from the vending apparatus in a predefined period of time; and (xi) that the vending apparatus must be maintained in operation to a prescribed degree.

31. The method of paragraph 30, wherein the limitation that the vending apparatus is required to vend only authorized goods includes at least one of: (i) selling only goods of an authorized type; (ii) selling only goods of an authorized brand; (iii) selling only goods of an authorized size; (iv) selling only goods of an authorized weight; (v) selling only goods of an authorized expiration date; (vi) selling only goods of an authorized package type; (vii) selling only goods of an authorized period of manufacture; and (viii) selling only goods of an authorized place of manufacture.

32. A method, comprising:

entering into at least one contractual obligation with at least one entity concerning sales of goods from a vending apparatus; and agreeing with the at least one entity that (i) the vending apparatus may be enabled to dispense the goods for an interval, (ii) the vending apparatus is at least partially disabled from dispensing at least some of the goods at an end of the interval, and (iii) the vending apparatus is not at least partially disabled at the end of the interval if a continuation code is received by the vending apparatus before the end of the interval.

33. The method of paragraph 32, wherein the step of agreeing with the at least one entity includes that (iii) the vending apparatus remains at least partially disabled for a predefined period of time after the end of the interval irrespective of whether the continuation code was received before the end of the interval, and (iv) the vending apparatus is at least partially re-enabled if the continuation code is received by the vending apparatus before or after the end of the interval.

34. The method of paragraphs 32, wherein the goods are packaged goods.

35. The method of paragraph 32, wherein the interval represents at least one of (i) one or more predefined periods of time; (ii) one or more predefined numbers of vends of goods from the vending apparatus; (iii) one or more predefined quanta of sales by the vending apparatus.

36. The method of paragraph 35, wherein the interval is at least one of reset and modified in response to the vending apparatus receiving the continuation code.

37. The method of paragraph 36, wherein the continuation code includes an interval modification instruction and the interval is at least one of reset and modified in response thereto.

38. The method of paragraph 37, wherein the interval is at least one of increased and decreased in response to the interval modification instruction.

39. The method of paragraph 32, further comprising agreeing with the at least one entity that the continuation code is made available to the vending apparatus after a determination is made that the at least one contractual obligation with the at least one entity has been at least one of satisfied and waived.

40. The method of paragraph 32, further comprising:

determining whether the at least one contractual obligation with the at least one entity has been at least one of satisfied and waived; and making the continuation code available to the vending apparatus.

41. The method of paragraph 40, further comprising encrypting the continuation code prior to making it available to the vending apparatus.

42. The method of paragraph 40, further comprising making the continuation code available to the vending apparatus if the at least one contractual obligation has been at least one of satisfied and waived.

43. The method of paragraph 40, further comprising making the continuation code available to the vending apparatus even if the at least one contractual obligation has not been at least one of satisfied and waived.

44. The method of paragraph 40, wherein an authorized third party receives prescribed data concerning the sales of goods from the vending apparatus, determines whether the at least one contractual obligation with the at least one entity has been satisfied based on at least some of the prescribed data, and makes the continuation code available to the vending apparatus.

45. The method of paragraph 40, further comprising:

communicating with an authorized third party responsible for receiving prescribed data concerning the sales of goods from the vending apparatus; and determining whether the at least one contractual obligation with the at least one entity has been satisfied based on at least some of the prescribed data.

46. The method of paragraph 43, further comprising making the continuation code available to the vending apparatus if the at least one contractual obligation has been at least one of satisfied and waived.

47. The method of paragraph 43, further comprising authorizing the third party to make the continuation code available to the vending apparatus.

48. The method of paragraph 40, 44 or 47, wherein the step of making the continuation code available to the vending apparatus includes at least one of:

generating the continuation code and releasing the continuation code to the vending apparatus, to an intermediary entity, or to an entity responsible for inputting the continuation code into the vending apparatus; and authorizing a third party to at least one of generate the continuation code and release the continuation code to the vending apparatus, to an intermediary entity, or to an entity responsible for inputting the continuation code into the vending apparatus.

49. The method of paragraph 48, wherein at least one of the step of releasing the continuation code to the vending apparatus and inputting the continuation code into the vending apparatus includes at least one of:

entering the continuation code into the vending apparatus through a goods selection keypad on the vending apparatus;

entering the continuation code into the vending apparatus through a dedicated keypad on the vending apparatus;

entering the continuation code into the vending apparatus through a portable computing device operable to connect to a data port of the vending apparatus; and entering the continuation code into the vending apparatus over a communications network to which the vending apparatus is connected.

50. The method of paragraph 49, wherein the communications network includes at least one of a wire network, a telephone network, a radio frequency link, an infrared link, a local area network, a wide area network, and the Internet.

51. The method of paragraph 32, further comprising agreeing with the at least one entity that the sales of goods from the vending apparatus are subject to at least one limitation.

52. The method of paragraph 51, wherein the continuation code includes at least one limitation modification instruction and the at least one limitation is modified in response thereto.

53. The method of paragraph 52, wherein the at least one limitation includes at least one of: (i) that the vending apparatus is required to vend only authorized goods; (ii) that inventory of one or more goods must be maintained in the vending apparatus; (iii) that goods must be displayed in the vending apparatus in a prescribed way; (iv) that advertising indicia must be displayed on the vending apparatus in a prescribed way; (v) that a prescribed ratio of a quantum of one or more goods to a quantum of storage space for goods in the vending apparatus must be maintained; (vi) that a prescribed number of goods selections in the vending apparatus must be maintained; (vii) that prescribed quanta of one or more goods must be dispensed from the vending apparatus in a predefined period of time; (viii) that a prescribed quantum of money must be received at the vending apparatus in a predefined period of time; (ix) that a prescribed ratio of one or more of the goods to one or more others of the goods must be vended from the vending apparatus; (x) that a prescribed ratio of one or more of the goods to one or more others of the goods must be vended from the vending apparatus in a predefined period of time; and (xi) that the vending apparatus must be maintained in operation to a prescribed degree.

54. The method of paragraph 39 or 40, wherein the at least one contractual obligation includes at least one of: (i) an obligation not to steal receipts; (ii) an obligation to provide a quantum of money to the at least one entity based on the sales of goods from the vending apparatus; and (iii) an obligation not to tamper with the vending apparatus.

55. The method of paragraph 54, wherein tampering with the vending apparatus includes at least one of: (i) tampering with a goods identification sensor of the vending apparatus that is operable to determine details of a particular good as it is vended from the vending apparatus; (ii) tampering with a controller of the vending apparatus; and (iii) relocating the vending apparatus.

56. The method of paragraph 39 or 40, wherein the at least one contractual obligation includes at least one of: (i) an obligation to vend only authorized goods; (ii) an obligation to maintain inventory of one or more goods in the vending apparatus; (iii) an obligation not to steal receipts; (iv) an obligation to provide a quantum of money to the at least one entity based on the sales of goods from the vending apparatus; (v) an obligation to display goods in the vending apparatus in a prescribed way; (vi) an obligation to display advertising indicia on the vending apparatus in a prescribed way; (vii) an obligation to maintain a prescribed ratio of a quantum of one or more goods to a quantum of storage space for goods in the vending apparatus; (viii) an obligation to maintain a prescribed number of goods selections in the vending apparatus; (ix) an obligation to dispense prescribed quanta of one or more goods from the vending apparatus in a predefined period of time; (x) an obligation to receive a prescribed quantum of money at the vending apparatus in a predefined period of time; (xi) an obligation to sell a prescribed ratio of one or more of the goods to one or more others of the goods; (xii) an obligation to sell a prescribed ratio of one or more of the goods to one or more others of the goods in a predefined period of time; (xiii) an obligation to make prescribed data concerning the sales of goods from the vending apparatus available to the at least one entity; (xiv) an obligation to maintain the vending apparatus in operation to a prescribed degree; and (xv) an obligation not to tamper with the vending apparatus.

57. The method of paragraph 56, wherein the obligation to sell only authorized goods includes at least one of: (i) selling only goods of an authorized type; (ii) selling only goods of an authorized brand; (iii) selling only goods of an authorized size; (iv) selling only goods of an authorized weight; (v) selling only goods of an authorized expiration date; (vi) selling only goods of an authorized package type; (vii) selling only goods of an authorized period of manufacture; and (viii) selling only goods of an authorized place of manufacture.

58. The method of paragraph 56, further comprising determining that the prescribed data concerning the sales of goods from the vending apparatus are authentic prior to making the continuation code available to the vending apparatus.

59. The method of paragraph 58, wherein the determination that the prescribed data are authentic is based on at least one of encryption and a code among the prescribed data.

60. The method of paragraph 56, wherein the prescribed data concerning the sales of goods from the vending apparatus includes at least one of: (i) a quantum of one or more types of goods sold during one or more prescribed periods of time; (ii) a quantum of one or more brands of goods sold during one or more prescribed periods of time; (iii) a ratio of one or more types of the goods sold to one or more other types of the goods sold in a predefined period of time; (iv) a ratio of one or more brands of the goods sold to one or more other brands of the goods sold in a predefined period of time; (v) respective dates of vends from the vending apparatus; (vi) respective times of vends from the vending apparatus; (vii) information concerning whether a particular good was out of inventory; (viii) information concerning what a next choice of goods was made by a purchaser when a particular good was out of inventory; (ix) information concerning whether the vending apparatus was operational; and (x) information concerning any limitations under which the vending apparatus vends the goods.

61. The method of paragraph 60, wherein the information concerning any limitations under which the vending apparatus vends the goods includes information concerning at least one of (i) whether the vending apparatus is required to vend only authorized goods; (ii) whether inventory of one or more goods must be maintained in the vending apparatus; (iii) whether goods must be displayed in the vending apparatus in a prescribed way; (iv) whether advertising indicia must be displayed on the vending apparatus in a prescribed way; (v) whether a prescribed ratio of a quantum of one or more goods to a quantum of storage space for goods in the vending apparatus must be maintained; (vi) whether a prescribed number of goods selections in the vending apparatus must be maintained; (vii) whether prescribed quanta of one or more goods must be dispensed from the vending apparatus in a predefined period of time; (viii) whether a prescribed quantum of money must be received at the vending apparatus in a predefined period of time; (ix) whether a prescribed ratio of one or more of the goods to one or more others of the goods must be vended from the vending apparatus; (x) whether a prescribed ratio of one or more of the goods to one or more others of the goods must be vended from the vending apparatus in a predefined period of time; and (xi) whether the vending apparatus must be maintained in operation to a prescribed degree.

62. The method of paragraph 56, wherein tampering with the vending apparatus includes at least one of: (i) tampering with a goods identification sensor of the vending apparatus that is operable to determine details of a particular good as it is vended from the vending apparatus; (ii) tampering with a controller of the vending apparatus; and (iii) relocating the vending apparatus.

63. The method of paragraph 32, wherein the vending apparatus may be enabled for sequential intervals so long as respective continuation codes are received by the vending apparatus for each interval, and no two sequential continuation codes are identical.

64. The method of paragraph 32, wherein after having been disabled at the end of an interval, the vending apparatus is automatically enabled after a predefined period of time has elapsed.

65. The method of paragraph 64, wherein the vending apparatus produces the continuation code after the predefined period of time has elapsed such that the vending apparatus is automatically enabled.

66. The method of paragraph 32, wherein the vending apparatus is disabled from vending only a subset of the goods when the continuation code is not received before or after the end of the interval.

67. The method of paragraph 32, wherein the at least one entity includes at least one of a manufacturer of the vending apparatus, an operator responsible to at least stock the vending apparatus with the goods and collect receipts from the vending apparatus, a seller of one or more goods to be vended from the vending apparatus, a distributor or agent of the seller of one or more goods, a lender of money to an entity to purchase the vending apparatus, a lessor of the vending apparatus to an entity, and a holder of property on which the vending apparatus is located.

68. The method of paragraph 67, further comprising the operator entering into a contract with at least one of the lender, the lessor, and the holder, wherein the at least one contractual obligation includes at least one of: (i) an obligation on the part of the operator not to steal receipts; (ii) an obligation on the part of the operator to provide one or more quanta of money to one or more of the lender, the lessor, and the holder based on the sales of goods from the vending apparatus; and (iii) an obligation on the part of the operator not to tamper with the vending apparatus.

69. The method of paragraph 67, further comprising the operator entering into a contract with at least one of the seller of goods, the distributor, and the agent, wherein the at least one contractual obligation includes at least one of: (i) an obligation to vend only authorized goods; (ii) an obligation to maintain inventory of one or more goods in the vending apparatus; (iii) an obligation not to steal receipts; (iv) an obligation to provide a quantum of money to the at least one entity based on the sales of goods from the vending apparatus; (v) an obligation to display goods in the vending apparatus in a prescribed way; (vi) an obligation to display advertising indicia on the vending apparatus in a prescribed way; (vii) an obligation to maintain a prescribed ratio of a quantum of one or more goods to a quantum of storage space for goods in the vending apparatus; (viii) an obligation to maintain a prescribed number of goods selections in the vending apparatus; (ix) an obligation to dispense prescribed quanta of one or more goods from the vending apparatus in a predefined period of time; (x) an obligation to receive a prescribed quantum of money at the vending apparatus in a predefined period of time; (xi) an obligation to sell a prescribed ratio of one or more of the goods to one or more others of the goods; (xii) an obligation to sell a prescribed ratio of one or more of the goods to one or more others of the goods in a predefined period of time; (xiii) an obligation to make prescribed data concerning the sales of goods from the vending apparatus available to the at least one entity; (xiv) an obligation to maintain the vending apparatus in operation to a prescribed degree; and (xv) an obligation not to tamper with the vending apparatus.

70. The method of paragraph 69, further comprising at least one of the seller of goods, the distributor, and the agent providing the manufacturer of the vending apparatus a quantum of money for making the vending apparatus available to the operator, wherein the vending apparatus includes limitations under which it vends the goods and will automatically be at least partially disabled if the limitations are not met.

71. The method of paragraph 70, wherein the limitations under which the vending apparatus vends the goods includes at least one of (i) that the vending apparatus is required to vend only authorized goods; (ii) that inventory of one or more goods must be maintained in the vending apparatus; (iii) that goods must be displayed in the vending apparatus in a prescribed way; (iv) that advertising indicia must be displayed on the vending apparatus in a prescribed way; (v) that a prescribed ratio of a quantum of one or more goods to a quantum of storage space for goods in the vending apparatus must be maintained; (vi) that a prescribed number of goods selections in the vending apparatus must be maintained; (vii) that prescribed quanta of one or more goods must be dispensed from the vending apparatus in a predefined period of time; (viii) that a prescribed quantum of money must be received at the vending apparatus in a predefined period of time; (ix) that a prescribed ratio of one or more of the goods to one or more others of the goods must be vended from the vending apparatus; (x) that a prescribed ratio of one or more of the goods to one or more others of the goods must be vended from the vending apparatus in a predefined period of time; and (xi) that the vending apparatus must be maintained in operation to a prescribed degree.

72. The method of paragraph 68 or 69, wherein the continuation code is made available to the vending apparatus after a determination is made that the at least one contractual obligation with the lessor has been at least one of satisfied and waived.

73. The method of paragraph 68 or 69, wherein at least one of the lender, the lessor, the holder, the seller of goods, the distributor, and the agent determines whether the operator has satisfied the at least one contractual obligation and makes the continuation code available to the vending apparatus after the determination has been made.

74. The method of paragraph 73, wherein:

the vending apparatus is not at least partially disabled at the end of the interval if a plurality of continuation codes are received by the vending apparatus before the end of the interval; and at least two of the lender, the lessor, the holder, the seller of goods, the distributor, and the agent makes the plurality of continuation codes available to the vending apparatus after the determination has been made.

75. A vending apparatus, comprising:

at least one storage area being operable to store goods for sale;

at least one retrieving device operable to retrieve the goods from the storage area and to dispense the goods from the vending apparatus; and a processing unit operable to (i) permit the dispensing of the goods from the vending apparatus, and (ii) at least partially disable the vending apparatus from dispensing at least some of the goods when an externally generated disable code is received by the vending apparatus.

76. The vending apparatus of paragraph 75, wherein the goods are packaged goods.

77. The vending apparatus of paragraph 75, wherein the processing unit is further operable to decode the disable code, the disable code having been encrypted prior to being received by the vending apparatus.

78. The vending apparatus of paragraph 75, further comprising a goods selection keypad into which the disable code may be entered into the vending apparatus;

a dedicated keypad into which the disable code may be entered into the vending apparatus;

a data port through which the disable code may be entered into the processing unit of the vending apparatus; and a communications unit operable to connect the vending apparatus to a communications network such that the disable code may be input into the vending apparatus over the communications network.

79. The vending apparatus of paragraph 78, wherein the communications network includes at least one of a wire network, a telephone network, a radio frequency link, an infrared link, a local area network, a wide area network, and the Internet.

80. The vending apparatus of paragraph 75, wherein the processing unit is operable to disable the vending apparatus from dispensing only a subset of the goods when the disable code is not received before or after the end of the interval.

81. A method, comprising:

permitting the dispensing of goods from a vending apparatus, the vending apparatus including at least one storage area being operable to store the goods for sale and at least one retrieving device operable to retrieve the goods from the storage area and to dispense the goods from the vending apparatus; and at least partially disabling the vending apparatus from dispensing at least some of the goods when an externally generated disable code is received by the vending apparatus.

82. The method of paragraph 81, wherein the goods are packaged goods.

83. The method of paragraph 81, further comprising decoding the disable code, the disable code having been encrypted prior to being received by the vending apparatus.

84. The method of paragraph 81, further comprising disabling the vending apparatus from dispensing only a subset of the goods when the disable code is not received before or after the end of the interval.

85. A method, comprising:

entering into at least one contractual obligation with at least one entity concerning sales of goods from a vending apparatus; and agreeing with the at least one entity that (i) the vending apparatus may be enabled to dispense the goods, and (ii) the vending apparatus may be at least partially disabled from dispensing at least some of the goods when an externally generated disable code is received by the vending apparatus.

86. The method of paragraph 81, wherein the goods are packaged goods.

87. The method of paragraph 81, further comprising agreeing with the at least one entity that the disable code may be made available to the vending apparatus after a determination is made that the at least one contractual obligation with the at least one entity has not been at least one of satisfied and waived.

88. The method of paragraph 81, further comprising:

determining whether the at least one contractual obligation with the at least one entity has been at least one of satisfied and waived; and making the disable code available to the vending apparatus if the at least one contractual obligation has not been at least one of satisfied and waived.

89. The method of paragraph 88, further comprising encrypting the disable code prior to making it available to the vending apparatus.

90. The method of paragraph 88, wherein an authorized third party receives prescribed data concerning the sales of goods from the vending apparatus, determines whether the at least one contractual obligation with the at least one entity has been satisfied based on at least some of the prescribed data, and makes the disable code available to the vending apparatus if the at least one contractual obligation has not been at least one of satisfied and waived.

91. The method of paragraph 88, further comprising:

communicating with an authorized third party responsible for receiving prescribed data concerning the sales of goods from the vending apparatus; and determining whether the at least one contractual obligation with the at least one entity has been satisfied based on at least some of the prescribed data.

92. The method of paragraph 91, further comprising making the disable code available to the vending apparatus if the at least one contractual obligation has not been at least one of satisfied and waived.

93. The method of paragraph 91, further comprising authorizing the third party to make the disable code available to the vending apparatus if the at least one contractual obligation has not been at least one of satisfied and waived.

94. The method of paragraph 88, 90 or 93, wherein the step of making the disable code available to the vending apparatus includes at least one of:

generating the disable code and releasing the disable code to the vending apparatus, to an intermediary entity, or to an entity responsible for inputting the disable code into the vending apparatus; and authorizing a third party to at least one of generate the disable code and release the disable code to the vending apparatus, to an intermediary entity, or to an entity responsible for inputting the disable code into the vending apparatus.

95. The method of paragraph 94, wherein at least one of the step of releasing the disable code to the vending apparatus and inputting the disable code into the vending apparatus includes at least one of:

entering the disable code into the vending apparatus through a goods selection keypad on the vending apparatus;

entering the disable code into the vending apparatus through a dedicated keypad on the vending apparatus;

entering the disable code into the vending apparatus through a portable computing device operable to connect to a data port of the vending apparatus; and entering the disable code into the vending apparatus over a communications network to which the vending apparatus is connected.

96. The method of paragraph 95, wherein the communications network includes at least one of a wire network, a telephone network, a radio frequency link, an infrared link, a local area network, a wide area network, and the Internet.

97. The method of paragraph 87 or 88, wherein the at least one contractual obligation includes at least one of: (i) an obligation not to steal receipts; (ii) an obligation to provide a quantum of money to the at least one entity based on the sales of goods from the vending apparatus; and (iii) an obligation not to tamper with the vending apparatus.

98. The method of paragraph 97, wherein tampering with the vending apparatus includes at least one of: (i) tampering with a goods identification sensor of the vending apparatus that is operable to determine details of a particular good as it is vended from the vending apparatus; (ii) tampering with a controller of the vending apparatus; and (iii) relocating the vending apparatus.

99. The method of paragraph 87 or 88, wherein the at least one contractual obligation includes at least one of: (i) an obligation to vend only authorized goods; (ii) an obligation to maintain inventory of one or more goods in the vending apparatus; (iii) an obligation not to steal receipts; (iv) an obligation to provide a quantum of money to the at least one entity based on the sales of goods from the vending apparatus; (v) an obligation to display goods in the vending apparatus in a prescribed way; (vi) an obligation to display advertising indicia on the vending apparatus in a prescribed way; (vii) an obligation to maintain a prescribed ratio of a quantum of one or more goods to a quantum of storage space for goods in the vending apparatus; (viii) an obligation to maintain a prescribed number of goods selections in the vending apparatus; (ix) an obligation to dispense prescribed quanta of one or more goods from the vending apparatus in a predefined period of time; (x) an obligation to receive a prescribed quantum of money at the vending apparatus in a predefined period of time; (xi) an obligation to sell a prescribed ratio of one or more of the goods to one or more others of the goods; (xii) an obligation to sell a prescribed ratio of one or more of the goods to one or more others of the goods in a predefined period of time; (xiii) an obligation to make prescribed data concerning the sales of goods from the vending apparatus available to the at least one entity; (xiv) an obligation to maintain the vending apparatus in operation to a prescribed degree; and (xv) an obligation not to tamper with the vending apparatus.

100. The method of paragraph 99, wherein the obligation to sell only authorized goods includes at least one of: (i) selling only goods of an authorized type; (ii) selling only goods of an authorized brand; (iii) selling only goods of an authorized size; (iv) selling only goods of an authorized weight; (v) selling only goods of an authorized expiration date; (vi) selling only goods of an authorized package type; (vii) selling only goods of an authorized period of manufacture; and (viii) selling only goods of an authorized place of manufacture.

101. The method of paragraph 99, wherein the prescribed data concerning the sales of goods from the vending apparatus includes at least one of: (i) a quantum of one or more types of goods sold during one or more prescribed periods of time; (ii) a quantum of one or more brands of goods sold during one or more prescribed periods of time; (iii) a ratio of one or more types of the goods sold to one or more other types of the goods sold in a predefined period of time; (iv) a ratio of one or more brands of the goods sold to one or more other brands of the goods sold in a predefined period of time; (v) respective dates of vends from the vending apparatus; (vi) respective times of vends from the vending apparatus; (vii) information concerning whether a particular good was out of inventory; (viii) information concerning what a next choice of goods was made by a purchaser when a particular good was out of inventory; (ix) information concerning whether the vending apparatus was operational; and (x) information concerning any limitations under which the vending apparatus vends the goods.

102. The method of paragraph 101, wherein the information concerning any limitations under which the vending apparatus vends the goods includes information concerning at least one of (i) whether the vending apparatus is required to vend only authorized goods; (ii) whether inventory of one or more goods must be maintained in the vending apparatus; (iii)

whether goods must be displayed in the vending apparatus in a prescribed way; (iv) whether advertising indicia must be displayed on the vending apparatus in a prescribed way; (v) whether a prescribed ratio of a quantum of one or more goods to a quantum of storage space for goods in the vending apparatus must be maintained; (vi) whether a prescribed number of goods selections in the vending apparatus must be maintained; (vii) whether prescribed quanta of one or more goods must be dispensed from the vending apparatus in a predefined period of time; (viii) whether a prescribed quantum of money must be received at the vending apparatus in a predefined period of time; (ix) whether a prescribed ratio of one or more of the goods to one or more others of the goods must be vended from the vending apparatus; (x) whether a prescribed ratio of one or more of the goods to one or more others of the goods must be vended from the vending apparatus in a predefined period of time; and (xi) whether the vending apparatus must be maintained in operation to a prescribed degree.

103. The method of paragraph 99, wherein tampering with the vending apparatus includes at least one of: (i) tampering with a goods identification sensor of the vending apparatus that is operable to determine details of a particular good as it is vended from the vending apparatus; (ii) tampering with a controller of the vending apparatus; and (iii) relocating the vending apparatus.

104. The method of paragraph 81, wherein the vending apparatus is disabled from vending only a subset of the goods when the disable code is not received before or after the end of the interval.

105. The method of paragraph 81, wherein the at least one entity includes at least one of a manufacturer of the vending apparatus, an operator responsible to at least stock the vending apparatus with the goods and collect receipts from the vending apparatus, a seller of one or more goods to be vended from the vending apparatus, a distributor or agent of the seller of one or more goods, a lender of money to an entity to purchase the vending apparatus, a lessor of the vending apparatus to an entity, and a holder of property on which the vending apparatus is located.

106. The method of paragraph 105, further comprising the operator entering into a contract with at least one of the lender, the lessor, and the holder, wherein the at least one contractual obligation includes at least one of: (i) an obligation on the part of the operator not to steal receipts; (ii) an obligation on the part of the operator to provide one or more quanta of money to one or more of the lender, the lessor, and the holder based on the sales of goods from the vending apparatus; and (iii) an obligation on the part of the operator not to tamper with the vending apparatus.

107. The method of paragraph 105, further comprising the operator entering into a contract with at least one of the seller of goods, the distributor, and the agent, wherein the at least one contractual obligation includes at least one of: (i) an obligation to vend only authorized goods; (ii) an obligation to maintain inventory of one or more goods in the vending apparatus; (iii) an obligation not to steal receipts; (iv) an obligation to provide a quantum of money to the at least one entity based on the sales of goods from the vending apparatus; (v) an obligation to display goods in the vending apparatus in a prescribed way; (vi) an obligation to display advertising indicia on the vending apparatus in a prescribed way; (vii) an obligation to maintain a prescribed ratio of a quantum of one or more goods to a quantum of storage space for goods in the vending apparatus; (viii) an obligation to maintain a prescribed number of goods selections in the vending apparatus; (ix) an obligation to dispense prescribed quanta of one or more goods from the vending apparatus in a predefined period of time; (x) an obligation to receive a prescribed quantum of money at the vending apparatus in a predefined period of time; (xi) an obligation to sell a prescribed ratio of one or more of the goods to one or more others of the goods; (xii) an obligation to sell a prescribed ratio of one or more of the goods to one or more others of the goods in a predefined period of time; (xiii) an obligation to make prescribed data concerning the sales of goods from the vending apparatus available to the at least one entity; (xiv) an obligation to maintain the vending apparatus in operation to a prescribed degree; and (xv) an obligation not to tamper with the vending apparatus.

108. The method of paragraph 107, further comprising at least one of the seller of goods, the distributor, and the agent providing the manufacturer of the vending apparatus a quantum of money for making the vending apparatus available to the operator, wherein the vending apparatus includes limitations under which it vends the goods and will automatically be at least partially disabled if the limitations are not met.

109. The method of paragraph 108, wherein the limitations under which the vending apparatus vends the goods includes at least one of (i) that the vending apparatus is required to vend only authorized goods; (ii) that inventory of one or more goods must be maintained in the vending apparatus; (iii) that goods must be displayed in the vending apparatus in a prescribed way; (iv) that advertising indicia must be displayed on the vending apparatus in a prescribed way; (v) that a prescribed ratio of a quantum of one or more goods to a quantum of storage space for goods in the vending apparatus must be maintained; (vi) that a prescribed number of goods selections in the vending apparatus must be maintained; (vii) that prescribed quanta of one or more goods must be dispensed from the vending apparatus in a predefined period of time; (viii) that a prescribed quantum of money must be received at the vending apparatus in a predefined period of time; (ix) that a prescribed ratio of one or more of the goods to one or more others of the goods must be vended from the vending apparatus; (x) that a prescribed ratio of one or more of the goods to one or more others of the goods must be vended from the vending apparatus in a predefined period of time; and (xi) that the vending apparatus must be maintained in operation to a prescribed degree.

110. The method of paragraph 106 or 107, wherein the disable code is made available to the vending apparatus after a determination is made that the at least one contractual obligation with the lessor has not been at least one of satisfied and waived.

111. The method of paragraph 106 or 107, wherein at least one of the lender, the lessor, the holder, the seller of goods, the distributor, and the agent determines whether the operator has satisfied the at least one contractual obligation and makes the disable code available to the vending apparatus after the determination has been made.

112. The method of paragraph 111, wherein:

the vending apparatus is not at least partially disabled unless a plurality of disable codes are received by the vending apparatus; and at least two of the lender, the lessor, the holder, the seller of goods, the distributor, and the agent makes the plurality of disable codes available to the vending apparatus after the determination has been made.

113. A vending apparatus, comprising:

at least one storage area being operable to store goods for sale;

at least one retrieving device operable to retrieve the goods from the storage area and to dispense the goods from the vending apparatus; and a processing unit operable to (i) permit the vending apparatus to dispense goods, (ii) at least partially disable the vending apparatus from dispensing at least some of the goods when a condition has occurred, and (iii) at least partially re-enabling the vending apparatus based on receiving a re-enable code.

114. The vending apparatus of paragraph 113, wherein the condition includes at least one of:

one or more limitations under which the vending apparatus vends the goods are violated;

one or more of the obligations have not been at least one of satisfied and waived;

the vending apparatus receives an externally generated disable code; and the vending apparatus reaches an end of a predefined interval without having received a continuation code that permits the vending apparatus to dispense at least some of the goods.

115. The vending apparatus of paragraph 113, wherein the goods are packaged goods.

116. The vending apparatus of paragraph 114, wherein the interval represents at least one of (i) one or more predefined periods of time; (ii) one or more predefined numbers of vends of goods from the vending apparatus; (iii) one or more predefined quanta of sales by the vending apparatus.

117. The vending apparatus of paragraph 113, wherein the re-enable code is made available to the vending apparatus after a determination is made as to whether a resolution condition has been at least one of satisfied and waived.

118. The vending apparatus of paragraph 117, wherein the resolution condition includes at least one of:

the one or more contractual obligations have been satisfied; and a penalty has been paid.

119. The vending apparatus of paragraph 113, wherein the processing unit is further operable to decode the re-enable code, the re-enable code having been encrypted prior to making it available to the vending apparatus.

120. The vending apparatus of paragraph 113, further comprising at least one of:

a goods selection keypad into which the re-enable code may be entered into the vending apparatus;

a dedicated keypad into which the re-enable code may be entered into the vending apparatus;

a data port through which the re-enable code may be entered into the processing unit of the vending apparatus; and a communications unit operable to connect the vending apparatus to a communications network such that the re-enable code may be input into the vending apparatus over the communications network.

121. The vending apparatus of paragraph 120, wherein the communications network includes at least one of a wire network, a telephone network, a radio frequency link, an infrared link, a local area network, a wide area network, and the Internet.

122. The vending apparatus of paragraph 114, wherein, the condition includes that one or more limitations under which the vending apparatus vends the goods are violated, and the one or more limitations include: (i) that the vending apparatus is required to vend only authorized goods; (ii) that inventory of one or more goods must be maintained in the vending apparatus; (iii) that goods must be displayed in the vending apparatus in a prescribed way; (iv) that advertising indicia must be displayed on the vending apparatus in a prescribed way; (v) that a prescribed ratio of a quantum of one or more goods to a quantum of storage space for goods in the vending apparatus must be maintained; (vi) that a prescribed number of goods selections in the vending apparatus must be maintained; (vii) that prescribed quanta of one or more goods must be dispensed from the vending apparatus in a predefined period of time; (viii) that a prescribed quantum of money must be received at the vending apparatus in a predefined period of time; (ix) that a prescribed ratio of one or more of the goods to one or more others of the goods must be vended from the vending apparatus; (x) that a prescribed ratio of one or more of the goods to one or more others of the goods must be vended from the vending apparatus in a predefined period of time; and (xi) that the vending apparatus must be maintained in operation to a prescribed degree.

123. The vending apparatus of paragraph 114 or 118, wherein the at least one contractual obligation includes at least one of: (i) an obligation not to steal receipts; (ii) an obligation to provide a quantum of money to the at least one entity based on the sales of goods from the vending apparatus; and (iii) an obligation not to tamper with the vending apparatus.

124. The vending apparatus of paragraph 123, wherein tampering with the vending apparatus includes at least one of: (i) tampering with a goods identification sensor of the vending apparatus that is operable to determine details of a particular good as it is vended from the vending apparatus; (ii) tampering with a controller of the vending apparatus; and (iii) relocating the vending apparatus.

125. The vending apparatus of paragraph 114 or 118, wherein the at least one contractual obligation includes at least one of: (i) an obligation to vend only authorized goods; (ii) an obligation to maintain inventory of one or more goods in the vending apparatus; (iii) an obligation not to steal receipts; (iv) an obligation to provide a quantum of money to the at least one entity based on the sales of goods from the vending apparatus; (v) an obligation to display goods in the vending apparatus in a prescribed way; (vi) an obligation to display advertising indicia on the vending apparatus in a prescribed way; (vii) an obligation to maintain a prescribed ratio of a quantum of one or more goods to a quantum of storage space for goods in the vending apparatus; (viii) an obligation to maintain a prescribed number of goods selections in the vending apparatus; (ix) an obligation to dispense prescribed quanta of one or more goods from the vending apparatus in a predefined period of time; (x) an obligation to receive a prescribed quantum of money at the vending apparatus in a predefined period of time; (xi) an obligation to sell a prescribed ratio of one or more of the goods to one or more others of the goods; (xii) an obligation to sell a prescribed ratio of one or more of the goods to one or more others of the goods in a predefined period of time; (xiii) an obligation to make prescribed data concerning the sales of goods from the vending apparatus available to the at least one entity; (xiv) an obligation to maintain the vending apparatus in operation to a prescribed degree; and (xv) an obligation not to tamper with the vending apparatus.

126. The vending apparatus of paragraph 125, wherein the obligation to sell only authorized goods includes at least one of: (i) selling only goods of an authorized type; (ii) selling only goods of an authorized brand; (iii) selling only goods of an authorized size; (iv) selling only goods of an authorized weight; (v) selling only goods of an authorized expiration date; (vi) selling only goods of an authorized package type; (vii) selling only goods of an authorized period of manufacture; and (viii) selling only goods of an authorized place of manufacture.

127. The vending apparatus of paragraph 125, further comprising determining that the prescribed data concerning the sales of goods from the vending apparatus are authentic prior to making the re-enable code available to the vending apparatus.

128. The vending apparatus of paragraph 127, wherein the determination that the prescribed data are authentic is based on at least one of encryption and a code among the prescribed data.

129. The vending apparatus of paragraph 125, wherein the prescribed data concerning the sales of goods from the vending apparatus includes at least one of: (i) a quantum of one or more types of goods sold during one or more prescribed periods of time; (ii) a quantum of one or more brands of goods sold during one or more prescribed periods of time; (iii) a ratio of one or more types of the goods sold to one or more other types of the goods sold in a predefined period of time; (iv) a ratio of one or more brands of the goods sold to one or more other brands of the goods sold in a predefined period of time; (v) respective dates of vends from the vending apparatus; (vi) respective times of vends from the vending apparatus; (vii) information concerning whether a particular good was out of inventory; (viii) information concerning what a next choice of goods was made by a purchaser when a particular good was out of inventory; (ix) information concerning whether the vending apparatus was operational; and (x) information concerning any limitations under which the vending apparatus vends the goods.

130. The vending apparatus of paragraph 129, wherein the information concerning any limitations under which the vending apparatus vends the goods includes information concerning at least one of (i) whether the vending apparatus is required to vend only authorized goods; (ii) whether inventory of one or more goods must be maintained in the vending apparatus; (iii) whether goods must be displayed in the vending apparatus in a prescribed way; (iv) whether advertising indicia must be displayed on the vending apparatus in a prescribed way; (v) whether a prescribed ratio of a quantum of one or more goods to a quantum of storage space for goods in the vending apparatus must be maintained; (vi) whether a prescribed number of goods selections in the vending apparatus must be maintained; (vii) whether prescribed quanta of one or more goods must be dispensed from the vending apparatus in a predefined period of time; (viii) whether a prescribed quantum of money must be received at the vending apparatus in a predefined period of time; (ix) whether a prescribed ratio of one or more of the goods to one or more others of the goods must be vended from the vending apparatus; (x) whether a prescribed ratio of one or more of the goods to one or more others of the goods must be vended from the vending apparatus in a predefined period of time; and (xi) whether the vending apparatus must be maintained in operation to a prescribed degree.

131. The vending apparatus of paragraph 125, wherein tampering with the vending apparatus includes at least one of: (i) tampering with a goods identification sensor of the vending apparatus that is operable to determine details of a particular good as it is vended from the vending apparatus; (ii) tampering with a controller of the vending apparatus; and (iii) relocating the vending apparatus.

132. A method, comprising:

permitting a vending apparatus to dispense goods, the vending apparatus including at least one storage area being operable to store the goods for sale and at least one retrieving device operable to retrieve the goods from the storage area and to dispense the goods from the vending apparatus;

at least partially disabling the vending apparatus from dispensing at least some of the goods when a condition has occurred; and at least partially re-enabling the vending apparatus based on receiving a re-enable code.

133. The method of paragraph 132, wherein the condition includes at least one of:

one or more limitations under which the vending apparatus vends the goods are violated;

one or more of the obligations have not been at least one of satisfied and waived;

the vending apparatus receives an externally generated disable code; and the vending apparatus reaches an end of a predefined interval without having received a continuation code that permits the vending apparatus to dispense at least some of the goods.

134. The method of paragraph 132, wherein the goods are packaged goods.

135. The method of paragraph 133, wherein the interval represents at least one of (i) one or more predefined periods of time; (ii) one or more predefined numbers of vends of goods from the vending apparatus; (iii) one or more predefined quanta of sales by the vending apparatus.

136. The method of paragraph 132, wherein the re-enable code is made available to the vending apparatus after a determination is made as to whether a resolution condition has been at least one of satisfied and waived.

137. The method of paragraph 136, wherein the resolution condition includes at least one of:

the one or more contractual obligations have been satisfied; and a penalty has been paid.

138. The method of paragraph 132, further comprising decoding the re-enable code, the re-enable code having been encrypted prior to making it available to the vending apparatus.

139. The method of paragraph 133, wherein, the condition includes that one or more limitations under which the vending apparatus vends the goods are violated, and the one or more limitations include: (i) that the vending apparatus is required to vend only authorized goods; (ii) that inventory of one or more goods must be maintained in the vending apparatus; (iii) that goods must be displayed in the vending apparatus in a prescribed way; (iv) that advertising indicia must be displayed on the vending apparatus in a prescribed way; (v) that a prescribed ratio of a quantum of one or more goods to a quantum of storage space for goods in the vending apparatus must be maintained; (vi) that a prescribed number of goods selections in the vending apparatus must be maintained; (vii) that prescribed quanta of one or more goods must be dispensed from the vending apparatus in a predefined period of time; (viii) that a prescribed quantum of money must be received at the vending apparatus in a predefined period of time; (ix) that a prescribed ratio of one or more of the goods to one or more others of the goods must be vended from the vending apparatus; (x) that a prescribed ratio of one or more of the goods to one or more others of the goods must be vended from the vending apparatus in a predefined period of time; and (xi) that the vending apparatus must be maintained in operation to a prescribed degree.

140. The method of paragraph 133 or 137, wherein the at least one contractual obligation includes at least one of: (i) an obligation not to steal receipts; (ii) an obligation to provide a quantum of money to the at least one entity based on the sales of goods from the vending apparatus; and (iii) an obligation not to tamper with the vending apparatus.

141. The method of paragraph 140, wherein tampering with the vending apparatus includes at least one of: (i) tampering with a goods identification sensor of the vending apparatus that is operable to determine details of a particular good as it is vended from the vending apparatus; (ii) tampering with a controller of the vending apparatus; and (iii) relocating the vending apparatus.

142. The method of paragraph 133 or 137, wherein the at least one contractual obligation includes at least one of: (i) an obligation to vend only authorized goods; (ii) an obligation to maintain inventory of one or more goods in the vending apparatus; (iii) an obligation not to steal receipts; (iv) an obligation to provide a quantum of money to the at least one entity based on the sales of goods from the vending apparatus; (v) an obligation to display goods in the vending apparatus in a prescribed way; (vi) an obligation to display advertising indicia on the vending apparatus in a prescribed way; (vii) an obligation to maintain a prescribed ratio of a quantum of one or more goods to a quantum of storage space for goods in the vending apparatus; (viii) an obligation to maintain a prescribed number of goods selections in the vending apparatus; (ix) an obligation to dispense prescribed quanta of one or more goods from the vending apparatus in a predefined period of time; (x) an obligation to receive a prescribed quantum of money at the vending apparatus in a predefined period of time; (xi) an obligation to sell a prescribed ratio of one or more of the goods to one or more others of the goods; (xii) an obligation to sell a prescribed ratio of one or more of the goods to one or more others of the goods in a predefined period of time; (xiii) an obligation to make prescribed data concerning the sales of goods from the vending apparatus available to the at least one entity; (xiv) an obligation to maintain the vending apparatus in operation to a prescribed degree; and (xv) an obligation not to tamper with the vending apparatus.

143. The method of paragraph 142, wherein the obligation to sell only authorized goods includes at least one of: (i) selling only goods of an authorized type; (ii) selling only goods of an authorized brand; (iii) selling only goods of an authorized size; (iv) selling only goods of an authorized weight; (v) selling only goods of an authorized expiration date; (vi) selling only goods of an authorized package type; (vii) selling only goods of an authorized period of manufacture; and (viii) selling only goods of an authorized place of manufacture.

144. The method of paragraph 142, further comprising determining that the prescribed data concerning the sales of goods from the vending apparatus are authentic prior to making the re-enable code available to the vending apparatus.

145. The method of paragraph 144, wherein the determination that the prescribed data are authentic is based on at least one of encryption and a code among the prescribed data.

146. The method of paragraph 142, wherein the prescribed data concerning the sales of goods from the vending apparatus includes at least one of: (i) a quantum of one or more types of goods sold during one or more prescribed periods of time; (ii) a quantum of one or more brands of goods sold during one or more prescribed periods of time; (iii) a ratio of one or more types of the goods sold to one or more other types of the goods sold in a predefined period of time; (iv) a ratio of one or more brands of the goods sold to one or more other brands of the goods sold in a predefined period of time; (v) respective dates of vends from the vending apparatus; (vi) respective times of vends from the vending apparatus; (vii) information concerning whether a particular good was out of inventory; (viii) information concerning what a next choice of goods was made by a purchaser when a particular good was out of inventory; (ix) information concerning whether the vending apparatus was operational; and (x) information concerning any limitations under which the vending apparatus vends the goods.

147. The method of paragraph 146, wherein the information concerning any limitations under which the vending apparatus vends the goods includes information concerning at least one of (i) whether the vending apparatus is required to vend only authorized goods; (ii) whether inventory of one or more goods must be maintained in the vending apparatus; (iii) whether goods must be displayed in the vending apparatus in a prescribed way; (iv) whether advertising indicia must be displayed on the vending apparatus in a prescribed way; (v) whether a prescribed ratio of a quantum of one or more goods to a quantum of storage space for goods in the vending apparatus must be maintained; (vi) whether a prescribed number of goods selections in the vending apparatus must be maintained; (vii) whether prescribed quanta of one or more goods must be dispensed from the vending apparatus in a predefined period of time; (viii) whether a prescribed quantum of money must be received at the vending apparatus in a predefined period of time; (ix) whether a prescribed ratio of one or more of the goods to one or more others of the goods must be vended from the vending apparatus; (x) whether a prescribed ratio of one or more of the goods to one or more others of the goods must be vended from the vending apparatus in a predefined period of time; and (xi) whether the vending apparatus must be maintained in operation to a prescribed degree.

148. The method paragraph 142, wherein tampering with the vending apparatus includes at least one of: (i) tampering with a goods identification sensor of the vending apparatus that is operable to determine details of a particular good as it is vended from the vending apparatus; (ii) tampering with a controller of the vending apparatus; and (iii) relocating the vending apparatus.

149. A method, comprising:

entering into at least one contractual obligation with at least one entity concerning sales of goods from a vending apparatus; and agreeing with the at least one entity that (i) the vending apparatus may be enabled to dispense the goods, (ii) the vending apparatus may be at least partially disabled from dispensing at least some of the goods when a condition has occurred, and (iii) the vending apparatus may be at least partially re-enabled by receiving a re-enable code after having been at least partially disabled.

150. The method of paragraph 149, wherein the condition includes at least one of:

one or more limitations under which the vending apparatus vends the goods are violated;

one or more of the obligations have not been at least one of satisfied and waived;

the vending apparatus receives an externally generated disable code; and the vending apparatus reaches an end of a predefined interval without having received a continuation code that permits the vending apparatus to dispense at least some of the goods.

151. The method of paragraph 149, wherein the goods are packaged goods.

152. The method of paragraph 150, wherein the interval represents at least one of (i) one or more predefined periods of time; (ii) one or more predefined numbers of vends of goods from the vending apparatus; (iii) one or more predefined quanta of sales by the vending apparatus.

153. The method of paragraph 149, further comprising agreeing with the at least one entity that the re-enable code is made available to the vending apparatus after a determination is made as to whether a resolution condition has been at least one of satisfied and waived.

154. The method of paragraph 153, wherein the resolution condition includes at least one of:

the one or more contractual obligations have been satisfied; and a penalty has been paid.

155. The method of paragraph 149, further comprising:

determining whether a resolution condition has been at least one of satisfied and waived; and making the re-enable code available to the vending apparatus.

156. The method of paragraph 155, further comprising encrypting the re-enable code prior to making it available to the vending apparatus.

157. The method of paragraph 155, further comprising making the re-enable code available to the vending apparatus if at least one of (i) the at least one contractual obligation has been at least one of satisfied and waived; and (ii) a penalty has been paid.

158. The method of paragraph 155, wherein an authorized third party receives prescribed data concerning the sales of goods from the vending apparatus, determines whether the resolution condition has been satisfied based on at least some of the prescribed data, and makes the re-enable code available to the vending apparatus.

159. The method of paragraph 155, further comprising:

communicating with an authorized third party responsible for receiving prescribed data concerning the sales of goods from the vending apparatus; and determining whether the resolution condition has been satisfied based on at least some of the prescribed data.

160. The method of paragraph 159, further comprising making the re-enable code available to the vending apparatus if the at least one resolution condition has been at least one of satisfied and waived.

161. The method of paragraph 160, further comprising authorizing the third party to make the re-enable code available to the vending apparatus.

162. The method of paragraph 155, 158 or 161, wherein the step of making the re-enable code available to the vending apparatus includes at least one of:

generating the re-enable code and releasing the re-enable code to the vending apparatus, to an intermediary entity, or to an entity responsible for inputting the re-enable code into the vending apparatus; and authorizing a third party to at least one of generate the re-enable code and release the re-enable code to the vending apparatus, to an intermediary entity, or to an entity responsible for inputting the re-enable code into the vending apparatus.

163. The method of paragraph 162, wherein at least one of the step of releasing the re-enable code to the vending apparatus and inputting the re-enable code into the vending apparatus includes at least one of:

entering the re-enable code into the vending apparatus through a goods selection keypad on the vending apparatus;

entering the re-enable code into the vending apparatus through a dedicated keypad on the vending apparatus;

entering the re-enable code into the vending apparatus through a portable computing device operable to connect to a data port of the vending apparatus; and entering the re-enable code into the vending apparatus over a communications network to which the vending apparatus is connected.

164. The method of paragraph 163, wherein the communications network includes at least one of a wire network, a telephone network, a radio frequency link, an infrared link, a local area network, a wide area network, and the Internet.

165. The method of paragraph 150, wherein, the condition includes that one or more limitations under which the vending apparatus vends the goods are violated, and the one or more limitations include: (i) that the vending apparatus is required to vend only authorized goods; (ii) that inventory of one or more goods must be maintained in the vending apparatus; (iii) that goods must be displayed in the vending apparatus in a prescribed way; (iv) that advertising indicia must be displayed on the vending apparatus in a prescribed way; (v) that a prescribed ratio of a quantum of one or more goods to a quantum of storage space for goods in the vending apparatus must be maintained; (vi) that a prescribed number of goods selections in the vending apparatus must be maintained; (vii) that prescribed quanta of one or more goods must be dispensed from the vending apparatus in a predefined period of time; (viii) that a prescribed quantum of money must be received at the vending apparatus in a predefined period of time; (ix) that a prescribed ratio of one or more of the goods to one or more others of the goods must be vended from the vending apparatus; (x) that a prescribed ratio of one or more of the goods to one or more others of the goods must be vended from the vending apparatus in a predefined period of time; and (xi) that the vending apparatus must be maintained in operation to a prescribed degree.

166. The method of paragraph 150 or 154, wherein the at least one contractual obligation includes at least one of: (i) an obligation not to steal receipts; (ii) an obligation to provide a quantum of money to the at least one entity based on the sales of goods from the vending apparatus; and (iii) an obligation not to tamper with the vending apparatus.

167. The method of paragraph 166, wherein tampering with the vending apparatus includes at least one of: (i) tampering with a goods identification sensor of the vending apparatus that is operable to determine details of a particular good as it is vended from the vending apparatus; (ii) tampering with a controller of the vending apparatus; and (iii) relocating the vending apparatus.

168. The method of paragraph 150 or 154, wherein the at least one contractual obligation includes at least one of: (i) an obligation to vend only authorized goods; (ii) an obligation to maintain inventory of one or more goods in the vending apparatus; (iii) an obligation not to steal receipts; (iv) an obligation to provide a quantum of money to the at least one entity based on the sales of goods from the vending apparatus; (v) an obligation to display goods in the vending apparatus in a prescribed way; (vi) an obligation to display advertising indicia on the vending apparatus in a prescribed way; (vii) an obligation to maintain a prescribed ratio of a quantum of one or more goods to a quantum of storage space for goods in the vending apparatus; (viii) an obligation to maintain a prescribed number of goods selections in the vending apparatus; (ix) an obligation to dispense prescribed quanta of one or more goods from the vending apparatus in a predefined period of time; (x) an obligation to receive a prescribed quantum of money at the vending apparatus in a predefined period of time; (xi) an obligation to sell a prescribed ratio of one or more of the goods to one or more others of the goods; (xii) an obligation to sell a prescribed ratio of one or more of the goods to one or more others of the goods in a predefined period of time; (xiii) an obligation to make prescribed data concerning the sales of goods from the vending apparatus available to the at least one entity; (xiv) an obligation to maintain the vending apparatus in operation to a prescribed degree; and (xv) an obligation not to tamper with the vending apparatus.

169. The method of paragraph 168, wherein the obligation to sell only authorized goods includes at least one of: (i) selling only goods of an authorized type; (ii) selling only goods of an authorized brand; (iii) selling only goods of an authorized size; (iv) selling only goods of an authorized weight; (v) selling only goods of an authorized expiration date; (vi) selling only goods of an authorized package type; (vii) selling only goods of an authorized period of manufacture; and (viii) selling only goods of an authorized place of manufacture.

170. The method of paragraph 168, further comprising determining that the prescribed data concerning the sales of goods from the vending apparatus are authentic prior to making the re-enable code available to the vending apparatus.

171. The method of paragraph 170, wherein the determination that the prescribed data are authentic is based on at least one of encryption and a code among the prescribed data.

172. The method of paragraph 168, wherein the prescribed data concerning the sales of goods from the vending apparatus includes at least one of: (i) a quantum of one or more types of goods sold during one or more prescribed periods of time; (ii) a quantum of one or more brands of goods sold during one or more prescribed periods of time; (iii) a ratio of one or more types of the goods sold to one or more other types of the goods sold in a predefined period of time; (iv) a ratio of one or more brands of the goods sold to one or more other brands of the goods sold in a predefined period of time; (v) respective dates of vends from the vending apparatus; (vi) respective times of vends from the vending apparatus; (vii) information concerning whether a particular good was out of inventory; (viii) information concerning what a next choice of goods was made by a purchaser when a particular good was out of inventory; (ix) information concerning whether the vending apparatus was operational; and (x) information concerning any limitations under which the vending apparatus vends the goods.

173. The method of paragraph 172, wherein the information concerning any limitations under which the vending apparatus vends the goods includes information concerning at least one of (i) whether the vending apparatus is required to vend only authorized goods; (ii) whether inventory of one or more goods must be maintained in the vending apparatus; (iii) whether goods must be displayed in the vending apparatus in a prescribed way; (iv) whether advertising indicia must be displayed on the vending apparatus in a prescribed way; (v) whether a prescribed ratio of a quantum of one or more goods to a quantum of storage space for goods in the vending apparatus must be maintained; (vi) whether a prescribed number of goods selections in the vending apparatus must be maintained; (vii) whether prescribed quanta of one or more goods must be dispensed from the vending apparatus in a predefined period of time; (viii) whether a prescribed quantum of money must be received at the vending apparatus in a predefined period of time; (ix) whether a prescribed ratio of one or more of the goods to one or more others of the goods must be vended from the vending apparatus; (x) whether a prescribed ratio of one or more of the goods to one or more others of the goods must be vended from the vending apparatus in a predefined period of time; and (xi) whether the vending apparatus must be maintained in operation to a prescribed degree.

174. The method of paragraph 168, wherein tampering with the vending apparatus includes at least one of: (i) tampering with a goods identification sensor of the vending apparatus that is operable to determine details of a particular good as it is vended from the vending apparatus; (ii) tampering with a controller of the vending apparatus; and (iii) relocating the vending apparatus.

175. The method of paragraph 149, wherein after having been disabled, the vending apparatus is automatically enabled after a predefined period of time has elapsed.

176. The method of paragraph 175, wherein the vending apparatus produces the re-enable code after the predefined period of time has elapsed such that the vending apparatus is automatically enabled.

177. The method of paragraph 149, wherein the vending apparatus is disabled from vending only a subset of the goods when the re-enable code is not received before or after the end of the interval.

178. The method of paragraph 149, 150, or 154, wherein the at least one entity includes at least one of a manufacturer of the vending apparatus, an operator responsible to at least stock the vending apparatus with the goods and collect receipts from the vending apparatus, a seller of one or more goods to be vended from the vending apparatus, a distributor or agent of the seller of one or more goods, a lender of money to an entity to purchase the vending apparatus, a lessor of the vending apparatus to an entity, and a holder of property on which the vending apparatus is located.

179. The method of paragraph 178, further comprising the operator entering into a contract with at least one of the lender, the lessor, and the holder, wherein the at least one contractual obligation includes at least one of: (i) an obligation on the part of the operator not to steal receipts; (ii) an obligation on the part of the operator to provide one or more quanta of money to one or more of the lender, the lessor, and the holder based on the sales of goods from the vending apparatus; and (iii) an obligation on the part of the operator not to tamper with the vending apparatus.

180. The method of paragraph 178, further comprising the operator entering into a contract with at least one of the seller of goods, the distributor, and the agent, wherein the at least one contractual obligation includes at least one of: (i) an obligation to vend only authorized goods; (ii) an obligation to maintain inventory of one or more goods in the vending apparatus; (iii) an obligation not to steal receipts; (iv) an obligation to provide a quantum of money to the at least one entity based on the sales of goods from the vending apparatus; (v) an obligation to display goods in the vending apparatus in a prescribed way; (vi) an obligation to display advertising indicia on the vending apparatus in a prescribed way; (vii) an obligation to maintain a prescribed ratio of a quantum of one or more goods to a quantum of storage space for goods in the vending apparatus; (viii) an obligation to maintain a prescribed number of goods selections in the vending apparatus; (ix) an obligation to dispense prescribed quanta of one or more goods from the vending apparatus in a predefined period of time; (x) an obligation to receive a prescribed quantum of money at the vending apparatus in a predefined period of time; (xi) an obligation to sell a prescribed ratio of one or more of the goods to one or more others of the goods; (xii) an obligation to sell a prescribed ratio of one or more of the goods to one or more others of the goods in a predefined period of time; (xiii) an obligation to make prescribed data concerning the sales of goods from the vending apparatus available to the at least one entity; (xiv) an obligation to maintain the vending apparatus in operation to a prescribed degree; and (xv) an obligation not to tamper with the vending apparatus.

181. The method of paragraph 180, further comprising at least one of the seller of goods, the distributor, and the agent providing the manufacturer of the vending apparatus a quantum of money for making the vending apparatus available to the operator, wherein the vending apparatus includes limitations under which it vends. the goods and will automatically be at least partially disabled if the limitations are not met.

182. The method of paragraph 181, wherein the limitations under which the vending apparatus vends the goods includes at least one of (i) that the vending apparatus is required to vend only authorized goods; (ii) that inventory of one or more goods must be maintained in the vending apparatus; (iii) that goods must be displayed in the vending apparatus in a prescribed way; (iv) that advertising indicia must be displayed on the vending apparatus in a prescribed way; (v) that a prescribed ratio of a quantum of one or more goods to a quantum of storage space for goods in the vending apparatus must be maintained; (vi) that a prescribed number of goods selections in the vending apparatus must be maintained; (vii) that prescribed quanta of one or more goods must be dispensed from the vending apparatus in a predefined period of time; (viii) that a prescribed quantum of money must be received at the vending apparatus in a predefined period of time; (ix) that a prescribed ratio of one or more of the goods to one or more others of the goods must be vended from the vending apparatus; (x) that a prescribed ratio of one or more of the goods to one or more others of the goods must be vended from the vending apparatus in a predefined period of time; and (xi) that the vending apparatus must be maintained in operation to a prescribed degree.

183. The method of paragraph 179 or 180, wherein the re-enable code is made available to the vending apparatus after a determination is made that the at least one contractual obligation with the lessor has been at least one of satisfied and waived.

184. The method of paragraph 179 or 180, wherein at least one of the lender, the lessor, the holder, the seller of goods, the distributor, and the agent determines whether the operator has satisfied the at least one contractual obligation and makes the re-enable code available to the vending apparatus after the determination has been made.

185. A vending apparatus, comprising:

at least one storage area being operable to store goods for sale;

at least one retrieving device operable to retrieve the goods from the storage area and to dispense the goods from the vending apparatus; and a processing unit operable to (i) monitor a first selection of goods for purchase made by a user of the vending apparatus; (ii) determine whether the first selection is for at least some goods that are out of inventory within the vending apparatus; and (iii) monitor at least a second selection of goods for purchase made by the user in response to the first selection of goods being out of inventory.

186. The vending apparatus of paragraph 185, wherein the processing unit is further operable to determine whether goods of at least one of a particular type, a particular brand, a particular price, a particular size, a particular weight, a particular expiration date, a particular package type, a particular period of manufacture, and a particular place of manufacture, are out of inventory within the vending apparatus.

187. The vending apparatus of paragraph 185, wherein the processing unit is further operable to release the data from the vending apparatus to at least one interested entity.

188. The vending apparatus of paragraph 187, further comprising a communications unit through which the data may be released to at least one of (i) a portable computing device operable to connect to the communications unit; and (ii) a communications network to which the vending apparatus is connectable.

189. The vending apparatus of paragraph 188, wherein the communications network includes at least one of a wire network, a telephone network, a radio frequency link, an infrared link, a local area network, a wide area network, and the Internet.

190. The vending apparatus of paragraph 188, wherein the at least one interested entity includes one or more computers disposed at one or more remote locations from the vending apparatus.

191. The vending apparatus of paragraph 187, wherein the processing unit is further operable to encode the data prior to the step of releasing the data.

192. The vending apparatus of paragraph 191, wherein the function of encoding includes at least one of encrypting the data and augmenting the data with a code.

193. The vending apparatus of paragraph 185 wherein the vending apparatus is of a type that the user cannot see the goods inside the vending apparatus prior to making the first or second selections.

194. A vending apparatus, comprising:

at least one storage area being operable to store goods for sale;

at least one retrieving device operable to retrieve the goods from the storage area and to dispense the goods from the vending apparatus; and a processing unit operable to (i) monitor data concerning sales of the goods from the vending apparatus; and (ii) release the data from the vending apparatus to at least one interested entity, wherein the data include at least one of (i) information concerning vending or attempts at vending unauthorized goods from the vending apparatus; (ii) information concerning the sales of goods from the vending apparatus obtained using a goods identification scanning device of the vending apparatus; and (iii) information concerning any limitations under which the vending apparatus vends the goods.

195. The vending apparatus of paragraph 194, wherein the information concerning the vending or attempts at vending unauthorized goods from the vending apparatus includes at least one of: (i) vending only goods of an authorized type; (ii) vending only goods of an authorized brand; (iii) vending only goods of an authorized size; (iv) vending only goods of an authorized weight; (v) vending only goods of an authorized expiration date; (vi) vending only goods of an authorized package type; (vii) vending only goods of an authorized period of manufacture; and (viii) vending only goods of an authorized place of manufacture.

196. The vending apparatus of paragraph 194, wherein the information concerning the vending or attempts at vending unauthorized goods from the vending apparatus includes a number of times that unauthorized goods were vended or that attempts were made at vending unauthorized goods.

197. The vending apparatus of paragraph 194, wherein the goods identification scanning device of the vending apparatus includes at least one of: (i) at least one bar code reader; (ii) at least one optical reader; (iii) at least one image recognition system; (iv) at least one digital still camera; (v) at least one video camera; (vi) at least one RF identification device; and (vii) at least one magnetic reader.

198. The vending apparatus of paragraph 194, wherein the information concerning the sales of goods from the vending apparatus obtained using a goods identification scanning device of the vending apparatus includes at least one of: (i) a type of goods; (ii) a brand of the goods; (iii) a size of the goods; (iv) a weight of the goods; (v) an expiration date of the goods; (vi) a package type of the goods; (vii) a period of manufacture of the goods; and (viii) a place of manufacture of the goods.

199. The vending apparatus of paragraph 194, wherein the information concerning any limitations under which the vending apparatus vends the goods includes information concerning at least one of (i) whether the vending apparatus is required to vend only authorized goods; (ii) whether inventory of one or more goods must be maintained in the vending apparatus; (iii) whether goods must be displayed in the vending apparatus in a prescribed way; (iv) whether advertising indicia must be displayed on the vending apparatus in a prescribed way; (v) whether a prescribed ratio of a quantum of one or more goods to a quantum of storage space for goods in the vending apparatus must be maintained; (vi) whether a prescribed number of goods selections in the vending apparatus must be maintained; (vii) whether prescribed quanta of one or more goods must be dispensed from the vending apparatus in a predetermined period of time; (viii) whether a prescribed quantum of money must be received at the vending apparatus in a predetermined period of time; (ix) whether a prescribed ratio of one or more of the goods to one or more others of the goods must be vended from the vending apparatus; (x) whether a prescribed ratio of one or more of the goods to one or more others of the goods must be vended from the vending apparatus in a predetermined period of time; and (xi) whether the vending apparatus must be maintained in operation to a prescribed degree.

200. The vending apparatus of paragraph 194, wherein the data concerning the sales of goods from the vending apparatus further includes at least one of: (i) a quantum of one or more types of goods sold during one or more prescribed periods of time; (ii) a quantum of one or more brands of goods sold during one or more prescribed periods of time; (iii) a ratio of one or more types of the goods sold to one or more other types of the goods sold in a predetermined period of time; (iv) a ratio of one or more brands of the goods sold to one or more other brands of the goods sold in a predetermined period of time; (v) respective dates of vends from the vending apparatus; (vi) respective times of vends from the vending apparatus; (vii) information concerning whether a particular good was out of inventory; (viii) information concerning what a next choice of goods was made by a purchaser when a particular good was out of inventory; and (ix) information concerning whether the vending apparatus was operational.

201. The vending apparatus of paragraph 194, further comprising a communications unit through which the data may be released to at least one of (i) a portable computing device operable to connect to the communications unit; and (ii) a communications network to which the vending apparatus is connectable.

202. The vending apparatus of paragraph 201, wherein the communications network includes at least one of a wire network, a telephone network, a radio frequency link, an infrared link, a local area network, a wide area network, and the Internet.

203. The vending apparatus of paragraph 202, wherein the at least one interested entity includes one or more computers disposed at one or more remote locations from the vending apparatus.

204. The vending apparatus of paragraph 194, wherein the processing unit is further operable to encode the data prior to the step of releasing the data.

205. The vending apparatus of paragraph 204, wherein the function of encoding includes at least one of encrypting the data and augmenting the data with a code.

206. A method of monitoring data concerning sales of goods from a vending apparatus, comprising:

monitoring a first selection of goods for purchase made by a user of the vending apparatus;

using the vending apparatus to determine whether the first selection is for at least some goods that are out of inventory within the vending apparatus; and using the vending apparatus to monitor at least a second selection of goods for purchase made by the user in response to the first selection of goods being out of inventory.

207. The method of paragraph 206, further comprising using the vending apparatus to determine whether goods of at least one of a particular type, a particular brand, a particular price, a particular size, a particular weight, a particular expiration date, a particular package type, a particular period of manufacture, and a particular place of manufacture, are out of inventory within the vending apparatus.

208. The method of paragraph 206, further comprising releasing the data from the vending apparatus to at least one interested entity.

209. The method of paragraph 208, wherein the step of releasing the data includes at least one of:

releasing the data to a portable computing device operable to connect to a data port of the vending apparatus; and releasing the data over a communications network to which the vending apparatus is connectable.

210. The method of paragraph 209, wherein the communications network includes at least one of a wire network, a telephone network, a radio frequency link, an infrared link, a local area network, a wide area network, and the Internet.

211. The method of paragraph 209, wherein the at least one interested entity includes one or more computers disposed at one or more remote locations from the vending apparatus.

212. The method of paragraph 208, further comprising encoding the data prior to the step of releasing the data.

213. The method of paragraph 212, wherein the step of encoding includes at least one of encrypting the data and augmenting the data with a code.

214. The method of paragraph 206, wherein the vending apparatus is of a type that the user cannot see the goods inside the vending apparatus prior to making the first or second selections.

215. A method, comprising:

using a vending apparatus to monitor data concerning sales of goods therefrom; and releasing the data from the vending apparatus to at least one interested entity, wherein the data include at least one of (i) information concerning vending or attempts at vending unauthorized goods from the vending apparatus; (ii) information concerning the sales of goods from the vending apparatus obtained using a goods identification scanning device of the vending apparatus; and (iii) information concerning any limitations under which the vending apparatus vends the goods.

216. The method of paragraph 215, wherein the information concerning the vending or attempts at vending unauthorized goods from the vending apparatus includes at least one of: (i) vending only goods of an authorized type; (ii) vending only goods of an authorized brand; (iii) vending only goods of an authorized size; (iv) vending only goods of an authorized weight; (v) vending only goods of an authorized expiration date; (vi) vending only goods of an authorized package type; (vii) vending only goods of an authorized period of manufacture; and (viii) vending only goods of an authorized place of manufacture.

217. The method of paragraph 215, wherein the information concerning the vending or attempts at vending unauthorized goods from the vending apparatus includes a number of times that unauthorized goods were vended or that attempts were made at vending unauthorized goods.

218. The method of paragraph 215, wherein the goods identification scanning device of the vending apparatus includes at least one of: (i) at least one bar code reader; (ii) at least one optical reader; (iii) at least one image recognition system; (iv) at least one digital still camera; (v) at least one video camera; (vi) at least one RF identification device; and (vii) at least one magnetic reader.

219. The method of paragraph 215, wherein the information concerning the sales of goods from the vending apparatus obtained using a goods identification scanning device of the vending apparatus includes at least one of: (i) a type of goods; (ii) a brand of the goods; (iii) a size of the goods; (iv) a weight of the goods; (v) an expiration date of the goods; (vi) a package type of the goods; (vii) a period of manufacture of the goods; and (viii) a place of manufacture of the goods.

220. The method of paragraph 215, wherein the information concerning any limitations under which the vending apparatus vends the goods includes information concerning at least one of (i) whether the vending apparatus is required to vend only authorized goods; (ii) whether inventory of one or more goods must be maintained in the vending apparatus; (iii) whether goods must be displayed in the vending apparatus in a prescribed way; (iv) whether advertising indicia must be displayed on the vending apparatus in a prescribed way; (v) whether a prescribed ratio of a quantum of one or more goods to a quantum of storage space for goods in the vending apparatus must be maintained; (vi) whether a prescribed number of goods selections in the vending apparatus must be maintained; (vii) whether prescribed quanta of one or more goods must be dispensed from the vending apparatus in a predetermined period of time; (viii) whether a prescribed quantum of money must be received at the vending apparatus in a predetermined period of time; (ix) whether a prescribed ratio of one or more of the goods to one or more others of the goods must be vended from the vending apparatus; (x) whether a prescribed ratio of one or more of the goods to one or more others of the goods must be vended from the vending apparatus in a predetermined period of time; and (xi) whether the vending apparatus must be maintained in operation to a prescribed degree.

221. The method of paragraph 215, wherein the data concerning the sales of goods from the vending apparatus further includes at least one of: (i) a quantum of one or more types of goods sold during one or more prescribed periods of time; (ii) a quantum of one or more brands of goods sold during one or more prescribed periods of time; (iii) a ratio of one or more types of the goods sold to one or more other types of the goods sold in a predetermined period of time; (iv) a ratio of one or more brands of the goods sold to one or more other brands of the goods sold in a predetermined period of time; (v) respective dates of vends from the vending apparatus; (vi) respective times of vends from the vending apparatus; (vii) information concerning whether a particular good was out of inventory; (viii) information concerning what a next choice of goods was made by a purchaser when a particular good was out of inventory; and (ix) information concerning whether the vending apparatus was operational.

222. The method of paragraph 215, wherein the step of releasing the data includes at least one of:

releasing the data to a portable computing device operable to connect to a data port of the vending apparatus; and releasing the data over a communications network to which the vending apparatus is connectable.

223. The method of paragraph 222, wherein the communications network includes at least one of a wire network, a telephone network, a radio frequency link, an infrared link, a local area network, a wide area network, and the Internet.

224. The method of paragraph 223, wherein the at least one interested entity includes one or more computers disposed at one or more remote locations from the vending apparatus.

225. The method of paragraph 215, further comprising encoding the data prior to the step of releasing the data.

226. The method of paragraph 225, wherein the step of encoding includes at least one of encrypting the data and augmenting the data with a code.

227. A processing system, comprising:

a data processor that is remote from at least one vending apparatus and operable to receive data from the vending apparatus concerning sales of goods from the vending apparatus; and a database operable to store at least some of the data, wherein the data include at least one of (i) information concerning vending or attempts at vending unauthorized goods from the vending apparatus; (ii) information concerning the sales of goods from the vending apparatus obtained using a goods identification scanning device of the vending apparatus; (iii) information concerning any limitations under which the vending apparatus vends the goods; and (iv) information concerning a user's second selection of goods from the vending apparatus in response to the user's first selection of goods being out of inventory in the vending apparatus.

228. The processing system of paragraph 227, wherein the information concerning the vending or attempts at vending unauthorized goods from the vending apparatus includes at least one of: (i) vending only goods of an authorized type; (ii) vending only goods of an authorized brand; (iii) vending only goods of an authorized size; (iv) vending only goods of an authorized weight; (v) vending only goods of an authorized expiration date; (vi) vending only goods of an authorized package type; (vii) vending only goods of an authorized period of manufacture; and (viii) vending only goods of an authorized place of manufacture.

229. The processing system of paragraph 227, wherein the information concerning the vending or attempts at vending unauthorized goods from the vending apparatus includes a number of times that unauthorized goods were vended or that attempts were made at vending unauthorized goods.

230. The processing system of paragraph 227, wherein the goods identification scanning device of the vending apparatus includes at least one of: (i) at least one bar code reader; (ii) at least one optical reader; (iii) at least one image recognition system; (iv) at least one digital still camera; (v) at least one video camera; (vi) at least one RF identification device; and (vii) at least one magnetic reader.

231. The processing system of paragraph 227, wherein the information concerning the sales of goods from the vending apparatus obtained using a goods identification scanning device of the vending apparatus includes at least one of: (i) a type of goods; (ii) a brand of the goods; (iii) a size of the goods; (iv) a weight of the goods; (v) an expiration date of the goods; (vi) a package type of the goods; (vii) a period of manufacture of the goods; and (viii) a place of manufacture of the goods.

232. The processing system of paragraph 227, wherein the information concerning any limitations under which the vending apparatus vends the goods includes information concerning at least one of (i) whether the vending apparatus is required to vend only authorized goods; (ii) whether inventory of one or more goods must be maintained in the vending apparatus; (iii) whether goods must be displayed in the vending apparatus in a prescribed way; (iv) whether advertising indicia must be displayed on the vending apparatus in a prescribed way; (v) whether a prescribed ratio of a quantum of one or more goods to a quantum of storage space for goods in the vending apparatus must be maintained; (vi) whether a prescribed number of goods selections in the vending apparatus must be maintained; (vii) whether prescribed quanta of one or more goods must be dispensed from the vending apparatus in a predetermined period of time; (viii) whether a prescribed quantum of money must be received at the vending apparatus in a predetermined period of time; (ix) whether a prescribed ratio of one or more of the goods to one or more others of the goods must be vended from the vending apparatus; (x) whether a prescribed ratio of one or more of the goods to one or more others of the goods must be vended from the vending apparatus in a predetermined period of time; and (xi) whether the vending apparatus must be maintained in operation to a prescribed degree.

233. The processing system of paragraph 227, wherein the data concerning the sales of goods from the vending apparatus further includes at least one of: (i) a quantum of one or more types of goods sold during one or more prescribed periods of time; (ii) a quantum of one or more brands of goods sold during one or more prescribed periods of time; (iii) a ratio of one or more types of the goods sold to one or more other types of the goods sold in a predetermined period of time; (iv) a ratio of one or more brands of the goods sold to one or more other brands of the goods sold in a predetermined period of time; (v) respective dates of vends from the vending apparatus; (vi) respective times of vends from the vending apparatus; (vii) information concerning whether a particular good was out of inventory; (viii) information concerning what a next choice of goods was made by a purchaser when a particular good was out of inventory; and (ix) information concerning whether the vending apparatus was operational.

234. The processing system of paragraph 233, further comprising computing at least some of the data concerning the sales of goods from the vending apparatus using the data processor.

235. The processing system of paragraph 227, wherein the goods of at least one of a particular type, a particular brand, a particular price, a particular size, a particular weight, a particular expiration date, a particular package type, a particular period of manufacture, and a particular place of manufacture, are out of inventory within the vending apparatus.

236. The processing system of paragraph 227 further comprising a communications unit through which the data may be at least one of received and transmitted to or from at least one of (i) a portable computing device operable to connect to the communications unit; and (ii) a communications network to which the data processor is connectable.

237. The processing system of paragraph 236, wherein the communications network includes at least one of a wire network, a telephone network, a radio frequency link, an infrared link, a local area network, a wide area network, and the Internet.

238. The processing system of paragraph 227, wherein the data processor is further operable to decode the data, the data having been encrypted prior to being received.

239. The processing system of paragraph 238, wherein the data processor is further operable to authenticate the data based on the data having been encrypted.

240. The processing system of paragraph 227, wherein the data processor is further operable to release the data to at least one interested party.

241. The processing system of paragraph 227, wherein the data processor is further operable to require that the at least one interested party provide an authorization code prior to releasing the data.

242. The processing system of paragraph 240, wherein the at least one interested party includes at least one of a manufacturer of the vending apparatus, an operator responsible to at least stock the vending apparatus with the goods and collect receipts from the vending apparatus, a seller of one or more goods to be vended from the vending apparatus, a distributor or agent of the seller of one or more goods, a lender of money to an entity to purchase the vending apparatus, a lessor of the vending apparatus to an entity, and a holder of property on which the vending apparatus is located.

243. The processing system of paragraph 227, wherein the data processor is further operable to produce at least one of a continuation code, a disable code, and a re-enable code, based on at least some of the data received from the vending apparatus, wherein the continuation code is for use by the vending apparatus to remain in an enabled state such that at least some of the goods may be dispensed therefrom, the disable code is for use in disabling the vending apparatus from dispensing at least some of the goods, and the re-enable code is for use in re-enabling the vending apparatus such that at least some of the goods may be dispensed therefrom after that vending apparatus has been at least partially disabled.

244. The processing system of paragraph 243, wherein the data processor is further operable to release at least one of the continuation code, the disable code, and the re-enable code, to the vending apparatus upon authorization by an interested party.

245. The processing system of paragraph 243, wherein the data processor is further operable to:

determine whether at least one contractual obligation between at least two interested parties has been at least one of satisfied and waived using the central data processing system based on at least some of the data received from the vending apparatus; and produce at least one of the continuation code, the disable code, and the re-enable code, in response to the determination.

246. The processing system of paragraph 245, wherein the at least one contractual obligation includes at least one of: (i) an obligation to vend only authorized goods; (ii) an obligation to maintain inventory of one or more goods in the vending apparatus; (iii) an obligation not to steal receipts; (iv) an obligation to provide a quantum of money to the at least one entity based on the sales of goods from the vending apparatus; (v) an obligation to display goods in the vending apparatus in a prescribed way; (vi) an obligation to display advertising indicia on the vending apparatus in a prescribed way; (vii) an obligation to maintain a prescribed ratio of a quantum of one or more goods to a quantum of storage space for goods in the vending apparatus; (viii) an obligation to maintain a prescribed number of goods selections in the vending apparatus; (ix) an obligation to dispense prescribed quanta of one or more goods from the vending apparatus in a predefined period of time; (x) an obligation to receive a prescribed quantum of money at the vending apparatus in a predefined period of time; (xi) an obligation to sell a prescribed ratio of one or more of the goods to one or more others of the goods; (xii) an obligation to sell a prescribed ratio of one or more of the goods to one or more others of the goods in a predefined period of time; (xiii) an obligation to make prescribed data concerning the sales of goods from the vending apparatus available to the at least one entity; (xiv) an obligation to maintain the vending apparatus in operation to a prescribed degree; and (xv) an obligation not to tamper with the vending apparatus.

247. The processing system of paragraph 246, wherein the obligation to sell only authorized goods includes at least one of: (i) selling only goods of an authorized type; (ii) selling only goods of an authorized brand; (iii) selling only goods of an authorized size; (iv) selling only goods of an authorized weight; (v) selling only goods of an authorized expiration date; (vi) selling only goods of an authorized package type; (vii) selling only goods of an authorized period of manufacture; and (viii) selling only goods of an authorized place of manufacture.

248. The processing system of paragraph 246, wherein the prescribed data concerning the sales of goods from the vending apparatus includes at least one of: (i) a quantum of one or more types of goods sold during one or more prescribed periods of time; (ii) a quantum of one or more brands of goods sold during one or more prescribed periods of time; (iii) a ratio of one or more types of the goods sold to one or more other types of the goods sold in a predefined period of time; (iv) a ratio of one or more brands of the goods sold to one or more other brands of the goods sold in a predefined period of time; (v) respective dates of vends from the vending apparatus; (vi) respective times of vends from the vending apparatus; (vii) information concerning whether a particular good was out of inventory; (viii) information concerning what a next choice of goods was made by a purchaser when a particular good was out of inventory; (ix) information concerning whether the vending apparatus was operational; and (x) information concerning any limitations under which the vending apparatus vends the goods.

249. The processing system of paragraph 248, wherein the information concerning any limitations under which the vending apparatus vends the goods includes information concerning at least one of (i) whether the vending apparatus is required to vend only authorized goods; (ii) whether inventory of one or more goods must be maintained in the vending apparatus; (iii) whether goods must be displayed in the vending apparatus in a prescribed way; (iv) whether advertising indicia must be displayed on the vending apparatus in a prescribed way; (v) whether a prescribed ratio of a quantum of one or more goods to a quantum of storage space for goods in the vending apparatus must be maintained; (vi) whether a prescribed number of goods selections in the vending apparatus must be maintained; (vii) whether prescribed quanta of one or more goods must be dispensed from the vending apparatus in a predefined period of time; (viii) whether a prescribed quantum of money must be received at the vending apparatus in a predefined period of time; (ix) whether a prescribed ratio of one or more of the goods to one or more others of the goods must be vended from the vending apparatus; (x) whether a prescribed ratio of one or more of the goods to one or more others of the goods must be vended from the vending apparatus in a predefined period of time; and (xi) whether the vending apparatus must be maintained in operation to a prescribed degree.

250. The processing system of paragraph 249, wherein tampering with the vending apparatus includes at least one of: (i) tampering with a goods identification sensor of the vending apparatus that is operable to determine details of a particular good as it is vended from the vending apparatus; (ii) tampering with a controller of the vending apparatus; and (iii) relocating the vending apparatus.

251. A method, comprising:

providing a central data processing system that is remote from at least one vending apparatus and operable to receive data from the vending apparatus concerning sales of goods from the vending apparatus; and receiving the data from the vending apparatus, wherein the data include at least one of (i) information concerning vending or attempts at vending unauthorized goods from the vending apparatus; (ii) information concerning the sales of goods from the vending apparatus obtained using a goods identification scanning device of the vending apparatus; (iii) information concerning any limitations under which the vending apparatus vends the goods; and (iv) information concerning a user's second selection of goods from the vending apparatus in response to the user's first selection of goods being out of inventory in the vending apparatus.

252. The method of paragraph 251, wherein the information concerning the vending or attempts at vending unauthorized goods from the vending apparatus includes at least one of: (i) vending only goods of an authorized type; (ii) vending only goods of an authorized brand; (iii) vending only goods of an authorized size; (iv) vending only goods of an authorized weight; (v) vending only goods of an authorized expiration date; (vi) vending only goods of an authorized package type; (vii) vending only goods of an authorized period of manufacture; and (viii) vending only goods of an authorized place of manufacture.

253. The method of paragraph 251, wherein the information concerning the vending or attempts at vending unauthorized goods from the vending apparatus includes a number of times that unauthorized goods were vended or that attempts were made at vending unauthorized goods.

254. The method of paragraph 251, wherein the goods identification scanning device of the vending apparatus includes at least one of: (i) at least one bar code reader; (ii) at least one optical reader; (iii) at least one image recognition system; (iv) at least one digital still camera; (v) at least one video camera; (vi) at least one RF identification device; and (vii) at least one magnetic reader.

255. The method of paragraph 251, wherein the information concerning the sales of goods from the vending apparatus obtained using a goods identification scanning device of the vending apparatus includes at least one of: (i) a type of goods; (ii) a brand of the goods; (iii) a size of the goods; (iv) a weight of the goods; (v) an expiration date of the goods; (vi) a package type of the goods; (vii) a period of manufacture of the goods; and (viii) a place of manufacture of the goods.

256. The method of paragraph 251, wherein the information concerning any limitations under which the vending apparatus vends the goods includes information concerning at least one of (i) whether the vending apparatus is required to vend only authorized goods; (ii) whether inventory of one or more goods must be maintained in the vending apparatus; (iii) whether goods must be displayed in the vending apparatus in a prescribed way; (iv) whether advertising indicia must be displayed on the vending apparatus in a prescribed way; (v) whether a prescribed ratio of a quantum of one or more goods to a quantum of storage space for goods in the vending apparatus must be maintained; (vi) whether a prescribed number of goods selections in the vending apparatus must be maintained; (vii) whether prescribed quanta of one or more goods must be dispensed from the vending apparatus in a predetermined period of time; (viii) whether a prescribed quantum of money must be received at the vending apparatus in a predetermined period of time; (ix) whether a prescribed ratio of one or more of the goods to one or more others of the goods must be vended from the vending apparatus; (x) whether a prescribed ratio of one or more of the goods to one or more others of the goods must be vended from the vending apparatus in a predetermined period of time; and (xi) whether the vending apparatus must be maintained in operation to a prescribed degree.

257. The method of paragraph 251, wherein the data concerning the sales of goods from the vending apparatus further includes at least one of: (i) a quantum of one or more types of goods sold during one or more prescribed periods of time; (ii) a quantum of one or more brands of goods sold during one or more prescribed periods of time; (iii) a ratio of one or more types of the goods sold to one or more other types of the goods sold in a predetermined period of time; (iv) a ratio of one or more brands of the goods sold to one or more other brands of the goods sold in a predetermined period of time; (v) respective dates of vends from the vending apparatus; (vi) respective times of vends from the vending apparatus; (vii) information concerning whether a particular good was out of inventory; (viii) information concerning what a next choice of goods was made by a purchaser when a particular good was out of inventory; and (ix) information concerning whether the vending apparatus was operational.

258. The method of paragraph 257, further comprising computing at least some of the data concerning the sales of goods from the vending apparatus using the central data processing system.

259. The method of paragraph 251, wherein the goods of at least one of a particular type, a particular brand, a particular price, a particular size, a particular weight, a particular expiration date, a particular package type, a particular period of manufacture, and a particular place of manufacture, are out of inventory within the vending apparatus.

260. The method of paragraph 251, wherein the step of receiving the data includes at least one of:

receiving the data from a portable computing device operable to connect to the central data processing system; and receiving the data over a communications network to which the central data processing system is connectable.

261. The method of paragraph 260, wherein the communications network includes at least one of a wire network, a telephone network, a radio frequency link, an infrared link, a local area network, a wide area network, and the Internet.

262. The method of paragraph 251, further comprising decoding the data using the central data processing system, the data having been encrypted prior to being received.

263. The method of paragraph 262, further comprising authenticating the data based on the data having been encrypted.

264. The method of paragraph 251, further comprising releasing the data from the central data processing system to at least one interested party.

265. The method of paragraph 264, further comprising requiring that the at least one interested party provide an authorization code to the central data processing system prior to releasing the data.

266. The method of paragraph 264, wherein the at least one interested party includes at least one of a manufacturer of the vending apparatus, an operator responsible to at least stock the vending apparatus with the goods and collect receipts from the vending apparatus, a seller of one or more goods to be vended from the vending apparatus, a distributor or agent of the seller of one or more goods, a lender of money to an entity to purchase the vending apparatus, a lessor of the vending apparatus to an entity, and a holder of property on which the vending apparatus is located.

267. The method of paragraph 251, further comprising producing at least one of a continuation code, a disable code, and a re-enable code, based on at least some of the data received from the vending apparatus, wherein the continuation code is for use by the vending apparatus to remain in an enabled state such that at least some of the goods may be dispensed therefrom, the disable code is for use in disabling the vending apparatus from dispensing at least some of the goods, and the re-enable code is for use in re-enabling the vending apparatus such that at least some of the goods may be dispensed therefrom after that vending apparatus has been at least partially disabled.

268. The method of paragraph 267, further comprising releasing at least one of the continuation code, the disable code, and the re-enable code, to the vending apparatus upon authorization by an interested party.

269. The method of paragraph 267, further comprising:

determining whether at least one contractual obligation between at least two interested parties has been at least one of satisfied and waived using the central data processing system based on at least some of the data received from the vending apparatus; and producing at least one of the continuation code, the disable code, and the re-enable code, in response to the determination.

270. The method of paragraph 269, wherein the at least one contractual obligation includes at least one of: (i) an obligation to vend only authorized goods; (ii) an obligation to maintain inventory of one or more goods in the vending apparatus; (iii) an obligation not to steal receipts; (iv) an obligation to provide a quantum of money to the at least one entity based on the sales of goods from the vending apparatus; (v) an obligation to display goods in the vending apparatus in a prescribed way; (vi) an obligation to display advertising indicia on the vending apparatus in a prescribed way; (vii) an obligation to maintain a prescribed ratio of a quantum of one or more goods to a quantum of storage space for goods in the vending apparatus; (viii) an obligation to maintain a prescribed number of goods selections in the vending apparatus; (ix) an obligation to dispense prescribed quanta of one or more goods from the vending apparatus in a predefined period of time; (x) an obligation to receive a prescribed quantum of money at the vending apparatus in a predefined period of time; (xi) an obligation to sell a prescribed ratio of one or more of the goods to one or more others of the goods; (xii) an obligation to sell a prescribed ratio of one or more of the goods to one or more others of the goods in a predefined period of time; (xiii) an obligation to make prescribed data concerning the sales of goods from the vending apparatus available to the at least one entity; (xiv) an obligation to maintain the vending apparatus in operation to a prescribed degree; and (xv) an obligation not to tamper with the vending apparatus.

271. The method of paragraph 270, wherein the obligation to sell only authorized goods includes at least one of: (i) selling only goods of an authorized type; (ii) selling only goods of an authorized brand; (iii) selling only goods of an authorized size; (iv) selling only goods of an authorized weight; (v) selling only goods of an authorized expiration date; (vi) selling only goods of an authorized package type; (vii) selling only goods of an authorized period of manufacture; and (viii) selling only goods of an authorized place of manufacture.

272. The method of paragraph 270, wherein the prescribed data concerning the sales of goods from the vending apparatus includes at least one of: (i) a quantum of one or more types of goods sold during one or more prescribed periods of time; (ii) a quantum of one or more brands of goods sold during one or more prescribed periods of time; (iii) a ratio of one or more types of the goods sold to one or more other types of the goods sold in a predefined period of time; (iv) a ratio of one or more brands of the goods sold to one or more other brands of the goods sold in a predefined period of time; (v) respective dates of vends from the vending apparatus; (vi) respective times of vends from the vending apparatus; (vii) information concerning whether a particular good was out of inventory; (viii) information concerning what a next choice of goods was made by a purchaser when a particular good was out of inventory; (ix) information concerning whether the vending apparatus was operational; and (x) information concerning any limitations under which the vending apparatus vends the goods.

273. The method of paragraph 272, wherein the information concerning any limitations under which the vending apparatus vends the goods includes information concerning at least one of (i) whether the vending apparatus is required to vend only authorized goods; (ii) whether inventory of one or more goods must be maintained in the vending apparatus; (iii) whether goods must be displayed in the vending apparatus in a prescribed way; (iv) whether advertising indicia must be displayed on the vending apparatus in a prescribed way; (v) whether a prescribed ratio of a quantum of one or more goods to a quantum of storage space for goods in the vending apparatus must be maintained; (vi) whether a prescribed number of goods selections in the vending apparatus must be maintained; (vii) whether prescribed quanta of one or more goods must be dispensed from the vending apparatus in a predefined period of time; (viii) whether a prescribed quantum of money must be received at the vending apparatus in a predefined period of time; (ix) whether a prescribed ratio of one or more of the goods to one or more others of the goods must be vended from the vending apparatus; (x) whether a prescribed ratio of one or more of the goods to one or more others of the goods must be vended from the vending apparatus in a predefined period of time; and (xi) whether the vending apparatus must be maintained in operation to a prescribed degree.

274. The method of paragraph 273, wherein tampering with the vending apparatus includes at least one of: (i) tampering with a goods identification sensor of the vending apparatus that is operable to determine details of a particular good as it is vended from the vending apparatus; (ii) tampering with a controller of the vending apparatus; and (iii) relocating the vending apparatus.

275. A vending apparatus, comprising:

at least one storage area being operable to store goods for sale and at least one retrieving device operable to dispense the goods from the vending apparatus; and a processing unit operable to produce a code associated with at least some data obtained by the vending apparatus concerning sales of the goods therefrom, the code providing an indication as to whether the at least some data have been tampered with, at least one of the code and the at least some data concerning sales of goods from the vending apparatus being releasable from the vending apparatus to at least one interested entity such that a determination may be made as to whether the at least some data have been tampered with.

276. The vending apparatus of paragraph 275, wherein the processing unit is further operable to encrypt at least some data obtained by the vending apparatus concerning sales of goods therefrom to produce the code.

277. The vending apparatus of paragraph 275, wherein the processing unit is further operable to produce an electronic file containing the at least some data, wherein the code indicates a number of times that the electronic file has been opened.

278. The vending apparatus of paragraph 276, wherein the processing unit is further operable to produce ciphertext data from the at least some data that cannot be decrypted without a non-public decryption key.

279. The vending apparatus of paragraph 276, wherein the processing unit is further operable to produce ciphertext data from the at least some data that can be decrypted with a public decryption key but cannot be created without a non-public encryption key.

280. The vending apparatus of paragraph 279, wherein the at least some data includes at least some information known to the at least one interested entity.

281. The vending apparatus of paragraph 280, wherein the information known to the at least one interested entity includes at least one of: an identification number, an interested entity identification number, a vending apparatus identification number, a date, a time, a sequence number, or a vending apparatus location number.

282. The vending apparatus of paragraph 276, wherein the processing unit is further operable to permit the data concerning sales of goods to be un-encrypted such that it may be read without decryption, and to produce a digital signature from at least some of the data concerning sales of goods that cannot be created without a non-public encryption key.

283. The vending apparatus of paragraph 275, wherein the data concerning sales of goods include at least one of (i) information concerning vending or attempts at vending unauthorized goods from the vending apparatus; (ii) information concerning the sales of goods from the vending apparatus obtained using a goods identification scanning device of the vending apparatus; and (iii) information concerning any limitations under which the vending apparatus vends the goods.

284. The vending apparatus of paragraph 283, wherein the information concerning the vending or attempts at vending unauthorized goods from the vending apparatus includes at least one of: (i) vending only goods of an authorized type; (ii) vending only goods of an authorized brand; (iii) vending only goods of an authorized size; (iv) vending only goods of an authorized weight; (v) vending only goods of an authorized expiration date; (vi) vending only goods of an authorized package type; (vii) vending only goods of an authorized period of manufacture; and (viii) vending only goods of an authorized place of manufacture.

285. The vending apparatus of paragraph 283, wherein the information concerning the vending or attempts at vending unauthorized goods from the vending apparatus includes a number of times that unauthorized goods were vended or that attempts were made at vending unauthorized goods.

286. The vending apparatus of paragraph 283, wherein the goods identification scanning device of the vending apparatus includes at least one of: (i) at least one bar code reader; (ii) at least one optical reader; (iii) at least one image recognition system; (iv) at least one digital still camera; (v) at least one video camera; (vi) at least one RF identification device; and (vii) at least one magnetic reader.

287. The vending apparatus of paragraph 283, wherein the information concerning the sales of goods from the vending apparatus obtained using a goods identification scanning device of the vending apparatus includes at least one of: (i) a type of goods; (ii) a brand of the goods; (iii) a size of the goods; (iv) a weight of the goods; (v) an expiration date of the goods; (vi) a package type of the goods; (vii) a period of manufacture of the goods; and (viii) a place of manufacture of the goods.

288. The vending apparatus of paragraph 283, wherein the information concerning any limitations under which the vending apparatus vends the goods includes information concerning at least one of (i) whether the vending apparatus is required to vend only authorized goods; (ii) whether inventory of one or more goods must be maintained in the vending apparatus; (iii) whether goods must be displayed in the vending apparatus in a prescribed way; (iv) whether advertising indicia must be displayed on the vending apparatus in a prescribed way; (v) whether a prescribed ratio of a quantum of one or more goods to a quantum of storage space for goods in the vending apparatus must be maintained; (vi) whether a prescribed number of goods selections in the vending apparatus must be maintained; (vii) whether prescribed quanta of one or more goods must be dispensed from the vending apparatus in a predetermined period of time; (viii) whether a prescribed quantum of money must be received at the vending apparatus in a predetermined period of time; (ix) whether a prescribed ratio of one or more of the goods to one or more others of the goods must be vended from the vending apparatus; (x) whether a prescribed ratio of one or more of the goods to one or more others of the goods must be vended from the vending apparatus in a predetermined period of time; and (xi) whether the vending apparatus must be maintained in operation to a prescribed degree.

289. The vending apparatus of paragraph 283, wherein the data concerning the sales of goods from the vending apparatus further includes at least one of: (i) a quantum of one or more types of goods sold during one or more prescribed periods of time; (ii) a quantum of one or more brands of goods sold during one or more prescribed periods of time; (iii) a ratio of one or more types of the goods sold to one or more other types of the goods sold in a predetermined period of time; (iv) a ratio of one or more brands of the goods sold to one or more other brands of the goods sold in a predetermined period of time; (v) respective dates of vends from the vending apparatus; (vi) respective times of vends from the vending apparatus; (vii) information concerning whether a particular good was out of inventory; (viii) information concerning what a next choice of goods was made by a purchaser when a particular good was out of inventory; (ix) information concerning whether the vending apparatus was operational; and (x) information concerning any limitations under which the vending apparatus vends the goods.

290. The vending apparatus of paragraph 276, wherein the processing unit is further operable to permit the release of at least one of the code and the at least some data, wherein the release includes at least one of:

releasing the at least one of the encrypted data and the at least some data concerning sales of goods from the vending apparatus to a portable computing device operable to connect to a data port of the vending apparatus; and releasing the at least one of the encrypted data and the at least some data concerning sales of goods from the vending apparatus over a communications network to which the vending apparatus is connectable.

291. The vending apparatus of paragraph 290, wherein the communications network includes at least one of a wire network, a telephone network, a radio frequency link, an infrared link, a local area network, a wide area network, and the Internet.

292. The vending apparatus of paragraph 291, wherein the at least one interested entity includes one or more computers disposed at one or more remote locations from the vending apparatus.

293. A method, comprising:

using a vending apparatus to produce a code associated with at least some data obtained by the vending apparatus concerning sales of goods therefrom, the code providing an indication as to whether the at least some data have been tampered with; and releasing at least one of the code and the at least some data concerning sales of goods from the vending apparatus to at least one interested entity such that a determination may be made as to whether the at least some data have been tampered with.

294. The method of paragraph 293, further comprising using the vending apparatus to encrypt at least some data obtained by the vending apparatus concerning sales of goods therefrom to produce the code.

295. The method of paragraph 293, further comprising using the vending machine to produce an electronic file containing the at least some data, wherein the code indicates a number of times that the electronic file has been opened.

296. The method of paragraph 294, wherein the step of encrypting includes producing ciphertext data from the at least some data that cannot be decrypted without a non-public decryption key.

297. The method of paragraph 294, wherein the step of encrypting data includes producing ciphertext data from the at least some data that can be decrypted with a public decryption key but cannot be created without a non-public encryption key.

298. The method of paragraph 297, wherein the at least some data includes at least some information known to the at least one interested entity.

299. The method of paragraph 298, wherein the information known to the at least one interested entity includes at least one of: an identification number, an interested entity identification number, a vending apparatus identification number, a date, a time, a sequence number or a vending apparatus location number.

300. The method of paragraph 294, wherein the step of encrypting includes permitting the data concerning sales of goods to be un-encrypted such that it may be read without decryption, and producing a digital signature from at least some of the data concerning sales of goods that cannot be created without a non-public encryption key.

301. The method of paragraph 293, wherein the data concerning sales of goods include at least one of (i) information concerning vending or attempts at vending unauthorized goods from the vending apparatus; (ii) information concerning the sales of goods from the vending apparatus obtained using a goods identification scanning device of the vending apparatus; and (iii) information concerning any limitations under which the vending apparatus vends the goods.

302. The method of paragraph 301, wherein the information concerning the vending or attempts at vending unauthorized goods from the vending apparatus includes at least one of: (i) vending only goods of an authorized type; (ii) vending only goods of an authorized brand; (iii) vending only goods of an authorized size; (iv) vending only goods of an authorized weight; (v) vending only goods of an authorized expiration date; (vi) vending only goods of an authorized package type; (vii) vending only goods of an authorized period of manufacture; and (viii) vending only goods of an authorized place of manufacture.

303. The method of paragraph 301, wherein the information concerning the vending or attempts at vending unauthorized goods from the vending apparatus includes a number of times that unauthorized goods were vended or that attempts were made at vending unauthorized goods.

304. The method of paragraph 301, wherein the goods identification scanning device of the vending apparatus includes at least one of: (i) at least one bar code reader; (ii) at least one optical reader; (iii) at least one image recognition system; (iv) at least one digital still camera; (v) at least one video camera; (vi) at least one RF identification device; and (vii) at least one magnetic reader.

305. The method of paragraph 301, wherein the information concerning the sales of goods from the vending apparatus obtained using a goods identification scanning device of the vending apparatus includes at least one of: (i) a type of goods; (ii) a brand of the goods; (iii) a size of the goods; (iv) a weight of the goods; (v) an expiration date of the goods; (vi) a package type of the goods; (vii) a period of manufacture of the goods; and (viii) a place of manufacture of the goods.

306. The method of paragraph 301, wherein the information concerning any limitations under which the vending apparatus vends the goods includes information concerning at least one of (i) whether the vending apparatus is required to vend only authorized goods; (ii) whether inventory of one or more goods must be maintained in the vending apparatus; (iii) whether goods must be displayed in the vending apparatus in a prescribed way; (iv) whether advertising indicia must be displayed on the vending apparatus in a prescribed way; (v) whether a prescribed ratio of a quantum of one or more goods to a quantum of storage space for goods in the vending apparatus must be maintained; (vi) whether a prescribed number of goods selections in the vending apparatus must be maintained; (vii) whether prescribed quanta of one or more goods must be dispensed from the vending apparatus in a predetermined period of time; (viii) whether a prescribed quantum of money must be received at the vending apparatus in a predetermined period of time; (ix) whether a prescribed ratio of one or more of the goods to one or more others of the goods must be vended from the vending apparatus; (x) whether a prescribed ratio of one or more of the goods to one or more others of the goods must be vended from the vending apparatus in a predetermined period of time; and (xi) whether the vending apparatus must be maintained in operation to a prescribed degree.

307. The method of paragraph 301, wherein the data concerning the sales of goods from the vending apparatus further includes at least one of: (i) a quantum of one or more types of goods sold during one or more prescribed periods of time; (ii) a quantum of one or more brands of goods sold during one or more prescribed periods of time; (iii) a ratio of one or more types of the goods sold to one or more other types of the goods sold in a predetermined period of time; (iv) a ratio of one or more brands of the goods sold to one or more other brands of the goods sold in a predetermined period of time; (v) respective dates of vends from the vending apparatus; (vi) respective times of vends from the vending apparatus; (vii) information concerning whether a particular good was out of inventory; (viii) information concerning what a next choice of goods was made by a purchaser when a particular good was out of inventory; (ix) information concerning whether the vending apparatus was operational; and (x) information concerning any limitations under which the vending apparatus vends the goods.

308. The method of paragraph 294, wherein the step of releasing includes at least one of:

releasing the at least one of the encrypted data and the at least some data concerning sales of goods from the vending apparatus to a portable computing device operable to connect to a data port of the vending apparatus; and releasing the at least one of the encrypted data and the at least some data concerning sales of goods from the vending apparatus over a communications network to which the vending apparatus is connectable.

309. The method of paragraph 308, wherein the communications network includes at least one of a wire network, a telephone network, a radio frequency link, an infrared link, a local area network, a wide area network, and the Internet.

310. The method of paragraph 309, wherein the at least one interested entity includes one or more computers disposed at one or more remote locations from the vending apparatus.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method of controlling the sale of packaged goods from a vending apparatus, the vending apparatus including a computer controller which has the ability to enable or disable the vending apparatus from selling packaged goods to a user of the vending apparatus based on an agreement between a first party and a second party, wherein;

the first party has an interest in controlling the sale of packaged goods from the vending apparatus, and the second party controls the loading of packaged goods into a storage area which is located inside the vending apparatus, and wherein, the first and second parties enter into an agreement concerning the sale of packaged goods from the vending apparatus, the agreement including the following rules about the manner of operation of the vending apparatus:

(i) the vending apparatus may be enabled to sell the packaged goods to a plurality of successive users for an interval, (ii) at an end of the interval the vending apparatus is at least partially disabled from selling at least some of the goods to a plurality of successive users, and (iii) if before the end of the interval a continuation code is received by the vending apparatus, then, in that case, the vending apparatus is not at least partially disabled at the end of the interval, and furthermore wherein, the rules (i),(ii), and (iii), for enabling and disabling the vending apparatus to sell packaged goods, are executed by the computer controller, which computer controller is programmed to control the vending apparatus in accordance with these rules.

2. The method of claim 1, wherein the interval represents at least one of (i) one or more predefined periods of time; (ii) one or more predefined numbers of vends of goods from the vending apparatus; (iii) one or more predefined quanta of sales by the vending apparatus.

3. The method of claim 2, wherein the interval is at least one of reset and modified in response to the vending apparatus receiving the continuation code.

4. The method of claim 3, wherein the continuation code includes an interval modification instruction and the interval is at least one of reset and modified in response thereto.

5. The method of claim 1, wherein said parties also agree that the continuation code is made available to the vending apparatus after a determination is made that at least one rule in the agreement has been at least one of satisfied and waived.

6. The method of claim 5, further comprising determining whether the at least one rule in the agreement has been at least one of satisfied and waived, and then making the continuation code available to the vending apparatus.

7. The method of claim 6, farther comprising encrypting the continuation code prior to making it available to the vending apparatus.

8. The method of claim 6, wherein an authorized third party receives prescribed data concerning the sales of goods from the vending apparatus, at a location which is remote from the vending machine, determines whether the at least one rule in the agreement has been satisfied based on at least some of the prescribed data, and makes the continuation code available to the vending apparatus.

9. The method of claim 8, wherein the step of making the continuation code available to the vending apparatus includes at least one of:

generating the continuation code and releasing the continuation code to one of the vending apparatus, to an intermediary entity, or to an entity responsible for inputting the continuation code into the vending apparatus; and authorizing a third party to at least one of generate the continuation code and release the continuation code to the vending apparatus, to an intermediary entity, or to an entity responsible for inputting the continuation code into the vending apparatus.

10. The method of claim 9, wherein at least one of the step of releasing the continuation code to the vending apparatus and inputting the continuation code into the vending apparatus includes at least one of:

entering the continuation code into the vending apparatus through a goods selection keypad on the vending apparatus;

entering the continuation code into the vending apparatus through a dedicated keypad on the vending apparatus;

entering the continuation code into the vending apparatus through a portable device operable to connect to a data port of the vending apparatus; and entering the continuation code into the vending apparatus over a communications network to which the vending apparatus is connected.

11. The method of claim 9, wherein the communications network includes at least one of a wire network, a telephone network, a radio frequency link, an infrared link, a local area network, a wide area network, and the Internet.

12. The method of claim 8, wherein the step of making the continuation code available to the vending apparatus includes generating the continuation code and releasing the continuation code to one of the vending apparatus, to an intermediary entity, or to an entity responsible for inputting the continuation code into the vending apparatus.

13. The method of claim 8, wherein the step of making the continuation code available to the vending apparatus includes authorizing a third party to at least one of generate the continuation code and release the continuation code to one of the vending apparatus, to an intermediary entity, or to an entity responsible for inputting the continuation code into the vending apparatus.

14. The method of claim 6, further comprising:

communicating with an authorized third party responsible for receiving prescribed data concerning the sales of goods from the vending apparatus; and determining whether the at least one rule in the agreement has been satisfied based on at least some of the prescribed data.

15. The method of claim 1, wherein after having been disabled at the end of an interval, the vending apparatus is automatically enabled after a predefined period of time has elapsed.

16. The method of claim 1, wherein the computer controller is further operable to at least one of increase and decrease the interval in response to the interval modification instruction.

17. The method of claim 1, wherein the computer controller is further operable to decode the continuation code, the continuation code having been encrypted prior to making it available to the vending apparatus.

18. The method of claim 1, further comprising subjecting the sale of goods from the vending apparatus to at least one limitation.

19. The method of claim 18, further comprising modifying the at least one limitation in response to at least one limitation modification instruction contained in the continuation code.

20. The method of claim 18, wherein the at least one limitation includes at least one of: (i) that the vending apparatus is required to vend only authorized goods; (ii) that inventory of one or more goods must be maintained in the vending apparatus; (iii) that goods must be displayed in the vending apparatus in a prescribed way; (iv) that advertising indicia must be displayed on the vending apparatus in a prescribed way; (v) that a prescribed ratio of a quantum of one or more goods to a quantum of storage space for goods in the vending apparatus must be maintained; (vi) that a prescribed number of goods selections in the vending apparatus must be maintained; (vii) that prescribed quanta of one or more goods must be dispensed from the vending apparatus in a predefined period of time; (viii) that a prescribed quantum of money must be received at the vending apparatus in a predefined period of time; (ix) that a prescribed ratio of one or more of the goods to one or more others of the goods must be vended from the vending apparatus; (x) that a prescribed ratio of one or more of the goods to one or more others of the goods must be vended from the vending apparatus in a predefined period of time; (xi) that prescribed data concerning the sales of goods from the vending apparatus will be made available to the first party; (xii) that the vending apparatus must be maintained in operation to a prescribed degree, and (xiii) that the first party will not tamper with the vending apparatus.

21. The method of claim 20, wherein the limitation that the vending apparatus is required to vend only authorized goods includes at least one of: (i) selling only goods of an authorized type; (ii) selling only goods of an authorized brand; (iii) selling only goods of an authorized size; (iv) selling only goods of an authorized weight; (v) selling only goods of an authorized expiration date; (vi) selling only goods of an authorized package type; (vii) selling only goods of an authorized period of manufacture; and (viii) selling only goods of an authorized place of manufacture.

22. The method of claim 20, further comprising determining that the prescribed data concerning the sales of goods from the vending apparatus are authentic prior to making the continuation code available to the vending apparatus.

23. The method of claim 22, wherein the determination that the prescribed data are authentic is based on at least one of encryption and a code among the prescribed data.

24. The method of claim 20, wherein the prescribed data from the vending apparatus is encrypted by a computer within the vending apparatus.

25. The method of claim 20, wherein the prescribed data from the vending apparatus is encrypted by a computer before the data is communicated from the vending apparatus to a location outside the vending apparatus.

26. The method of claim 20, wherein the prescribed data concerning the sales of goods from the vending apparatus includes at least one of: (i) a quantum of one or more types of goods sold during one or more prescribed periods of time; (ii) a quantum of one or more brands of goods sold during one or more prescribed periods of time; (iii) a ratio of one or more types of the goods sold to one or more other types of the goods sold in a predefined period of time; (iv) a ratio of one or more brands of the goods sold to one or more other brands of the goods sold in a predefined period of time; (v) respective dates of vends from the vending apparatus; (vi) respective times of vends from the vending apparatus; (vii) information concerning whether a particular good was out of inventory; (viii) information concerning what a next choice of goods was made by a purchaser when a particular good was out of inventory; (ix) information concerning whether the vending apparatus was operational; and (x) information concerning any limitations under which the vending apparatus vends the goods. (xi) information concerning the sales price of any of the goods sold

27. The method of claim 20, wherein tampering with the vending apparatus includes at least one of: (i) tampering with a goods identification device of the vending apparatus that is operable to determine details of a particular good stored in or vended from the vending apparatus; (ii) tampering with a computer controller of the vending apparatus; and (iii) relocating the vending apparatus.(iv) tampering with any electronic or electro-mechanical device connected to the vending apparatus

28. The method of claim 1, wherein after having been disabled at the end of an interval, the vending apparatus is automatically enabled after a predefined period of time has elapsed.

29. The method of claim 1, wherein the computer controller of the vending apparatus may be enabled so as to produce the continuation code at the end of the interval, such that the vending apparatus is automatically enabled.

30. The vending apparatus of claim 29, wherein the computer controller of the vending apparatus is further operable to decode the disable code, the disable code having been encrypted prior to being received by the vending apparatus.

31. The vending apparatus of claim 29, wherein the computer controller of the vending apparatus is further operable to decode the continuation code, the continuation code having been encrypted prior to being received by the vending apparatus.

32. The method of claim 1, wherein the vending apparatus is disabled from vending only a subset of the goods when the continuation code is not received before or after the end of the interval.

33. The method of claim 1, wherein the first party includes at least one of a manufacturer of the vending apparatus, an operator responsible to at least stock the vending apparatus with the goods and collect receipts from the vending apparatus, a seller of one or more goods to be vended from the vending apparatus, a distributor or agent of the seller of one or more goods, a lender of money to an entity to purchase the vending apparatus, a lessor of the vending apparatus to an entity, and a holder of property on which the vending apparatus is located.

34. The method of claim 1, wherein the computer controller of the vending apparatus is operable to at least partially disable the vending apparatus from dispensing at least some of the goods when an externally generated disable code is received by the vending apparatus.

35. The method of claim 1, wherein the vending apparatus may be enabled for sequential intervals so long as respective continuation codes are received by the vending apparatus for each interval, and no two sequential continuation codes are identical.

36. The method of claim 1, wherein the computer controller of the vending apparatus is operable to (i) monitor a first selection of goods for purchase made by a user of the vending apparatus; (ii) determine whether the first selection is for at least some goods that are out of inventory within the vending apparatus; and (iii) monitor at least a second selection of goods for purchase made by the user in response to the first selection of goods being out of inventory.

37. The method of claim 1, wherein the computer controller of the vending apparatus is operable to (i) monitor data concerning sales of the goods from the vending apparatus; and (ii) release the data from the vending apparatus to at least one interested entity, wherein the data include at least one of (i) information concerning vending or attempts at vending unauthorized goods from the vending apparatus; (ii) information concerning the sales of goods from the vending apparatus obtained using a goods identification device of the vending apparatus; and (iii) information concerning any limitations under which the vending apparatus vends the goods

38. The method of claim 1, wherein the interval can be a predetermined number of attempts by the machine to vend unauthorized goods

39. The method of claim 38, wherein the information concerning whether goods are unauthorized is determined with the use of a camera, and computer using pattern recognition techniques to determine whether the image of at least one package in the vending apparatus is of a type which is or is unauthorized

40. The method of claim 39 wherein based on a determination that attempts were made to sell unauthorized goods from the vending apparatus, the computer controller is operable to partially disable the vending apparatus by disabling the ability of the vending apparatus to vend goods from that portion of the storage area in which unauthorized goods were determined to have been stored.

41. The method of claim 1, including the further steps of:

using a vending apparatus to produce a code associated with at least some data obtained by the vending apparatus concerning sales of goods therefrom, the code providing an indication as to whether the at least some data have been tampered with; and releasing at least one of the code and the at least some data concerning sales of goods from the vending apparatus to at least one interested entity such that a determination may be made as to whether the at least some data have been tampered with

* * * * *

UNITED STATES PATENT AND TRADEMARK OFFICE

CERTIFICATE OF CORRECTION

PATENT NO. : 7,389,916 B2
APPLICATION NO. : 11/076732
DATED : June 24, 2008
INVENTOR(S) : Munroe Chirnomas It is certified that error appears in the above-identified patent and that said Letters Patent is hereby corrected as shown below:

Column 124, Claim 1, lines 30-32, after "interval," should read as follows:

"(ii) at an end of the interval the vending apparatus is at least partially disabled from selling at least some of the goods to a plurality of subsequent users, and ..."

Signed and Sealed this

Sixteenth Day of February, 2010

David J. Kappos

David J. Kappos
*Director of the United States Patent and Trademark Office*